(12) United States Patent
Scheffler

(10) Patent No.: US 12,536,405 B2
(45) Date of Patent: Jan. 27, 2026

(54) METHODS AND SYSTEMS FOR NEURAL AND COGNITIVE PROCESSING

(71) Applicant: Lee J. Scheffler, West Newton, MA (US)

(72) Inventor: Lee J. Scheffler, West Newton, MA (US)

( * ) Notice: Subject to any disclaimer, the term of this patent is extended or adjusted under 35 U.S.C. 154(b) by 0 days.

(21) Appl. No.: 18/132,937

(22) Filed: Apr. 10, 2023

(65) Prior Publication Data

US 2023/0419074 A1    Dec. 28, 2023

Related U.S. Application Data

(63) Continuation of application No. 16/534,797, filed on Aug. 7, 2019, now abandoned, which is a continuation of application No. 14/718,642, filed on May 21, 2015, now Pat. No. 10,417,554.

(60) Provisional application No. 62/076,167, filed on Nov. 6, 2014, provisional application No. 62/002,146, filed on May 22, 2014.

(51) Int. Cl.
    *G06N 3/04*    (2023.01)
    *G06N 3/10*    (2006.01)

(52) U.S. Cl.
    CPC ............... *G06N 3/04* (2013.01); *G06N 3/10* (2013.01)

(58) Field of Classification Search
    None
    See application file for complete search history.

(56) References Cited

U.S. PATENT DOCUMENTS

| | | | | |
|---|---|---|---|---|
| 5,014,327 | A * | 5/1991 | Potter | G06F 18/24147 382/218 |
| 5,960,395 | A * | 9/1999 | Tzirkel-Hancock | G10L 15/12 704/241 |
| 7,580,907 | B1 * | 8/2009 | Rhodes | G06N 3/04 382/103 |
| 2007/0094168 | A1 * | 4/2007 | Ayala | G06N 3/105 706/15 |
| 2011/0060708 | A1 * | 3/2011 | Suzuki | G06N 20/00 706/12 |
| 2014/0067740 | A1 * | 3/2014 | Solari | G06N 3/10 706/27 |
| 2015/0120632 | A1 * | 4/2015 | Campos | G06N 3/049 706/44 |

FOREIGN PATENT DOCUMENTS

WO    WO-9221102 A1 * 11/1992 ............... G06K 9/66

OTHER PUBLICATIONS

Dean et al., "Large Scale Distributed Deep Networks", (2012) (Year: 2012).*

* cited by examiner

*Primary Examiner* — Andrew J Jung
*Assistant Examiner* — Beatriz Ramirez Bravo
(74) *Attorney, Agent, or Firm* — NextWave IP Legal Seervices, LLC; Leon Fortin, Jr.

(57) ABSTRACT

Provided herein is a system for creating, modifying, deploying and running intelligent systems by combining and customizing the function and operation of reusable component modules arranged into neural processing graphs which direct the flow of signals among the modules, analogous in part to biological brain structure and operation as compositions of variations on functional components and subassemblies.

19 Claims, 89 Drawing Sheets encode melody properties

— 745 reinitialize when:  False
  static var init stmts:
  graph parameter init stmts:
process input event if:  IN.value > 0 and LAST is not None and IN.timestamp – LAST.timestamp < 1000
  OUT.timestamp =  DELAY + IN.timestamp
  OUT.id =  'same' if LAST.id == IN.id else 'up' if LAST.id < IN.id else 'down'
  OUT.value =  1
  output ID list/{ID:value} dict:
  static var updates:
  graph parameter updates
else?
  OUT.timestamp =
  OUT.id =
  OUT.value =
  output ID list/{ID:value} dict:
  static var updates:
  graph parameter updates
scale factor  1.00
imports
custom functions file name
output event ID prefix
send 0-valued events?  ☑
default duration (msec):*  40
delay:*  3

Table 1030:

| signal | \multicolumn{5}{c}{sequence position} |
|---|---|---|---|---|---|
|  | 1 | 2 | 3 | 4 | 5 |
| b | 1 |   |   |   |   |
| a |   | 1 |   |   |   |
| d |   |   | 1 |   |   |
| g |   |   |   | 1 |   |
| e |   |   |   |   | 1 |

Table 1032:

| signal | 1 | 2 | 3 | 4 | 5 |
|---|---|---|---|---|---|
| b | 1 | 0.5 |   |   |   |
| a | 0.5 | 1 | 0.5 |   |   |
| d |   | 0.5 | 1 | 0.5 |   |
| g |   |   | 0.5 | 1 | 0.5 |
| e |   |   |   | 0.5 | 1 |

Table 1034:

| example sequences | | | | | | 0 tolerance | 1 tolerance |
|---|---|---|---|---|---|---|---|
| b | a | a | a |   |   | 0.2 | 0.2 |
| b | a | a | d |   |   | 0.4 | 0.4 |
| b | a | a | d | g | e | 0.6 | 0.6 |
| b | a | a | d | g | e | 0.8 | 0.8 |
| b | a | d | a | g | e | 1 | 1 |
| b | d | d | a | g | e | 0.6 | 0.8 |
| b | d | g | g | a | e | 0.4 | 0.6 |
| a | b | u | a | e | d | 0 | 0.4 |
| b | u | d | e | g | e | 0.8 | 0.8 |
| d | a | d | d | d | y | 0.4 | 0.4 |

[b,a,d,g,e]  {ad:1.0, ae:0.25, ag:0.5, ba:1.0, bd:0.5, be:0.125, bg:0.25, de:0.5, dg:1.0, ge:1.0}

[b,a,g,d,e]  {ad:0.5, ae:0.25, ag:1.0, ba:1.0, bd:0.25, be:0.125, bg:0.5, de:1.0, gd:1.0, ge:0.5}

1050
1052

| example sequences | | | | match score |
|---|---|---|---|---|
| b | a | d | | 0 |
| b | a | d | | 0.15 |
| b | a | d | g | 0.41 |
| b | a | d | g | e | 0.69 |
| b | a | d | g | e | 1 |
| b | d | g | a | e | 0.83 |
| b | d | g | g | e | 0.75 |
| a | b | g | a | d | 0.59 |
| b | u | d | g | e | 0.55 |
| d | a | d | d | y | 0.16 |

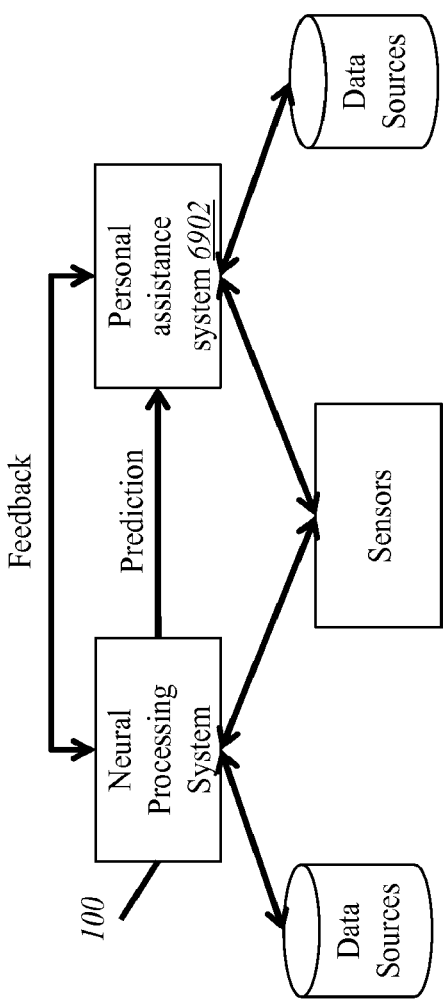
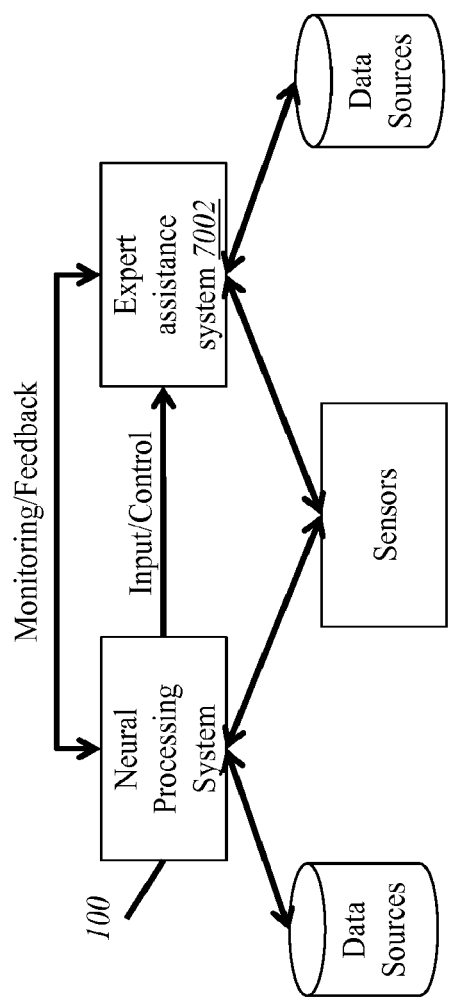
Fig. 69
Fig. 70

METHODS AND SYSTEMS FOR NEURAL AND COGNITIVE PROCESSING

CROSS-REFERENCE TO RELATED APPLICATIONS

This application is a continuation of U.S. Non-provisional patent application Ser. No. 16/534,797 filed Aug. 7, 2019. U.S. Non-provisional patent application Ser. No. 16/534,797 is a continuation of U.S. Non-provisional patent application Ser. No. 14/718,642 filed on May 21, 2015, which issued as U.S. Pat. No. 10,417,554 on Sep. 17, 2019 and which claims the benefit of U.S. Prov. App. No. 62/002,146 filed on May 22, 2014, and U.S. Prov. App. No. 62/076,167 filed on Nov. 6, 2014, where the entire content of each is hereby incorporated by reference.

FIELD OF THE INVENTION

This application relates to the field of artificial intelligence.

DESCRIPTION OF THE RELATED ART

Artificial intelligence has advanced significantly, such that computers are capable of performing functions of increasing complexity, such as playing strategic games like chess, solving complex puzzles, and the like. However, animals and humans perform many tasks in ways that are superior to the current state of the art of computer-based intelligence. Reverse engineering biological brains remains a continuing research and development challenge, both for understanding how biological brains work, and for building working artificial systems with structure and function similar to biological brains. An emerging point of view is that biological brain architecture comprises variations in connectivity among variations of common "building block" components and subsystems. Evolution's environmental adaptations have yielded both commonality and diversity in how basic genomic/chemical/electrical mechanisms are configured and assembled to form biological brains. Synthesizing working cognitive systems with structure and function similar to biological brains can yield insight and guidance to biological brain studies and useful systems.

No existing systems embody these viewpoints closely enough to support research and building intelligent systems. Systems exist for simulation of biological synapses, neurons, and small neuron assemblies in software and hardware including neuromorphic circuits thought to mimic neuron and synapse operation, and combinations thereof. These systems focus on fine levels of biochemical detail below the functional level, and require large amounts of computing power beyond that available in widely available computers to compute large amounts of cognitive capability. Other existing systems implement high-level cognitive functions using system architectures that are very different from the structure and function of biological brains, making it difficult to use these systems to understand biological brain operation or to use biological observations to inspire and guide artificial system design. Missing are systems for emulating brain function, interconnection and operation at a functional abstraction level and structure analogous to biological brains, and which can compute substantial cognitive capabilities on widely available conventional computers as well as specialized hardware. Accordingly, a need exists for practical methods and systems that support research efforts to reverse engineer the brain at a functional level, helping to understand how the brain does what it does, and to build similar functionality that operates in similar ways on widely available computing resources. Further, needs exist to integrate many existing specialized cognitive-related technologies into integrated working intelligent systems, as well as to incorporate intelligent functionality in other systems.

Incorporated by reference herein is the paper "NeurOS™ and NeuroBlocks™ a neural/cognitive operating system and building blocks" in the journal Biologically Inspired Cognitive Architectures, Volume 11, January 2015, Pages 75-105, ISSN 2212-683X.

SUMMARY

Provided herein is a system for creating, modifying, deploying and running intelligent systems, referred to herein as neural processes, by combining and customizing the functions and operation of reusable component modules. Such modules are arranged in neural processing graphs or circuits which direct the flow of signals among the modules, including the ability to model the overall structure and operation of biological brains at a functional level. The system embraces composition of variations on multiple themes, including those that conceive of a brain as a collection of interconnected building block components and subsystems. Intelligent systems so built may run with scalable performance and without redesign on widely available computing platforms as well as on specialized hardware and combinations thereof. Embodiments additionally may comprise abilities to easily customize modules, to create custom modules, to incorporate external system functions as modules, to incorporate neural processes in external systems, and to share and exchange learned information among multiple systems.

In one aspect, a system includes a neural process specification and a neural computing environment, where the neural process specification further includes a plurality of modules and a plurality of links for conveying signals there between, where the neural computing environment executes the neural process specification.

Implementations may have one or more of the following features. The system may be configured to perform a cognitive function. The cognitive function may include at least one of sensing, perception, reacting, learning, pattern recognition, short-term memory, working memory, long-term memory, classification, prediction, imagination, reasoning, planning, problem solving, acquiring and using skills, behavior, learning and navigating spaces, and language acquisition, understanding and generation. A link may be a directed link including a source end and a target end, where a module connected to the source end sends signals over the directed link to a module connected to the target end, where the target end-connected module is responsive to the signals. The source end-connected module and the target end-connected module may be the same module. The plurality of directed links carrying signals between the modules may organize the modules into a directed neural graph. The source end-connected module may have at least one distinguished output port, the target end-connected module may have at least one distinguished input port, the output port of the source end-connected module may connect to the source end of the directed link, the target end of the link may connect to an input port of the target end-connected module, the source end-connected module may send signals on the link via the output port, and the target end-connected module may be responsive to the signals from the target end of the link connected to the input port. The signals may include a plurality of events, where each event includes a stamp, a signal identifier, and a signal value. The stamp may be selected from a group consisting of a real time value, a virtual time value, and a number. The signal identifier may uniquely identify a signal among the signals on a link. The signal value may be selected from the group consisting of a scalar, a vector, a matrix, a data structure, and a reference. Each event may signify a value of the signal identified by the signal identifier as of the stamp value. The neural process specification may include one or more parameters accessible to the plurality of modules. A module from the plurality of modules may change the value of one or more parameters of the neural process specification. A module from the plurality of modules may additionally include one or more module parameters for specifying and controlling the function and operation of the module. The value of a module parameter may be computed as a function of one or more parameters of the neural process specification. A module from the plurality of modules may additionally maintain one or more internal state values, where the state values are updated as appropriate to the function of the module. A module from the plurality of modules may additionally access one or more external state values, where the state values are accessible to other modules from the plurality of modules, and where the state values may be updated by one or more modules from the plurality of modules. One or more of the external state values may represent a long-term memory pattern. A module from the plurality of modules may be an input module, performing an input function, obtaining external information from an external environment and conveying it as one or more said signals to a link. The external information may be selected from the group consisting of image, video, audio, MIDI, user input gesture, keystroke, phonetic stream, data stream, message stream, external program output, file reading, stochastic process observations, query results, search results, sensor reports, and sensor observations. A module from the plurality of modules may be an output module, performing an output function, receiving one or more signals from a link, and transmitting corresponding information to an external environment. The external information may be selected from the group consisting of image, video, audio, MIDI, alphanumeric text, symbolic text, visual display, file writing, data stream, message stream, external program input, database update, control of mechanisms, control of apparatus, and voice synthesis. A module from the plurality of modules may be a processing module, receiving one or more signals from an input link, performing a module function specific computation, and as determined by the computation, sending signals on an output link. The module may be at least one of a transformer module, a filter module, a working memory module, a group operations module, a wrapper module, a sub-graph module, and a custom program module. The neural process specification may further include one or more pattern memory spaces, where each memory pattern space holds one or more memory patterns, and each memory pattern represents a combination of signal values, and where each memory space is sharable by one or more of the modules in the neural process specification. At least one module may be a memory pattern module accessing one or more memory patterns in one or more memory pattern spaces. The memory module may compare a combination of input signals with a memory pattern in the plurality of memory patterns, deriving for the memory pattern a pattern matching score reflecting the degree of matching of the input signal combination with the memory pattern, and send an output signal for the pattern using a function of the pattern matching score as the signal value. The function may be one of a constant function, a binary function, a linear function, a logistic function, or mathematical combinations thereof. The module may additionally create a new memory pattern corresponding to an input signal combination on the input links that fails to match any existing memory pattern with a matching score above a threshold value. The module may additionally make adjustments to a memory pattern to incorporate an input signal combination, where the magnitude of the pattern adjustments is governed by a learning rate. The adjustments may include one of changing a weight associated with an input signal, changing an expected value associated with an input signal, adding a new signal to the memory pattern, and removing a signal from the memory pattern. The module may be at least one of a set module, a sequence module, or a temporal module. The module may be selected from a group consisting of a weight set module and a weight value set module. The module may be selected from a group consisting of a weight matrix sequence pattern module, a weight value matrix sequence pattern module, a regular expression sequence pattern module, an edit distance sequence pattern module, an open bigrams sequence pattern module, and a state machine sequence pattern module. The module may be a temporal module. The module may be a reify module for generating output signals corresponding to identifiers in a pattern which pattern identity is received as an input signal. The neural computing environment may include a compilation function, an executable process representation, and an execution machine. The compilation function may generate the executable process representation corresponding to the neural process specification and the execution machine may execute the executable process representation. The executable process representation may be a machine language representation, where the process execution machine includes one or more physical or virtual computer processors for running the machine language representation. The executable process representation may involve multiprocessor coordination. The executable process representation may be a configuration specification for configuring hardware to perform the functions of the neural process graph specification. The neural computing environment may include a neural process specification interpreter and executable module implementations, where the interpreter and module implementations further use facilities of a computer operating system and one or more computer processors to execute the neural process specification. The processing of the executable module implementation of the module may be performed on multiple computer processors. The processing of the functions of multiple interconnected modules may be split among multiple computer processors organized as one or more of a shared-memory multi-processor system, a non-shared-memory multi-processor system, and a distributed system. The neural computing environment may allocate modules and links of the neural process specification to processing nodes and communications paths in a multi-processor or distributed computing system. The allocation of modules and links may change during the execution of the neural process specification. The allocation of modules and links may include redundant execution of parts of a neural process specification. The neural computing environment may maintain a monotonically non-decreasing virtual time clock which may advance at least one of faster, slower, and at the same rate as real time where stamp values of events are set and interpreted relative to the virtual time clock. The neural computing environment may continue execution of parts of a neural process specification when execution of other parts stop operating or stop communicating. The system may further include a development environment including a library of module types, an external persistent representation of a neural process specification, and a user interface for creating, modifying, saving and restoring a neural process specification. The system may further include a user interface for assembling and modifying a neural process specification graphically in a directed graph form by one or more of adding a module, configuring a module, removing a module, adding a link, configuring a link, and removing a link. The system may further include a user interface whereby a developer may assemble and modify a neural process specification graphically using a block construction visual metaphor by placing blocks representing module instances on a design canvas and representing links by block proximity. The system may further include a user interface for setting and modifying parameters of a module instance. The system may further include a graphical user interface for setting and modifying parameters of the neural process specification. The user interface (e.g., visual editor) may provide a zoom function to vary the display of sub-graphs of the neural process specification where such variation may include at least one of expansion, contraction, separation, and hiding of the display of at least one sub-graph. The system may further include at least one or more functions for deploying a neural process specification for execution by a neural computing environment, starting, controlling, monitoring, pausing, continuing or stopping execution of a neural process specification. The system may further include a facility to vary the rate at which a neural process executes. The system may further include facilities for at least one of tracing and displaying aspects of the execution of a neural process. Design changes made to the neural process specification may change the execution of the neural process while executing. The system may further include displaying changing aspects of neural process execution using visual attributes of icons and lines. The system may further include a graphical representation of one or more memory patterns.

In another aspect, a system includes neural process specification and a neural computing environment, where the neural process specification further includes at least one module.

Implementations may have one or more of the following features. The module may have no links to external modules and performs at least one neural process computing function that is internal to the module. The system may further include at least one link of the module for conveying signals to the at least one module and/or from the at least one module, where the neural computing environment executes the neural process specification. The at least one module may be configured to mimic a cognitive function of a biological brain. The cognitive function may be at least one of sensing, perception, reacting, learning, pattern recognition, short-term memory, working memory, long-term memory, classification, prediction, imagination, reasoning, planning, problem solving, acquiring and using skills, behavior, learning and navigating spaces, and language acquisition, understanding and generation. The system may include a single source module that undertakes a function and provides an output via a link. The system may include a single target module that takes an input via a link and performs a function.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 7E shows a parameter control panel of a transformer module embodiment.

FIG. 10C shows sequential pattern weight matrices and matching scores.

FIG. 10E shows sequential pattern bigrams and matching scores.

FIG. 69 shows a neural processing system providing a prediction to a personal assistance system.

FIG. 70 shows a neural processing system providing monitoring, input and/or control to an expert assistance system.

DETAILED DESCRIPTION

Figure 1:
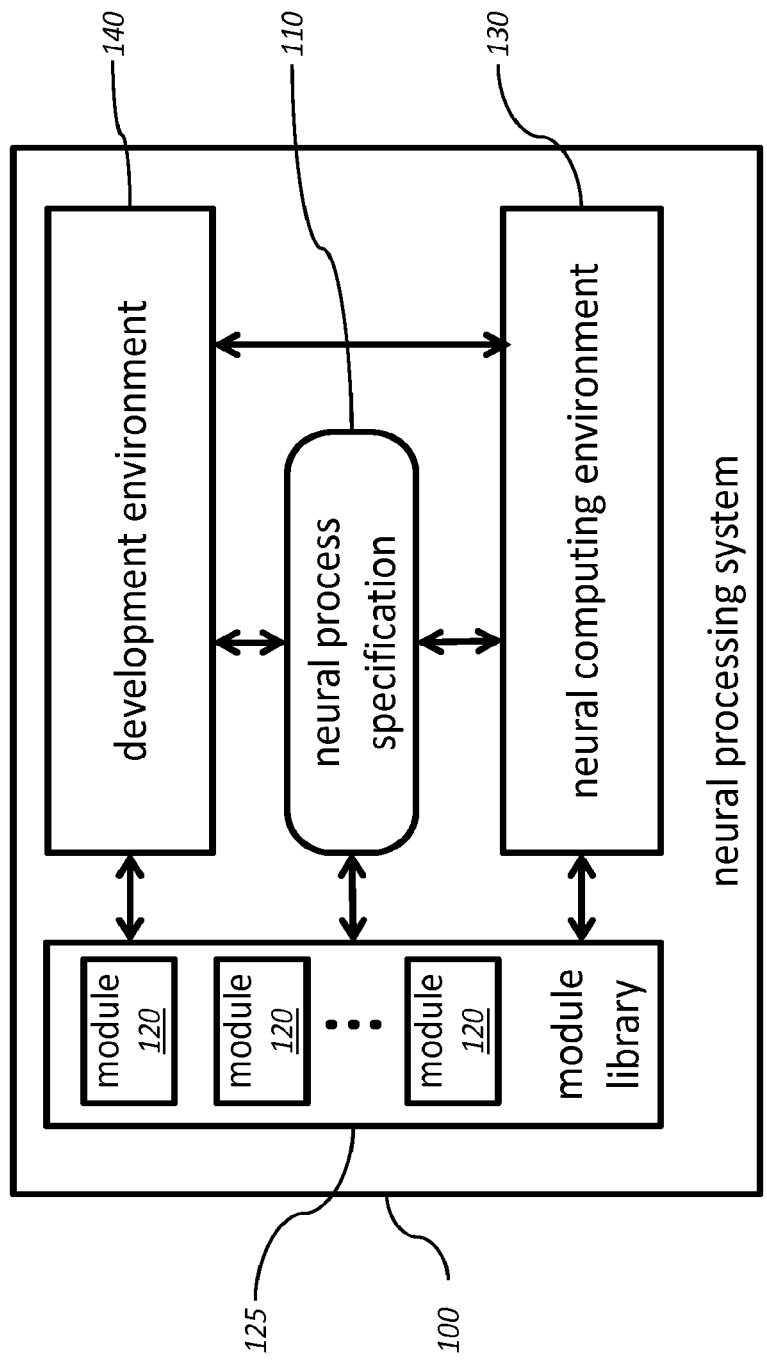
FIG. 1 shows an overview of a neural processing system.

The embodiments will now be described more fully hereinafter with reference to the accompanying FIGURES, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one skilled in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "above," "below," and the like, are words of convenience and are not to be construed as limiting terms unless expressly state otherwise.

Cognitive functions as contemplated herein refer generally to the range of functions performed by animal and human brains and nervous systems and intelligent systems, including without limitation aspects of sensing, perception, reacting, learning, pattern recognition, short-term memory, working memory, long-term memory, classification, prediction, imagination, reasoning, planning, problem solving, acquiring and using skills, behavior, learning and navigating spaces, and language acquisition, understanding and generation. In the described systems, cognitive functions may be embodied in individual components and may also emerge from interconnection of components irrespective of whether components individually embody a cognitive function.

Neural Processing System Overview

FIG. 1 shows an overview of an embodiment of a neural processing system 100. A neural process specification 110 specifies a composition of processing modules 120 which may be aggregated into a module library 125, which composition may implement a cognitive function. The specification 110 may be executed by a neural computing environment 130 to perform the specified cognitive function, using neural computing environment specific implementations of modules 120. A development environment 140 may enable creation and editing of a neural process specification 110. The development environment may interact with the neural computing environment 130 to facilitate operations including without limitation deployment, control, monitoring and visualization of execution of a neural process specification 110.

Despite superficial similarities in terminology and graphical depiction, methods and systems described herein should not be confused with well-known technologies called "neural networks". Methods and systems described herein operate on very different organizational, structural and operational principles from neural networks.

Figure 2A:
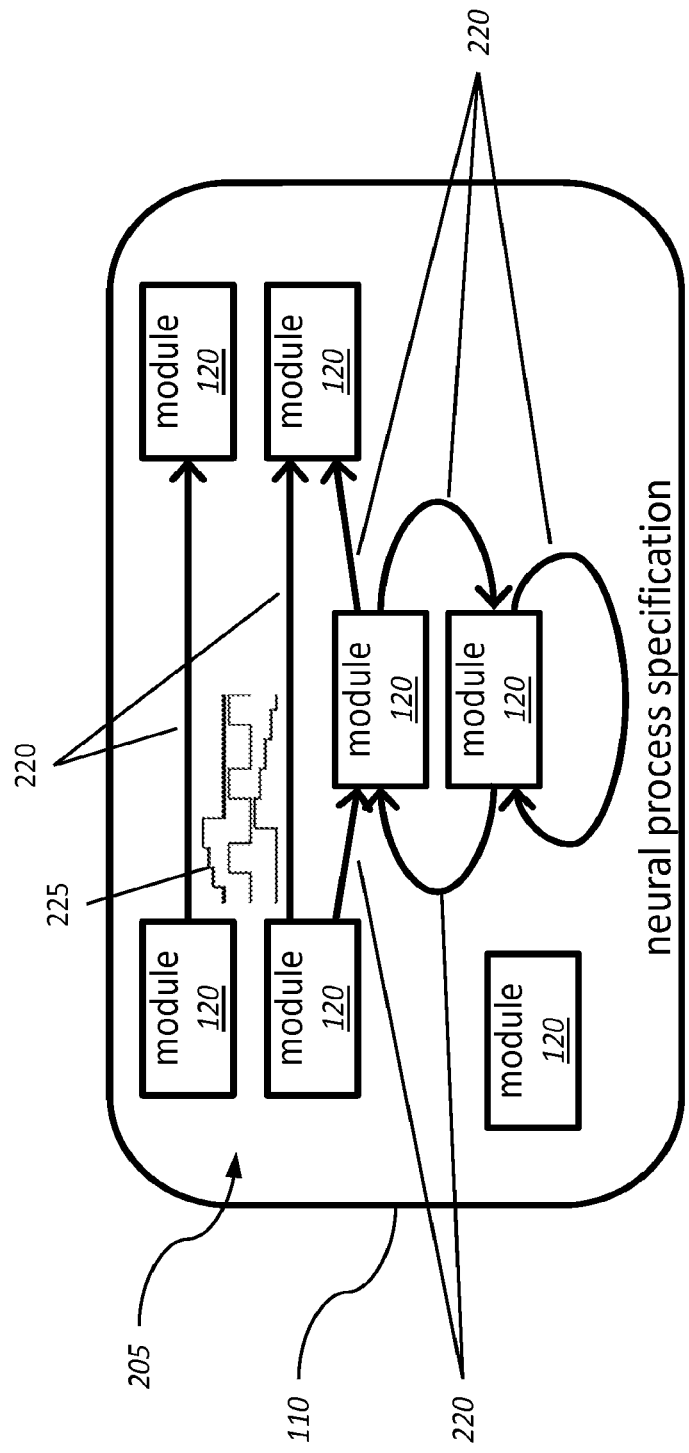
FIG. 2A shows a neural process specification in the form of a neural graph.

In embodiments a neural process specification 110 may be a directed neural graph 205, also sometimes referred to herein interchangeably as a neural circuit, sub-graph, application, assembly or sub-assembly, as shown in FIG. 2A, comprising a plurality of modules 120 and directed links 220 interconnecting the modules and conveying signals 225 among the modules. In an aspect, the directed links carrying signals between the modules organizes the modules into a directed neural graph 205. For clarity, signals 225 are shown for some but not all links in FIG. 2A. It should be clear that similar signals may be conveyed on all links 220.

Figure 2B:
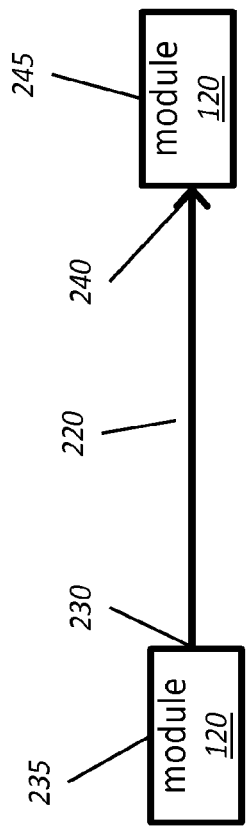
FIG. 2B shows details of a directed link connecting from a first module to a second module.

As shown in FIG. 2B a link 220 may have a source end 230 connected to a module 120 referred to as the source module 235 of the link, and a target end 240 connected to a module 120 referred to as the target module 245 of the link. The link 220 may be referred to as an output link of its source module 235. The link 220 may also be referred to as an input link of its target module 245. The link may convey one or more signals from source module 235 connected to its source end 230 to target module 245 connected to its target end 240. In one aspect, the source end-connected module and the target end-connected module are the same module.

In embodiments a neural process specification 110 may have a general directed graph topology, referred to herein as a neural graph or neural circuit. A module may have zero, one or more output links and zero, one or more input links. A neural graph may have loops, including a link connecting a module to itself. A neural graph may be completely or incompletely connected by links. A single module with no input links and no output links connected may be a valid neural graph. A single module with no input links and no output links connected may be a valid component of a valid neural graph.

Figure 2C:
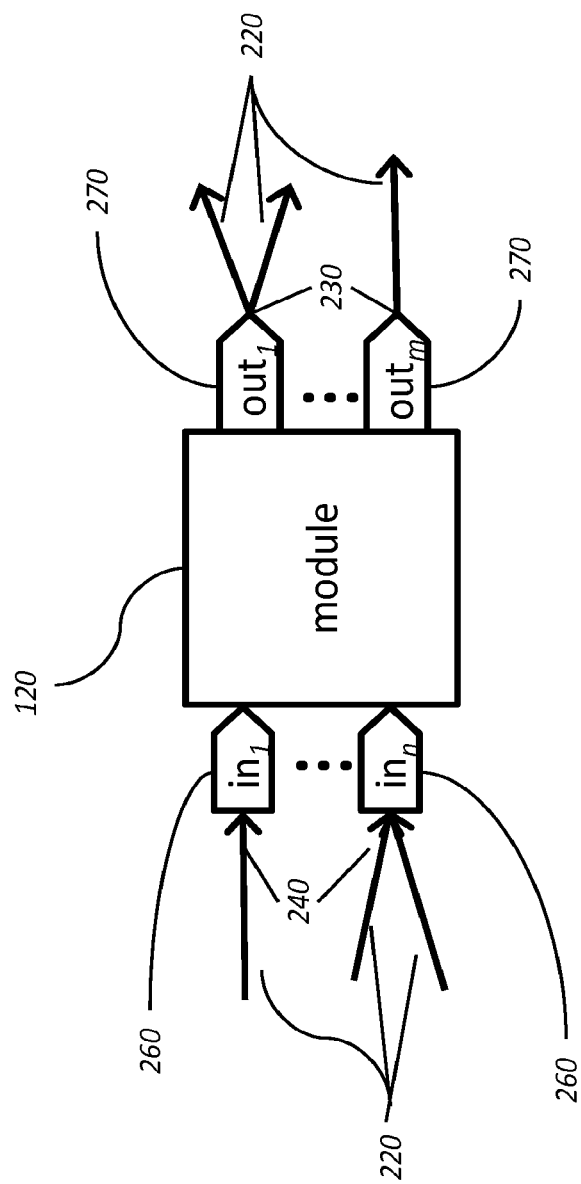
FIG. 2C shows input and output ports of a module.

In embodiments a module 120 may have distinguished ports to serve as connection points for links 220, as shown in FIG. 2C. A module 120 may have zero or more distinguished input ports 260, each of which may serve as a connection point for target ends 240 of links 220, and may have zero or more distinguished output ports 270 each of which may serve as a connection point for source ends 230 of links 220. Multiple link 220 target ends 240 may connect to one input port 260 and may represent a commingling of signals from those links to that input port. Multiple link 220 source ends 230 may connect to one output port 270 and may represent a sharing or duplication of signals sent via that output port onto the multiple links.

In embodiments a neural process specification 110 may have one or more parameters, sometimes referred to herein for clarity as "graph parameters" which values may be accessible to modules 120 in the process specification. In embodiments, values of these parameters may be changed dynamically by one or more of without limitation a development environment 140, a neural computing environment 130, and modules 120.

In embodiments a module 120 may have one or more module parameters which values are used to configure and control module operation. In embodiments the value of a module parameter may be set by a programming language expression which may include references to parameters of the neural process specification 110 as well as constant values, programming language operators and functions.

Figure 2D:
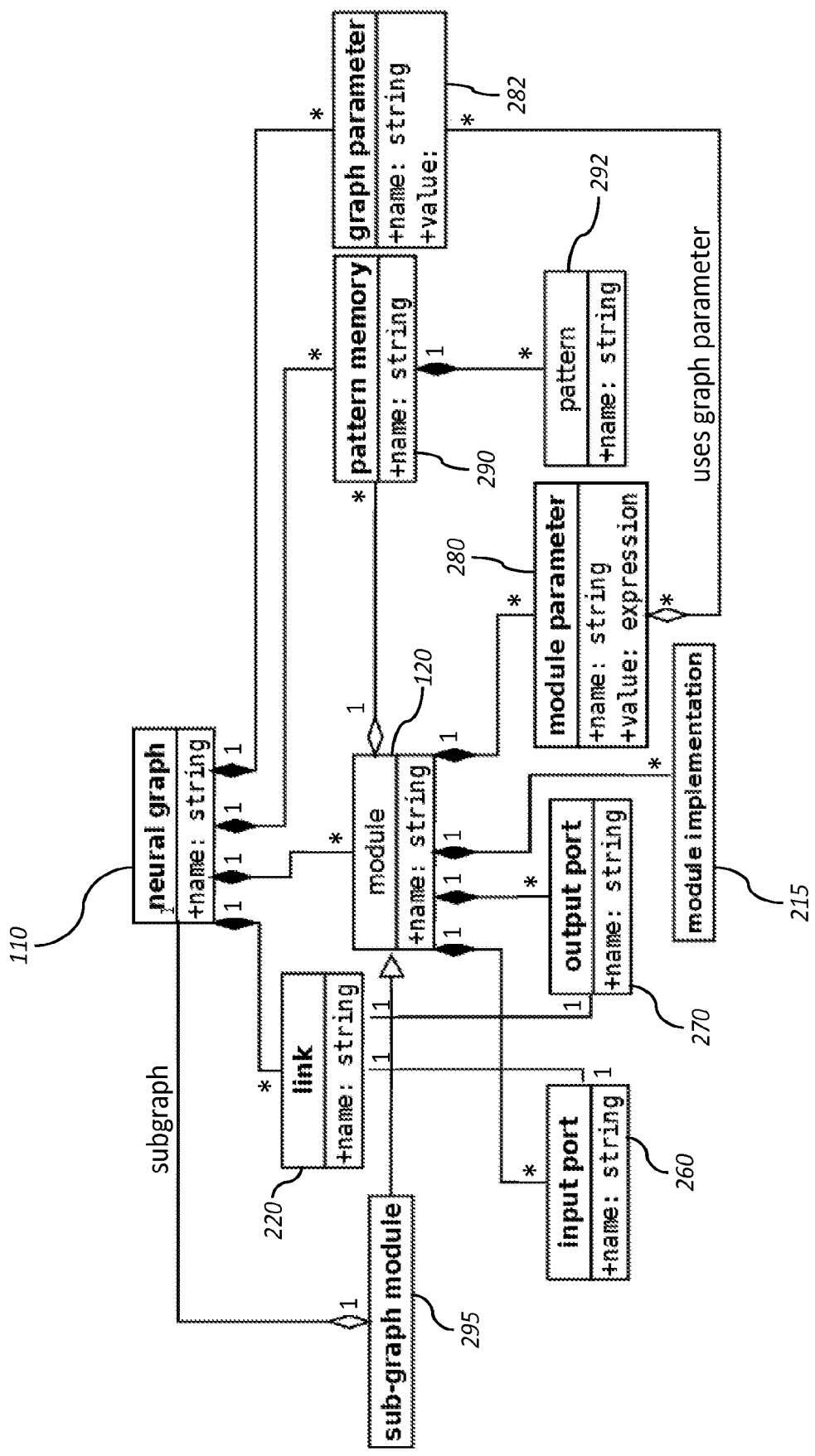
FIG. 2D shows a UML class diagram showing neural process specification elements and relationships.

FIG. 2D is a UML diagram that further clarifies elements and relationships of embodiments of neural process specification 110, also referred to herein as a neural graph or neural circuit. It should be understood that the use of a UML class diagram for explanatory purposes in no way implies that any embodiment is necessarily implemented in an object oriented programming technology. It should further be understood that the use of a UML class diagram for explanatory purposes in no way implies that any embodiment implemented in an object oriented programming technology necessarily uses exactly the classes and relationships shown in the diagram. It should also be understood that a UML class diagram such as this may include only some elements and relationships of an overall system, and should therefore be considered non-limiting of other possible elements and relationships not shown.

A neural graph 110 may contain one or more modules 120, links 220, graph parameters 282 and pattern memory spaces 290. A module 120 may contain any number including zero of input ports 260, output ports 270, and module parameters 280. A link 220 may connect one output port 270 to one input port 260. A sub-graph module 295 may encapsulate a neural graph 110 as a reusable module 120. A module 120 may have associated one or more module implementations 215 corresponding to different neural computing environments 130 including without limitation object-oriented class implementations, scripts, program code, microcode, configurable hardware configurations, and hardware components and circuits. As used herein, enumerations of sub-types of module 120 are not intended to be limiting, as embodiments may comprise many additional sub-types not shown in FIG. 2D.

In embodiments a neural process specification 110 may include just a single module 120 and no links 220 to external modules. Such a neural process may perform the functions of the single module without receiving any signals from other modules, but may obtain information directly from external sources and deliver information directly to external targets. Such a neural process specification may be referred to as an "application".

In embodiments a neural process specification 110 may comprise one or more modules 120 not connected to other modules 120 by any links 220. During execution, such isolated modules may function independently and concurrently with other modules in the neural process specification, and may obtain information directly from external sources and deliver information directly to external targets.

In embodiments a neural process specification 110 may comprise one or more disjoint sub-graphs with no links between modules in one sub-graph and modules in other sub-graphs. During execution, such disjoint sub-graphs may execute independently, each sub-graph separately obtaining information from external resources and delivering information to external targets and updating shared external state.

Embodiments may include a function to save a neural process specification 110 to a file in a variety of formats including without limitation an XML format, a tabular format, a text format, a programming language format, and a binary format. Said save format may include aspects of the neural process specification such that the specification can be reconstituted from said format at a later time. Said save format may optionally include without limitation the current states and values of graph parameters, memory pattern spaces, individual modules and links.

Embodiments may include a function to restore a neural process specification from a formatted file in a variety of formats including without limitation an XML format, a tabular format, a text format, a programming language format, and a binary format. Said restoring may in addition restore any state present in the saved specification, including without limitation the states and values of graph parameters, memory pattern spaces, individual modules and links. Such restoring may reconstitute an equivalent version of a saved neural process specification which may differ only in non-essential characteristics. Such restoring may additionally adapt a saved neural process specification to a different version of a neural process specification including without limitation changes to module types, parameters and parameter values, links, and saved state.

When executed by a neural computing environment 130, a module 120 may perform one or more functions. It may interact with an external resource to receive information, modify external information, send information, or control and manage resources. It may invoke a program. It may receive signals from one or more input links. It may send signals to one or more output links. It may perform computations. It may create and update internal state. It may interact with a user. Such external resources may include without limitation files, communications links, audio, images, video, sensors, user interaction devices, programs, devices, robots, vehicles, databases, and computer networks.

Illustrative Example—What's that Tune?

Figure 3:
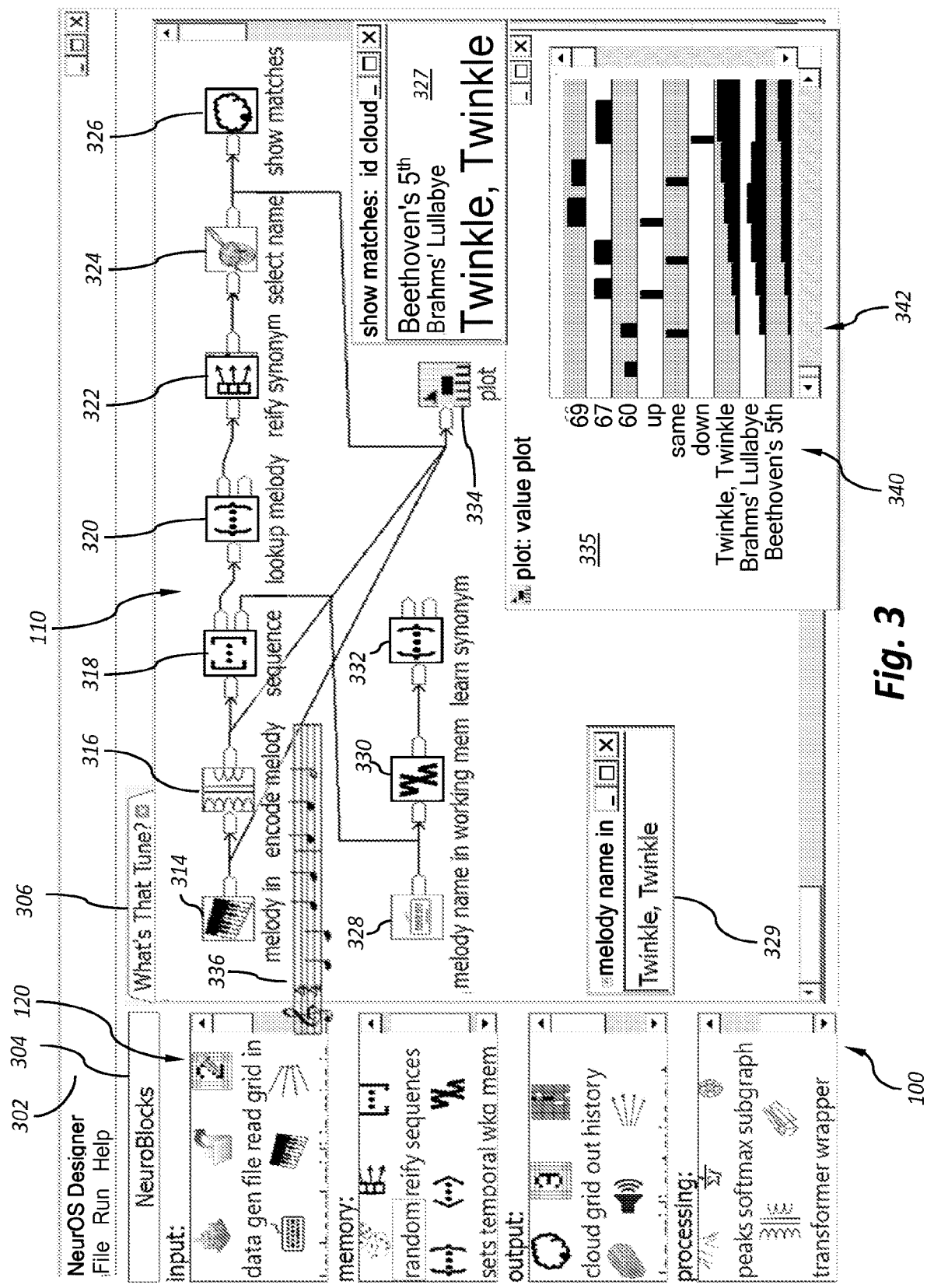
FIG. 3 shows a melody identification application in an embodiment.

FIG. 3 shows a melody identification function which may be a cognitive application or function built as a neural process specification 110 in the "NeurOS" environment which is an embodiment of neural processing system 100. It will be understood that the NeurOS environment may in general include the programming environment—user interface, controls, import and export tools, access to programming libraries, and so forth—used to create, modify, execute, port, export, monitor, debug, and otherwise work with neural process specifications 110, modules 120 also known as "NeuroBlocks", module libraries 125 and neural computing environments 130 as contemplated herein. Thus the term environment, as used herein, should be construed broadly to include any or all of the foregoing, or other hardware, software, user interface components, and the like used to build and use neural processing systems.

FIG. 3 shows the NeurOS Designer tool 302 which is an embodiment of development environment 140, showing a simple NeurOS application which is a neural process specification 110 under development. At left is the NeuroBlocks toolbox 304 which displays modules in a module library 125 which may be used in a neural graph design. The design creation and editing canvas 306 shows an example of neural process specification 110 neural graph 205 of the application under development, a simple "What's That Tune?" melody learning and recognition capability. In operation, a simple melody is played on a musical keyboard and a name is entered for it on a computer keyboard. Later, a melody is played, perhaps in a different key, tempo and with mistakes or extra or missing notes, and the application recognizes previously learned melodies with relative confidence scores.

In the following description, when one module 120 performs its function, it sends signals representing any results out via one or more output ports 270 over one or more links 220 to one or more input ports 260 of other modules, which perform additional processing. In FIG. 3, specific instances of modules 120 are numbered uniquely to identify them individually for clarity of explanation. Also in FIG. 3, the many links and ports are left unlabeled to avoid visual clutter and improve clarity, their identities and functions being implicit in context.

In more detail, a simple melody illustrated in conventional music notation 336 is entered via the "melody in" module 314 attached to a MIDI-capable musical instrument (e.g., a MIDI-capable piano-style keyboard). Module 314 sends signals corresponding MIDI's note-on and note-off messages to modules 316 and 334. "Encode melody" module 316 converts these signals into an abstract invariant representation of the melody, signals for relative pitch intervals of "same", "up" and "down". These signals are learned as a sequence pattern by the "sequence" module 318, which may output a signal uniquely identifying a new pattern on its "new" output port. A name for the new melody may be entered in computer keyboard input window 329 associated with "melody name in" module 328 and may be output as a signal identified by the entered name.

When both a new melody pattern is created for an unfamiliar melody, and a new name is entered for it at roughly the same time, signals for both these occurrences may arrive at "working mem" module 330, which may remember both occurrences for a short period of time and may emit signals for them concurrently. The "learn synonym" module 332 may observe the concurrent signals for the name and the encoded melody and may create a new distinct synonym pattern for a new combination.

When another melody is subsequently entered in "melody in" module 314, and subsequently encoded in "encode melody" module 316, "sequence" module 318 may compare the abstract melody representation signals with previously learned sequence patterns, and may outputs signals on its "out" output port reflecting pattern matching confidence for each known melody pattern. The "lookup melody" module 320 may then recognize name-melody synonym patterns previously created by the "learn synonym" module 332. The "reify synonym" module 322 may generate signals for the component elements of matching set patterns (names and melody patterns). The "select name" module 324 may select just the name signals and output signals reflecting the matching confidence score of each name. The "show matches" module 326 may show these names in associated display window 327 using a font size proportional to matching confidence. The "plot" module 334 may display the values 342 over time of input signal identifiers 340 in associated EKG-like plot display window 335 showing signal value progressions over time.

In the specific running application depicted, at least three previous simple melody patterns may have been learned and associated with names: "Twinkle, Twinkle", "Brahms' Lullabye" and "Beethoven's 5th". The progressive confidence scores for these names are shown in the bottom three signal lines of the window 335 and also depicted in the relative font sizes in window 327. As successive melody notes are input, the several patterns begin to match partially. After several more notes are input, the matching confidence level of the "Twinkle, Twinkle" melody continues to rise, while the confidence levels of other melody patterns diminish or fail to rise.

Signals

In embodiments a signal may be represented by any signaling mechanism or encoding capable of conveying at least one of an analog and a digital signal in at least one of a time domain, a frequency domain, a spatial domain and a complex domain. In embodiments a signal may convey at least one of values, value changes, or events.

Embodiments may employ combinations of a variety of representations, encodings and media for conveying signals on links 220, including without limitation computer memory data structures, analog or digital transmission systems, event systems, messaging systems, computer networks, data streams, wires, and busses.

As used herein, the words "sending", "outputting", "receiving" and "inputting" as applied to signals are intended to be interpreted as appropriate for a signal representation, encoding and communications medium in use in an embodiment. As a non-limiting example, in signaling using computer memory data structures "sending" or "outputting" a signal may refer to setting or changing a value in memory and "receiving" or "inputting" such a signal may refer to observing a value in memory. As a non-limiting example, in signaling using analog transmission "sending" or "outputting" a signal may correspond to setting a physical property including without limitation voltage, current, pressure, intensity or the like, and "receiving" or "inputting" a signal may correspond to detecting the state or value or changes of such a physical property. As a non-limiting example, in signaling using digital transmission "sending" or "outputting" may correspond to encoding a digital pattern representing a signal's value and transmitting that pattern over a signaling medium, and "receiving" or "inputting" may correspond to decoding such a digital pattern. As a non-limiting example, in signaling using event or message systems, "sending" or "outputting" may correspond to creating a discrete message comprising an encoding of a signal's value and transmitting it via a message passing system, and "receiving" or "inputting" may correspond to receiving the message and decoding the signal's value in the message. As a non-limiting example, in signaling over a bus, "sending" or "outputting" may correspond to setting a physical property including without limitation voltage or current on one or more discrete connections and "receiving" or "inputting" may correspond to detecting the state or value of such a physical property.

Figure 4C:
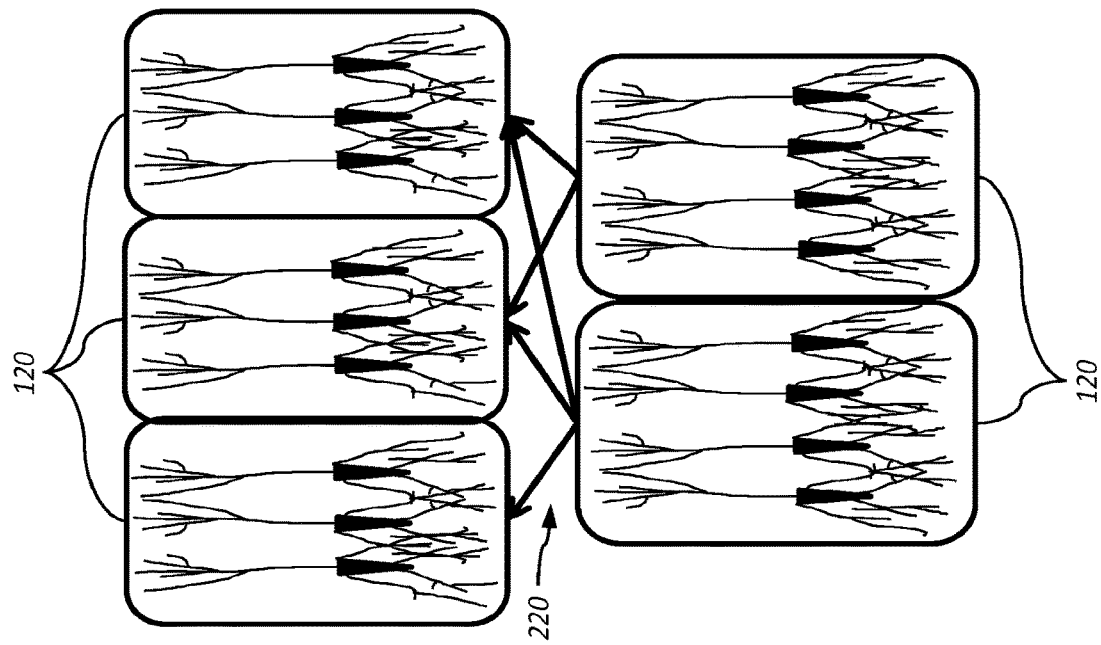
FIG. 4C shows multiple groups of biological neurons grouped into multiple modules connected by multiple links.
Figure 4B:
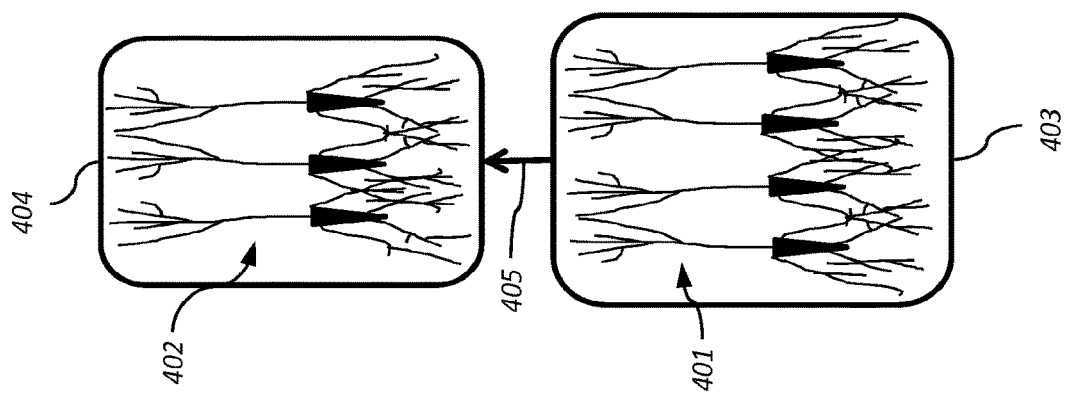
FIG. 4B shows biological neurons grouped into modules connected by a link.
Figure 4A:
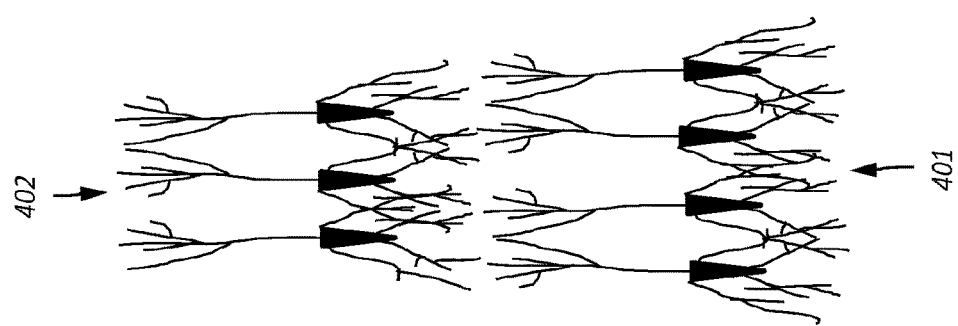
FIG. 4A shows groups of biological neurons.

FIGS. 4A, 4B and 4C illustrate a rough biological analogy to modules 120 and links 220. FIG. 4A depicts two stylized groups or layers of interconnected biological neurons, a source group 401 and a target group 402. In FIG. 4B, neuron group 401 is aggregated into module 403 which performs the functions of the aggregated neurons, neuron group 402 is similarly aggregated into module 404, and link 405 connects from module 402 to module 404, conveying the aggregated signals from neuron group 401 to neuron group 402. More generally, FIG. 4C shows multiple groups of neurons aggregated into multiple modules 120 and their aggregated signals conveyed among modules via multiple links 220. In system embodiments, neural graphs may convey similar multiple cross-connectivity among modules representing aggregated neural functions.

Embodiments may include a signal representation and encoding on a link modeled on biological neuron signaling comprising a partially ordered collection of events, each event comprising a stamp, an identifier, and a value. The stamp may serve to order and synchronize events relative to each other. The event stamp may be of any form such that one event stamp is equal to, less than or greater than any other event stamp. In embodiments a stamp may be without limitation a number, a real time or a virtual time. The event identifier may be any value to identify the signal associated with this event to distinguish the signal from other signals conveyed on the same link or arriving at the same module input port. The event value may be one of a scalar, a vector, a matrix, a general data structure or a reference to data. An event may mean "the signal identified by this event identifier has this value at this stamp".

The stamp values provide an ordering of signal changes in a neural processing system. In embodiments, an event's stamp may be any sort of value as long as any event stamp may be compared with any other event stamp to determine whether one event occurs before, concurrently with or after the other according to a range of stamp values. Event stamps provide a sense of both concurrency and forward progress in a neural processing system, and enable highly flexible asynchronous parallel correct execution in neural computing environments.

In embodiments, a stamp may correspond to a time value which may be a real or virtual time.

Figure 4D:
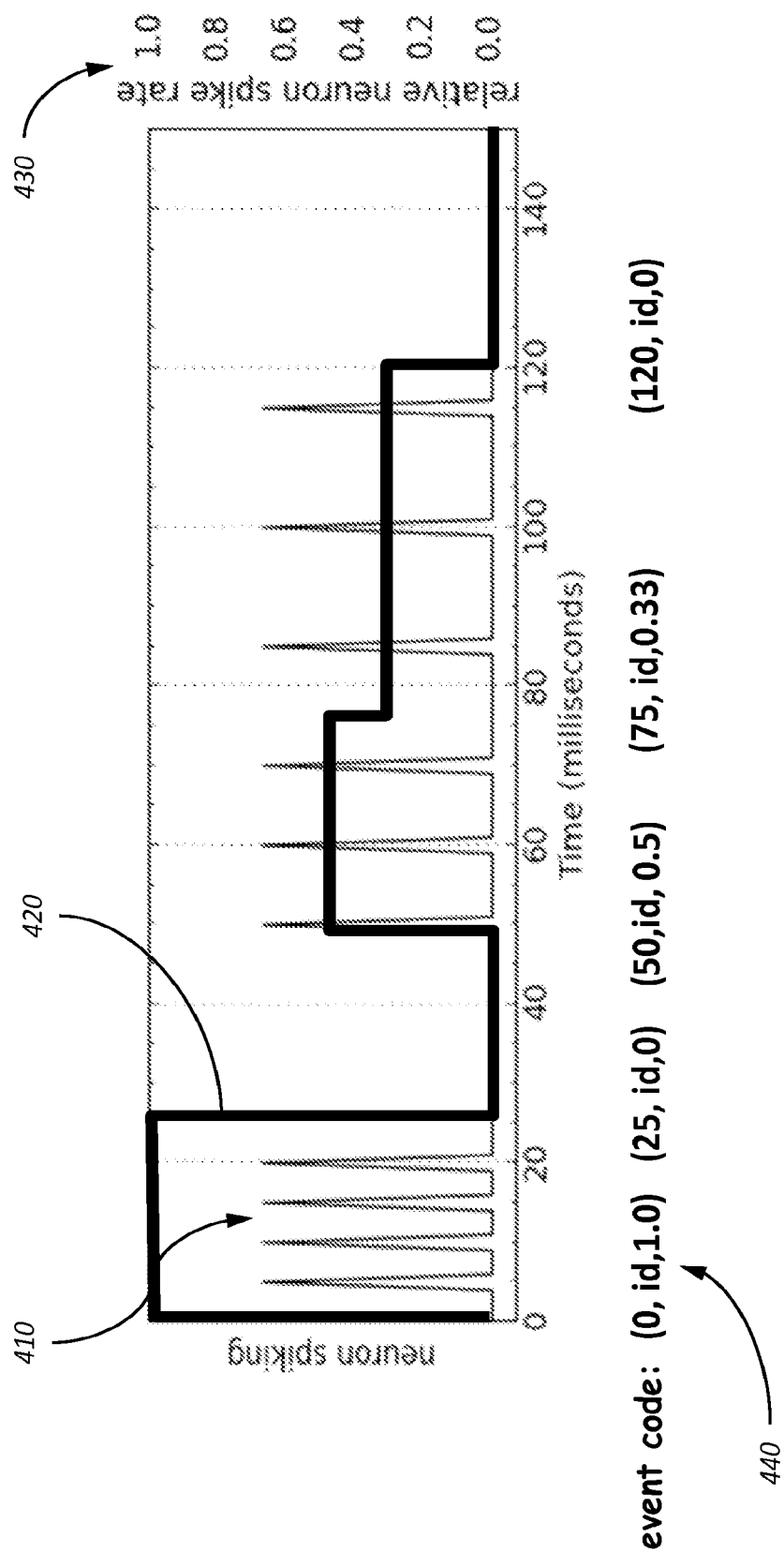
FIG. 4D shows an encoding of a signal.

This signal representation and encoding embodiment may be analogous to biological systems as depicted in FIG. 4D. A biological neuron signals information by emitting series of short duration voltage spikes on its output axon, shown in idealized form 410. Such signals are often bursty, emitting no spikes for periods of time interspersed with other bursts of spikes at similar or different rates. A corresponding spike rate signal 420 may have values in the relative neural spike rate range 430, where 0 may represent no spikes, 1 may represent the maximum spiking rate of a neuron, and values between 1 and 0 may be related to the spike rate as a proportion of a maximum spike rate. A sequence of events 440 as described herein may encode changes to neuron spike rates, wherein each event is shown as a triple of a stamp value associated with time, a signal identifier and a relative spike rate value, wherein all events shown have the same signal identifier to indicate they are events for the same signal. This encoding may enable efficient encoding of bursty signals, and may support well-known spike-rate and time-to-spike biological information encoding models.

It will be clear to those skilled in the arts that signal values need not be constrained to any particular numeric range.

Signal identifiers unique among signals on a link allow multiple such signals to be multiplexed on a single event stream associated with a link 220. In embodiments of neural computing environments 130, instances of modules 120 need only be activated when at least one event arrives on an input link 220 indicating a signal change to a new value, yielding efficiencies in computing resource usage.

Figure 4E:
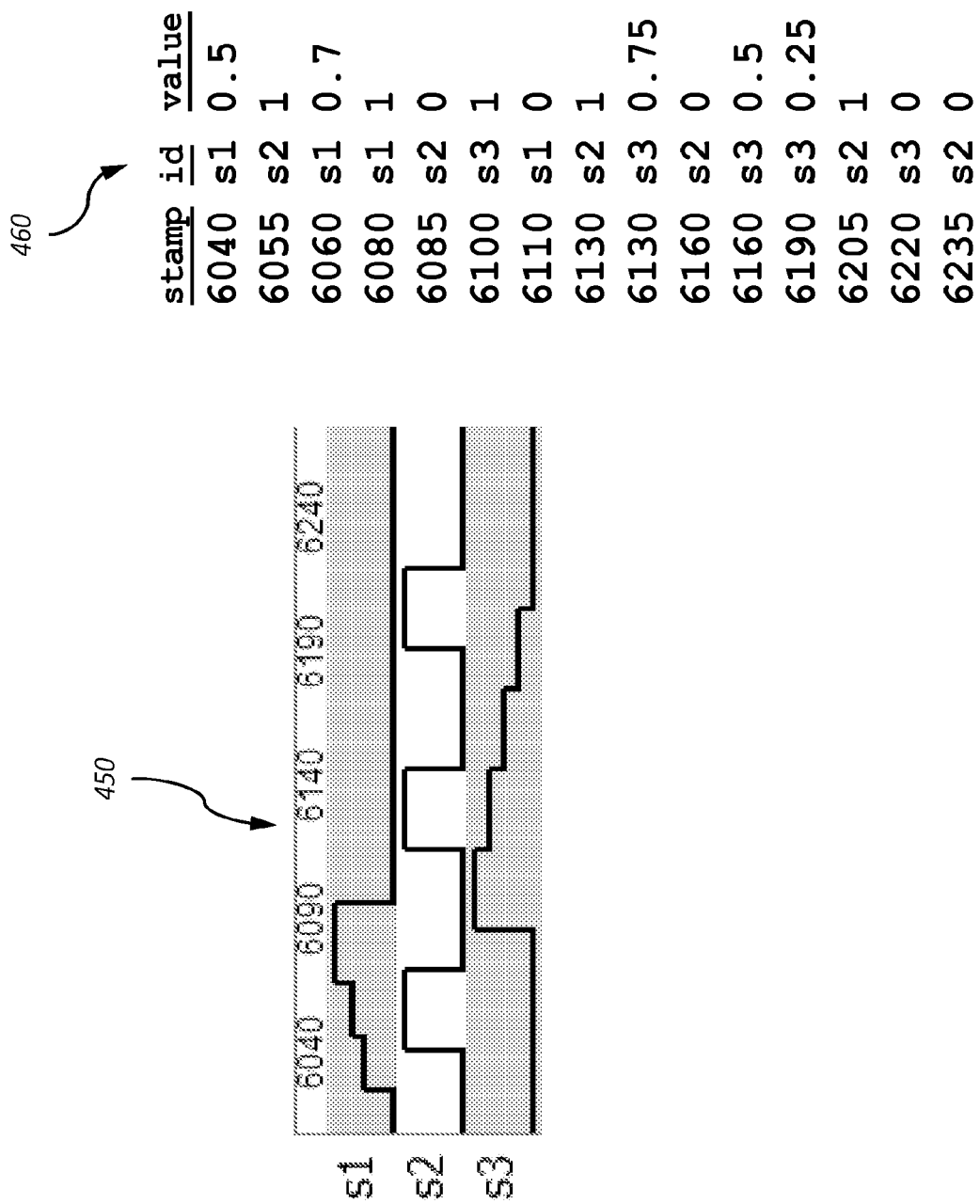
FIG. 4E shows multiplexing of signals on a link.

FIG. 4E shows how multiple signals 420 may be multiplexed onto a link 220. Line graph 450 depicts the values of three distinct signals 220 over a stamp value range including 6040 through 6235, and a corresponding textual representation of a sequence of events 460, one event per line, each line showing the stamp value, the signal identifier and the value.

It will be clear to one skilled in the arts that the above described signal encoding and signal multiplexing mechanisms may have wide utility in systems beyond the scope of systems for computing cognitive functions, including without limitation any system where it is advantageous to limit computational resources to signal changes, and where it is advantageous to be able to multiplex arbitrary or changing combinations of signals on a single communications path.

Modules

Modules may be building block components composed into neural process specifications. Modules may individually perform a variety of cognitive and non-cognitive functions.

As used herein, there may be several distinct aspects of the term "module". "Module type" refers to the general character, function and operation of a module. "Module instance" refers to one of possibly many distinct independently functioning copies of a module type in a neural graph. "Module implementation" 215 refers to one of possibly many implementations of a module type each corresponding to different computing environments 130 including without limitation object-oriented class implementations, scripts, program code, microcode, configurable hardware configurations, and hardware components and circuits. By analogy to building block toys, a module type may be a distinct block design including size and shape, a module instance may be a single block of that design and a module implementation may embody a particular material such as plastic, wood, cardboard or foam and a particular scale. In embodiments using an object-oriented programming environment, a module type may be a class, a module instance may be a single object instance of that class, with its own separate parameter and internal state values, and a module implementation may be a specific set of program code implementing the class. In embodiments using electronic circuitry, a module type may be a specific component or circuit interface, a module implementation may embody a particular technology such as TTL, ECL or CMOS, and a module instance may be a distinct copy of a component or circuit of that design. In discussions, the specific meaning of the unqualified term "module" will generally be understood from context. Where disambiguation is necessary, the qualified terms "module type" or "type", "module instance" or "instance", and "module implementation" or "implementation" may be used.

In embodiments a module type 120 may have associated one or more module implementations 215 corresponding to different computing environments 130 including without limitation object-oriented class implementations, scripts, program code, microcode, configurable hardware configurations, and hardware components and circuits.

Figure 5A:
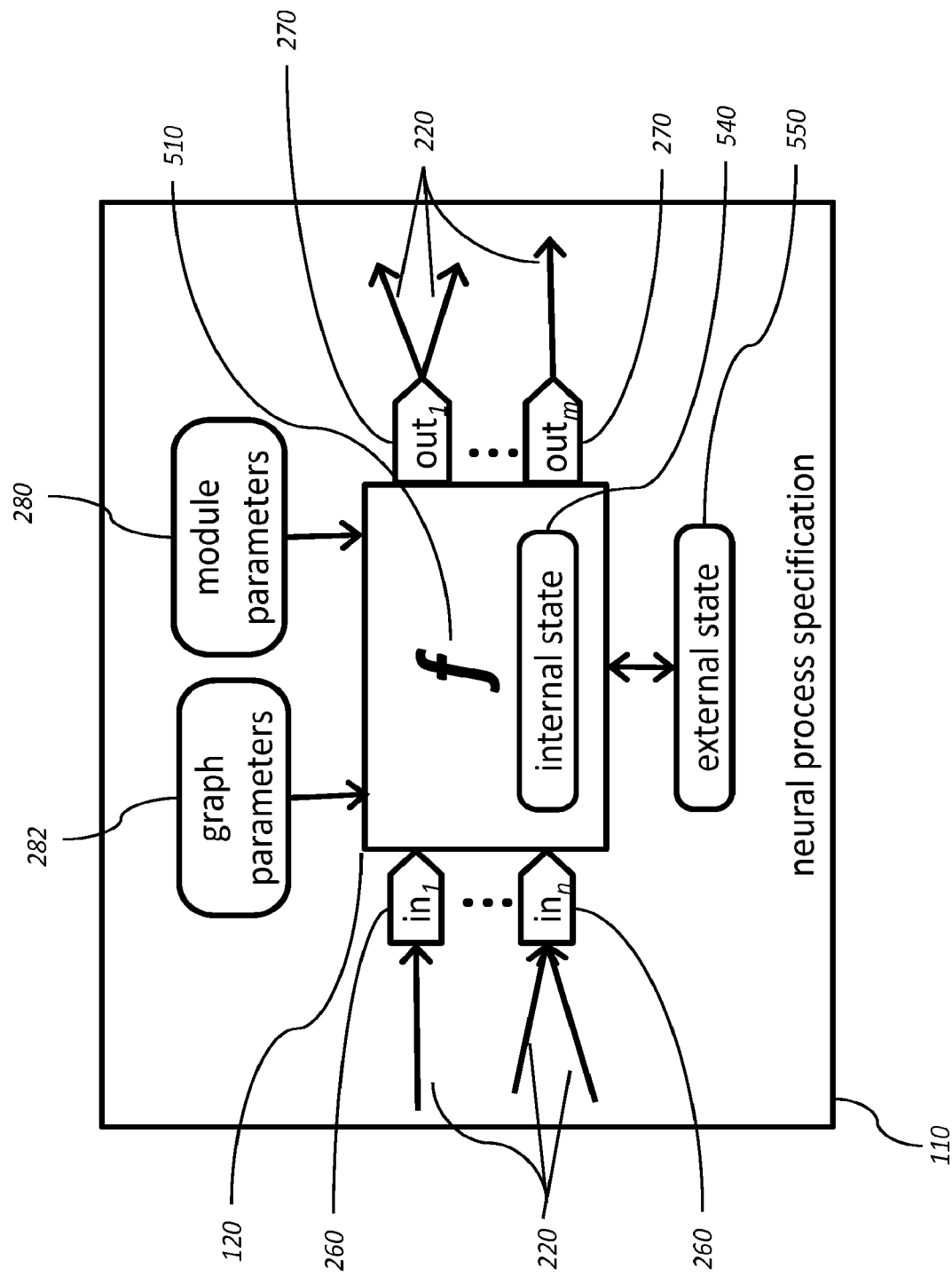
FIG. 5A shows a module formalism.

Embodiments of a module 120 may additionally comprise elements shown in FIG. 5A. One or more module parameters 280 may specify and control operation of a specific instance of module 120, different from other instances of the same module type. One or more graph parameters 282 may specify and control operation of one or more modules 120 in the neural process specification 110. A module may have private internal state 540, values of which may be changed during module operation and which values may be retained between module operations, but which are not shared with other module instances. A module may additionally access external state 550, values of which may be changed during module operation and which values are retained between module operations, and which may be shared with other modules in the neural process specification 110.

Figure 5B:
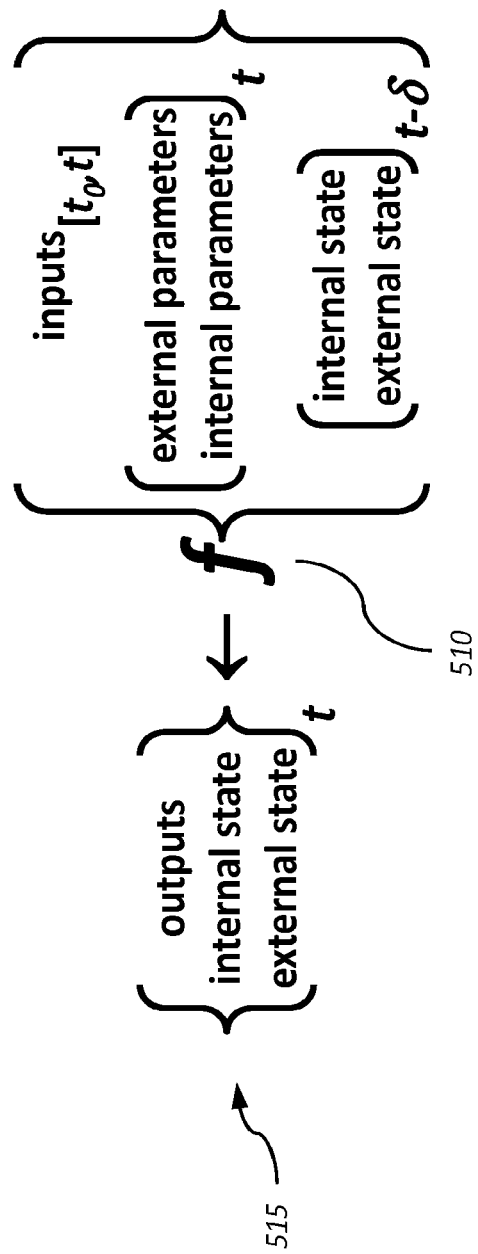
FIG. 5B shows a module function.

Embodiments of a module 120 may have a run function 510, which operation is described in expression 515 in FIG. 5B, specifying that the values of module output signals, internal state and external state at stamp t are determined by function $f$ 510 of the history of the module input signals over the stamp interval $[t_0, t]$ from a lowest stamp $t_0$ through stamp t, the values of graph parameters and module parameters at stamp t, and the internal state and external state values at a previous function invocation at lower stamp t–δ.

Figure 6:
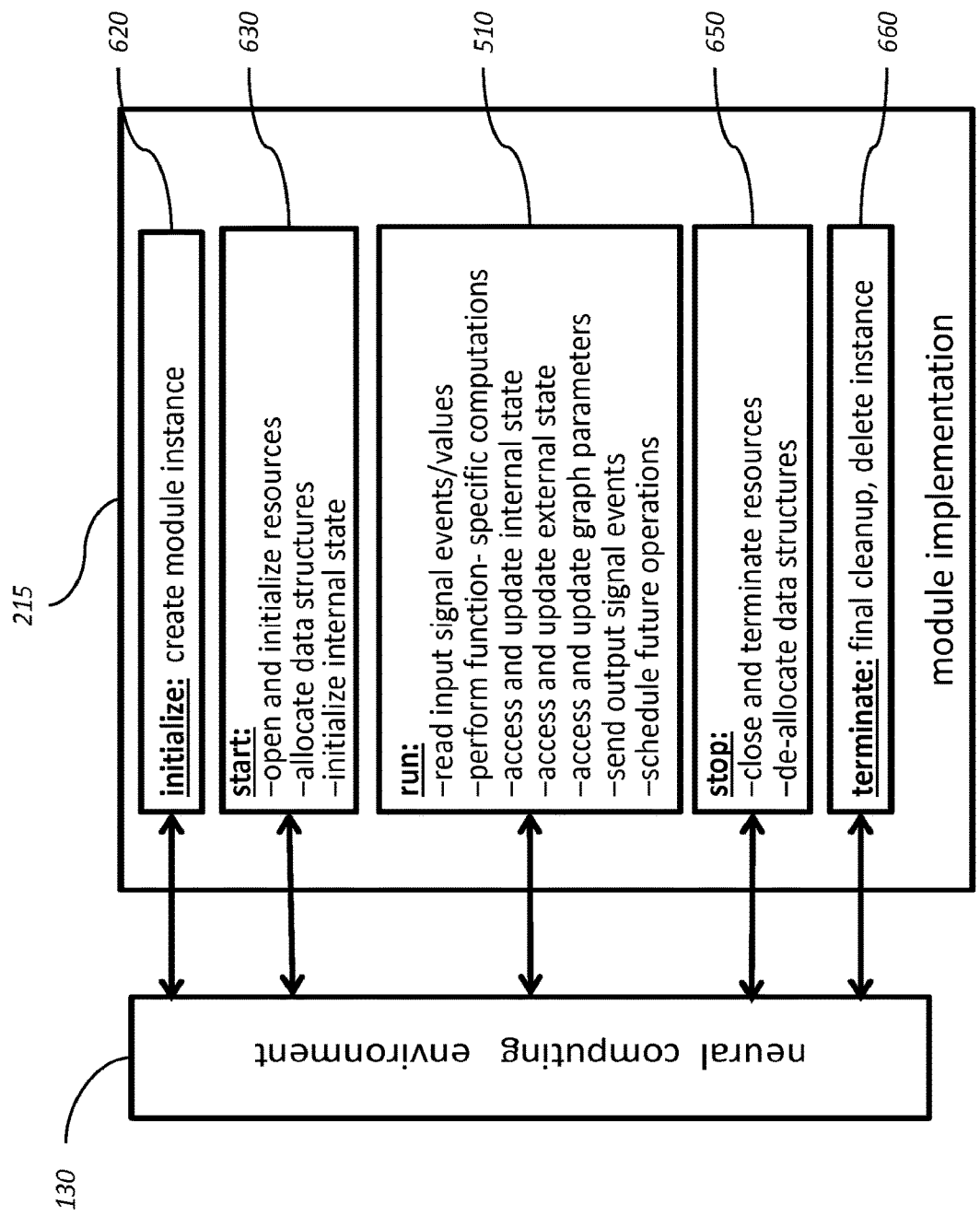
FIG. 6 shows a module implementation structure embodiment.

In embodiments a module 120 may have a module implementation 215 structure as shown in FIG. 6. A neural computing environment 130 may invoke a module initialize function 620 to create a module instance, a start function 630 to initialize the module instance and related resources, a run function 510 each time an input signal changes value or at any other appropriate time to perform module-specific functions, a stop function 650 to close and terminate resources, and a terminate function 660 to perform final cleanup. Module functions 610, 620, 630, 510, 650 and 660 may in turn invoke services provided by the neural computing environment 130 for operations including without limitation sending and receiving signals, accessing and updating external state and graph parameters, and scheduling future module operations.

Module Types

It will be clear to those skilled in the arts that embodiments may include an unbounded variety of types of modules 120, each supplying a component function that may be incorporated in neural process specifications 110.

It will also be clear to those skilled in the arts that specific module types enumerated herein are in no way limiting of other possible modules, including the combining of cited functions within single module types and the separating of cited functions into multiple module types.

Although modules may be used to build neural processes 110 that perform intelligent or cognitive functions, some module types may or may not perform cognitive functions per se, but may be useful for other functions including without limitation system development, user interaction, debugging, monitoring, visualizing, and auxiliary processing.

Module types herein may be loosely categorized non-exclusively as input modules, output modules, processing modules, memory modules, miscellaneous modules and other modules as described below. Such categorization herein is for explanatory purposes and not to be construed as a necessary part of any embodiment.

Input Modules

Embodiments may include input modules that may obtain information from external systems and environments and encode such information for transmission as signals sent via output ports 270 over links 220 to other modules 120. Embodiments of input modules may in addition receive signals on input ports 260 to specify, control or modify the external information and its conversion for transmission.

Figure 7A:
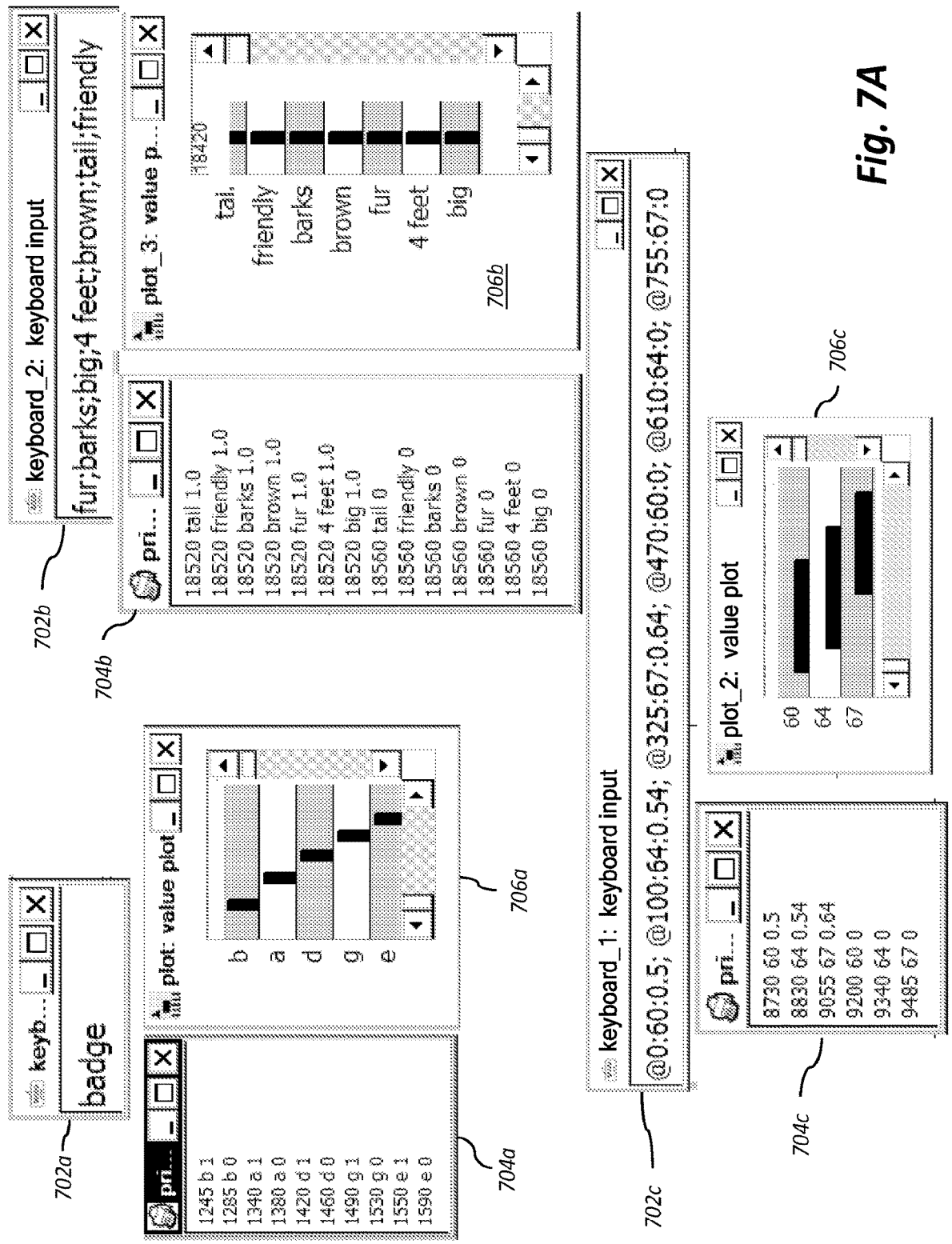
FIG. 7A shows variations of a keyboard input module embodiment.

Embodiments may include a keyboard input module that may receive data from a computer keyboard in a variety of formats, including without limitation a character-at-a-time format, sequences of key-up and key-down events, a delimited format, and a programming language expression format, parse the input data and send corresponding output signals. FIG. 7A shows non-limiting examples of keyboard input module input formats. Keyboard input window 702a shows a character-at-a-time keyboard input format with signals sent for the sequence of letters entered b, a, d, g, e. Text output window 704a shows the sequence of signal events sent on an output link from such a keyboard module. Graphical plot output window 706a shows corresponding signals in an EKG-style signal plot. This keyboard input example may represent the typing of a word. Similarly, keyboard input window 702b shows a delimited line-at-a-time keyboard input format where individual signal identifiers are separated by semi-colons, and all signals are sent concurrently. Text output window 704b and graphical plot window 706b show the corresponding signals sent. This keyboard input example may represent several concurrently recognized features of an animal. Keyboard input window 702c shows a delimited temporal sequence keyboard input format, where each distinct signal event has three colon (":") separated components @ stamp:id:value where the @ symbol introduces a relative stamp value, id is a signal identifier and value is the new signal value as of that stamp value. Text output window 704c and graphical plot 706c show the corresponding signals sent. This keyboard input example may represent a musical chord played in an arpeggio form where the signal identifiers correspond to MIDI (Musical Instrument Digital Interface) note numbers.

Figure 7C:
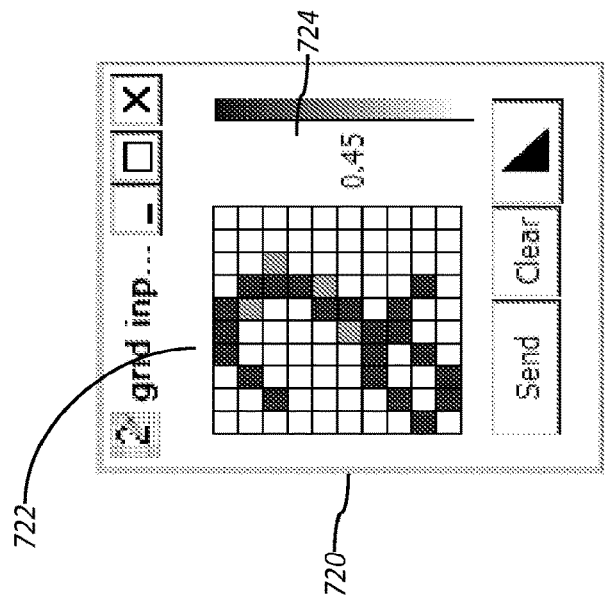
FIG. 7C shows an image drawing input module embodiment.
Figure 7B:
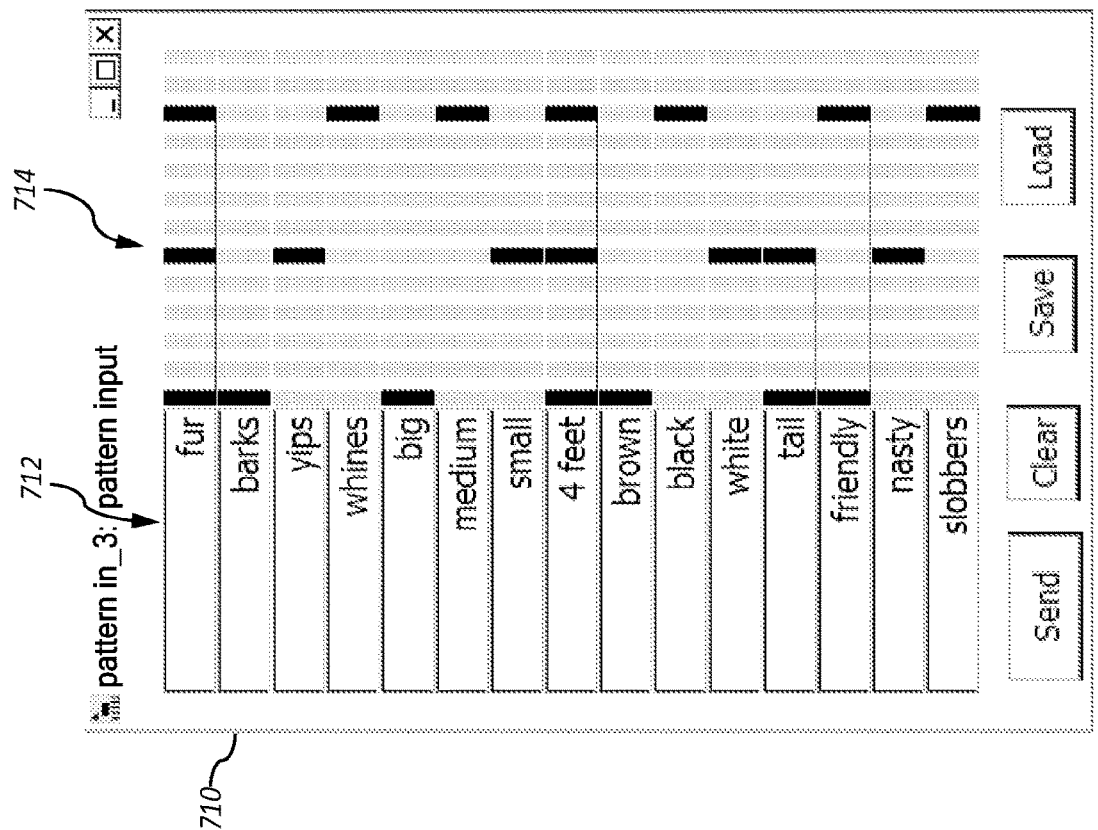
FIG. 7B shows a graphical signal input module embodiment.

Embodiments may include a graphical pattern input module that may enable signal data to be entered graphically using a variety of graphical input means including without limitation a pointing device, a touch screen, computer keyboard keys and a mouse, by drawing individual signal values over ranges of stamp values. FIG. 7B shows an example of such a graphical pattern input module window 710, where signal identifiers are entered in the left column 712 and signal values over relative ranges of stamp values are entered graphically in the right column 714. In this example the signals may represent different observed animal features at different times.

Embodiments may include a data generator module that may generate signals according to a distribution specification.

Embodiments may include one or more file input modules that may read data from a file in one or more formats including without limitation a text format, an XML format, an HTML format, a spreadsheet format, a programming language expression format, an image format, an audio format, and a video format and generate corresponding output signals.

Embodiments may include an image drawing input module that may allow a user to use graphical input means to enter data by drawing on a graphical canvas and generate corresponding output signals. FIG. 7C shows an example of such an image drawing input module window 720, where a user may select a signal value from the scale 724 and then draw such values in various cells of grid 722.

Embodiments may include an image input module that may obtain input from an image source including without limitation a camera or a scanner and generate corresponding output signals.

Embodiments may include an audio input module that may obtain audio signals from an audio source including without limitation a microphone, an audio player, or an audio processor and generate corresponding output signals.

Embodiments may include a video input module that may obtain video signals in a variety of formats from a video source including without limitation a video camera, a video player, or a video processor and generate corresponding output signals.

Embodiments may include a data stream input module to obtain data from a data stream in a variety of formats, parse it and generate corresponding output signals.

Embodiments may include a database query module that may perform a query on a database, obtain and encode query results, and generate corresponding output signals. Additionally, such a database query module may have one or more input ports that may receive signals for data values and query specifications to be used in querying.

Embodiments may include a search module that may perform searches on collections of information including without limitation documents, file systems, databases and web sites, encode search results and generate corresponding output signals. Additionally such a search module may have one or more input ports that may receive signals representing search criteria to be used in searches.

Embodiments may include a MIDI (Musical Instrument Digital Interface) input module that may receive MIDI messages from a MIDI source device, encode them and generate corresponding output signals.

Embodiments may include sensing modules that may obtain information from sensors including without limitation visual input, audio input, thermal input, motion input, position input, location input, orientation input, velocity input, acceleration input, scent input, chemical input, and biological input and generate corresponding output signals.

Embodiments may include a ROS (Robotic Operating System) interface that may receive ROS messages, encode them and generate corresponding output signals.

Embodiments may include a program output capture module that may receive data from a running program via one or more interfaces including without limitation memory data structures, data streams, pipes, queues, sockets, ports, virtual circuits, web and REST service interfaces, file transfer interfaces, messages, and electronic mail and generate corresponding output signals.

Embodiments may include many other module types that may obtain external information, encode it and generate corresponding output signals for use within neural processes.

Output Modules

Embodiments may include output modules that may receive signals from other modules 120 via links 220 connected to input ports 260 and deliver such information externally.

Embodiments may include text display modules that may display input signal activity, displaying character-strings for stamp values, event identifiers and numeric strengths in a variety of formats including without limitation line-oriented, tabular, delimited, and programming language expressions.

Embodiments may include text display modules that may display textual values for event identifiers using visual attributes including without limitation font size, color, font style and position in a visual display to indicate associated stamps and values. Display window 327 in FIG. 3 shows an example of this sort of display using larger font sizes to illustrate to illustrate higher signal values.

Figure 7D:
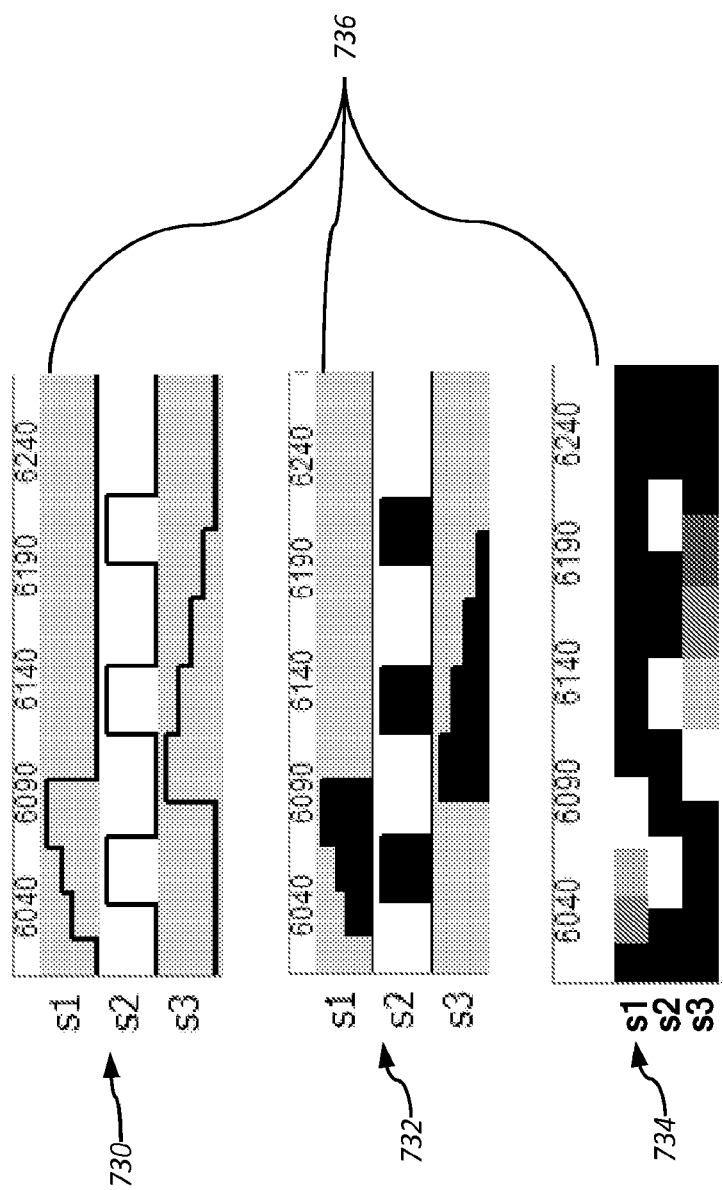
FIG. 7D shows alternative displays of a graphical plot output module embodiment.

Embodiments may include graphical display modules that may display input signal values over stamp value ranges, including but not limited to EKG-like line graph and filled line graph displays, heat maps, and other well-known graphical visualizations. FIG. 7D shows examples of such a line graph 730, a filled line graph 732 and a gray-scale heat map 734 for three signals for stamp range 736 values 6040 through 6240. It will be clear to those skilled in the arts that many similar graphical display forms are contemplated herein including without limitation color heat maps, composite line graphs, Hinton diagrams and the like.

Embodiments may include image display modules that may display input signals in multiple dimensions, using graphical attributes including but not limited to color, size, intensity, motion, graphical symbols, line width, line style, surface, shading, 3D wire frame and shading renderings and transparency to represent signal attributes.

Embodiments may include environmental action modules that may perform external actions including without limitation audio output, thermal output, mechanical motion, scent output, biological output, chemical output, electromagnetic output, light output.

Embodiments may include file output modules that may write signal data to files in a variety of formats, including but not limited to formatted and unformatted text, binary data, XML, HTML, spreadsheet formats, programming language expressions, image, audio and video.

Embodiments may include stream output modules that may send data from input signals to various data streams including without limitation memory data structures, pipes, queues, sockets, computer networks and streams in a variety of formats, including but not limited to text, message, binary, audio and video.

Embodiments may include program input modules that may deliver data from input signals to program inputs via various interfaces and in various formats including without limitation program invocation parameters, memory data structures, pipes, queues, sockets, ports, computer networks, data streams, file transfer interfaces, web and REST services, and messages.

Embodiments may include audio output modules that may convert input signals into corresponding outputs to audio devices including without limitation speakers, headphones, audio recorders and audio processors.

Embodiments may include video output modules that may convert input signals into corresponding outputs to video devices including without limitation video displays, video recorders and video processors.

Embodiments may include MIDI (Musical Instrument Digital Interface) output modules that may convert input signals into MIDI messages for sending to MIDI devices.

Embodiments may include ROS (Robotic Operating System) output modules that may convert input signals to ROS messages.

Embodiments may include control modules that may convert input signals to forms to control external artifacts including without limitation a device, a robot, a vehicle, a motor, an appliance, an actuator, and an industrial process.

Embodiments may include database update modules that may use input signals to insert, update or delete information in a database.

Embodiments may include web output modules that may use input signals to create or modify web sites.

Processing Modules

Embodiments may include modules that may receive signals from one or more input ports 260, perform computations, and send signals to one or more output ports 270.

Embodiments may include transformer modules that may receive input signals, perform computations, and output signals. Such computations may include without limitation stateless transformations, stateful transformations, initialization of internal state, modification of internal state, arithmetic and mathematical functions, scalar, vector, matrix, list, set, dictionary, binary and string manipulations, conditional functions, programming language expressions dimensional mapping, binning, ranking, value mapping, invoke external program functions, access to module parameters 280 and access and modification of neural graph parameters 282.

FIG. 7E shows an embodiment of a control panel 740 for setting parameter values of a transformer module. The specific example shown may be the parameter settings for "encode melody" module 316 in the illustrative example of FIG. 3. Parameters 745 control various aspects of initialization and on-going processing. Value "False" for "reinitialize when" parameter 750 indicates that there are no initializations of internal variables of this transformer module instance nor graph parameters 282. The value for parameter 752 "process input event if" is a programming language expression using internal transformer variables representing elements of the previous input event LAST and the current input event IN, and states that the current input event is to be processed if it has a value greater than 0 and there is a previous input event and no more than 1000 counts of timestamp have passed since the previous event. If the current input event is processed, an output event OUT will be built with a timestamp that adds module parameter DELAY from "delay" parameter 768 to the input timestamp, a signal identifier that is "same", "up" or "down" depending on whether the current input event id is the same, greater or less than the previous input event id, and a value of 1. Since "else?" box 762 is unchecked, no other actions are taken. Since "send 0-valued events? box 764 is checked, two events will be output for each input event processed, one for the computed signal identity with signal value of 1, and one for the same signal identity with a value of 0 at a timestamp value 40 milliseconds larger 766.

Embodiments may include filter modules that may receive input signals, filter and modify them according to various criteria including without limitation comparisons, signal identity pattern matching, calculations, and signal transformations, and send resulting information as output signals.

Embodiments may include group operation modules that may receive input signals, perform group calculations on the values of such signals, including but not limited to maximum, minimum, mean, standard deviation, highest value events, running or windowed statistics over a range of stamp values, and softmax functions including but not limited to exponential, linear and logistic softmax calculations, and output signals corresponding to the results of such calculations.

Embodiments may include a bigram module that may receive input signals, compute successive bigrams of input signal changes and send output signals for such bigrams.

Embodiments may include domain transform modules that may transform input signals in the stamp domain to signals in a mathematically transformed domain, including without limitation a Fast Fourier Transform module and an inverse Fast Fourier Transform module.

Miscellaneous Modules

Embodiments may include additional modules for performing a variety of additional useful capabilities.

Embodiments may include a wrapper module that may incorporate external functionality into neural processes. A wrapper module may receive input signals from input ports and provide them to an external facility including without limitation a program or device via interfaces including without limitation program invocation arguments, data streams, files, pipes, sockets, ports, queues, web and REST service interfaces, computer networks, memory structures, file transfer interfaces, electromagnetic signals, optical signals, audio signals. A wrapper module may obtain information from an external facility including without limitation program return values, data streams, files, pipes, sockets, ports, queues, web and REST service interfaces, computer networks, memory structures, file transfer interfaces, electromagnetic signals, optical signals, audio signals, and send corresponding output signals via its output ports.

Embodiments may include program modules that may incorporate a custom program in a neural process. A custom program module may cause a custom program to run, including but not limited to program initialization, continuing operation, maintaining program state, and program termination. A custom program module may receive input signals from input ports and provide them to a custom program via interfaces including without limitation program invocation arguments, data streams, files, pipes, sockets, ports, queues, computer networks or memory structures. A custom program module may obtain output information from a custom program via interfaces including but not limited to program return values, data streams, files, pipes, sockets, ports, queues, computer networks or memory structures, convert such information and send it as output signals via output ports. A custom program module may set self-timers to request execution at specific future stamp values or stamp intervals. A custom program module may access its own module parameters 280 and shared graph parameters 282. A custom program module may use user interface facilities provided by a development environment 140 and/or a neural computing environment 130 for displaying and setting parameters and interacting with users.

A program invoked in a custom program may be required to follow certain execution rules. It may not block waiting for external events nor invoke any external programs which may block or execute for long periods of time. When invoked, it may not execute for a long period of time. If lengthy or potentially blocking execution is required (e.g., long-running queries/searches, extensive mathematical algorithms, lockable resources, transactions) it must be done via asynchronous mechanisms like threads or processes. It may not lock resources that may cause other processing activities to block. It may not share memory or process-local operating system resources (e.g. open file handles, stream ends, ports, queues, sockets, pipes) directly with other modules or other instances of the same module. It may not depend on any synchronizing mechanism not provided by a neural computing environment 130. Since a neural computing environment 130 may freely relocate a module instance on different computers, a custom module may not share any local name or resource space (e.g., a local file system or shared-memory facility) with other modules or resources. In another aspect, a custom module may be prevented from using operating system or other external interfaces for locking, concurrency or timers.

A custom module should be prepared to receive signal values that are scalars, vectors, matrices and data structures and perform sensible actions on each, including doing nothing or creating an error signal, but may not perform any action causing the overall neural computing environment 130 to fail.

A custom module should anticipate the possibility that module parameters 280 may change their values dynamically, for example resulting from user interaction or because they depend on graph parameters 282 which may change their values dynamically due to user interaction or activities of other modules.

A custom module should anticipate the possibility that memory patterns 292 in a pattern memory space 290 may change dynamically.

A custom module should generally follow signal naming conventions common to other frequently-used modules. Where a module's function is primarily to filter incoming signals it should generally preserve the input signal names to be sent on its outputs.

Embodiments may include modules that have no input ports 260 or are not connected to any input link, but which may actively operate on module parameters 280, graph parameters, 282 internal state 540, external state 550 or memory patterns 292 and may send signals via output ports 270.

Embodiments may include modules that have no output ports 270 or are not connected to any output link but which may receive input signals on input ports 260 and actively operate on module parameters 280, graph parameters 282, internal state 540, external state 550 or memory patterns 292.

Embodiments may include the ability to create a neural process specification 110 and save it as a distinct new module type to be incorporated into additional neural process specifications just like other module types. The created module may include without limitation modules, links, graph and module parameter settings, and pattern memory spaces. Input ports and output ports of modules in the sub-graph may be mapped to input ports and output ports of the newly created sub-graph module. Graph parameters of the sub-graph become module parameters of the new module. Pattern memory spaces used in the sub-graph may be combined with pattern memory spaces in new neural graphs. Use of a sub-graph module in another neural process specification may be equivalent to explicitly using the modules, links, parameters and memory spaces of the sub-graph individually. Embodiments of neural computing environments 130 may perform the functions of such sub-graph modules in different but functionally equivalent ways.

Figure 8:
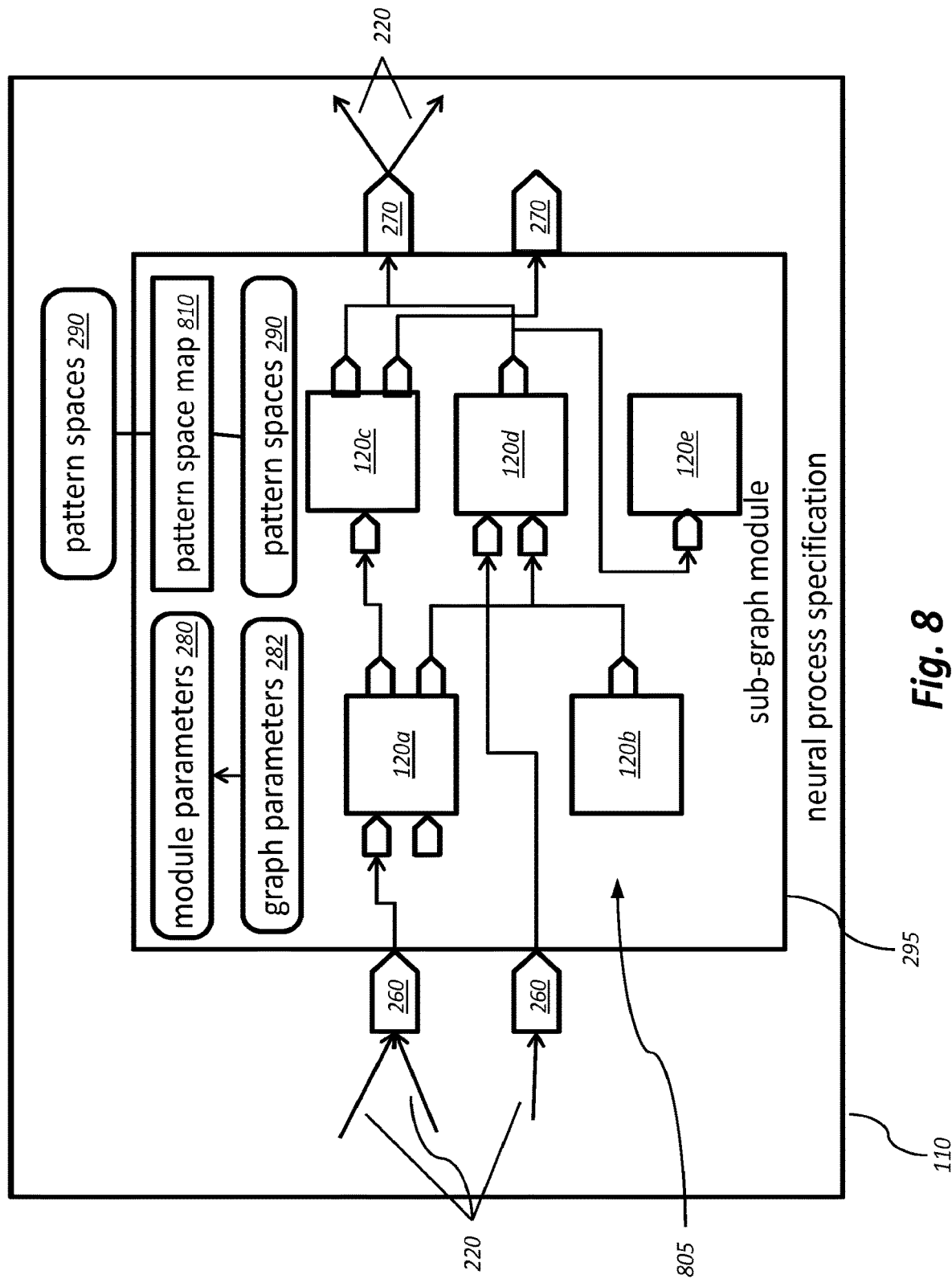
FIG. 8 shows encapsulation of a neural sub-graph as a reusable module.

FIG. 8 depicts an embodiment of a sub-graph module 295 encapsulating a neural sub-graph 805 comprising modules 120*a*, 120*b*, 120*c*, 120*d*, 120*e*, related ports and links, graph parameters 282 and memory pattern spaces 290. Some ports of contained modules are connected to ports of the sub-graph module 295, which ports may be connected to links 220 in neural process specification 110. Sub-graph 805 graph parameters 282 become module parameters 280 of the sub-graph module. Memory pattern spaces 290 of the sub-graph 805 are mapped through pattern space map 810 to pattern spaces 290 of neural process specification 110 utilizing the sub-graph module. In this way, the neural process specification of a sub-graph may be incorporated as a reusable module in other neural process specifications.

Memory Modules

Embodiments may include modules whose purposes may include without limitation retaining received information, comparing received signals with retained information so as to recognize signal patterns, generating output signals conveying degree of matching of such comparisons, and generating output signals conveying retained information and recognized signal patterns.

Embodiments may include working memory modules, which may emulate cognitive functions for temporary or working memory, which modules may receive input signals, retain signal values across an interval of stamp values, adjust retained signal values according to parameterized mathematical distributions including without limitation negative exponential, Gaussian, linear, Poisson, and uniform distributions, and generate output signals for adjusted retained signal values.

Memory Patterns, Memory Pattern Spaces and Memory Pattern Modules

In embodiments, long term memories may be retained in the form of one or more memory patterns organized into memory pattern spaces associated with a neural process specification and created and utilized by memory pattern modules.

Figure 9:
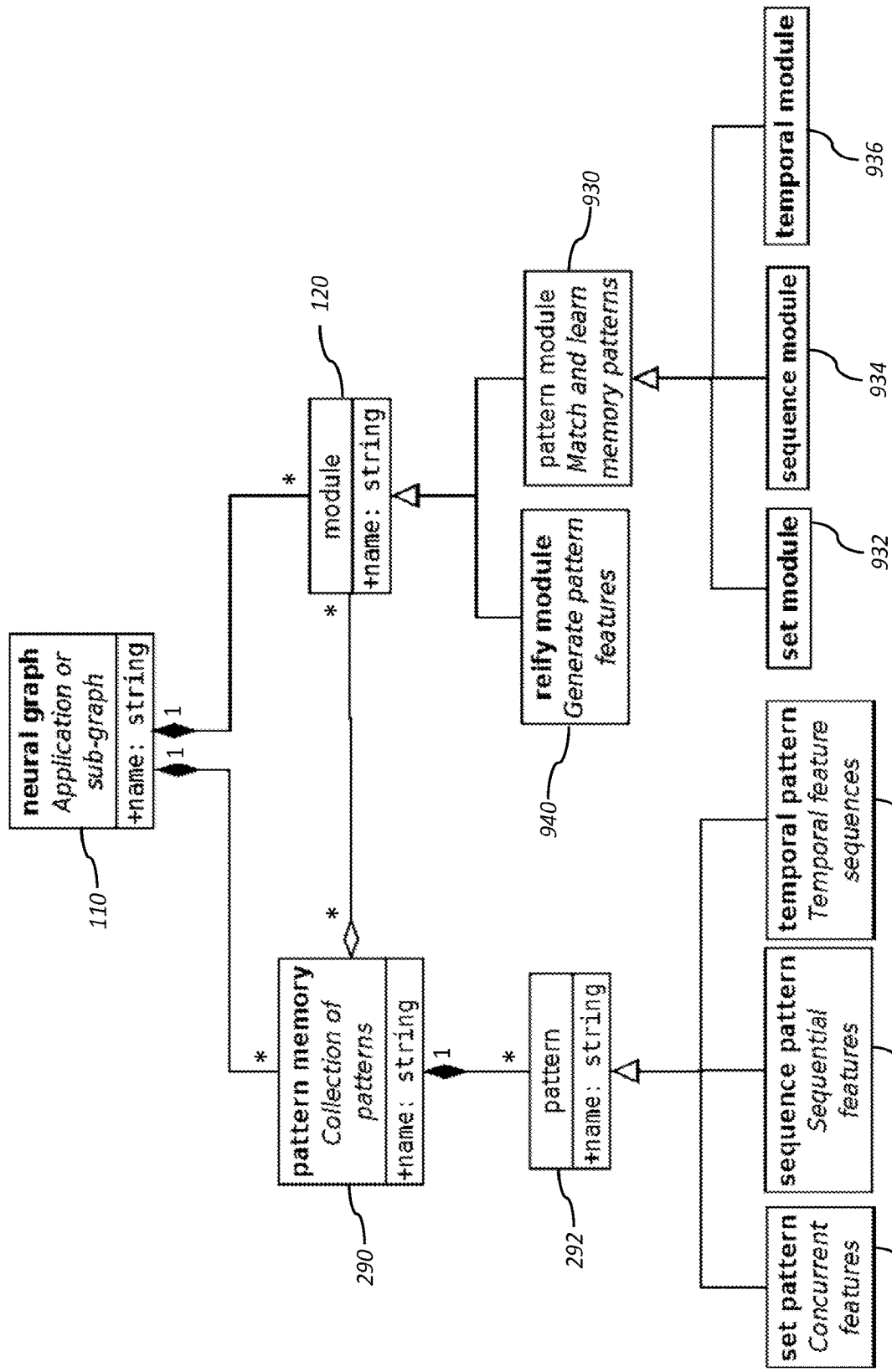
FIG. 9 shows a UML class diagram for memory pattern spaces, patterns and pattern modules.

FIG. 9 shows a UML (Unified Modeling Language) class diagram for an embodiment, showing relationships among neural graphs, memory patterns, memory pattern spaces, memory pattern modules, and related modules. A neural graph 110 may contain one or more pattern memory spaces 290 and one or more modules 120. A pattern memory space 290 may contain one or more memory patterns 292. Set pattern 912, sequence pattern 914 and temporal pattern 916 are sub-types of pattern 292. Pattern module 930 is a sub-type of module 120 for learning and matching memory patterns. Set module 932, sequence module 934, and temporal module 936 are sub-types of pattern module 930 for managing corresponding set patterns 912, sequence patterns 914, and temporal patterns 916. Reify module 940 is also a sub-type of module 120. A module 120 may refer to any number of pattern memory spaces 290, thereby associating with various patterns 292 contained therein. As used herein, enumerations of sub-types of module 120, pattern 292 and pattern module 930 are not intended to be limiting, as embodiments may comprise many additional sub-types not shown.

It should be understood that the UML diagram of FIG. 9 may include only some elements and relationships needed for explanatory purposes and in no way limits the use of other or different elements and relationships in embodiments. It should be understood that the use of a UML class diagram for explanatory purposes in no way implies that any embodiment is necessarily implemented in an object oriented programming technology. It should further be understood that the use of a UML class diagram for explanatory purposes in no way implies that any embodiment implemented in an object oriented programming technology necessarily uses exactly these classes and relationships. It should also be understood that a UML class diagram such as this may include only some elements and relationships of an overall system, and should therefore be considered non-limiting of other possible elements and relationships not shown.

Memory Patterns and Pattern Matching

In embodiments, a memory pattern object 292 may represent a particular combination of signal values such that a subsequent occurrence of a similar combination of signal values may be recognized as matching that pattern to at least some degree. It will be understood by those skilled in the arts that many such pattern representations and corresponding pattern matching methods are possible and are contemplated herein.

In embodiments, a pattern may be a set pattern which represents a combination of multiple signal values at a particular stamp value.

In embodiments, a pattern may be a sequence pattern which represents a combination of signal values occurring over a contiguous range of relative stamp values.

In embodiments, a pattern may be a temporal pattern which represents a combination of signal values at particular relative stamp values.

In embodiments, pattern matching by pattern modules to combinations of input signals may yield output signals corresponding to known patterns with signal values representing pattern matching scores wherein higher signal values may reflect better matching.

Figure 10A:
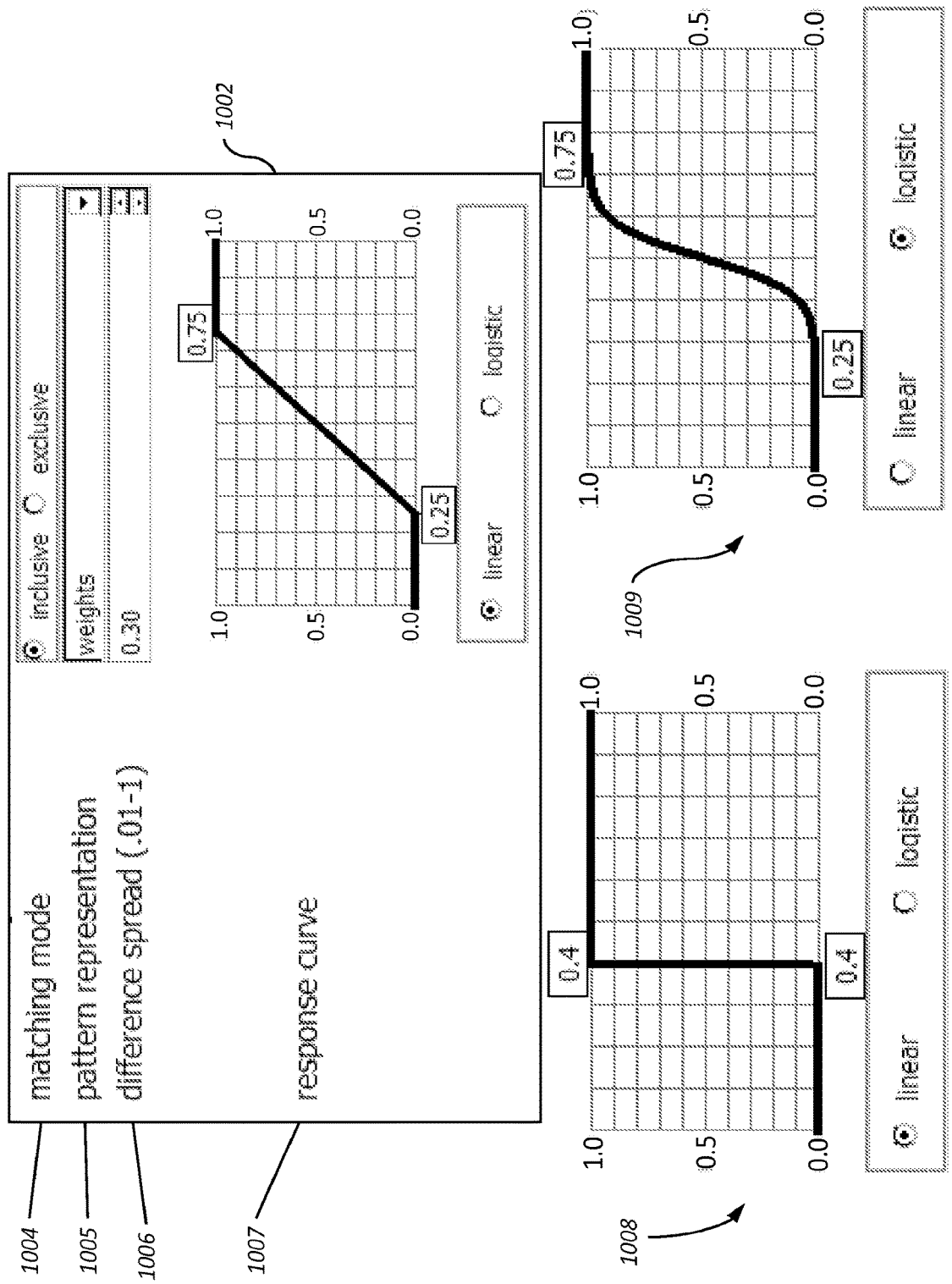
FIG. 10A shows pattern matching parameters

In embodiments, pattern match scoring may be influenced by one or more parameters. FIG. 10A shows examples of fragments of an embodiment of a development environment 140 for setting such parameters. Aspect 1002 is a fragment of a control panel for setting certain parameters influencing pattern match scoring. Parameter 1004 with label "matching mode" may control how additional input signal values not included in a memory pattern affect match scoring. A setting of "inclusive" may ignore other input signals in computing a matching score. A setting of "exclusive" may diminish the matching score if other signals not included in the pattern are present, which may model biological brain processes of cross-suppression or cross-inhibition. Parameter 1005 with label "pattern representation" may provide a choice of pattern representations as described herein. Parameter 1006 labeled "difference spread" may control the magnitude of scoring influence of differences between expected signal values in the pattern and actual input signals. Parameter 1007 labeled "response curve" graphically depicts a function which may be applied to computed raw matching scores to produce a final matching score. These curves may serve the purpose of modeling non-linear biological neural processes. The curve shown in 1007 is a piecewise linear curve, where raw scores below 0.25 may produce a final matching score of 0, raw scores above 0.75 may produce a final matching score of 1, and raw score values between 0.25 and 0.75 may yield final matching scores according to a linear function. Aspect 1008 shows a possible alternative example of a response curve emulating a threshold function. Raw matching scores below 0.4 yield a final matching score of 0. Raw matching scores of 0.4 or above yield a final matching score of 1. Aspect 1009 shows a possible alternative example of a response curve providing a "logistic" function. Raw scores below 0.25 yield 0 final scores. Raw scores above 0.75 yield a 1 final score. Raw scores between 0.25 and 0.75 yield final scores according to a well-known logistic or "S-curve" function.

In embodiments, a set pattern 912 may be a weight set pattern representing a particular combination of signal values using a set of numeric weights, each weight corresponding to a signal value. When a set module 932 receives a combination of signal values, it may attempt to match them to one or more set patterns 912 held within associated pattern memory spaces 290. The match scoring method may include computing the sum of products of input signal values and corresponding signal weights to yield a numeric matching score. A possible match scoring calculation may be $$\text{match score} = nf\left(\frac{\Sigma_i W_i * V_i}{\Sigma_i W_i}\right)$$

where the match score is computed as a response curve function of applied to the sum of the products of each weight W and the corresponding signal value V, divided by the sum of the weights W.

Figure 10B:
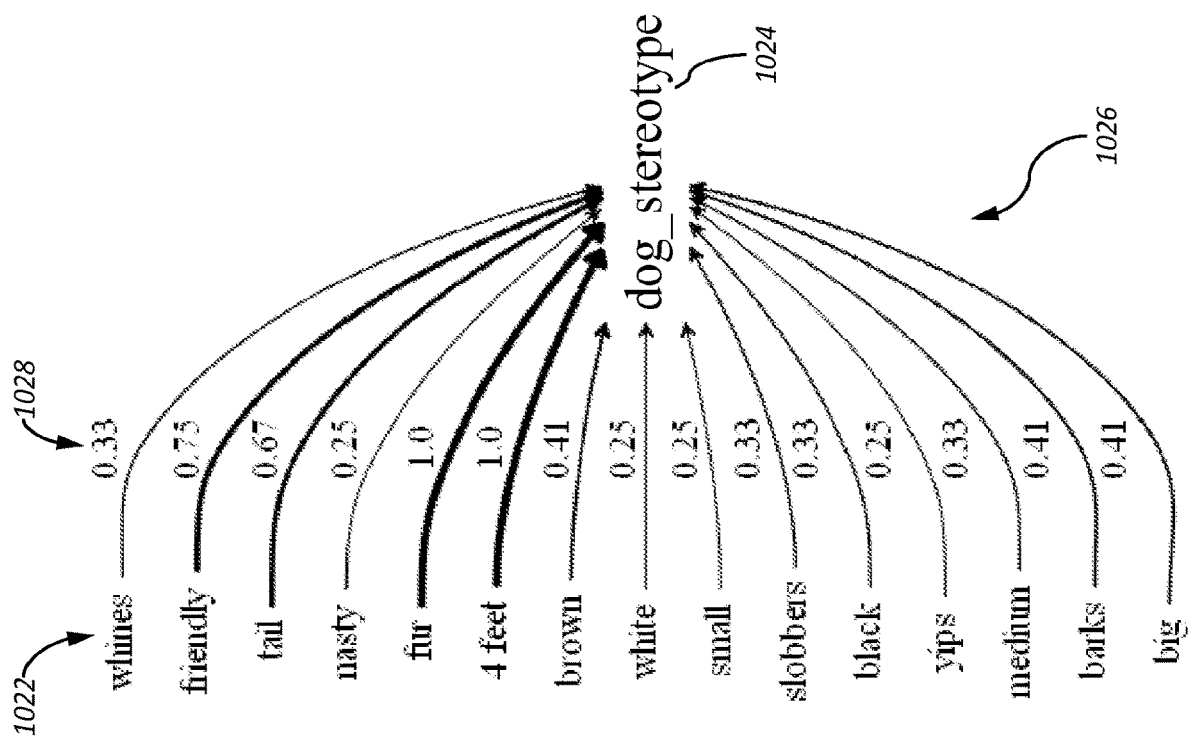
FIG. 10B shows a set pattern.

FIG. 10B shows a graphical depiction of an embodiment of a weight set pattern. Signal identifiers 1022 are connected to pattern identifier "dog_stereotype" 1024 by directed arrows 1026, with line thickness and associated numeric values 1018 indicating corresponding weight values. For interest this weight set pattern may represent a stereotype of features of a dog, with higher-weighted features more common and lower-weighted features less common.

In embodiments, a set pattern 912 may be a weight value set pattern comprising a set of weights and a set of expected values of multiple signals, and may compute a pattern matching score that is a function of the sum of products of signal weights and a function of differences between input signal values and expected signal values. A possible match scoring calculation may be $$\text{match score} = nf\left(\frac{\Sigma_i W_i * sf(V_i, E_i)}{\Sigma_i W_i}\right)$$

where the match score is computed as a response curve function of applied to the sum of the products of each weight W and a spread function sf of the signal value V and the corresponding expected signal value E, divided by the sum of the weights W.

In embodiments, a sequence pattern 914 may represent a particular sequential combination of signal values over an interval of signal stamp values. Sequence patterns may be without limitation one or more of a weight matrix sequence pattern, a weight value matrix sequence pattern, a regular expression sequence pattern, an edit distance sequence pattern, an open bigram sequence pattern, and a state machine sequence pattern.

In embodiments, a sequence pattern may be a weight matrix sequence pattern comprising a matrix of numeric weights wherein each matrix row represents a distinct signal, each matrix column represents a sequential pattern step corresponding to a stamp interval, and each matrix cell represents a numeric weight. When a sequence module 934 receives signal values, it may attempt to match them to one or more sequence pattern 914 objects held within one or more associated pattern memory spaces 290. For a weight matrix sequence pattern the match scoring method may compute a matching score for each row as the sum of products of values of the input signal with the corresponding row of weights for each sequential step, and combine the row matching scores for all matrix rows.

In embodiments, a sequence pattern 914 may be a weight value matrix sequence pattern comprising a weight matrix of numeric weights each matrix row representing a distinct signal, each matrix column representing a sequential pattern step corresponding to a stamp interval, and each matrix column representing a numeric weight, and a matrix of expected signal values, each matrix row representing a distinct signal, each matrix column representing a sequential pattern step with respect to a stamp interval, and each matrix cell representing an expected signal value, and may compute a pattern matching score that is a function of the sum of products of weights and a function of differences between input signal values and corresponding expected signal values for the multiple steps of the pattern.

In embodiments, a sequence pattern 914 may additionally represent a sequential step tolerance in matching using non-zero weights in adjacent steps in the weight matrix row for a signal. During pattern match scoring, such weights influence matching score computation by according a contribution for a signal value received at an earlier or later sequential step than expected.

FIG. 10C shows embodiments of weight matrix sequence patterns for recognizing a sequence of signals with identifiers b, a, d, g and e, which when such signals represent successive English alphabet letters may represent the English word "badge". Matrix 1030 shows weights with rows corresponding to signal identifiers and columns corresponding to sequential steps, for a pattern representation with 0 step positional tolerance. Matrix cells with 0 weights are left blank for clarity. Matrix 1032 is a similar weight matrix for a pattern with a 1 step positional tolerance, where weights of 0.5 are specified in steps immediately preceding and following the ideal step position for each signal. Table 1034 shows pattern match scoring results of several signal sequences, one per row, with input signal values of 1 assumed for each input signal identifier shown in sequential step order, the columns for "0 tolerance" and "1 tolerance" showing respective matching scores for each sequence shown, with score differences highlighted in bold showing scoring effects of matching signals out of sequence in the two patterns. Such positional tolerance may enable better pattern recognition in the face of expected mistakes such as misspellings of words.

In embodiments, values and changes to values of multiple signals at the same step in a weight matrix sequence pattern or weight value matrix sequence pattern may represent acceptable alternative values, as in the cases of signals for ambiguous recognitions of similarly shaped letters in a visual reading application or for ambiguous recognitions of similar-sounding phonemes in a speech recognition application.

In embodiments, values and changes to values of multiple signals at the same step in a weight matrix sequence pattern or weight value matrix sequence pattern may represent expected combinations of values at that step, as in the cases of signals representing multiple musical notes in a musical chord, or of acoustic energy levels at multiple frequency bands representing the harmonic signature of a particular kind of instrument, or of primary color intensity values of pixels in a visual scene.

In embodiments, a sequence pattern representation may be regular expression sequence pattern wherein a character string regular expression pattern corresponds to the expected sequence of non-zero valued signal events. Individual signal identifiers, which may be of any type including without limitation strings, numbers, tuples, general data structures or references, may be mapped to distinct characters in a character set recognizable by regular expression matching functions and a regular expression synthesized from those mapped characters to represent the expected identifier sequence and desired sequence matching characteristics. Incoming signals may be mapped through the pattern's signal identifier to character map into a character string. Pattern match scoring may be related to the maximal string length of matching of the input signal string to the regular expression. Mistake tolerant match scoring may be encoded using well-known regular expression features for alternatives, grouping, optional and wildcard character matching.

Figure 10D:
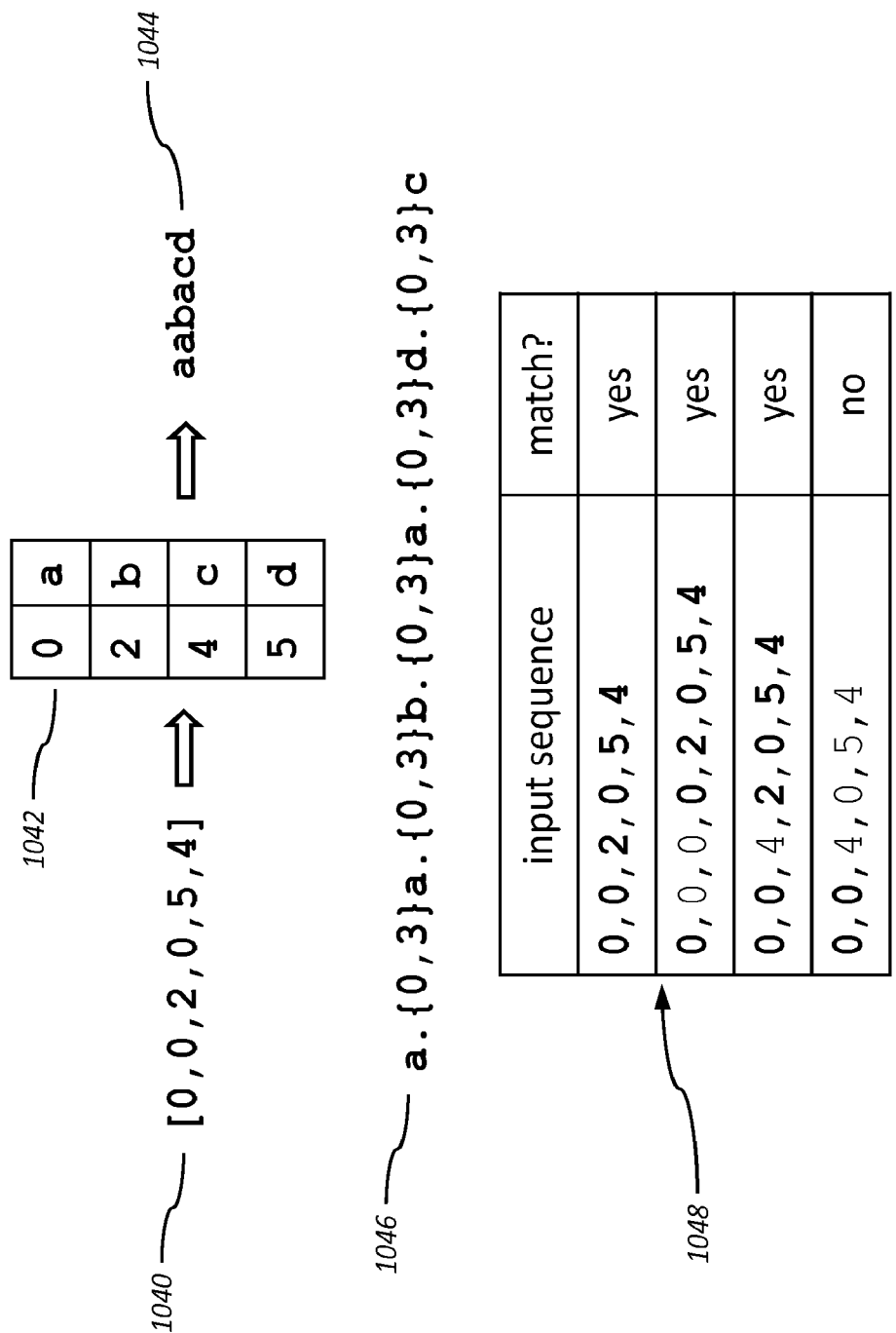
FIG. 10D shows sequential pattern regular expression matching.

FIG. 10D shows a non-limiting example of using a regular expression sequence pattern to recognize sequence patterns in noisy inputs which may include extraneous signals not part of the pattern. Sequence 1040 is a sequence of signal identifiers which may for example represent a simple melody sequence of successive musical note pitches relative to a starting note on a Western musical scale. Map 1042 maps these signal identifiers to characters in a character set, yielding the character string 1044. Regular expression 1046 was synthesized to represent the desired signal sequence allowing anywhere from 0 to 3 intervening signals to be tolerated in matching. Table 1048 shows the results of matching arriving input signal sequences as mapped through map 1042 with regular expression 1046, using bold type to indicate input elements that match. Such a pattern representation and scoring may be useful, for example, in identifying melody similarities for purposes of copyright infringement detection.

In embodiments, a sequence pattern representation may be an edit distance sequence pattern wherein the pattern is represented as an ordered list of the original input signal identifiers in sequence. Pattern match scoring may use well known string edit distance algorithms adapted to an ordered list of signal identifiers, which algorithms compute the number of editing operations including without limitation insertions, deletions, replacements or transpositions to convert the input sequence to the pattern sequence, such algorithms including without limitation Hamming distance, longest common subsequence, Levenshtein distance, and Damerau-Levenshtein distance, with lower string edit distances corresponding to higher pattern matching scores.

In embodiments, a sequence pattern representation may be an open bigram sequence pattern wherein a sequence may be represented by a set of open bigrams each representing ordered pairs of signal identifiers found in the sequence, including pairs of identifiers separated by other identifiers, and possibly assigning different weights to each such bigram based on the sequence distance between identifiers. Pattern match scoring may compare the set of open bigrams computed for current input signals with the open bigrams for the pattern, with the score related to the degree of overlap between bigram sets.

FIG. 10E shows examples of an embodiment of an open bigram sequence pattern and corresponding match scoring. Set 1050 shows open bigrams computed for a signal identity sequence [b,a,d,g,e]. Set 1052 shows open bigrams computed for a signal identity sequence [b,a,d,g,e]. In both cases, the weight associated with each bigram is computed as $0.5^d$ where d is the distance between the respective signal identifiers in the sequence and ^ represents exponentiation. The weight and set membership differences are highlighted in bold. Table 1054 shows the results of match scoring results of an input signal sequence with each row representing the score resulting from matching an example sequence with the pattern sequence [b,a,d,g,e]. It will be obvious to those skilled in the arts that although signal identifiers and patterns exemplified here appear as single English alphabet letters and English words that signal identifiers in sequences may be of any form including without limitation character strings, binary strings, numbers, tuples, general data structures and references.

In embodiments, a sequence pattern representation may be a state machine wherein elements and combinations of elements of a sequence may be represented by states and input signals are represented by transitions among states. Pattern match scoring proceeds as new input signals arrive, moving the state machine among states and emitting signals with appropriate scores to represent partial matching confidence.

As used here, the word "temporal" denotes a contiguous range of increasing possible signal stamp values, with signal value changes occurring at stamp values within that range. Such a range may often be related to real time or virtual time, but may in embodiments simply be a numeric range.

Figure 10F:
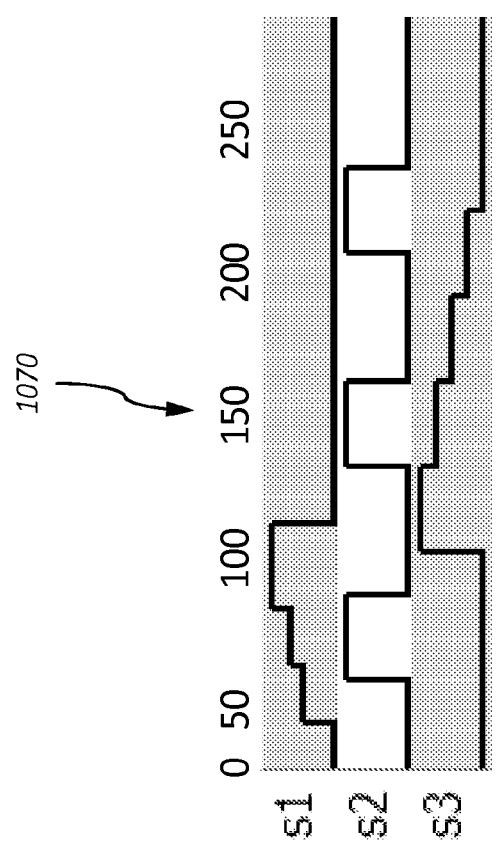
FIG. 10F shows temporal pattern interpolation curves.

In embodiments, a temporal pattern representation may be one or more interpolation curves of weights over a relative stamp range, one such curve for each input signal id included in the pattern. Line graph 1070 of FIG. 10F shows possible values of such interpolation curves for signal identifiers s1, s2 and s3. A pattern match score may be related to the sum of products of new input signal values and corresponding weight values from interpolation weight curves at corresponding input stamp values normalized to 0 for the start of the input signals being matched. In order to match temporal signals of varying temporal rates, for example the same musical note sequence played at different tempos, the corresponding interpolation curves may be mathematically expanded or compressed in the stamp dimension by multiplying the corresponding stamp values by a scale factor, with the final temporal pattern matching score being maximum matching score of any of several such expanded or compressed curves.

Embodiments of a temporal pattern representation may additionally comprise one or more expected signal values for each signal at each relative stamp value in the relative stamp range, with pattern match scoring related to the sum of products of corresponding weight values and the differences between input and expected signal values.

Pattern Learning

In embodiments, new patterns 292 may be created for novel input signal combinations, existing patterns 292 may be adjusted to account for variations in input signal combinations, and rarely matched patterns 292 may be deleted.

In embodiments a new memory pattern 292 may be created when an arriving input signal combination fails to sufficiently match any existing pattern 292 within a pattern memory space 290 well enough, determined by comparing all computed pattern matching scores for patterns 292 in one or more pattern memory spaces 290 with a threshold.

In embodiments an existing memory pattern 292 that matches current input signals may be adjusted, including without limitation adjustments of weights, expected values, sequences, timings, and adding and removing signal identifiers, to incorporate current signals. The amount of adjustment may be controlled by a learning rate parameter. The pattern(s) 292 to be adjusted may be chosen according to parameters including without limitation a minimum matching threshold and a highest-match criterion.

Figure 10G:
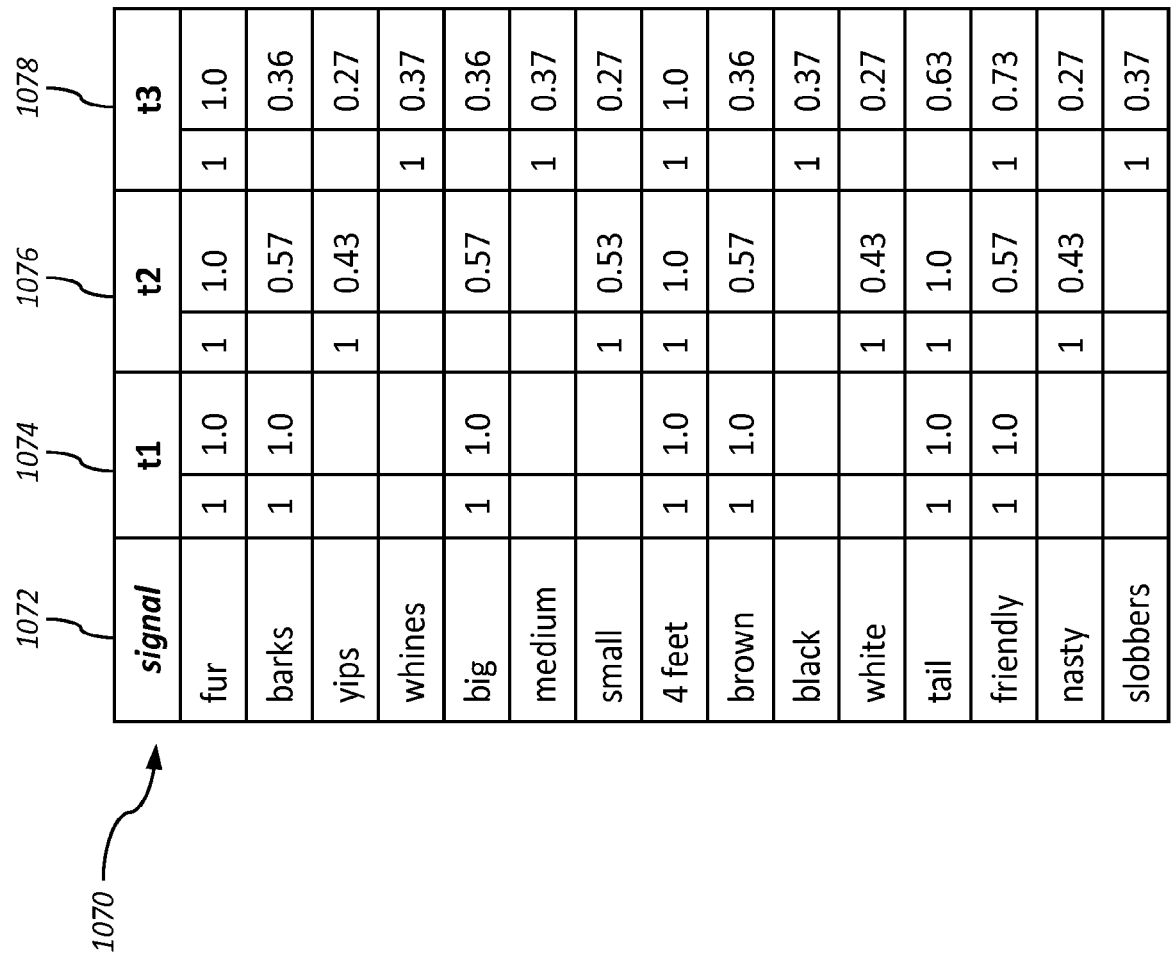
FIG. 10G shows learning in a weight set pattern.

FIG. 10G shows an example of possible effects of initial pattern creation and subsequent learning for a weight set pattern. Column 1072 of table 1070 enumerates signal identifiers that may be received by a set pattern module configured to create weight set patterns. 0 values in the table are shown as blank for clarity. For simplicity, all arriving non-0 signal values at each successive stamp value are 1. Column 1074 shows input signal values at stamp t1 and the corresponding pattern weights set as a result of these inputs. Column 1076 shows input signal values at stamp t2 greater than t1, with 1 values indicating signals received at that stamp, and the resulting pattern weights after adjustment using a learning rate of 0.5. Similarly column 1078 shows input signal values at stamp t3 greater than t2 and the resulting pattern weights after learning using the same learning rate 0.5.

In human experience, some memories may be transient, formed and discarded quickly unless reinforced by further experience. Other memories may be initially formed and remembered for long periods of time, based on initial high salience associated for example with a trusted teacher or an emotionally intense context. Newly formed memories may be less "vivid" than older or more frequently reinforced memories. Additionally, signal combinations repeated rapidly (e.g., "cramming") may not be remembered as well as if they are repeated over longer periods of time. In embodiments, these dynamic effects may be modeled by associating a salience value with a memory pattern 292. This salience value may be set initially at pattern creation, may be adjusted upward with repeated high-confidence matching, and may decay over time according to a decay profile. Additionally, a refractory period parameter may control the rate of increase in pattern salience inversely related to the stamp interval since previous matching. The salience of a pattern may also participate in pattern match scoring, with low-salience patterns scoring lower than high-salience patterns. A pattern with a high salience and long decay may be retained for an arbitrarily long stamp range. A pattern with low salience and/or short decay may fade quickly and be deleted.

Figure 10H:
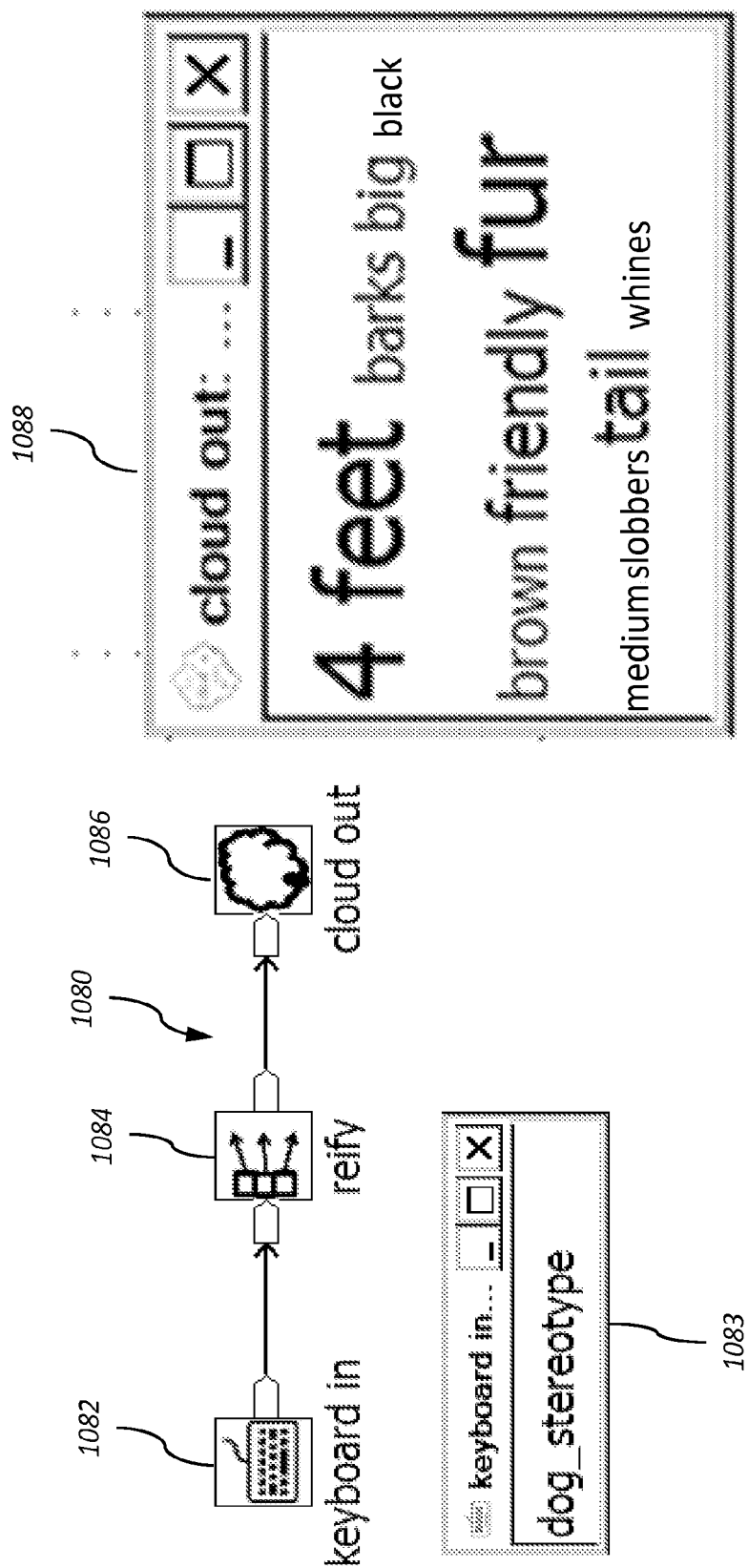
FIG. 10H shows an example of usage of a reify module.

Embodiments may include a reify module which, when it receives an input signal for an identifier of a pattern in a memory pattern space, may generate output signals for each of the component signal identifiers in the pattern representation. The reify function may be thought of as regenerating, replaying, recreating, reproducing, reviewing, repeating, re-experiencing, replicating, or reiterating the components of a pattern. FIG. 10H shows an example neural process specification 1080. Keyboard input module 1082 sends a signal for the known pattern name "dog_stereotype" entered in keyboard input window 1083. Reify module 1084 receives that signal and generates multiple output signals each with an identifier corresponding to a component signal of the pattern and a value related to the weight of that signal in the pattern. Cloud text output module 1086 displays these signal values in associated window 1088 with font size proportional to signal value. In this particular instance the pattern identifier entered in keyboard input module 1082 corresponds to a stereotype pattern for recognizing a dog where component weights may indicate the importance of corresponding features in recognizing a dog. In this case the features "4 feet" and "fur" are very important, "friendly" and "tail" are somewhat important, and other features have lesser importance, as learned from experience. Such reification may be important in cognitive functions of prediction and imagination. If enough features are observed strongly enough then a dog may be recognized and the reify module may fill in missing features. If other neural processes produce a strong signal for "dog", the reify module may supply all the features needed to imagine a generic dog.

Embodiments may include modules to generate signals for identifiers of patterns in pattern memory spaces according to parameterized probability and time distributions.

Saving, Restoring and Sharing Memory Patterns

In embodiments there may be an operation to save memory pattern representations into files in formats including without limitation an XML format, a tabular format, a delimited text format, a programming language expression format, and a binary format.

In embodiments there may be an operation to restore saved pattern representations from files into memory pattern spaces of a neural graph, including saved pattern representations in formats including without limitation an XML format, a tabular format, a delimited text format, a programming language expression format, and a binary format.

In embodiments, pattern memory spaces 290 may be shared live among multiple concurrently executing neural graphs. As a non-limiting example, a robot of a collection of cooperating robots, each running a portion of a neural process specification, may share patterns learned from experience live with other robots when inter-robot communication is operational.

Neural Computing Environments

As used herein, the terms "process", "address space", "thread", "processor", "multi-processor", "node" and "distributed processing" are used in their conventional meanings in the contexts of computing, computer program execution and computer networking in the current state of the art.

A neural process specification embodies a neural flow computing paradigm characterized by a number of computing elements interconnected in a directed graph, where each element sends signals to inputs of one or more connected elements, and each element is responsive to signals presented on its inputs, where computing proceeds on an element-by-element basis in response to said signals, with each element asynchronously receiving any signals and performing responsive characteristic computation to arrive at further signals that are transmitted from its output(s).

While this neural flow computing paradigm may loosely resemble other computing paradigms such as spreadsheets or dataflow systems, the neural processing system 100 explicitly employs parameters like time, dependency, signal strength, and the like to more closely and naturally model signaling and processing aspects of biological processes such as animal and human neural activity.

Embodiments of a neural process specification 110 may follow well-known dataflow technology principles. Dependencies among modules 120 may be limited to explicit interactions via signals 225 on links 220 and via resources mediated by neural computing environments including without limitation graph parameters 282 and memory pattern spaces 290. This isolation may permit module instances to be configured within single computer processes and address spaces or in separate processes and address spaces possibly on separate computers. Stamps on signal events among modules may ensure that overall signal logical synchronization may be maintained across asynchronous execution of module instances on different processors. Thanks to dataflow principles, neural/cognitive application performance may be nearly linearly scalable with available resources and distributable over multiple network topologies, using both pipelined and partitioned parallelism, without explicit parallel design and without design change.

Embodiments of neural computing environments 130 may implement the characteristics of this neural flow computing paradigm in a variety of ways in different neural computing environments. Different embodiments of neural computing environments may use different functionally equivalent module implementations 215 appropriate to the underlying technologies, including without limitation neural sub-graphs, software source code, intermediate language code, machine code, microcode, software macros and hardware macros.

Embodiments of neural computing environments 130 may maintain synchronization of activities among modules in a neural graph based on stamp values of events corresponding to signal values. Multiple events from one or more input links may be delivered to an input port of a module. Events may ordered by their respective stamp values. An event with a lower stamp value is considered to be "earlier than" an event with a higher stamp value. Events with the same stamp value are considered to be concurrent. Events may be synchronized with each other only as necessary for correct functional operation. Events on different paths through a neural graph may not need to be synchronized except as explicitly indicated by convergence of respective links on a single input port of a module instance.

In embodiments, event stamps may correspond to a real or virtual time clock.

Virtual time in the system can operate like a "system clock," which can be run as fast or slow as needed, to ensure activities occur in a synchronized fashion. The relationship of the system clock and any real-time clock is not necessarily 1-1, but if there is some external series of events and the real time differences between them needs to be maintained, then some accommodation/adjustment can be made with the virtual time/system clock to account for the real time-dependent factors. For example, when streaming sound or video, the relative timings between successive (reconstructed) video frames needs to be accurate to see an accurate picture. To keep it smooth, video signals are buffered as they arrive with no relationship to real time, but then replayed with the correct real-time relationships. But often the show stops until more frames are loaded. Output of the system can be managed to address these real-time constraints while virtual time is managed to handle appropriate synchronization and queuing of signals within and between modules of the system.

In embodiments, an external system may be a simulation system, and the system may account for the timing (e.g., virtual time) used within the simulation. For example, a simulation system may simulate evolution of a biological ecosystem, playing out of a market, playing of a game, progression of a military campaign, or the like, and the clock for the simulation may be coordinated with the virtual time/system clock of the neural computing system to prompt inputs to the simulation (e.g., decisions) at appropriate times. In other embodiments the virtual timing for or within a graph may be different and may not require synchronization unless there is a reason for such synchronization is required (such as for an external system).

Time inside an executing neural graph may be virtual and monotonically increasing (or otherwise non-decreasing). Virtual time flows along the links of a neural graph, and is used to serialize and synchronize events. Neural computing environments 140 assure that events arrive at modules in virtual time order. Virtual time can be slowed down so developers can monitor complex dynamics or to cope with system resource limitations, and can be sped up as resources (e.g., processing power) are available. Virtual time can be synchronized with real time at external input and output interfaces, especially useful in real-time processing and robotic control. Incorporating varying speed components and algorithms has no functional effect on overall graph operation. Processing modules may add a small "processing delay" time to output events generated from input events, simulating the biological reality that neurons are not infinite-speed, and enabling graph loops without infinite recursion.

A neural process specification 110 may be executable by multiple neural computing environments 130, including without limitation interpreters, compilers creating machine language programs executed on conventional or specialized computer systems, and configuration generators creating specifications for configuring configurable hardware including without limitation field programmable gate arrays (FPGAs), application-specific integrated circuits (ASICs), and custom hardware designs. Neural process execution may proceed on appropriately configured uni-processor, multi-processor, distributed and heterogeneous computer configurations. The same neural process specification may be executed with equivalent effect on multiple neural computing environments without change, and may take advantage of performance accelerations inherent in these environments. Neural process executions may be split among cooperative neural computing environments 130 of different types, for examples custom hardware for some functions and software for others, and across networks with some functions operating in outboard devices such as robots and other functions operating in centralized or distributed systems.

The neural dataflow paradigm of neural processing system 100 enables neural computing environments 130 to provide flexible dynamic configuration, reconfiguration and graceful degradation of executing neural process specifications. Parts of a neural process specification may be replicated and may be dynamically migrated among multiple processors and distributed system nodes, for example to maintain function in unreliable systems. Parts of an executing neural process may continue operating even when other parts of the neural process stop functioning or stop communicating for a variety of reasons, including without limitation hardware failure, software failure, power loss, dynamic design change, and environmental interference.

It will be clear to those skilled in the arts that, although a neural process specification 110 may be a graph explicitly specifying signal data flow dependencies among modules 120, embodiments of a neural computing environment 130 need not employ data flow technology in executing the specification, as long as said dependencies and related signal synchronizations according to signal stamp values are respected. As a non-limiting example, a neural computing environment 130 may pre-compute signal and module interdependencies and invoke module functions as needed in an order that preserves those dependencies. As another non-limiting example, a neural computing environment may invoke module functions on a fixed schedule when any significant signal values or changes are present. Such alternative neural process execution embodiments may be advantageous for some computing technologies, and may be employed for parts or all of a neural process execution.

Figure 11A:
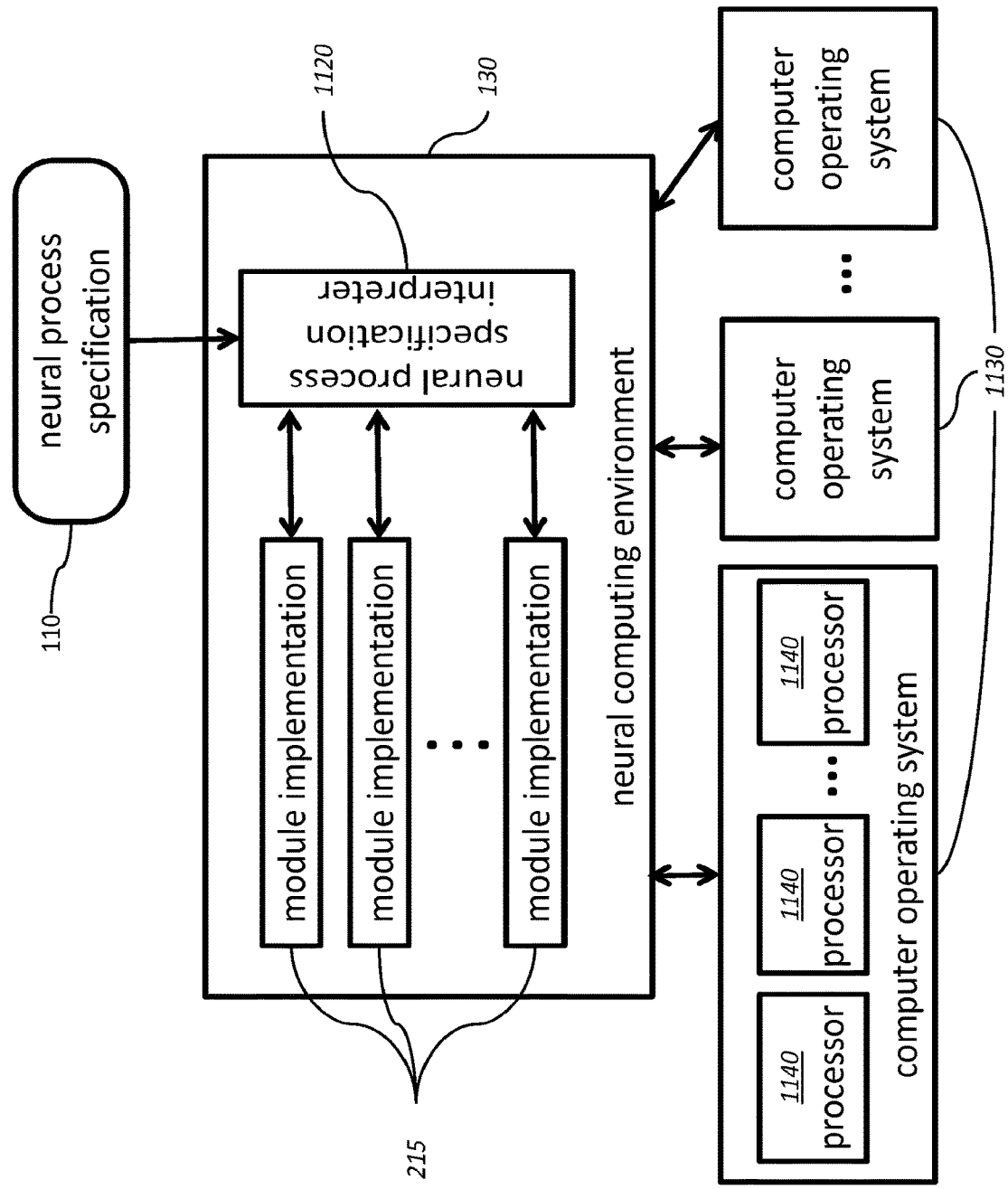
FIG. 11A shows an interpreted neural computing environment.

FIG. 11A shows an embodiment of a neural computing environment 130 using a neural process specification interpreter 1120. The interpreter reads a neural process specification 110, configures and initializes necessary resources, initiates and controls the processing, using implementations 215 of individual module types 120. Interpreter 1120 may utilize as needed facilities provided by a computer operating system 1130 and processors 1140, including without limitation processes, threads, memory, shared memory, virtual memory, inter-process communications, communications channels, file systems, databases, timers, interrupts, queues, and devices. In operation, interpreter 1120 may create instances of modules 120 and links 220, invoke functions of module instances, respond to requests from module instances to read input signals, access graph parameters 282 and pattern memory spaces 290, send output signals and schedule additional operations. Embodiments of module implementations 215 may include without limitation object-oriented programming classes, interfaces, attributes, and methods, subroutines, functions, scripts and programs. In distributed processing environments including without limitation computer networks the neural computing environment 130 may interact with one or more computer operating systems 1130 operating on distinct computing nodes each comprising one or more processors 1140.

In embodiments, a neural process specification 110 in the form of a neural graph may achieve scalable performance using multiprocessor systems including without limitation shared-memory multiprocessors, non-shared-memory multiprocessors, distributed multiprocessors, heterogeneous multiprocessors and computer networks. If module implementations 215 interact solely through facilities managed by neural computing environment 130, including without limitation signaling through links 220 and the use of pattern memory spaces 290 and graph parameters 282 then module implementations 215 for distinct module instances may execute on different processors 1140 in the multiprocessor system and may execute concurrently and in parallel, with links 220 conveying signals among module instances across processes and computing nodes.

In embodiments, an individual module implementation 215 may utilize available multi-threading and multi-processing facilities of an underlying computer operating system 1130 to achieve scalable performance through concurrent execution of threads or processes.

Figure 11B:
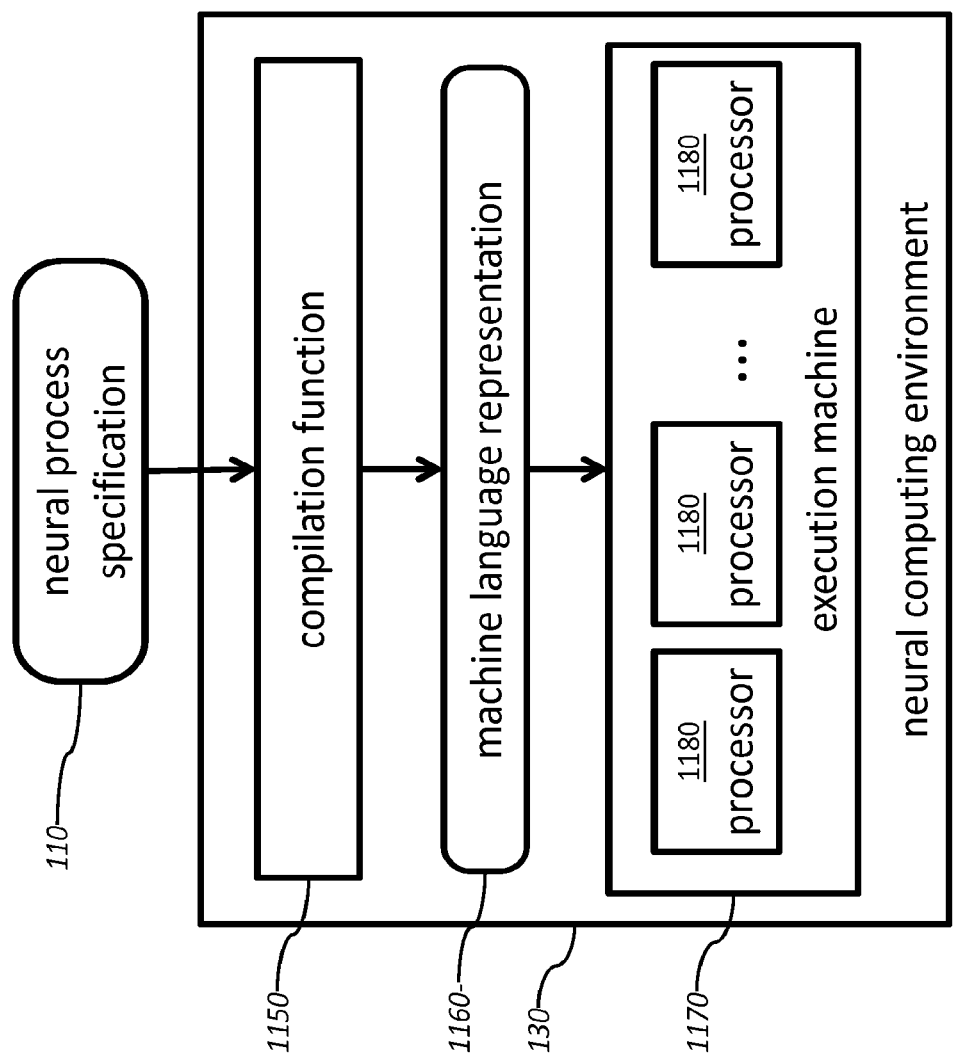
FIG. 11B shows a compiled neural computing environment.

FIG. 11B shows an embodiment of a neural computing environment 130 using a compilation function 1150 to generate a machine language representation 1160 of the neural process specification 110 for direct execution on a real or virtual execution machine 1170 controlling one or more processors 1180 which may include without limitation conventional central processing units (CPUs), graphical processing units (GPUs) and neuromorphic processing units. It will be appreciated by those skilled in the arts that compilation function 1150 may employ a variety of well-known techniques, including without limitation creating directly executable machine instructions and creating intermediate programming language representations which may be independently deployed for execution on multiple execution machines 1170. Execution machine 1170 may additionally comprise program library and operating system facilities which may be utilized by machine language representation 1160.

In one aspect, the neural computing environment 130 comprises a compilation function 1150, an executable process representation (e.g., a machine language representation 1160), and an execution machine 1170. The compilation function 1150 may generate the executable process representation corresponding to the neural process specification. The execution machine 1170 may then execute the executable process representation, e.g., using one or more processors 1180 (e.g., physical or virtual computer processors for running the machine language representation 1160). Thus, the executable process representation may involve multiprocessor coordination. The executable process representation may also or instead include a configuration specification for configuring hardware to perform the functions of the neural process graph specification.

Figure 11C:
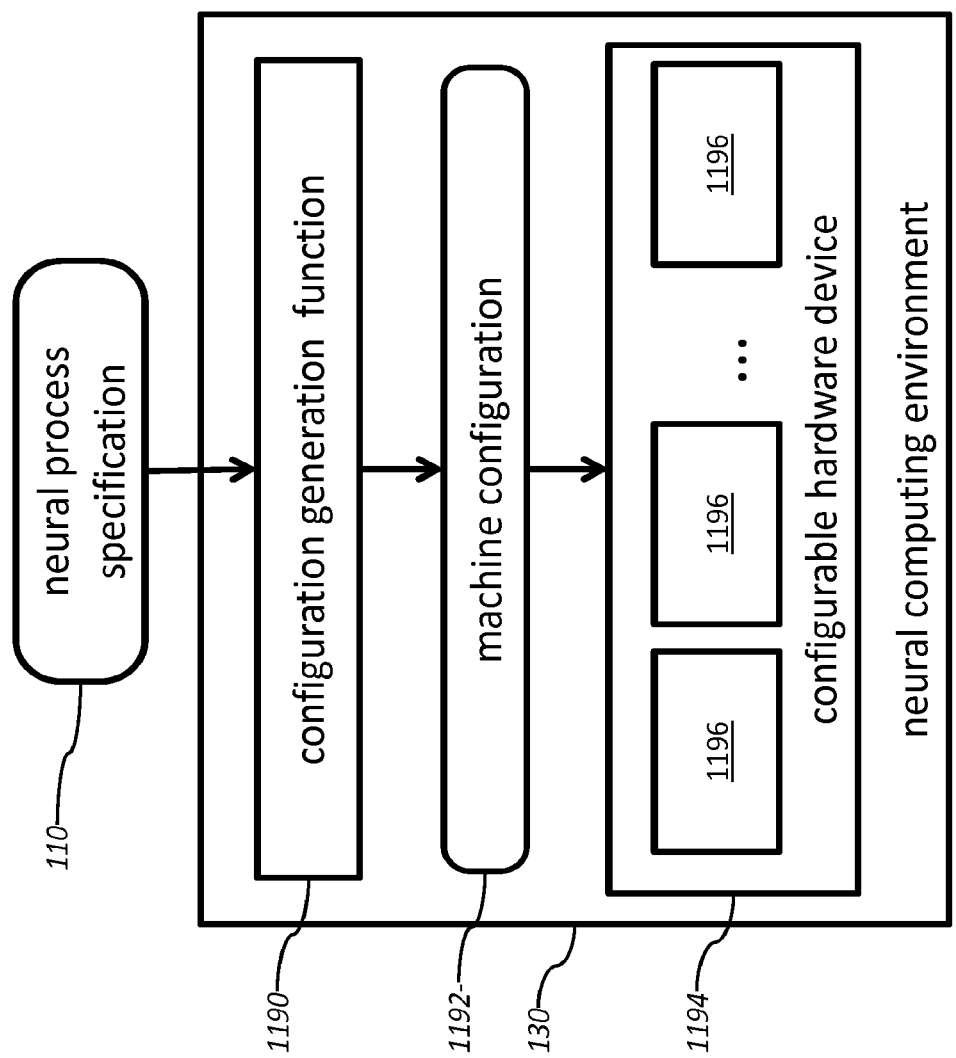
FIG. 11C shows a neural computing environment for configurable hardware.

FIG. 11C shows an embodiment of a neural computing environment 130 using a configuration generation function 1190 to generate a machine configuration 1192 for configuring a configurable hardware device 1194 comprising processing elements 1196. It will be appreciated by those skilled in the arts that the configurable hardware device may include without limitation statically configured hardware such as field programmable gate arrays (FPGAs), and application-specific integrated circuits (ASICs), and dynamically configurable hardware such as neuromorphic hardware and microcode.

It is contemplated herein that module implementations 215 may be invoked by arbitrary programs, such programs providing interfaces used by said module implementations for receiving signals, sending signals, setting timers and accessing sharable state including without limitation sharable parameters and memory patterns. It will be clear to those skilled in the arts that such a program, by acting in similar ways to a neural computing environment 130, is to be considered an embodiment of a neural computing environment 130 as contemplated herein.

Development Environments

In embodiments, a neural process specification 110 may be represented in one or more formats, including without limitation entities in an object oriented programming environment, an XML document, programming language code, and database entities.

Embodiments may include a development environment 140 for creating, modifying, saving and restoring a neural process specification 110, including without limitation a text editor, a program editor, an outline editor, a graphical editor, an immersive environment, an experiential environment, and a virtual reality environment.

In embodiments, a development environment 140 may additionally comprise interfaces to one or more neural computing environments 130 to provide functions including without limitation deployment, running, managing, controlling, monitoring, visualizing, saving and restoring neural process specifications 110.

Figure 12A:
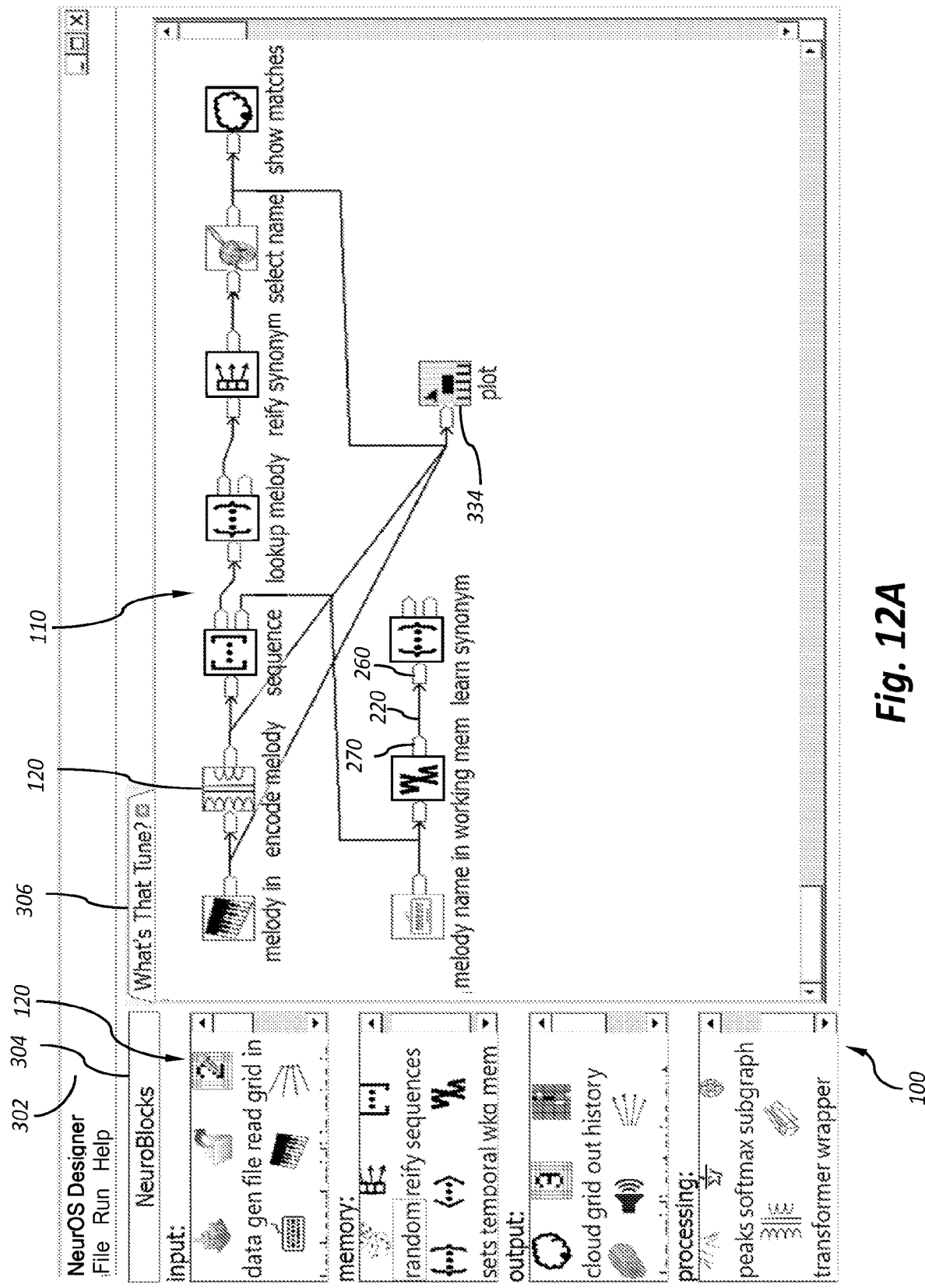
FIG. 12A shows a neural process development environment.

FIG. 12A shows the NeurOS Designer tool 302 which is an embodiment of development environment 140. The NeurOS Designer tool comprises several user interface components described herein, including a NeuroBlocks toolbox 302, and one or more neural process specification 110 graphical design editors 306. The NeuroBlocks toolbox 304 depicts module 120 types available in a module library 125 which module types may be used in neural process specification 110 designs as a plurality of icons. Depicted is an instance 306 of a graphical editor of a neural process specification 110 using a box and line graph metaphor visually depicting module instances 120 as icons, links 220 as directed arrows, input ports 260 as block pentagonal arrows adjacent to and pointing inward to modules 120, output ports 270 as block pentagonal arrows adjacent to and pointing outward from modules 120. Development tool 302 may additionally comprise multiple graphical editors 306 for concurrent development of multiple neural process specifications 110.

In embodiments, a variety of well-known graphical user interface actions, controls and techniques may be used to achieve creation, modification, deletion, configuration, visualization, control or monitoring functions on the visual depiction of a neural processing specification 110 including without limitation keyboard keys, cursors, arrow keys, keyboard macros, function keys, pointing and positioning devices such as mice, touch pads and touch screens, button pressing and releasing, menu selection, visual selection of elements, selection of multiple elements, dragging, dropping, pinching, spreading fingers, turning a touch dial, clicking, double-clicking, right-clicking, gesturing and eye movements. In embodiments a module instance may be added to a neural process specification by dragging an icon representing a module type from toolbox 304 and dropping it at a position on editor 306. In embodiments a new link may be created by dragging an output port 270 to an input port 260. In embodiments an existing link may be deleted by dragging the output port 270 at the link's tail to the input port 260 at the link's head.

Figure 12B:
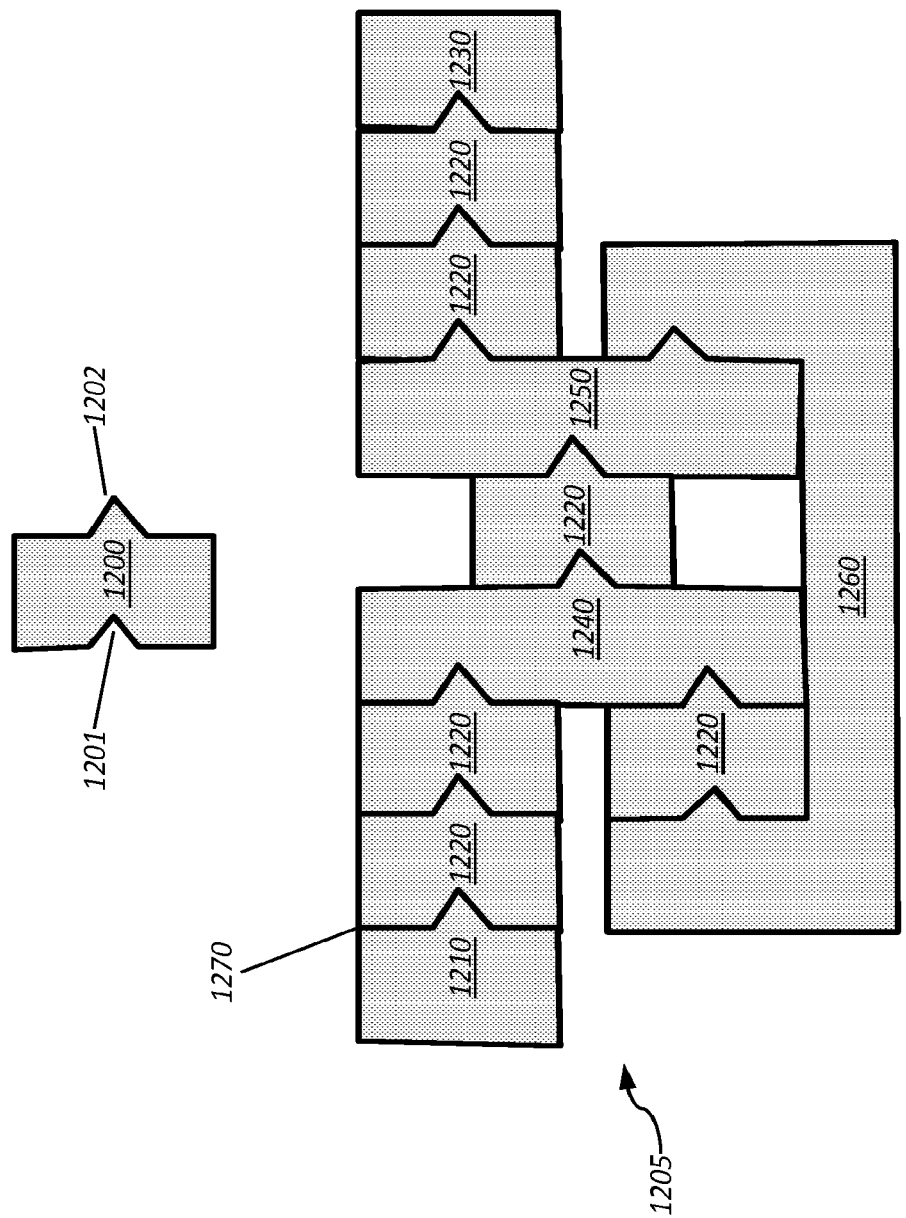
FIG. 12B shows an alternative visual development paradigm.

In embodiments, a graphical editor may be provided for a developer to create and modify neural process specifications 110 based on two or three dimensional block stacking or block proximity metaphors, where individual blocks may represent modules 120 or sub-graphs 295 and links 220 may be represented by block proximity. FIG. 12B depicts one example of such an embodiment. A generic block 1200 may represent a module 120 with any input port 260 represented as an indentation shape 1201, and any output port 270 represented as a protrusion shape 1202. Configuration 1205 may represent a neural process specification 110 being created in this visual design metaphor. Block 1210 with no input ports may represent an input module. Block 1230 with no output ports may represent an output module. Blocks 1220 may represent intermediate modules each with an input port and an output port. Block 1240 may represent a module with multiple distinguished input ports. One such module type may be a merge function to commingle input signals from all its input ports. Block 1250 may represent a module with multiple output ports. One such module type may be a broadcast function to copy input signals to multiple output ports. Block 1260 may be a repeater function useful to copy input signals to its outputs to enable complex connectivity configurations such as feedback paths. Abuttal 1270 of two blocks with an output port shape of a first block mating with an input port shape of a second block represents a link 220. Composition of a neural process specifications 110 may proceed using a variety of well-known user interaction techniques. One example may be dragging and dropping blocks representing specific module types onto a design canvas. Positioning a block abutting another block such that an output port 270 protrusion 1202 of one block mates with an input port 260 indentation 1201 of another block may create a link 220. A variety of well-known user interaction techniques may accelerate the assembly of neural process specifications in such a metaphor, such as automated "snapping together" of blocks and visual stretching and morphing of block shapes to adjust to the graphical connectivity needs of a neural process specification 110 being created.

In embodiments, a neural process development environment 140 may offer a zoom function providing the ability to view and interact with a neural process specification at varying levels of detail, including without limitation viewing and interacting with neural sub-graphs contained in sub-graph module instances and in-place expansion or contraction of sub-graphs or graph regions.

Figure 13:
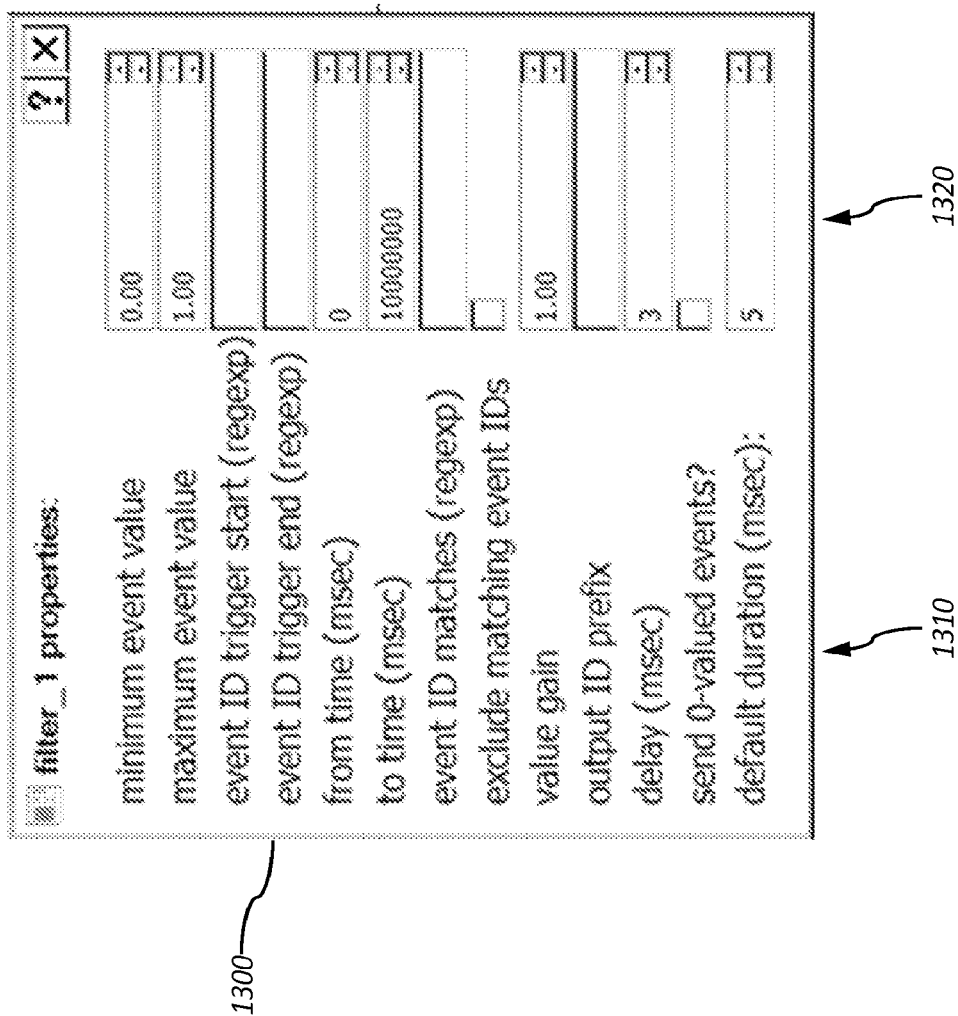
FIG. 13 shows an example of a module parameter setting user interface.

In embodiments, a neural process development environment 140 may offer a graphical user interface control panel for a user to graphically specify and modify values of module parameters 280. Different module types 120, having possibly different module parameters 280, may have different associated control panels for specifying and modifying values of module parameters 280. FIG. 13 shows a non-limiting example of an embodiment of a property sheet style of graphical user interface control panel 1300 for setting multiple parameter values for one specific module type, a filter module. At left are descriptive strings 1310 for each module parameter 280. At right are graphical editing controls 1320 for setting corresponding parameter values, each control specifically configured to enable editing and constrain values of the corresponding parameter, including without limitation any of a variety of well-known graphical controls, including text editors, spin boxes, check boxes, buttons, button groups, choice lists and customized controls, and combinations thereof. The meanings of individual parameters 280 and their valid values may be specific to each module type.

It will be understood by those skilled in the arts that a wide variety of alternative graphical user interfaces are possible for such parameter setting, and multiple such variations may be used in any embodiment.

In embodiments, a development environment 140 may enable dynamic editing of a neural process specification 110 while it is executing, including without limitation creating and deleting modules 120 and links 220, creating, deleting and modifying module parameters 280 and graph parameters 282, creating, deleting, and clearing the contents of pattern memories 290. Such modifications may take effect on the executing neural process as enabled by the neural computing environment 130 executing the neural process specification 110.

In embodiments a development environment 140 may provide dynamic display of characteristics of an executing neural process, including without limitation signal activity on links 220, computing activity in modules 120, resource consumption, execution location in multiprocessor execution environments, population and change of pattern memory spaces 290, values and value changes of module parameters 280 and graph parameters 282. Such dynamic displays may utilize any of a variety of well-known graphical attributes and constructs including without limitation color, line style and thickness, highlighting, text and numeric displays, graphs and charts, fonts and font characteristics such as bold, italics and size, graphical effects such as glows, shadows, shading, depth, perspective and marquees, motion, and 3-dimensional rotations and angles, and combinations thereof.

Figure 14:
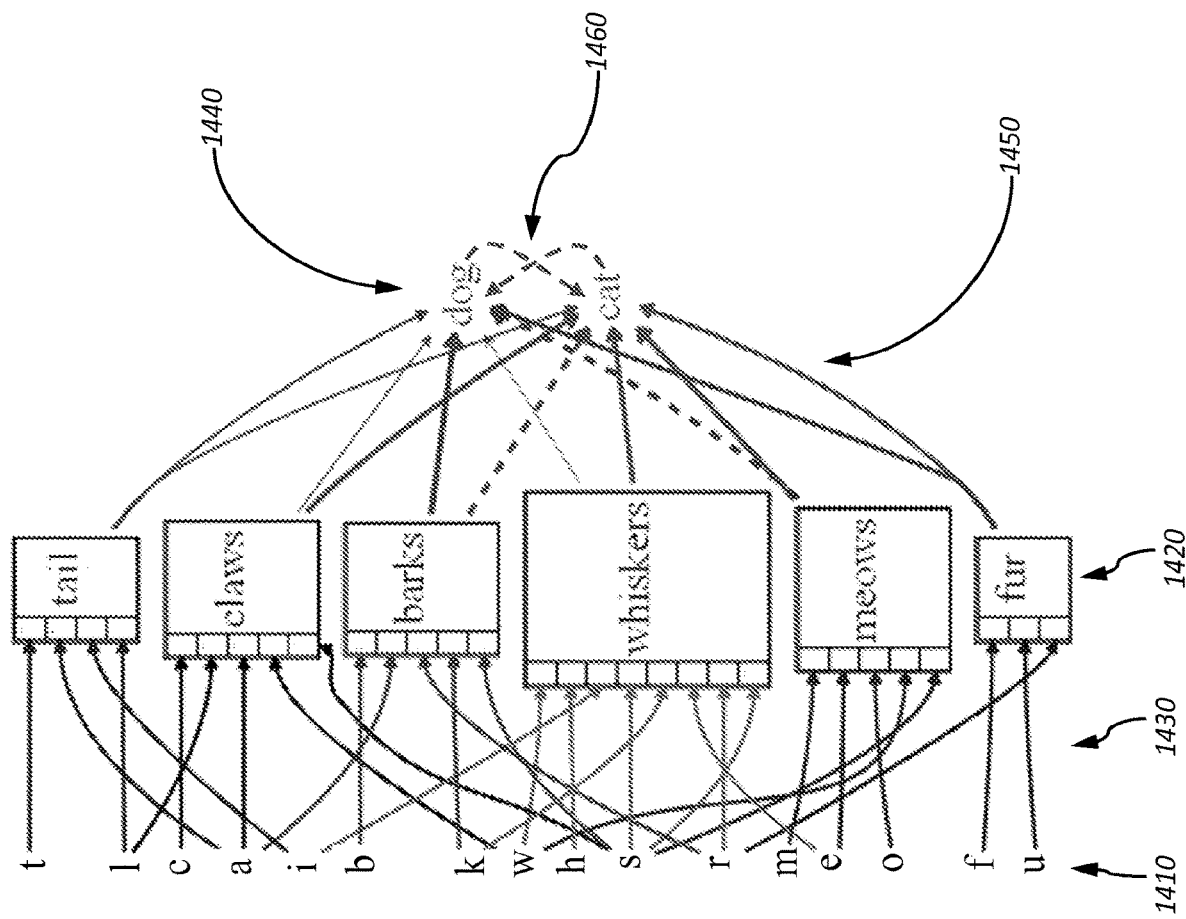
FIG. 14 shows an example memory pattern visualization display.

In embodiments a memory pattern visualization function may be provided, as shown in the example in FIG. 14. In this embodiment, a pattern may be represented by an identifier with or without a surrounding box, and relations among patterns may be represented by arrows. In this example, signal identifiers 1410 represent English alphabet letters which may derive from signal sources including without limitation typed input, file input or image input and are labeled with those letters. In this example sequence patterns 1420 represent sequences of signal identifiers, in this case constituting words. Relationship arrows 1430 and step numbers in sequence pattern boxes 1420 show how letter signals are combined to form sequence patterns 914, with identifiers reflecting corresponding English words in this example. Set pattern 912 identifiers 1440 ("dog" and "cat") may combine individual word patterns 1420 shown by relationship arrows 1450. Font sizes for identifiers may indicate pattern salience values with larger fonts representing more salient patterns. Arrow thicknesses may indicate the magnitude of weights of pattern component identifiers, with thicker arrows indicating higher weights. A solid arrow may depict a positive excitatory weight to increase a pattern matching score if a corresponding input is active. A dashed arrow may depict a negative inhibitory weight to diminish a pattern matching score if a corresponding input is active. Arrows 1460 may represent cross-inhibitory memory effects, in this case modeling that strongly matching a set of input signals as a "dog" diminishes the matching score for a "cat", and vice versa. It will be understood by those skilled in the arts that other visual attributes including without limitation color, font and font characteristics, and other line styles, and visualization techniques such as varifocal zooming may be used to visualize additional aspects of memory patterns 282. It will be understood by those skilled in the arts that specific signal and pattern identifiers shown are specific to memory patterns illustrated in this example, and may differ in other examples.

In embodiments a development environment 140 may include user interface controls including deploying a neural process specification 110 to one or more neural computing environments 130, starting, stopping, pausing, stepping and resuming execution, modifying execution parameters including without limitation the real or virtual execution rate of stamp increments, saving a neural process specification including current execution state, and restoring a saved neural process specification including saved execution state.

It will be understood by those skilled in the arts that the embodiments described herein and depicted in FIGS. 12A and 12B are but two of a great many possible alternative user interface forms of a development environment 140 to provide similar functionality contemplated herein.

Accordingly several advantages of one or more aspects and embodiments include the following. Users can rapidly create and iterate designs of practical functioning intelligent applications and subsystems using a visual graphical design metaphor. Designs may resemble familiar functional block diagrams of brain operation and generally mimic the organization, structure and activity patterns of biological brains and nervous systems, providing insight and cross-fertilization with neuroscience and cognitive science research. Designs directly support popular theories of neural information coding, including spike timing, spike rate and population coding. Biological memory functions and phenomena may be modeled and emulated. Cognitive functions emerge from composition of modular components. Applications and subsystems developed can support a wide range of cognitive capabilities and models of brain function. Development is accelerated through composition of reusable configurable modular components. Users can quickly and easily incorporate and integrate external technologies and systems into designs and can quickly and easily incorporate developed intelligent applications and subsystems into external systems. Users can develop intelligent sub-assemblies and recapture them as reusable modular components. Intelligent applications and subsystems can be designed once and deployed on multiple computing architectures including general-purpose computers, multi-processors, distributed systems and networks, specialized computers, heterogeneous systems, embedded systems, special-purpose and custom and neuromorphic hardware, appliances and devices and hybrid systems. Performance of developed systems is scalable with available computing resources without redesign. Built systems are inherently efficient, using computing resources only in response to activity. Applications and subsystems can share learned memory patterns. Complex intelligent systems can be assembled from separately built and tested subsystems. The technology supports a broad synergistic ecosystem of multiple developers contributing interchangeable tools, execution environments, modules, sub-assemblies, applications, adapters to external technologies, and learned patterns.

Cognitive Functions

Embodiments described herein may enable the creation of neural process specifications 110 which may implement or model a wide variety of cognitive functions, including without limitation aspects of sensing, perception, timing, reacting, learning, pattern recognition, working memory, long-term memory, memory consolidation and reconsolidation, classification, prediction, imagination, reasoning, planning, problem solving, acquiring and using skills, behavior, learning and navigating spaces, and language acquisition, understanding and generation. Such specifications may be referred to interchangeably as graphs, neural graphs, circuits, neural circuits, sub-graphs, neural sub-graphs, assemblies, neural assemblies, sub-assemblies, neural sub-assemblies and applications. Embodiments described herein may allow a neural graph implementing a cognitive function to be incorporated as part of a larger neural graph, and to be captured as reusable module 120 usable in other neural graphs. It should be noted that a sub-graph may comprise a single module instance or multiple module instances and any number of links. In the example sub-graphs described herein, it will be understood that manual user input and visual output modules may be included for demonstration purposes. In practical use as parts of larger systems or as reusable modules, such user interaction modules may be replaced by other sources providing similar input signals and other targets consuming output signals.

Figure 15A:
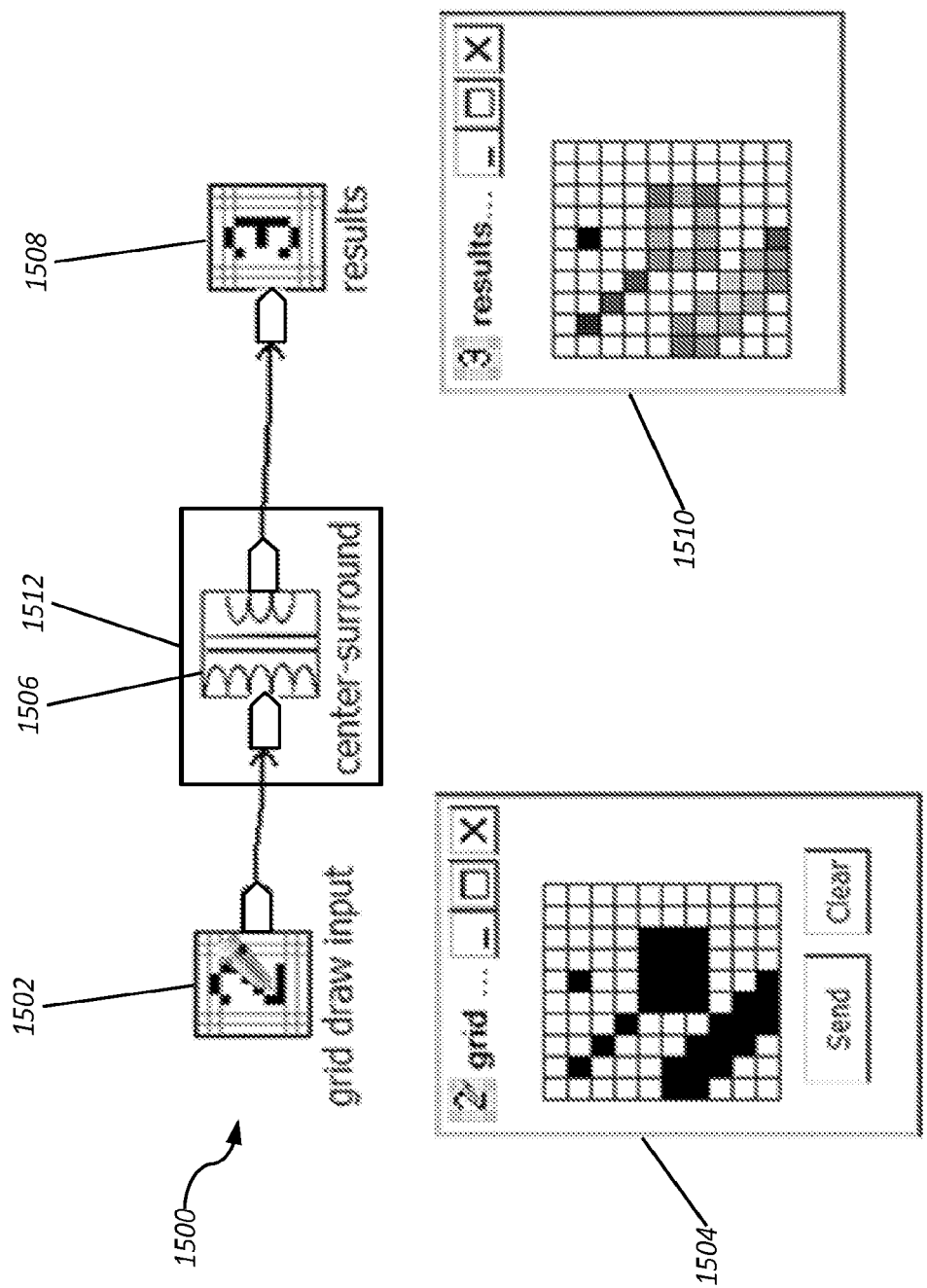
FIG. 15A shows a neural circuit for a center-surround perception computation using a matrix function.
Figure 15B:
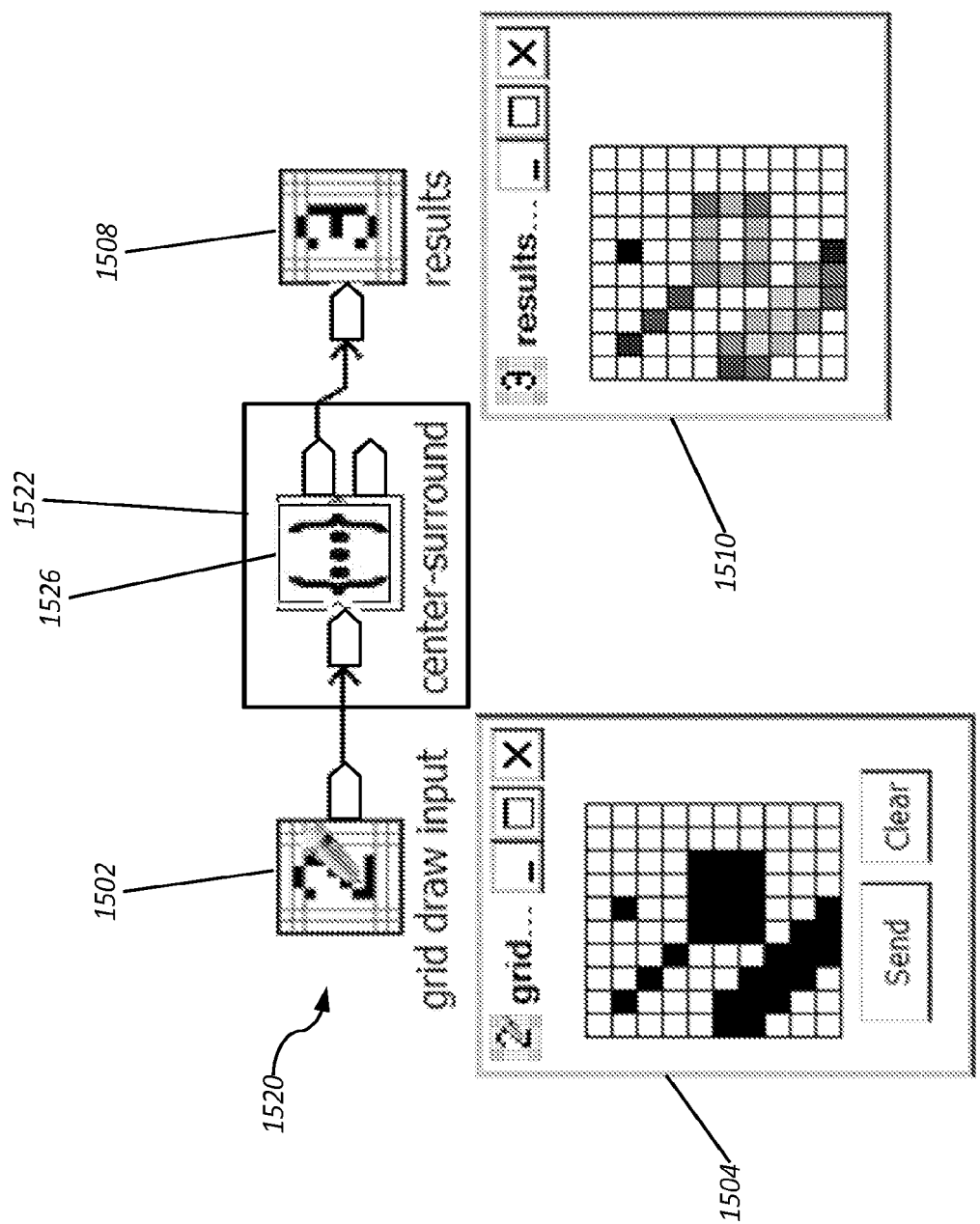
FIG. 15B shows a neural circuit for a center-surround perception computation using set patterns.

Some low-level biological perceptual processing is fixed and uniform across a broad input field. System embodiments may facilitate performing such processing with neural sub-graphs and general pattern mechanisms or specialized processing. FIG. 15A shows a neural circuit 1500 computing well-known "center-surround" lateral inhibition visual processing used by biological visual cortexes to highlight edges using a matrix computation function. Drawing input module 1502 provides a grid drawing window 1504 where a two-dimensional image corresponding to image pixels is entered, and outputs a signal event with a matrix of pixel intensity values of 0 or 1 corresponding to white and black cells in the drawing grid. Transformer module 1506 uses a center-surround matrix computation function to compute an output matrix, using a center pixel weight of 1 and –0.125 weights for the 8 surrounding pixels. Image output module 1508 shows the expected contrast-enhanced grid of pixels in shades of gray in window 1510. Box 1512 shows the reusable sub-graph implementing this cognitive function, in this case just the sub-graph comprising the single module instance 1506. FIG. 15B shows a functionally equivalent computation using a neural circuit 1520, where drawing module 1502 and image output module 1508 and corresponding windows 1504 and 1508 perform identical functions as in neural circuit 1500. Set pattern module 1526 performs an equivalent center-surround computation as transformer module 1506, instead using a set pattern for each pixel with a weight of 1 for the center pixel value and weights of –0.125 for each surrounding pixel, yielding identical results. Box 1522 shows the reusable sub-graph implementing this cognitive function, in this case just the sub-graph comprising the single module instance 1526. In usages a sub-graph comprising just transformer module 1506 or set pattern module 1526 would provide the indicated function.

Figure 16:
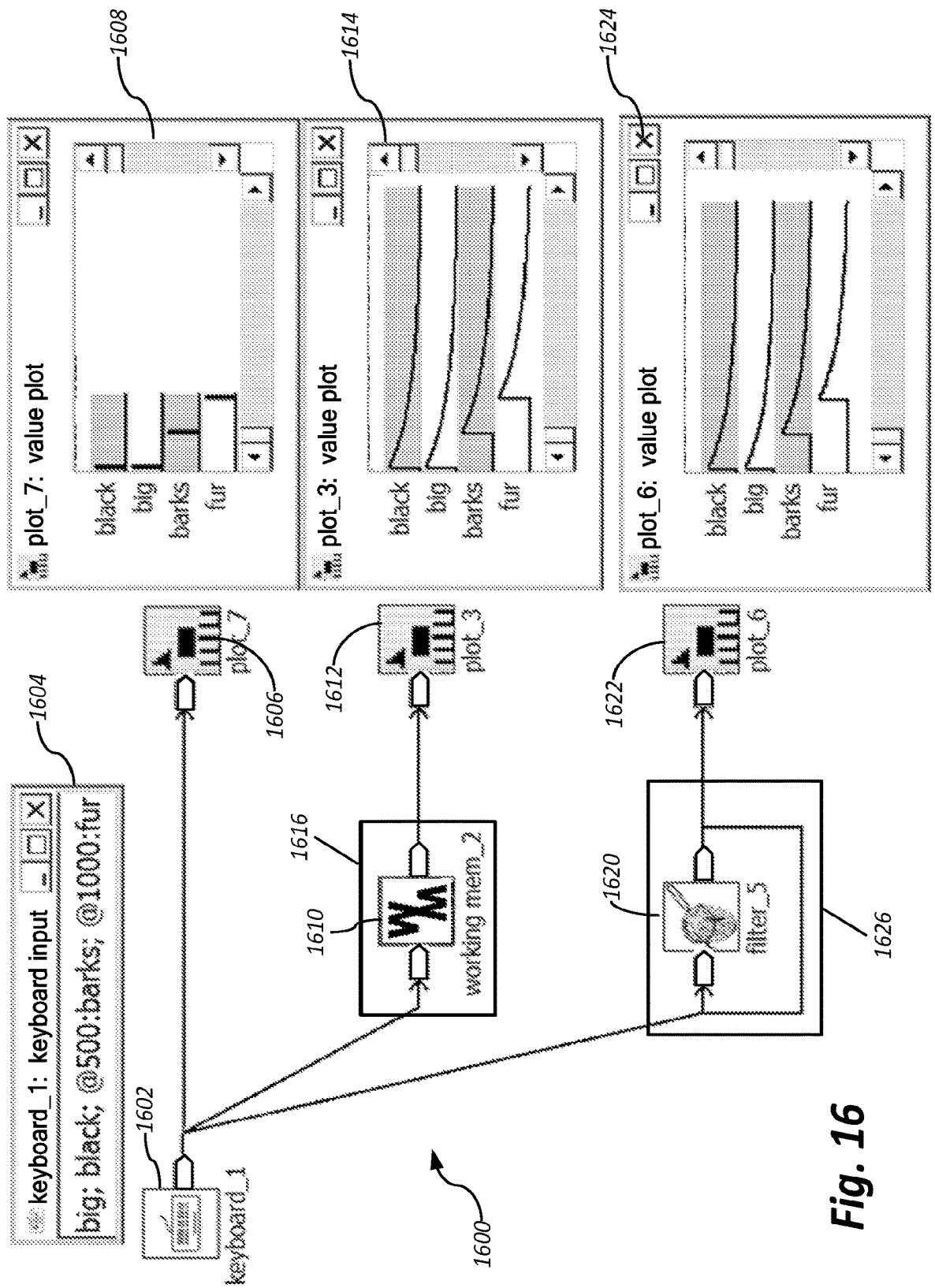
FIG. 16 shows alternative neural circuits for working memory.

Biological brains are thought to implement a working memory function, whereby signal values may be remembered for short periods of time to facilitate additional computations. System embodiments may facilitate building similar functionality. FIG. 16 shows neural circuit 1600 depicting two different methods for emulating a working memory function in sub-graphs. Keyboard input module 1602 enables manual entry of several features, in this example a "big" and a "black" signal at (implied) stamp 0, a "barks" signal at stamp 500, and a "fur" signal at stamp 1000, all with (implied) values of 1, emitting corresponding signals on all its output links. Plot module 1606 shows these signals over time in window 1608, with each signal returning to 0 within a few stamp counts. The middle path in neural circuit 1600 uses a working memory module 1610 configured to compute a decaying signal value function as displayed by plot module 1612 in window 1614. In the bottom path filter module 1620 applies a gain factor of 0.9 to each input signal and outputs the reduced signal value. This output signal feeds both plot module 1622 and feeds back to the input port of the gain module 1620 after a delay of 100 stamp counts. Input signals then cycle around with exponentially diminishing values, yielding the slowly declining plot display in window 1624. This sub-assembly is perhaps analogous to biological "autapses" where an axon branch connects back to an input dendrite of the same neuron. A cognitive system developer may use either sub-assembly 1616 comprising a working memory module 1610 or sub-assembly 1626 comprising a filter module 1620 with a feedback loop to achieve a similar working memory function.

Figure 17:
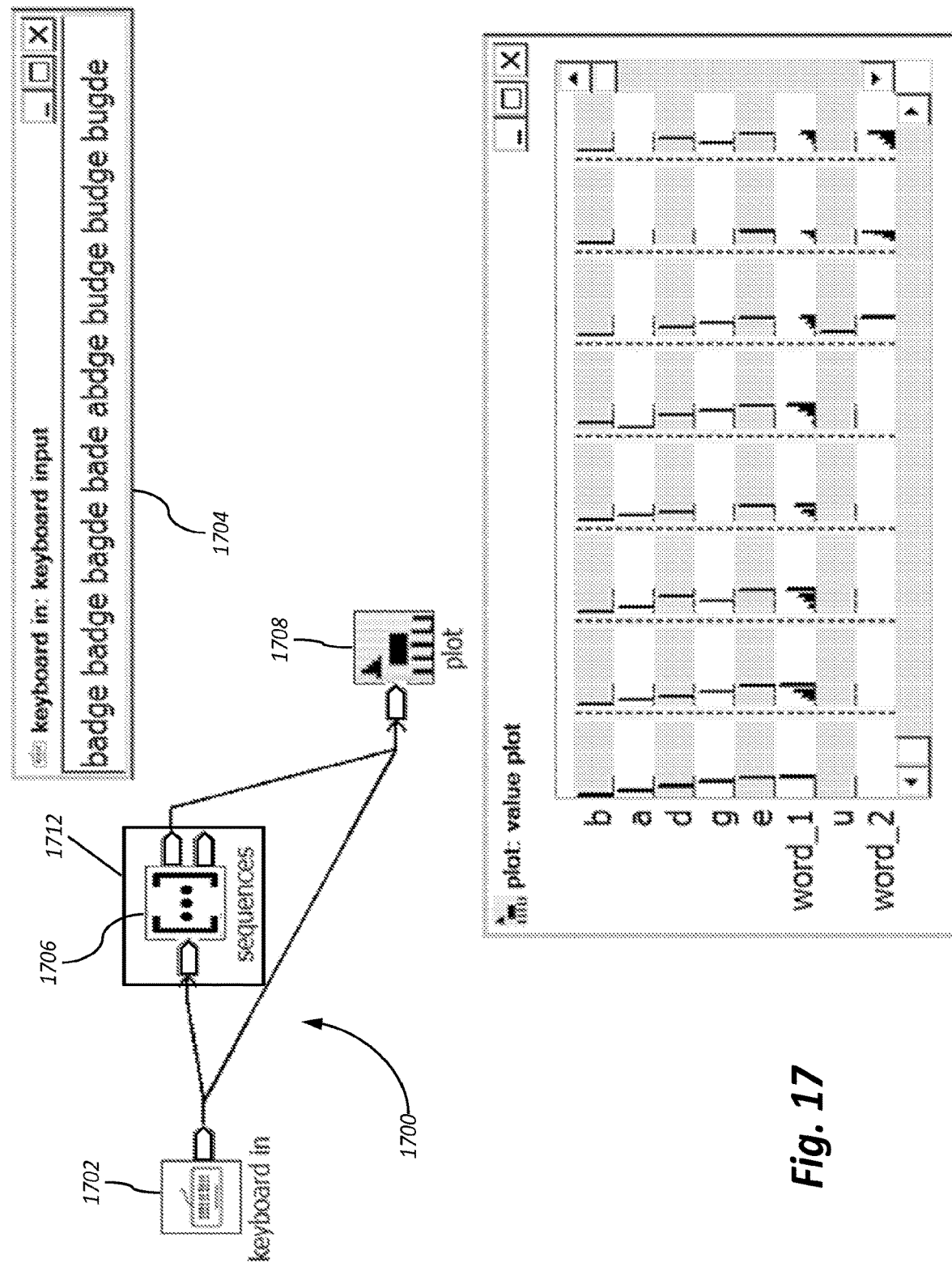
FIG. 17 shows a neural circuit for recognizing words.

FIG. 17 shows a neural circuit 1700 for recognizing words. One possible representation of words is as simple sequences of letters. Keyboard input module 1702 enables entry of letters in sequence in window 1704 and sends signals for each letter entered on its output links. Sequence pattern module 1706 learns a new sequence pattern for each input signal sequence that does not match a known sequence with a matching score above a threshold. Match scoring in this case is configured to tolerate a 1-position sequence error in an input sequence. The input signals and corresponding new and recognized patterns are shown by plot module 1708 in plot display window 1710, where signals are shown one per row, with the signal identifier on the left and corresponding signal values over the range of stamp values, with vertical dotted lines demarking periods of no signal activity. As shown in window 1710, a new pattern "word_1" is learned from the first letter sequence b,a,d,g,e, and subsequently matches various misspellings of the word until the input sequence b,u,d,g,e is encountered, which is enough different from the word_1 pattern for a new sequence pattern word_2 to be learned. Subsequent input letter sequences including errors match both word_1 and word_2 with different confidence score values. A cognitive system developer may use sub-graph 1712 comprising sequence module 1706 to achieve sequence learning and recognition. It will be clear to those skilled in the arts that this sequence learning circuit may apply not just to written words, but without limitation to time-independent sequences in many domains, such as phonemes, simple music encodings, cross-domain sequences, and behavior steps.

Figure 18A:
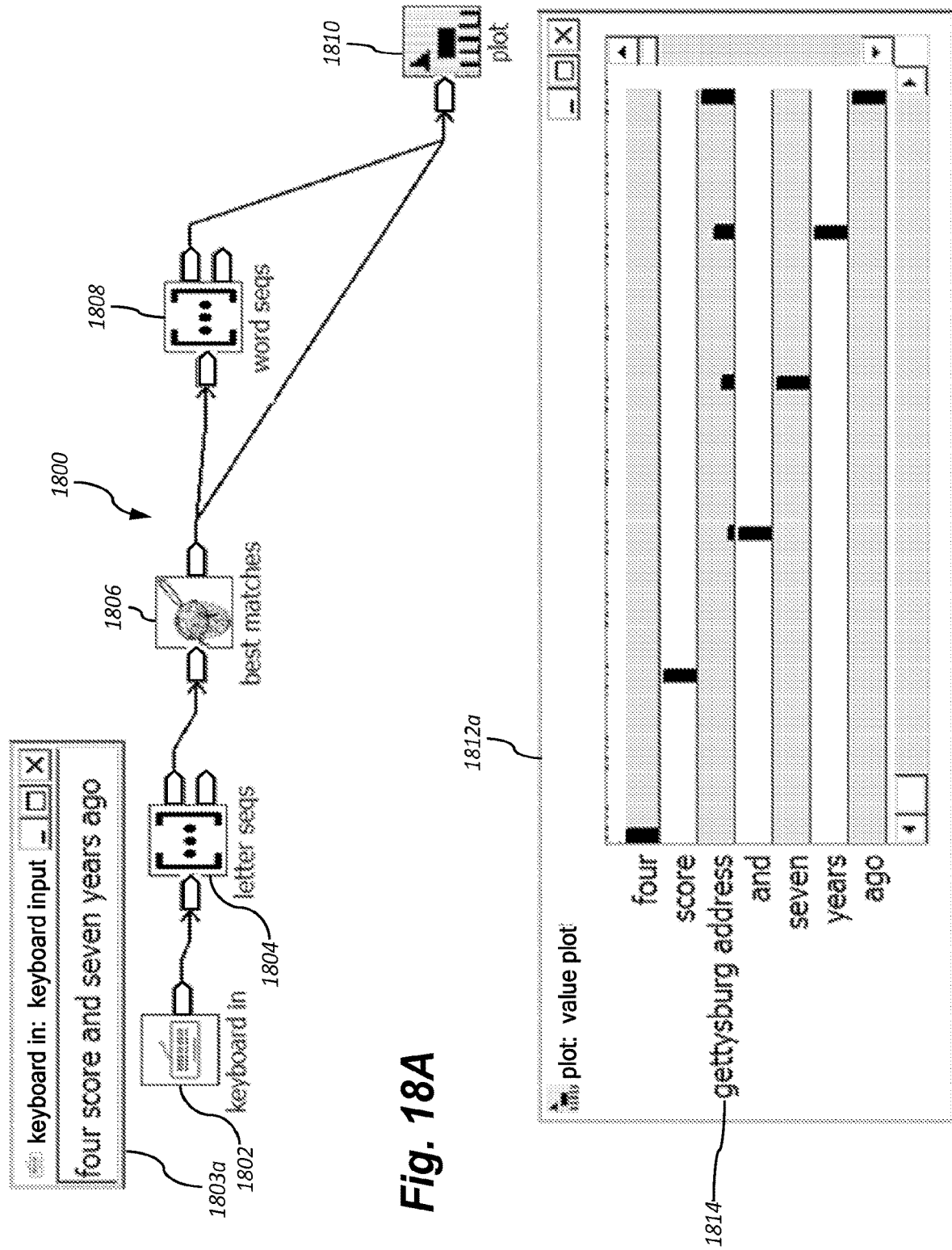
FIG. 18A shows a neural circuit for word and progressive phrase recognition.

FIG. 18A illustrates a neural circuit for phrase recognition. "Word", "phrase" and "concept" apply not just to language, but also many other domains: music, shapes, image segmentation, and across domains. The natural representation of words and phrases in a neural process specification 110 is a sequence pattern 914, a partially ordered series of elements (whatever they represent) together with auto-associative recognition.

For example, the familiar phrase "four score and seven years ago" is a sequence of words, each word a sequence of letters. In the neural circuit 1800, as letters are entered individually in window 1803a of keyboard input module instance 1802, the sequence pattern module instance 1804, holding previously learned word patterns, progressively emits signals for matching word candidates. The filter module instance 1806 passes through only high-confidence word matches. These in turn feed the sequence module instance 1808 which progressively recognizes known phrases. The plot module instance 1810 displays recognition strength values of individual words and the progressively more strongly recognized phrase "gettysburg address" 1814 in window 1812a.

Figure 18B:
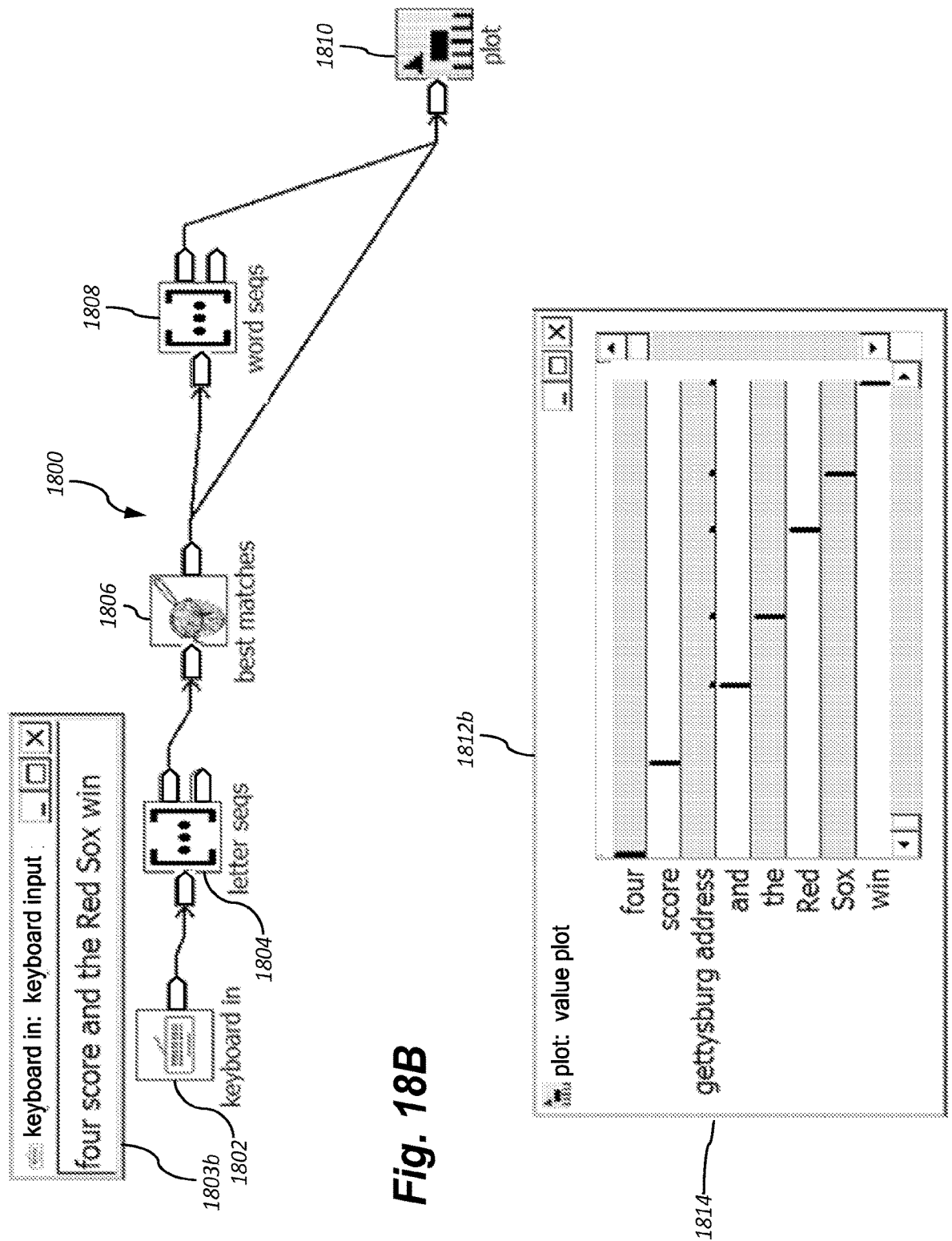
FIG. 18B shows partial phrase recognition with the neural circuit of FIG. 18A.

FIG. 18B illustrates partial phrase recognition with the same neural circuit 1800 of FIG. 18A. More specifically, FIG. 18B shows a subsequent trial, where another phrase "four score and the Red Sox win" is entered in window 1803b. The neural circuit 1800 starts to recognize the familiar phrase, but as the new input 1803b departs from what is expected, the recognition strength of the known phrase 1814 shown in window 1812b remains low.

More generally, compositions of set and sequence patterns naturally represent a huge range of concepts. Using conventional list [a,b, . . . ] and set {a,b, . . . notation, the English sentence "The big brown dog chased the cat." might be represented as [[The, big, brown, furry, barks, tail}], chased, [the, {furry, meows, tail, claws} ]]. Indeed, each word may itself be a sequence of letters, each letter a set of visual properties like edges and curves, etc. A musical phrase likewise may be a sequence of sequences (e.g., intervals, arpeggios, runs) and sets (e.g., chords). Each note played by each instrument may itself be an audio spectrum (set of audio frequencies with energy/sound levels) temporal sequence. A person may similarly be represented as a set of features, some of which are sets (e.g., of visual attributes, voice frequency spectrum) and others sequences like gait and movement. In embodiments these are naturally represented as chains of set, sequence and temporal pattern modules representing layers of abstraction/processing.

Figure 19A:
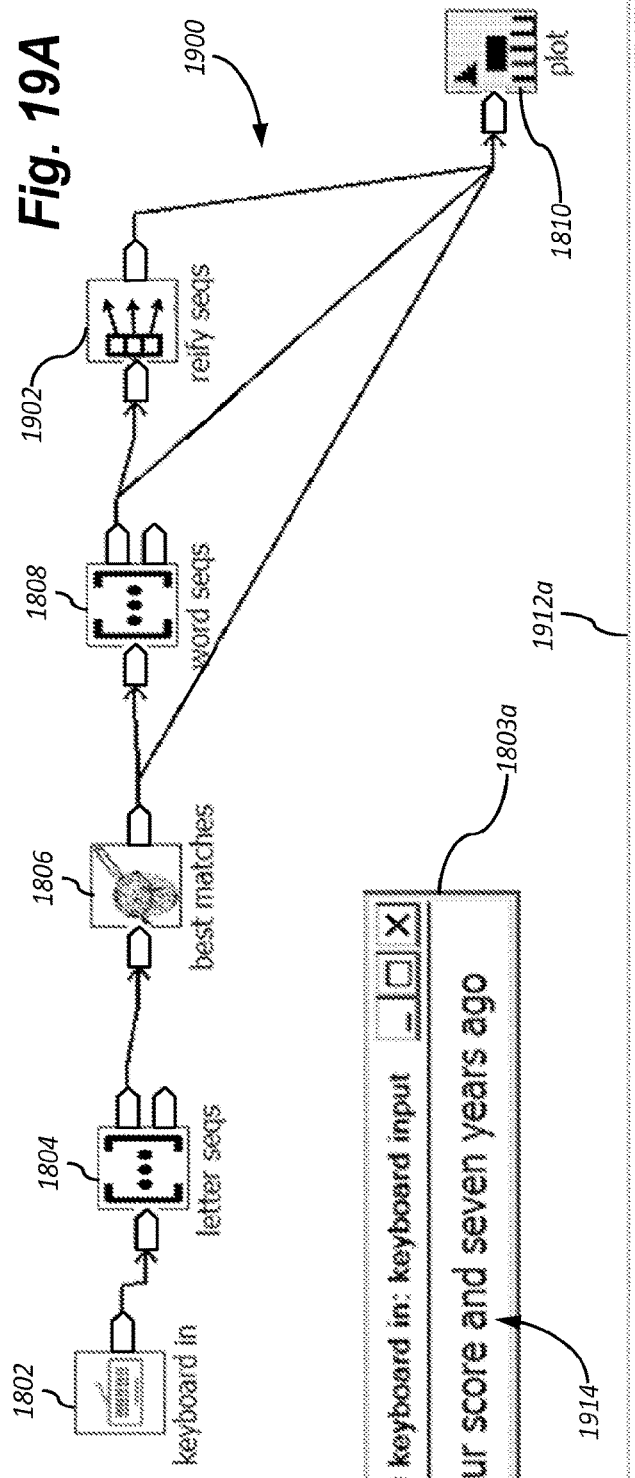
FIG. 19A shows prediction using a neural circuit.
Figure 19A:
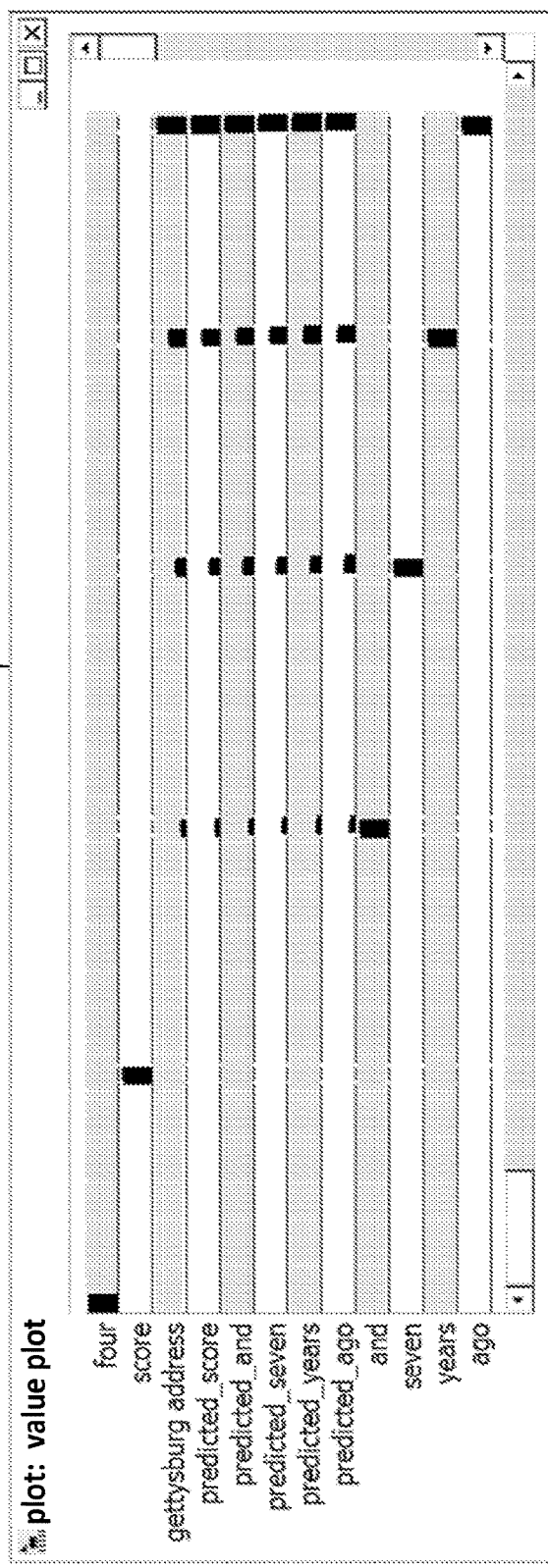

FIG. 19A illustrates prediction using a neural circuit 1900 derived from neural circuit 1800 by adding a reify module instance 1902 to the circuit 1800 from FIG. 18A As the words are entered in the keyboard in window 1803a, the "gettysburg address" phrase pattern is progressively more and more strongly recognized by sequence module instance 1808. Reify module 1902 expands the "gettysburg address" sequence pattern into its component elements, prepending a "predicted_" prefix to signal identifiers to distinguish them from sensory inputs. Display window 1912a of plot module 1810 here shows predictions of expected input words based on the progressive recognition of the familiar phrase 1914 before they are actually entered. In a realistic system, these predicted elements might have the same signal identifiers as the sensory inputs. Downstream processing can immediately begin to operate early as if the predicted items had already been perceived.

Figure 19B:
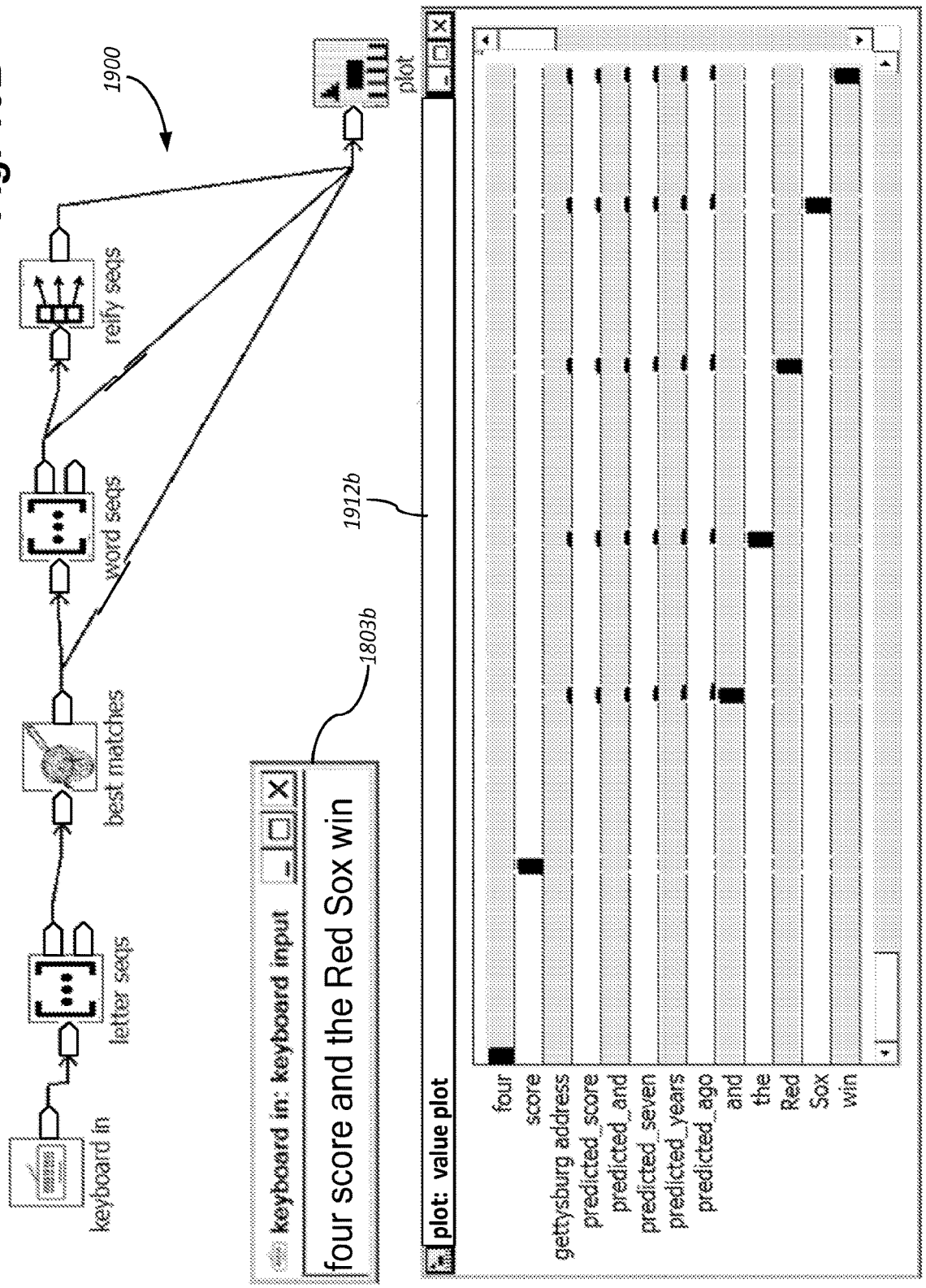
FIG. 19B shows curtailed prediction using a neural circuit.

FIG. 19B illustrates curtailed predictions in display window 1912b using the neural circuit 1900 in response to a different entered phrase in window 1903b as the familiar phrase pattern recognition fails to grow.

Figure 19C:
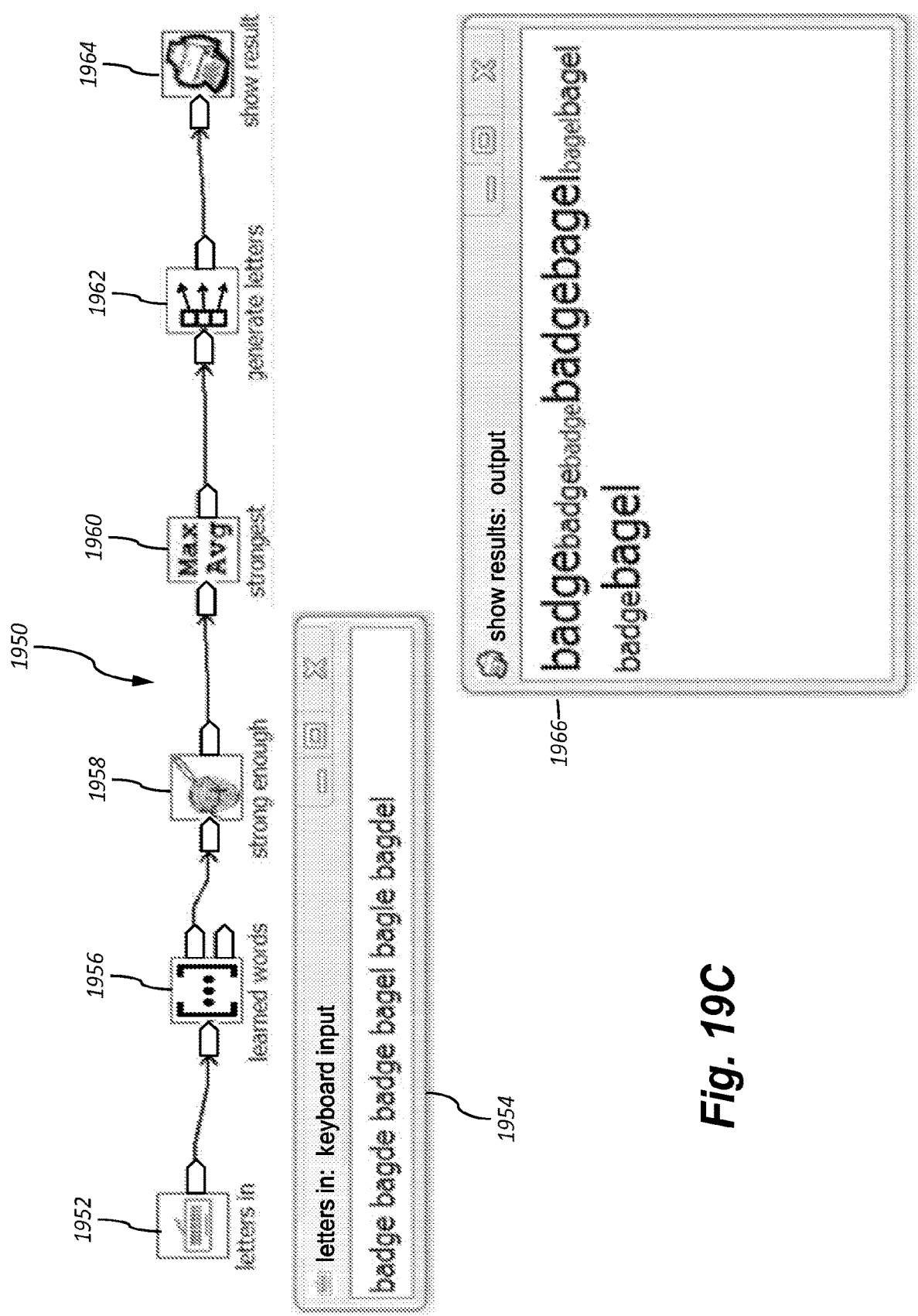
FIG. 19C shows a neural circuit for experience-based corrective filtering.

FIG. 19C shows a neural circuit 1950 for experience-based corrective filtering. A series of letters forming words or word-like sequences are entered in keyboard input window 1954 associated with keyboard input module instance 1952. A sequence of signals for each letter are sent to sequence memory pattern module 1956 which learns new sequences (in this case, words) and recognizes previously learned sequences with signal values proportional to recognition confidence. Filter module instance 1958 selects signals for likely recognized words and group operations module instance 1960 picks just the strongest recognized word. Reify module instance 1962 regenerates signals for the component letters of a pattern, which are shown in display window 1966 associated with text output module instance 1964 with font size proportional to recognition confidence. As depicted, the initial word "badge" is learned as a new pattern yielding a large-font "badge" spelling in window 1966. Subsequent entry of a misspelling "bagde" yields a lower-confidence (smaller font) corrected spelling. Reentry of "badge" initially yields a low-confidence (small font) "badge" result after the first few letters "badg" are entered, and subsequently a high-confidence (large font) "badge" result. Entering a significantly different input sequence "bagel" creates a new pattern and an initial high-confidence result. A misspelling "bagle" yields two low-confidence correct spellings of "bagel" as more letters are entered. Finally, entering the confusing "bagdel" yields a moderate-confidence recognition of "badge" and a higher confidence recognition of "bagel", the two known patterns that might match. The neural sub-graph design pattern of learning new patterns, matching new signals to learned patterns, picking the strongest matches and reifying their component signals as a way to generate patterns corrected and with missing details filled in from experience may apply to a wide range of concrete and abstract signal combinations, not limited to just sequences of letters.

Figure 20:
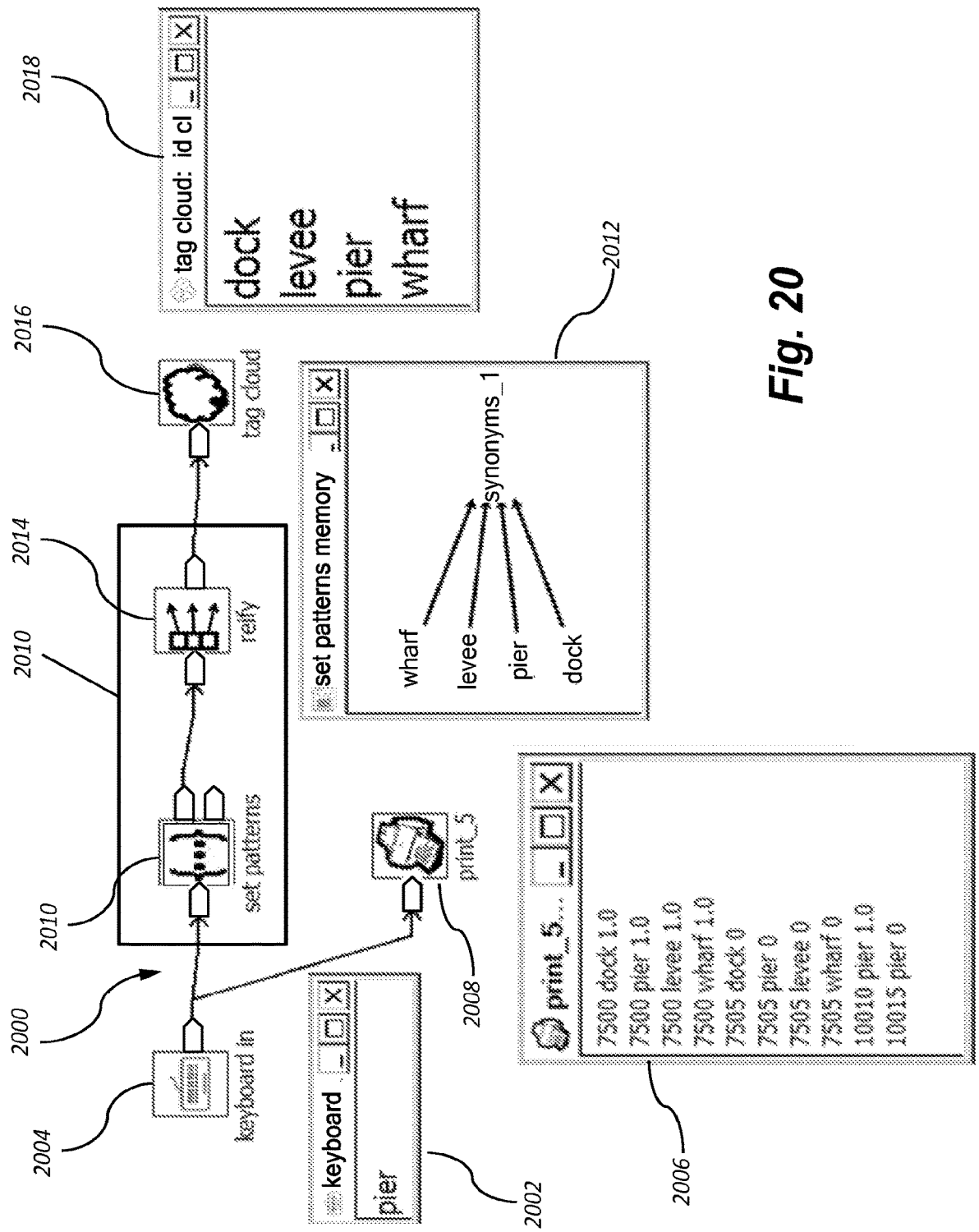
FIG. 20 shows synonym handling using a neural circuit.

FIG. 20 illustrates synonym handling using a neural circuit. Names and other aspects of a concept (e.g., feature patterns, alternative shapes for letters, stereotypes, exemplars, pronunciation, synonym words, images of the same object) are akin to synonyms. In embodiments, such synonyms may be conveniently represented as set memory patterns 912: multiple inputs with match scoring curve set to a low binary threshold that provides an "any/or" disjunctive function, responding with a strong matching score to the arrival of any component input signal. A subsequent reify of the synonym pattern activates all the component synonyms, typically propagating to further processing, imagination feedback and/or output.

In FIG. 20, the example neural circuit 2000 demonstrates synonym representation and processing. Multiple words "dock", "pier", "levee" and "wharf" that are synonyms are initially entered in keyboard input window 2002 of keyboard input module instance 2004, and these initial signals are shown in output window 2006 of print module instance 2008. Set pattern module 2010 learns a new set pattern illustrated in pattern display window 2012. When the single word "pier" is subsequently entered as shown in window 2002, set pattern module 2010 finds that synonym pattern 2012 matches strongly and sends a signal to reify module instance 2014, which generates signals for all component features of pattern 2012. Signal identifier cloud module instance 2016 displays all the signals representing all the synonyms in large fonts indicating high confidence scores in window 2018. The sub-graph indicated by box 2010 may be incorporated in a variety of neural circuits to implement this synonym cognitive function.

Figure 21:
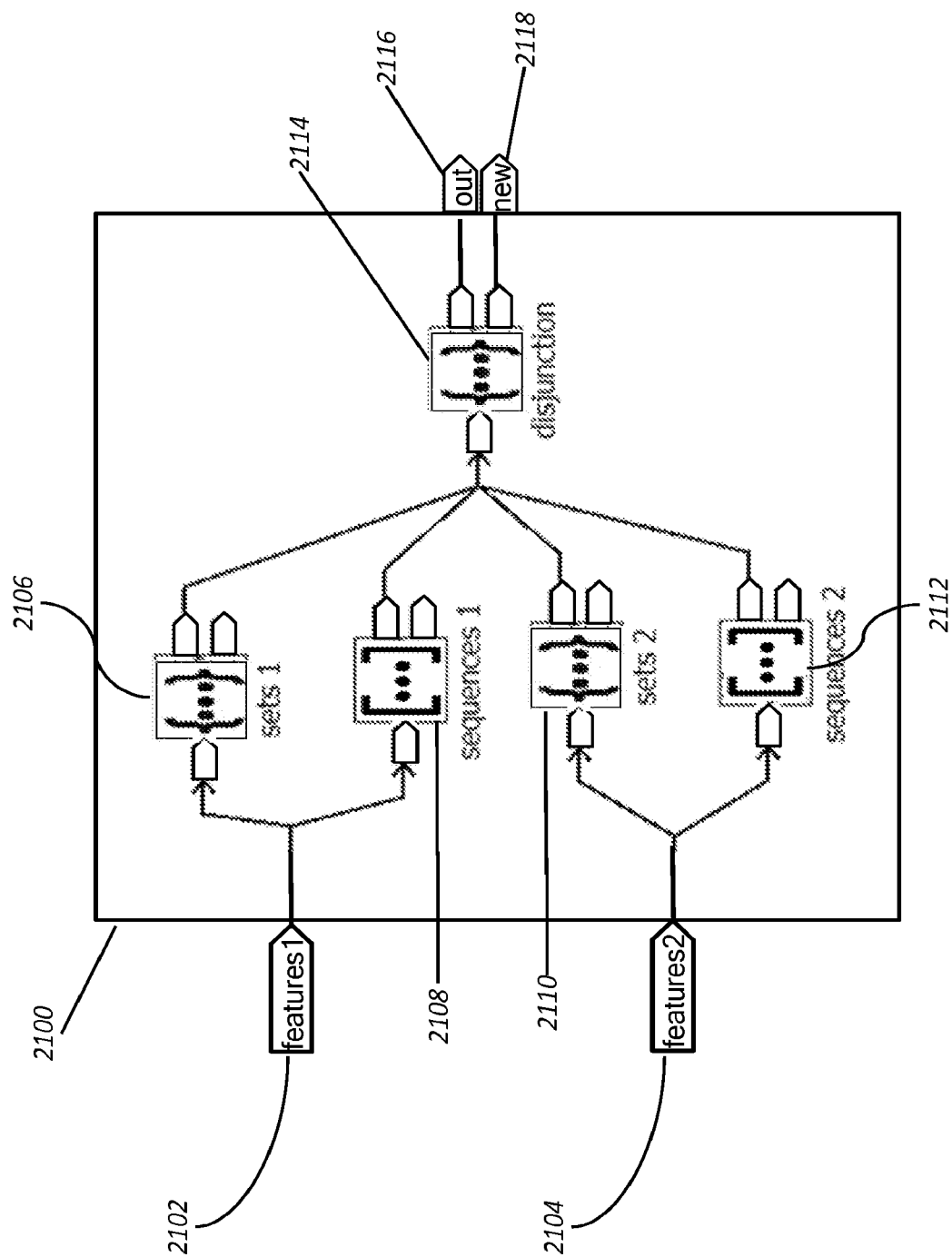
FIG. 21 shows a conjunction-disjunction sub-graph of a neural circuit.

FIG. 21 shows a conjunction/disjunction circuit 2100. A frequent cognitive construct is the combination of multiple aspects of a thing: multiple shapes for a letter; sound, shape and letter sequences for a word; multiple synonym words for a meaning; and as in the example melody identification application, the name, coded signature sequence pattern and original melody temporal pattern for a tune. The "features 1" 2102 and "features 2" 2104 inputs represent sources of features, perhaps from different sensory domains (e.g., vision and hearing), abstract feature or concept domains, or perhaps from different preprocessing channels within a domain. The "sets 1" set module instance 2106 and the "sequences 1" sequence module instance 2108 learn and recognize distinctive set and sequence patterns from the "features 1" 2102 input signals. Likewise the "sets 2" set module instance 2110 and the "sequences 2" module instance 2112 learn patterns from the "features 2" 2104 input signals. These alternative aspects of what is currently being experienced are collected in the "disjunction" set module instance 2114 which learns/recognizes concurrent signal sets which match with an "any", "a few" or "some" semantic set by a response curve parameter, delivering output signals on the sub-graph "new" output 2118 for new concepts and output signals on the "out" output 2116 for current input signals matching known concepts. It should be clear to those skilled in the arts that this neural circuit design pattern may include any number of conjunctive antecedent neural circuits feeding the inputs of the disjunctive pattern module 2114, representing multiple aspects of a concept. Used in layers and/or loops this construct can support complexities like sound and vision feeding phoneme and letter shape recognition feeding word recognition feeding meaning and so on.

Figure 22A:
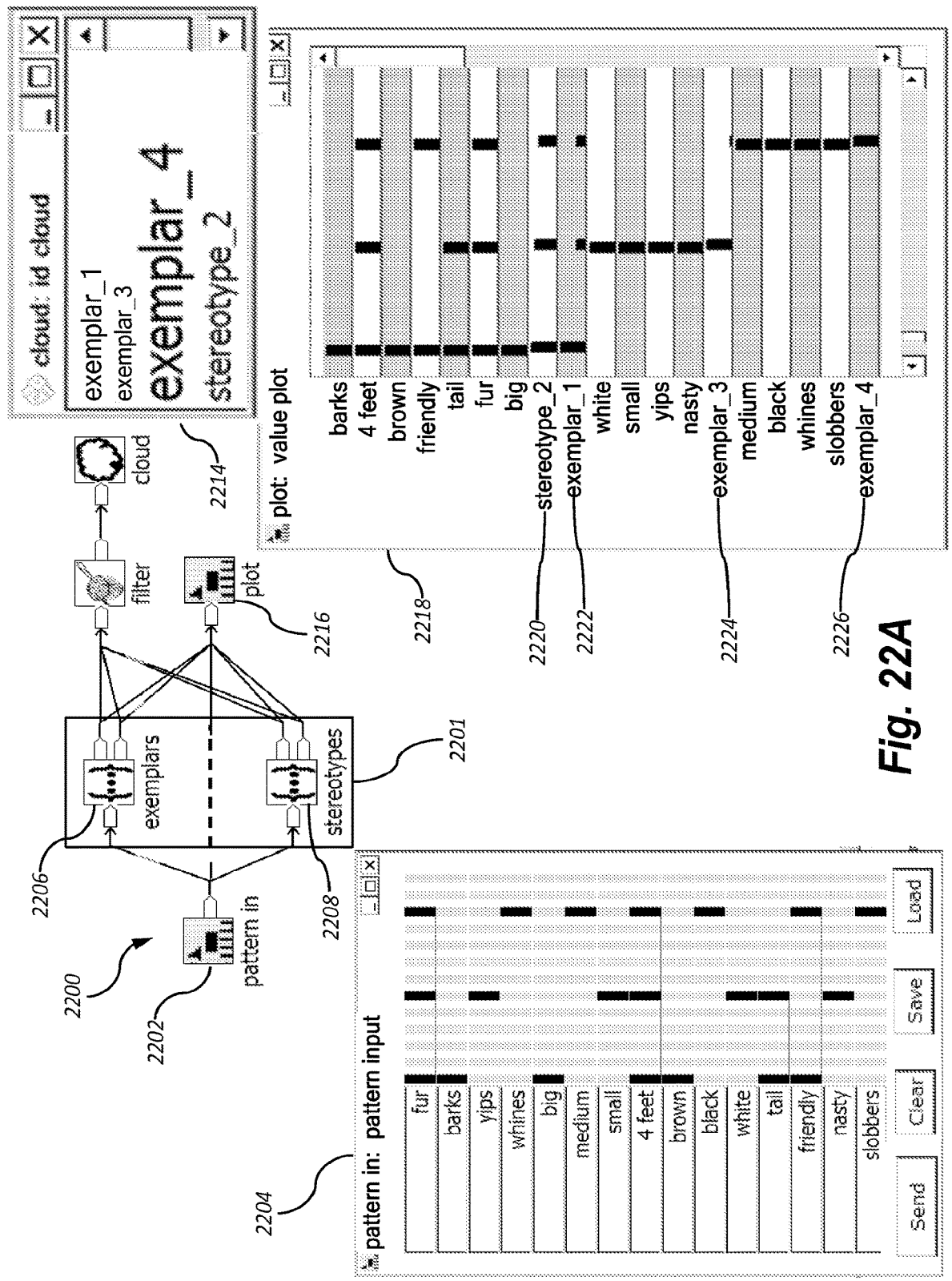
FIG. 22A shows classification using a neural circuit.
Figure 22B:
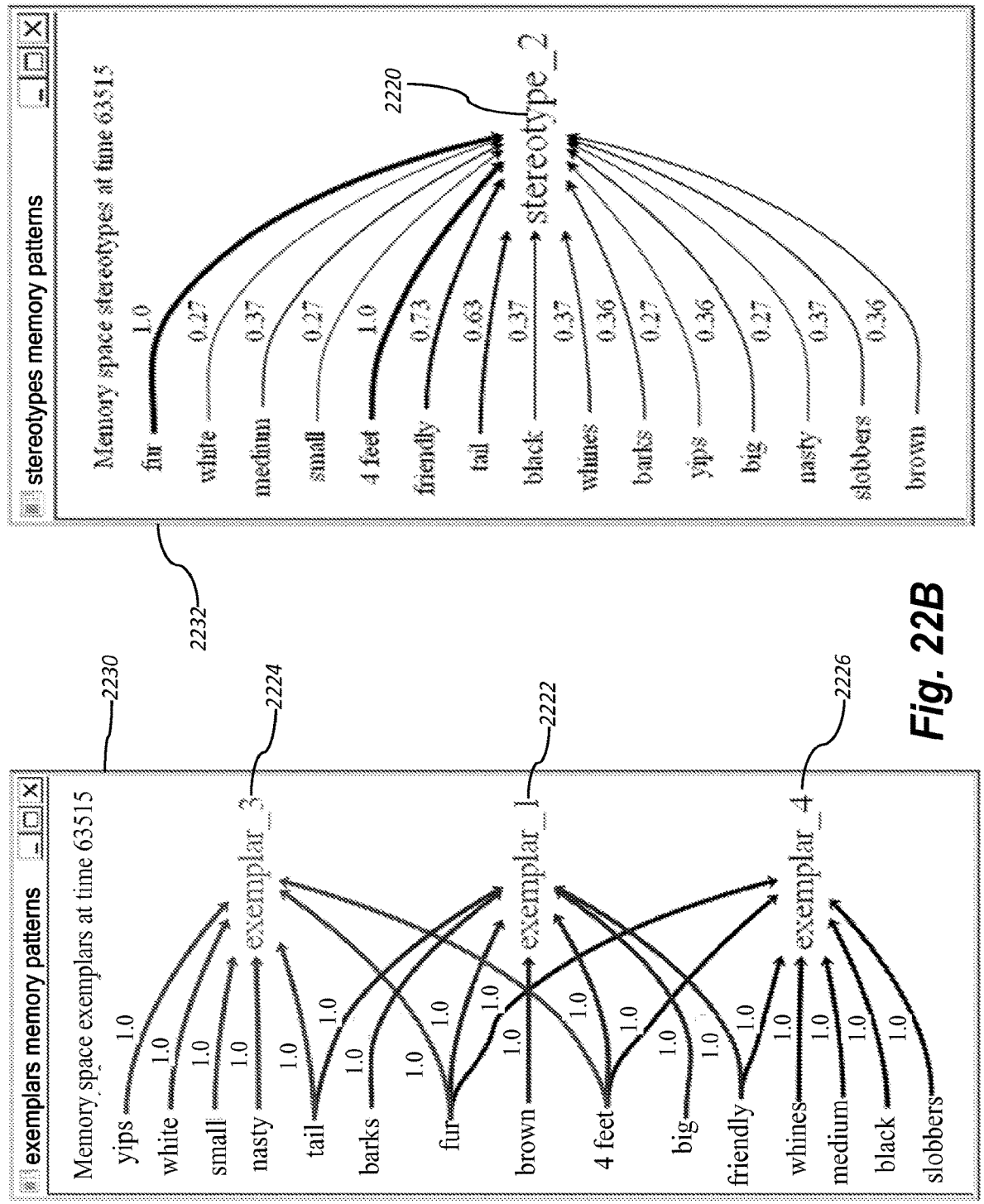
FIG. 22B shows classification memory patterns.

FIGS. 22A and 22B illustrate classification using a neural circuit. Embodiments of a neural process specification 110 may enable building a range of classification schemes with no inherent requirements about hierarchy or exclusivity, including flexible fuzzy multi-hierarchies of stereotypes and exemplars typical of "mental models". Memory pattern modules 930 may offer a new pattern threshold parameter to govern when new patterns are created or existing patterns are adjusted in response to input signal combinations. A high threshold may cause a new pattern to be created if no existing pattern matches strongly, creating an exemplar pattern tuned to the current input signal combination. A lower threshold may cause the strongest matching pattern(s) to be adjusted to incorporate the current input signal combination, creating and continually adjusting average or stereotype pattern(s) tuned to match similar input combinations, where the weights of signals common to many exemplars grow and accidental or occasional input signals diminish. Such a stereotype pattern is roughly equivalent to a cluster centroid in conventional clustering classification systems. Thus a sub-graph of multiple memory pattern modules with different new pattern thresholds receiving the same input signals can progressively create and adapt flexible classification systems tuned to continuing experience.

The example neural circuit 2200 demonstrates progressively learning several exemplar and stereotype patterns for a series of input signal combinations. A succession of input feature signals are entered in the graphical input window 2204 of "pattern in" module 2202. Each row represents values of a particular feature signal over time. Non-0 signal values at the same time represent concurrent features. These signals feed the "exemplars" set module instance 2206 and the "stereotypes" set module instance 2208 in parallel. The "exemplars" module 2206 has a high new pattern threshold, creating a new exemplar set pattern for new input signal combinations that do not match existing exemplars very well. The "stereotypes" set module instance 2208 has a lower new pattern threshold, creating a new stereotype set pattern only for very different input signal combinations that do not match any existing stereotype pattern. The input signals and pattern creation/matching scores are depicted over time in window 2218 of graphical plot module instance 2216, showing the initial creation of both the "exemplar_1" pattern 2222 and the "stereotype_2" pattern 2220 after the first input signal combination. At the second input signal combination arrival, another new exemplar pattern "exemplar_3" 2224 is created, but "stereotype_2" pattern 2220 matches the new inputs well enough to adjust the weights of pattern 2220 rather than create a new stereotype. At the third input signal combination another new exemplar pattern "exemplar_4" 2226 is created and stereotype pattern 2220 is further adjusted. Window 2214 of text cloud output module shows relative pattern strengths after the arrival of the third input signal burst, with font size indicating signal strength. "exemplar_4" matches perfectly since it was created just for this input signal combination. "stereotype_2" matches strongly also since the input signal combination contains many features in common with previous combinations. The other exemplar patterns match poorly.

FIG. 22B shows memory pattern spaces after receipt of the third input signal combination. Window 2230 shows signal weights of the three exemplar patterns 2222, 2224 and 2226. Window 2232 shows signal weights of stereotype pattern 2220, with the highest weights for features in common to all signal combinations and those present in the earliest signal combinations and lesser weights for less common features or those that only appeared in later input combinations. In effect, the three exemplar patterns may represent observed features of three different dogs, and the stereotype pattern may represent a generic or average "dog". Repeated experience of these same input signal combinations (e.g., seeing the same three animals again) continues to tune the signal weights of the stereotype pattern to reflect the most common dog features experienced. More generally, sub-graphs like that in box 2201 with common input signals fed in parallel to multiple memory pattern modules may implement arbitrary flexible adaptable classification schemes.

Thus, seeing your pet Fido might stimulate a specific Fido exemplar, a dog breed stereotype, a broader generic dog stereotype, a broad animal stereotype and a (non-dog-specific) pet stereotype, all in parallel. Seeing a furry animal initially might stimulate just the broad animal stereotype. Upon further observation, the dog stereotype and dog breed stereotypes might be activated, and once you recognize Fido, his exemplar might be activated most strongly.

Memory patterns in embodiments may learn from experience. Just like two people can never have identical experience histories and so build up different associational and classification structures in their minds, there are no guarantees that any specific neural circuit will converge to the same classification structure given similar but non-identical experiences.

In embodiments, memory pattern modules may do neither cluster splitting nor merging. Instead, multiple patterns grow and change with experience. Those that don't match much experience may be eventually garbage collected, while those that match frequently and strongly may become dominant and permanent. There may not be any formal hierarchical relationships among the different patterns, so any feature combination can stimulate multiple patterns. This also arguably mimics human experience where clear-cut disjoint and strict hierarchical clustering are the exception rather than the rule.

Figure 23:
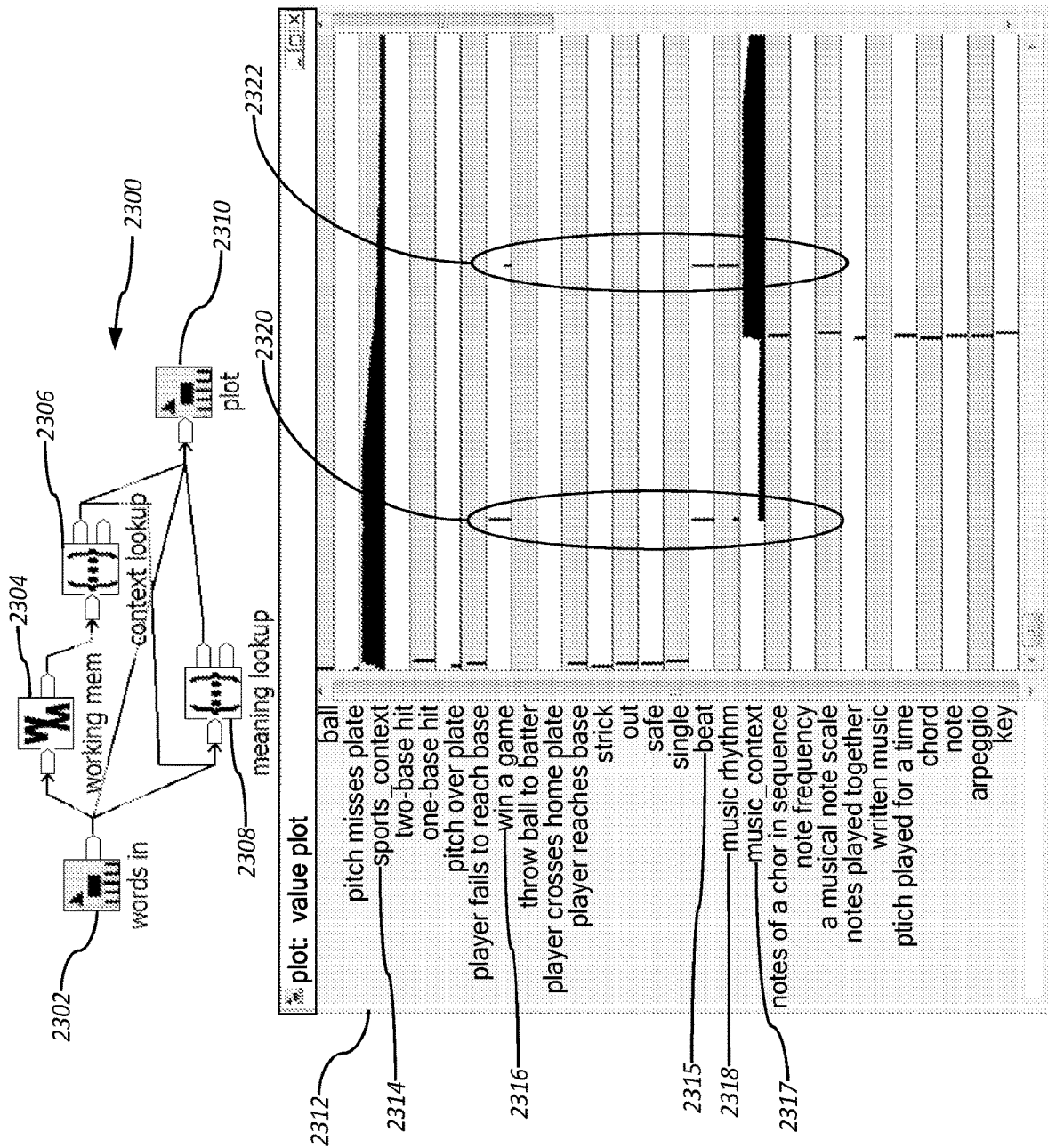
FIG. 23 shows context priming using a neural circuit.

FIG. 23 shows an example neural circuit implementing a context priming and disambiguation function. Our interpretations of ambiguous words like "beat", "pitch", and "score" depend strongly on the context of our recent conversation, for example: music or baseball. Conversely, the context of a conversation derives from the words recently used. If we hear "ball", "strike", "safe", "out" and "single" we are likely in a "sports" or "baseball" context, emphasizing meanings of ambiguous words relative to that context. If we recently heard "chord", "arpeggio", "note" and "key" we are more likely in a "music" context.

Initially, the words "ball", "strike", "out", "safe" and "single" are input via the "words in" graphical input module instance 2302. These signals are persisted for a few seconds in the "working mem" working memory module 2304, and are combined in the "context lookup" set pattern module instance 2306 to establish a strong "sports_context" context 2314 signal as shown in signal plot window 2312 of plot module 2310, which in turn persists for a few seconds before decaying. Subsequently entering the ambiguous word "beat" 2315, together with the current context, are looked up in the "meaning lookup" set pattern module instance 3208, yielding a strong interpretation as the "win a game" signal 2316 and a very weak alternative of "music rhythm" 2318 because of the lack of a music_context, as indicated by signal values 2320. Without continued refresh (as in a continued sports-related conversation), the working memory module 2304 decays the "sports_context" signal 2314. Subsequently entering the words "chord", "arpeggio", "note" and "key" firmly establishes a "music_context" context 2317. Reentering the word "beat" 2315 now yields a strong interpretation as a "music rhythm" signal 2318, and a very weak interpretation for "win a game" 2316 as indicated by signal values 2322.

Figure 24:
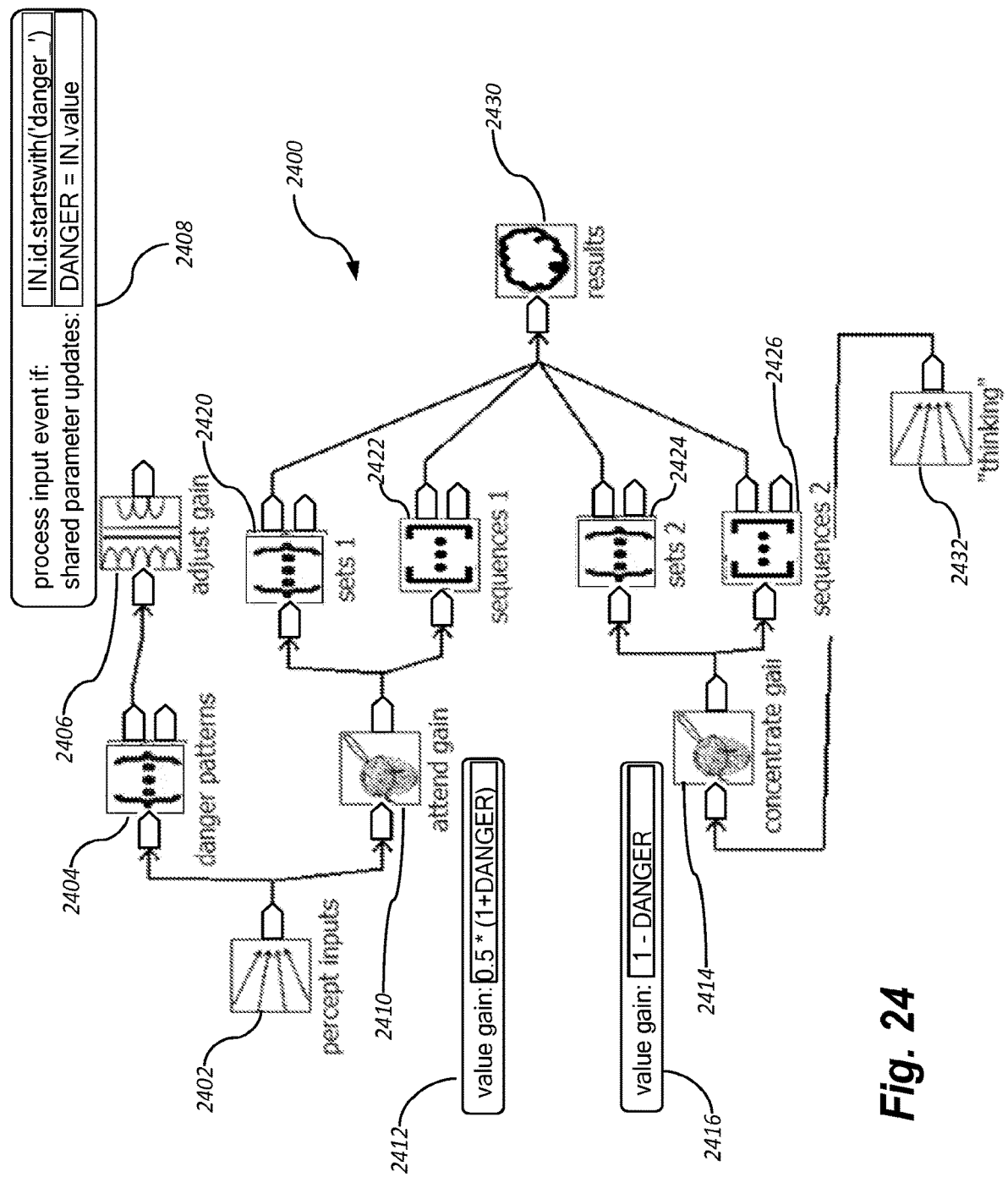
FIG. 24 shows state modulation using a neural circuit.

FIG. 24 illustrates state modulation using a neural circuit. Biologically, different mental and emotional "states" appear to be modulated by chemical "messengers" in certain brain regions, for example the "fight or flight" stress response to danger, with broad effects on perception, thinking, memory and action in multiple brain regions.

In embodiments, these broad effects may be emulated using neural graph parameters 282. Many modules 120 have local module parameters 280 affecting things like learning rates, sensitivity, scaling, delays, significance thresholds, etc. Rather than static constants, these parameters may be set to live expressions referring to and combining the values of sharable graph parameters. The sharable graph parameter values can be adjusted dynamically by a transformer module instance in response to "current events" to affect for example, attention, concentration, focus, sensitivity, balance of external perception vs. internal imagination, learning rates, etc.

As illustrated in FIG. 24, a neural circuit 2400 may model this process for a simple case of danger response. Raw perceptual inputs modeled by "percept inputs" module 2402 directly feed a "danger patterns" set pattern module instance 2404, analogous to "lower" brain functions. Any (pre-loaded or learned) danger patterns matched feed the "adjust gain" transformer module instance 2406. Box 2408 shows an excerpt of relevant module parameters of module 2406. If any danger event is received (the IN.id.startswith('danger_') expression evaluates to True), the DANGER graph parameter is updated with that pattern's value (DANGER=IN.value).

Two separate paths shown represent perceptual ("perception") vs. internal ("thinking") processing. Each path includes a filter module whose "value gain" parameter is set to an expression. In the absence of any danger, the normal gain factor on the perceptual path is 0.5 (e.g., "background attention"); the normal gain is 1 on the internal processing path (e.g., "concentrating"). The DANGER shared parameter is normally 0. If a danger pattern is detected, the "adjust gain" transformer module instance 2406 boosts DANGER to a corresponding high value. This boosts the "attend gain" module 2410 gain parameter via the 0.5*(1+DANGER) expression 2412, and drops the "concentrate gain" module 2414 gain to much closer to 0 via the 1-DANGER expression 2416. Pattern modules 2420 and 2422 accordingly receive strengthened perceptual inputs to pay heightened attention to external stimuli. Pattern modules 2424 and 2426 accordingly receive diminished inputs from the "thinking" processes modeled by module 2432, effectively suppressing other internal neural processes in the presence of danger. As the danger passes, the danger_events detected diminish in strength, and the respective gains correspondingly settle to their normal values. Resulting pattern recognitions adjusted for the current mental or emotional state are shown commingled to module 2430 representing subsequent processing.

The DANGER parameter here is sharable via multiple modules on multiple paths in larger neural circuits, emulating the broad effects of biological "fight or flight" chemical changes. This same technique can be used to implement effects of other mental and emotional states like excitement, depression, sleep, wariness, etc.

In a robotic context, such state modulation through shared graph parameters may address prioritizations such as low-power conservation modes and "find power" behaviors; adjusting sensor sensitivities to environmental changes; boosting "where am I?" behaviors when lost and re-planning behaviors when needed.

Figure 25:
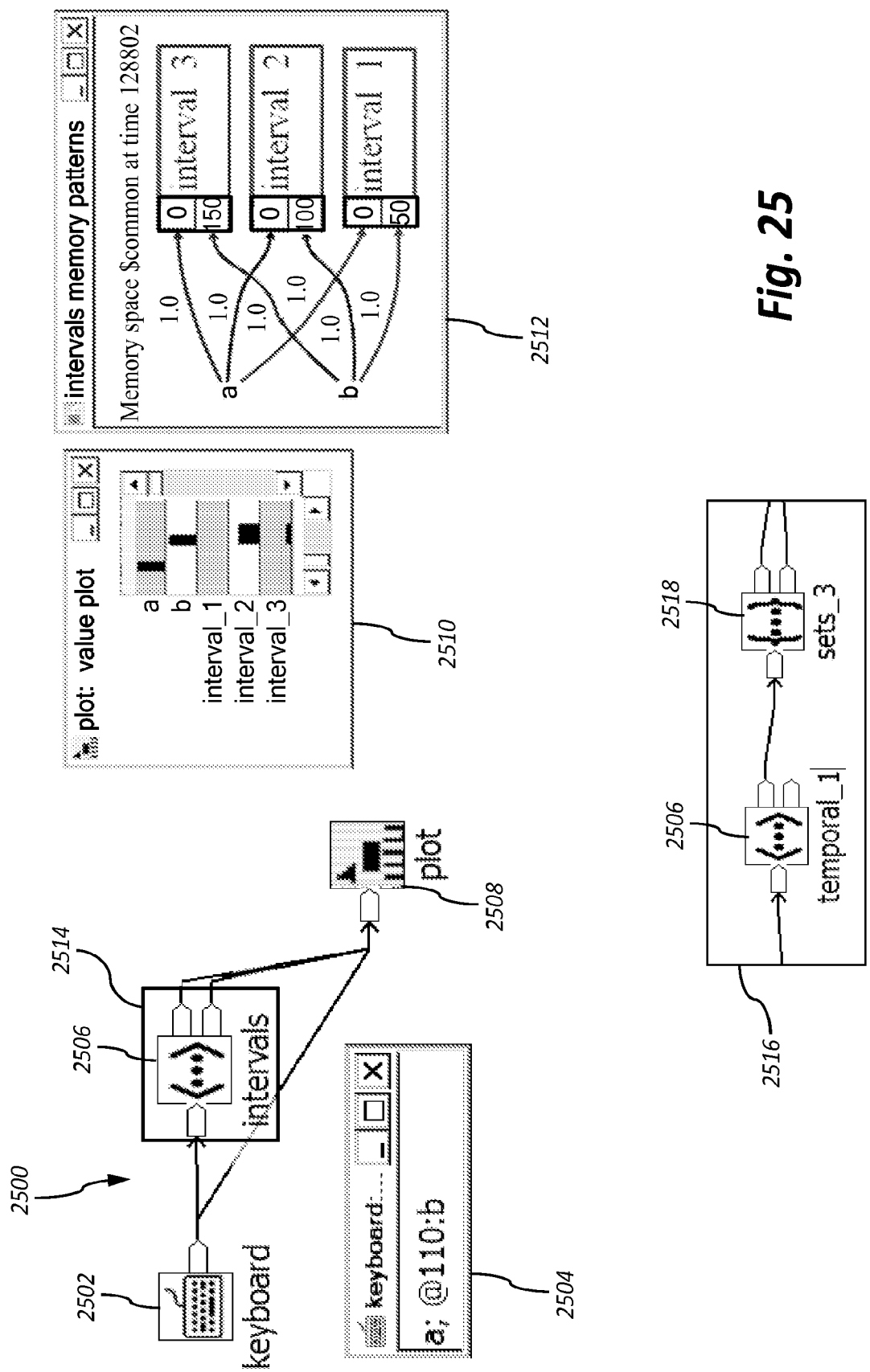
FIG. 25 shows timing using a neural circuit.

Biological brains may have timing mechanisms for recognizing familiar temporal patterns, for controlling behavioral events and other biological purposes. FIG. 25 shows a neural circuit 2500 for learning and recognizing familiar timed sequences among events. Keyboard input module instance 2502 supplies relative temporal sequences entered in keyboard input window 2504 to temporal pattern module 936 instance 2506. The pattern memory space learns multiple temporal patterns over time corresponding to variations of input signal temporal combinations, as shown in this example in memory pattern display 2512 for three patterns with intervals between a signal "a" and a subsequent signal "b" with intervals of 50, 100 and 150 stamp counts. A spread parameter of 50 stamp counts causes actual temporal interval values to match a pattern if it occurs within +/− the spread count of the expected stamp interval, with a matching confidence value proportional to the stamp difference. Subsequent entry of the temporal sequence shown in window 2504, an event "a" followed 110 stamp counts later by event "b", partially matches two of the interval patterns, as shown in plot window 2510 of plot module instance 2508, in this case pattern "interval_2" (the 100 stamp count interval) with a confidence value of 0.8, and interval_3 (the 150 stamp count interval) with a confidence value of 0.19, and not matching pattern "interval_1" (the stamp count interval) at all. With suitable pre-processing of input signals such a timing mechanism may be shared or replicated among various processing domains, for example different sensory modalities (hearing, vision, touch) and behavioral modalities (muscle activation, focus change). Sub-assembly 2516 adds a set module instance 2518 which may learn and recognize different combinations of these temporal interval matching scores as distinctive "signature" patterns of intervals. A particular virtue of this approach is that timers needed by various cognitive processes need not be pre-defined nor pre-configured. Only timers relevant to a containing system's experience need to be learned and computed. Different settings of temporal spread, new pattern threshold and learning rate parameters can enable coarse, fine or varied temporal filtering patterns.

Animals and humans experience a great many combinations of external stimuli as well as internal stimulus activations, most of which are accidental and not worthy of remembering. Some stimulus combinations may be worth remembering long term for a variety of reasons. A repeated sensory or internal (e.g., imagined) experience may strengthen long-term memory of that stimulus combination, indicating a regularity in the system's environment or cognitive processes. A stimulus combination experienced in an emotionally salient moment or in the company of a trusted teacher may also lead to strong long-term memories.

Figure 26:
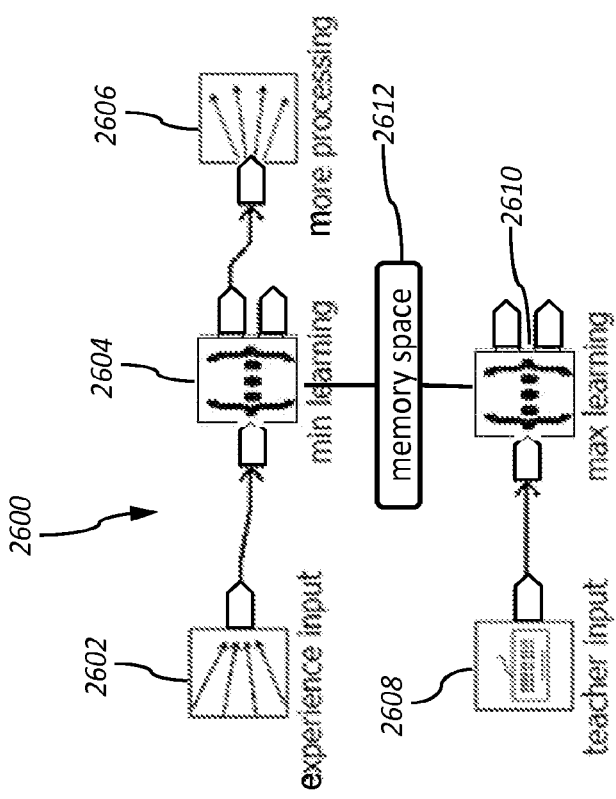
FIG. 26 shows teaching and experiential learning using a neural circuit.

FIG. 26 illustrates teaching with a neural circuit. Learning generally involves both experience (unsupervised) and teaching (supervised) learning. Experience and teaching may be intermixed in a neural circuit 2600. The upper path feeds on-going experience from "experience input" module 2602 through a memory pattern module instance 2604 accessing patterns in memory pattern space 2612, which may be a set pattern module, sequence pattern module, temporal pattern module or any module providing pattern memory learning capability, for pattern matching and subsequent processing by module 2606. Learning parameters along this path are set to minimal values, for on-going fine tuning and adjustment of already learned patterns. Teaching input from "teacher input" module 2608 feeds a memory pattern module 2610 sharing the same memory pattern space 2612, with a learning rate parameter set high. Via this path, a teacher (or other source) supplies "especially good examples" to add new patterns or substantially adjust existing patterns. These take effect immediately for subsequent experience input. The additional teaching path can even be configured on the fly in a running system, for example to correct existing patterns or instill new patterns. A similar effect can be achieved over time with a single pattern memory module, by dynamically raising its learning rate parameter during training periods and lowering it during normal experience.

Figure 27:
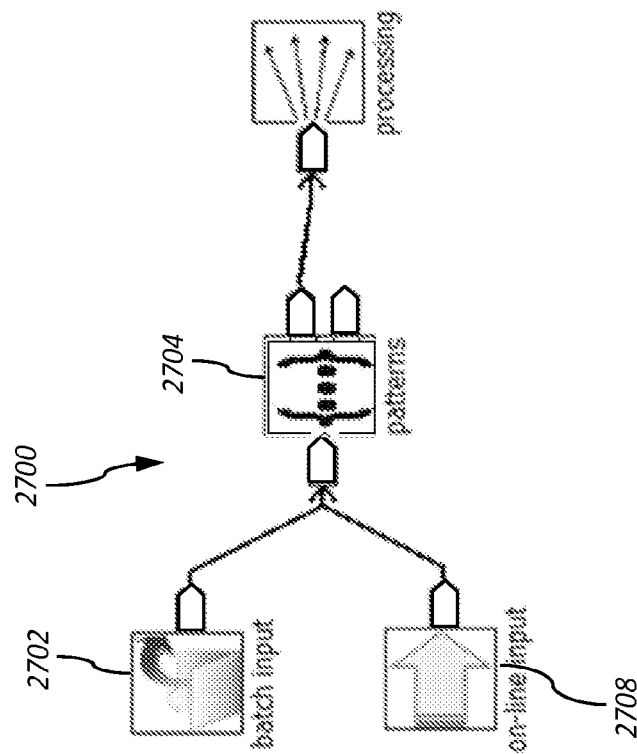
FIG. 27 shows batch and on-line learning using a neural circuit.

FIG. 27 illustrates batch and on-line learning using a neural circuit. Batch and on-line learning can be commingled, as shown in neural circuit 2700. At the start of running of an application, the file input module instance "batch input" 2702 reads signals from a file and feeds them continuously to the "patterns" set memory module instance 2704 to learn and adjust patterns. Subsequently (or concurrently) on-line input from module instance 2708 feeds the same set pattern module instance 2704. Other input modules (like database query) can also be used as sources of batch learning. The on-line input can also derive from external sources like sockets/streams/image/audio sources, etc.

Figure 28:
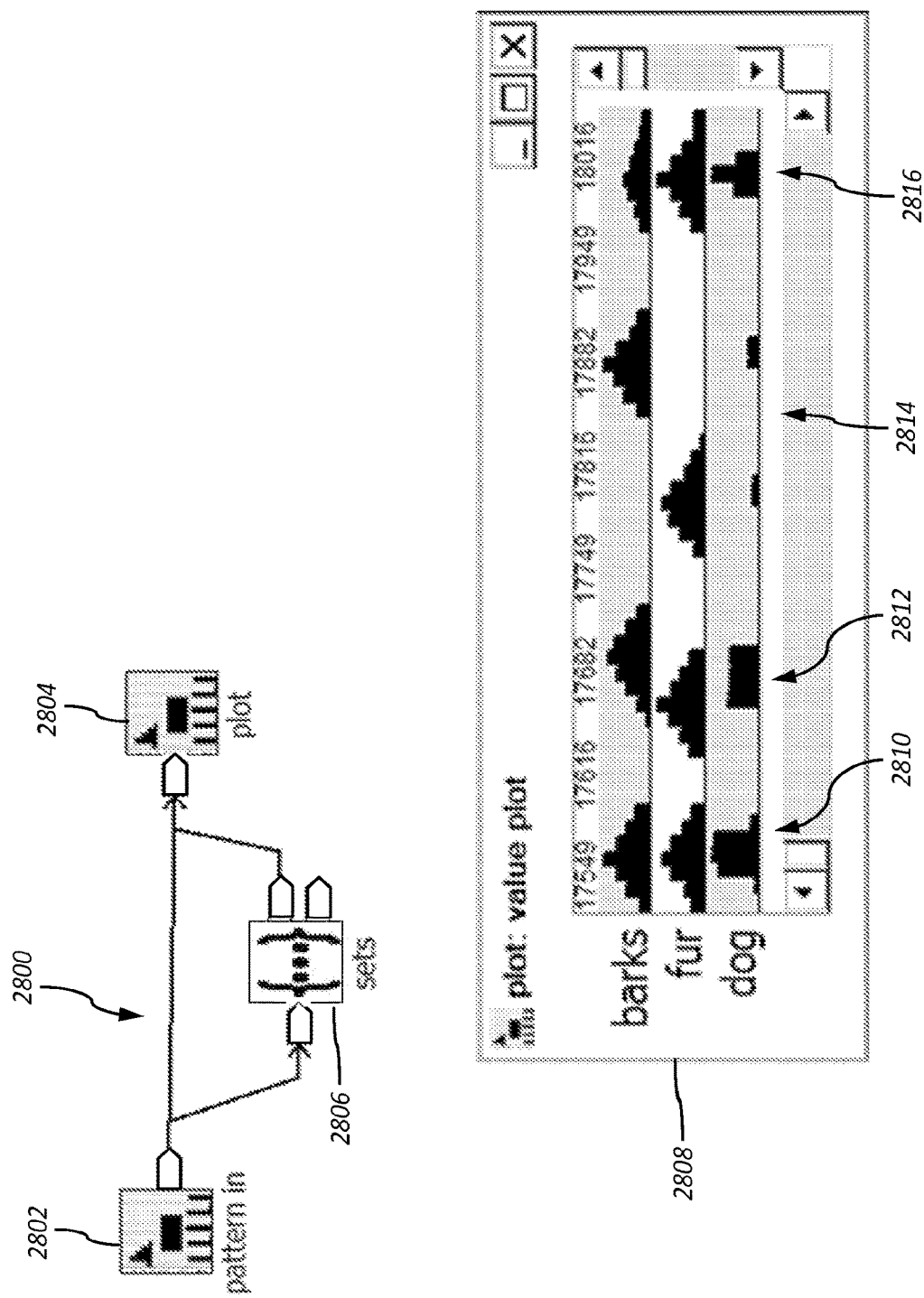
FIG. 28 shows interruption and concentration loss in a neural circuit.

FIG. 28 illustrates a neural circuit 2800 that demonstrates the dynamic effects of interruption and concentration loss. Concentrating means "keeping several things in mind at once", like a programming task, writing or playing music. In embodiments, this is naturally modeled as multiple concurrent input features feeding one or more set memory pattern modules. If source signals occur or are recognized within a reasonable time range with high confidence, the signals overlap in time and can be recognized strongly by a known pattern. Interruptions, distractions and brain resource conflicts (i.e., multi-tasking) may delay or diminish individual feature signal values, leading to weaker or no pattern recognition.

The example in FIG. 28 shows a simple neural circuit 2800. Input time distributions of "fur" and "barks" feature signal strengths are entered via the "pattern in" graphical input module instance 2802. The "sets" set pattern module instance 2806 attempts to recognize signal combinations as they arrive. The "sets" module has a pre-learned pattern for "dog" which includes input signals "barks" and "fur" and a match scoring parameter that responds most strongly to concurrent signals for both features. The original signals and corresponding pattern recognition scores are displayed in plot window 2808 of plot module 2804.

If "fur" and "barks" roughly co-occur as in the first time segment 2810, they strongly stimulate the "dog" pattern. If "barks" is delayed by even as little as 30 milliseconds, the overlap of signal strengths is diminished and "dog" is recognized weakly and a few time steps later, as in the second segment 2812. Delay the recognition of "barks" even longer as in segment 2814, or reduce its input confidence (e.g., due to noise or poor perception) as in segment 2816, and the recognition of "dog" diminishes further.

More generally, input features may come from sensory pre-processing paths, working memory, and imagination feedback, and the set module memory pattern space may hold thousands of previously learned patterns. Disruption of any of these many paths can delay or diminish feature signals needed to keep "many plates spinning" or "many balls in the air", that is, to sustain the continuing recognition of patterns that constitute our collective current working memory "state".

Figure 29:
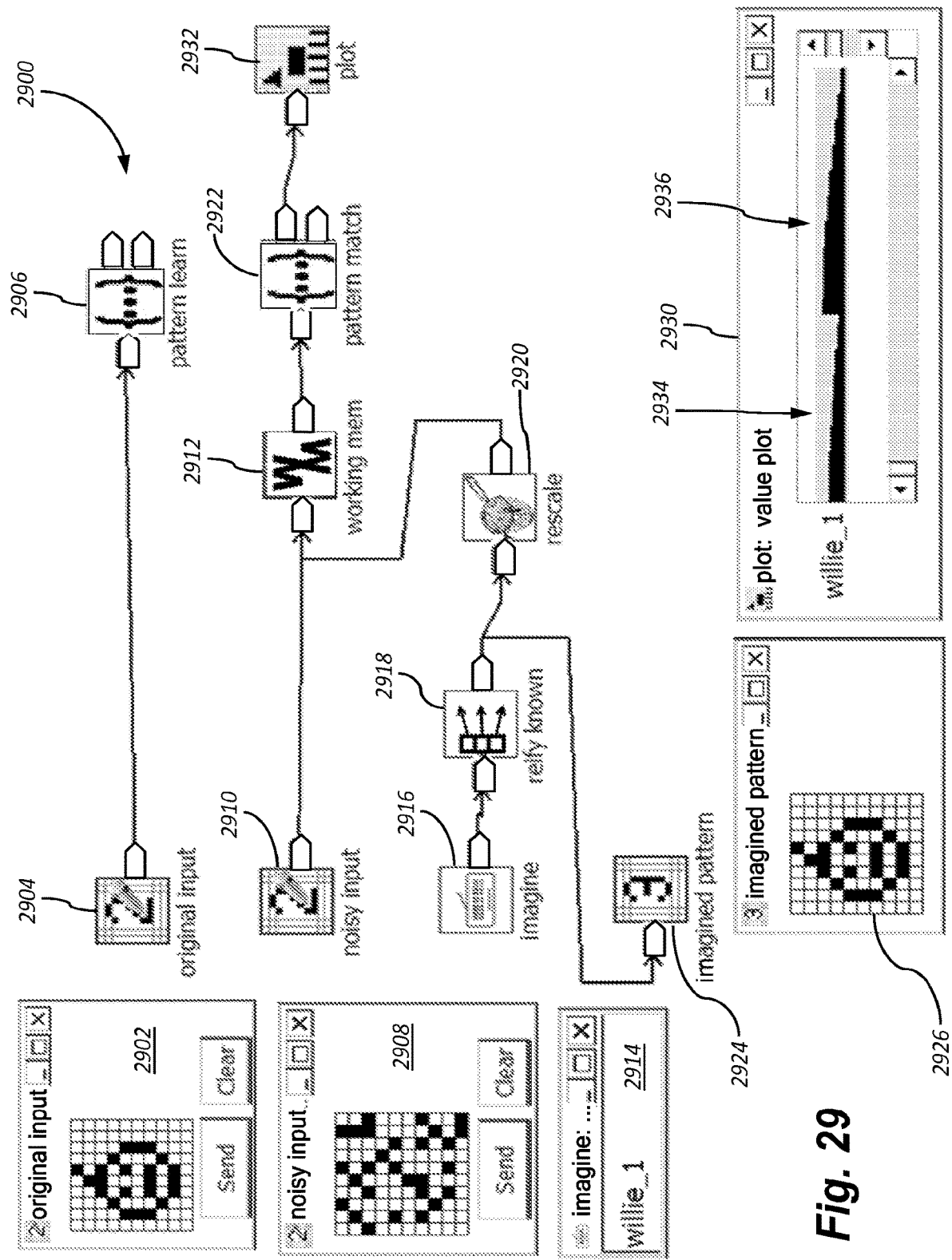
FIG. 29 shows imagination in a neural circuit.

FIG. 29 illustrates imagination in a neural circuit. Imagination involves the ability to "see" or "visualize" a collection of features without actually experiencing them. Often we visualize a familiar pattern such as our dog Fido or a sunset. The reify module type 940 is the primary vehicle for this: start with an event for a previously learned pattern, and activate all of its component features. Via feedback connections, these features can be "experienced" as if we are currently perceiving them.

If, for whatever reason, we happen to "think of" several familiar concept patterns, like "flying" and "horse", they may simultaneously reify into surprising new combinations of features which are not constrained to match reality. If we are in an "open-minded" state (i.e., learning rate parameters set high), this serendipitous concurrence may create a new pattern. If we repeatedly "think of" these same abstractions, the concurrence (or sequence) of their component features may become familiar enough to strengthen the new pattern and prevent it being garbage-collected. We can thus "remember" things that we never experienced. The data generator and random pattern generation modules may contribute random generation of input and pattern-recognition events to such imagination processes.

A particular role for imagination is perception enhancement for known patterns, as shown in the example neural circuit of FIG. 29. Finding a known pattern in a busy, noisy input field is a frequent challenge in multiple domains: perceptual domains like vision and hearing as well as recognizing abstractions. Having a clear image in mind of what we are looking for boosts recognition. Neural circuit 2900 in FIG. 29 shows one plausible approach.

Three distinct paths are shown. In the top path from module 2904 to module 2906, an original "Willie" image entered in image input window 2902 associated with image input module instance 2904 is entered and learned by set module instance 2906 as a new set pattern. The middle path starting with image input module 2920 feeds a noisy input image as shown in window 2908 through a working memory module instance 2912 to feed pattern recognition. The bottom path starting with previously learned set pattern identifier "willie_1" entered in window 2914 of keyboard input module instance 2916 simulates imagination feedback of the pattern sought. The "willie_1" pattern is reified in reify module instance 2918 into its component feature signals. These signals are re-scaled in "rescale" filter module 2920 and delivered to working memory module 2912 along with the noisy image input. Output signals from module 2912 feed "pattern match" set module instance 2922 which attempts to match signals to known patterns. Results of pattern matching are shown in plot window 2930 of plot module instance 2932.

Initially, an original "willie" image is entered and learned by pattern module 2906. Next a noisy input image is entered alone in window 2908 with no input provided from the imagination path, and a modest recognition score is shown in the plot display 2930 segment 2934. Finally, the looked-for pattern's identity "willie_1" is imagined (simulated by keyboard entry into the "imagine" module instance 2916), reified into its component features by reify module instance 2918, rescaled with a gain factor of 0.5 so as not to overshadow perceptual input evidence, and additively combined in working memory module instance 2912, yielding an enhanced recognition score greater than perception or imagination alone as shown in plot display segment 2936. This additive combination of perceived and imagined features models the convergence of feed-forward and feed-back synapses on individual neurons.

This construct works as well with input of multiple known pattern IDs, searching for multiple known patterns or the same object in multiple poses. In a realistic application, the known pattern IDs may instead be supplied as the results of other processing, for example speculative thinking about what one might find or reified memories of images of a favorite person or pet. Also current pattern input would likely be a sequence of images resulting from a scanning process such as visual saccades or other abstract feature sets.

Figure 30A:
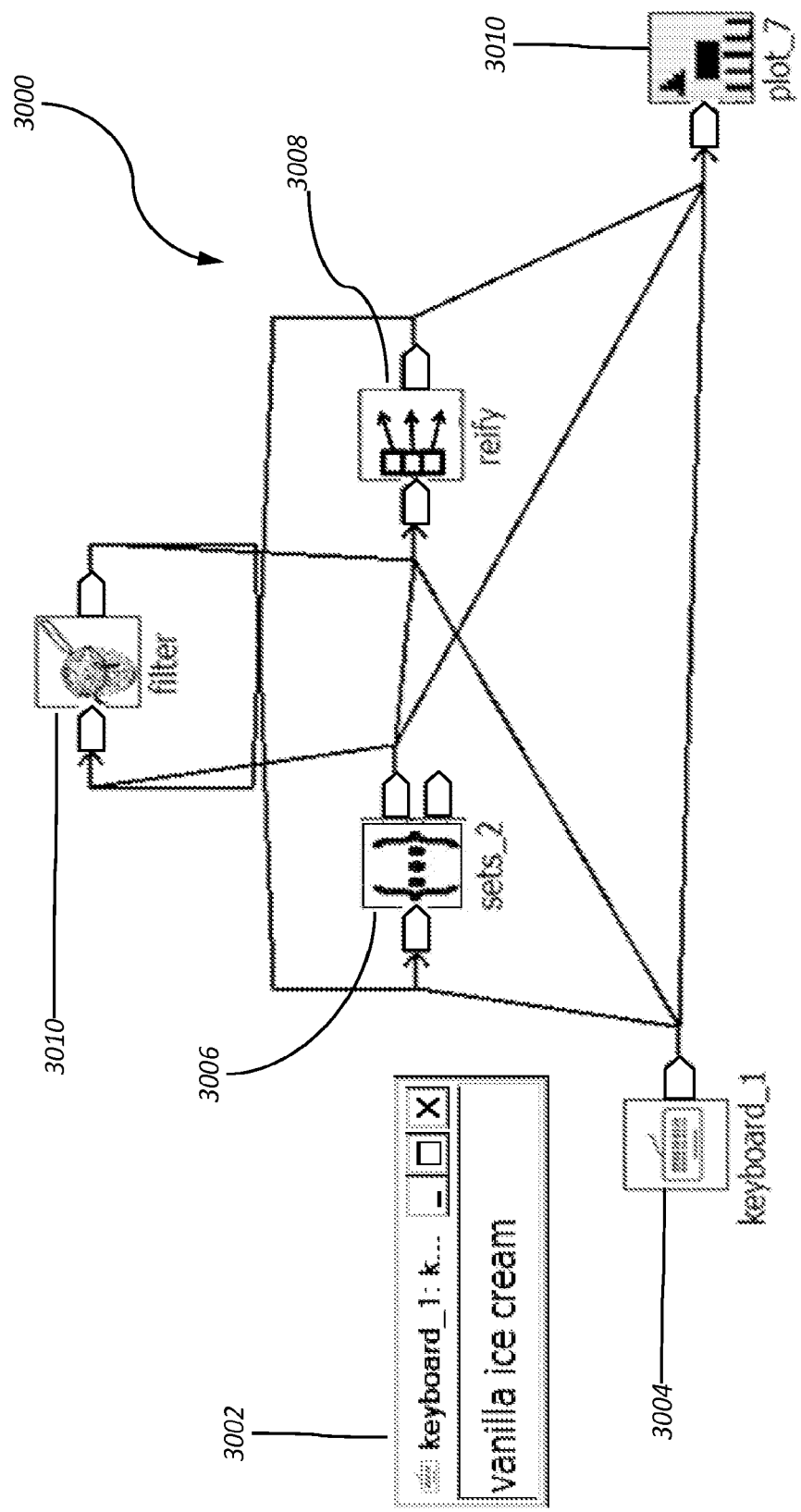
FIGS. 30A-30C show associational thinking in a neural circuit.
Figure 30B:
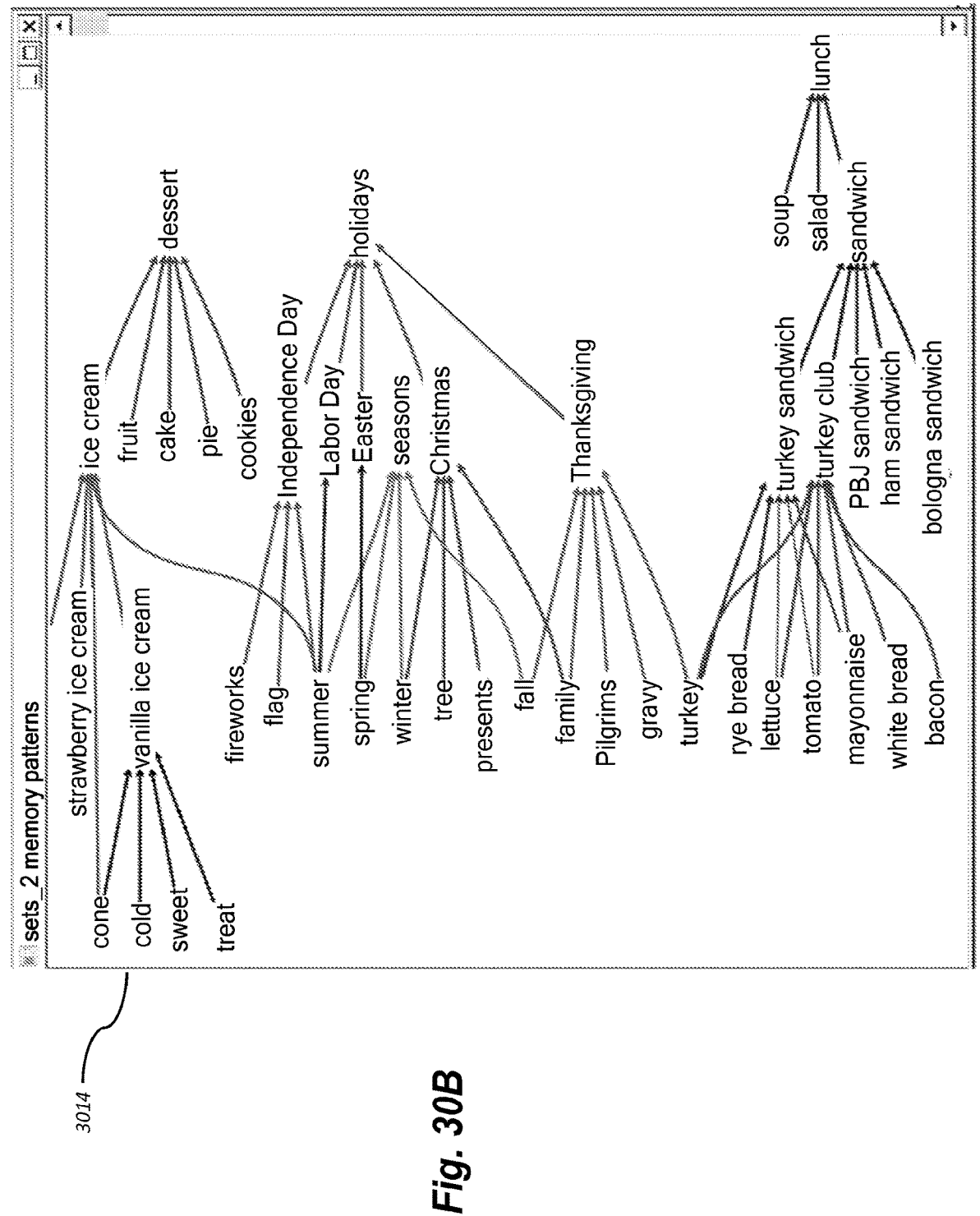
Figure 30C:
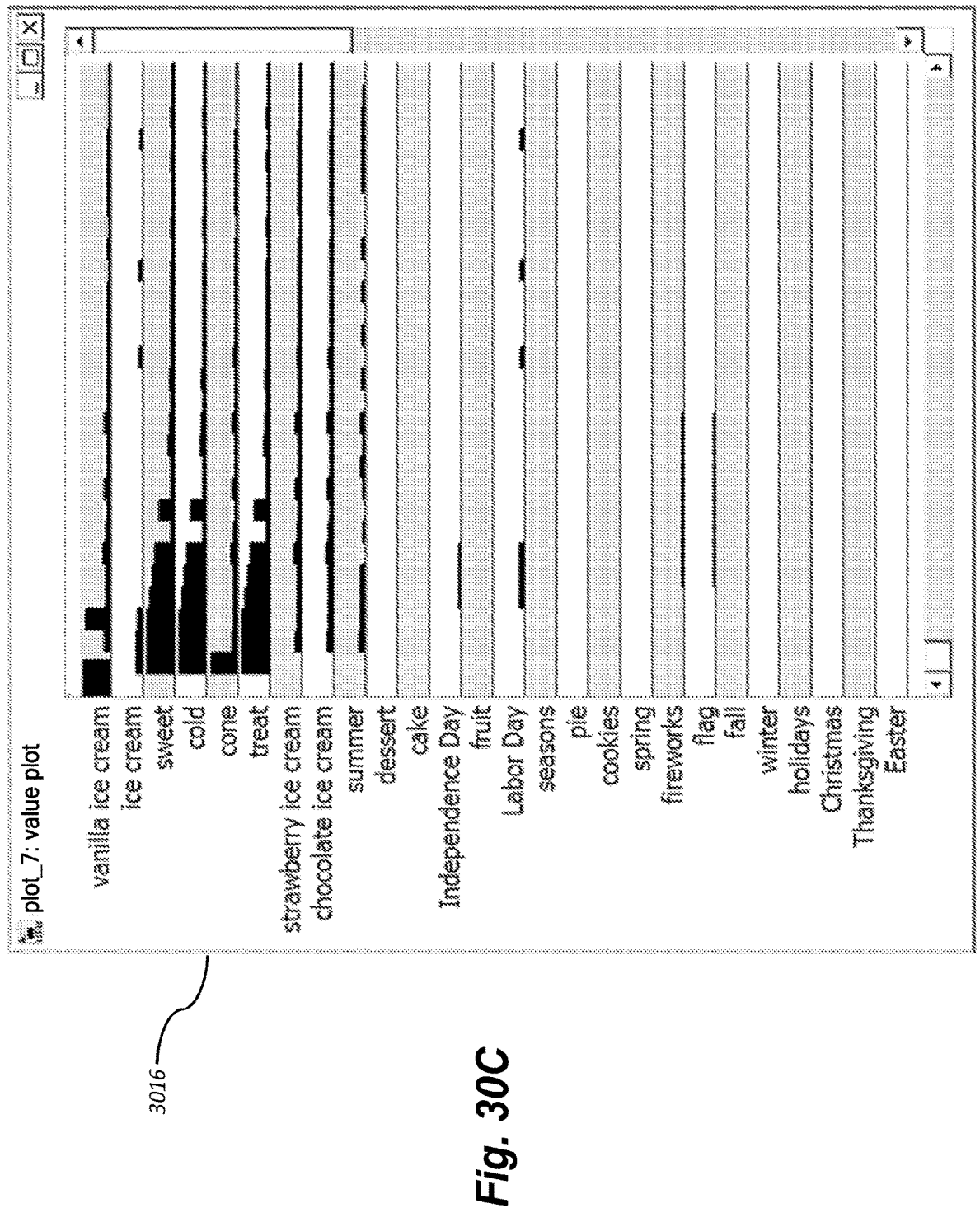

FIG. 30 illustrates associational thinking in a neural circuit. Any universal code of "thinking" is yet to be broken. Intuitively, thinking involves chasing associations up, down and sideways through meshes of associations. We recognize some known pattern, perhaps from a few features. This makes us think of other things, which lead to other things. We travel "up" through successively higher levels of abstraction, back "down" to component features of abstractions, and "across" to related concepts.

In embodiments, these concepts may be modeled as follows: set, sequence and temporal modules provide auto-associative matching of input features to more abstract learned patterns. Layers of pattern modules may be the "up" direction. The reify module type decomposes abstractions to their component features. Layers of reify modules may be the "down" direction. The "across" connections are "up" and "down" paths among the memory pattern and reify modules, including feedback paths.

In the neural circuit 3000 in FIG. 30, keyboard input in window 3002 of keyboard input module instance 3004 feeds both set pattern module instance 3006 and reify module instance 3008, as well as plot module 3010 which shows signals over time in window 3016. A collection of set patterns has been pre-loaded into the set module's memory pattern space or alternative previously learned, as indicated in the "sets_2 memory patterns" display 3014. Both the set module 3006 and the reify module 3008 feed back to each other through a filter module 3010, which damps the feedback signals with a gain factor of 0.9. Entering the initial stimulus of "vanilla ice cream" in keyboard input window 3002 starts the association chaining looping through the memory space patterns. The plot module 3010 display output in window 3016 shows the activation spread and decay over time.

Without any additional stimulation, the signal activations diminish over time and with "semantic distance" (number of links) from the original stimulus. However, if something else comes along, such as a new perceptual input, from some other thought path, or from random neural firing (as with a random pattern module), some concurrence may lead to other cascades and recombinations. This generally suggests creation of ideas by fostering recombination of previously unconnected elements, but without being swamped with overwhelming meaningless combinations.

Figure 31:
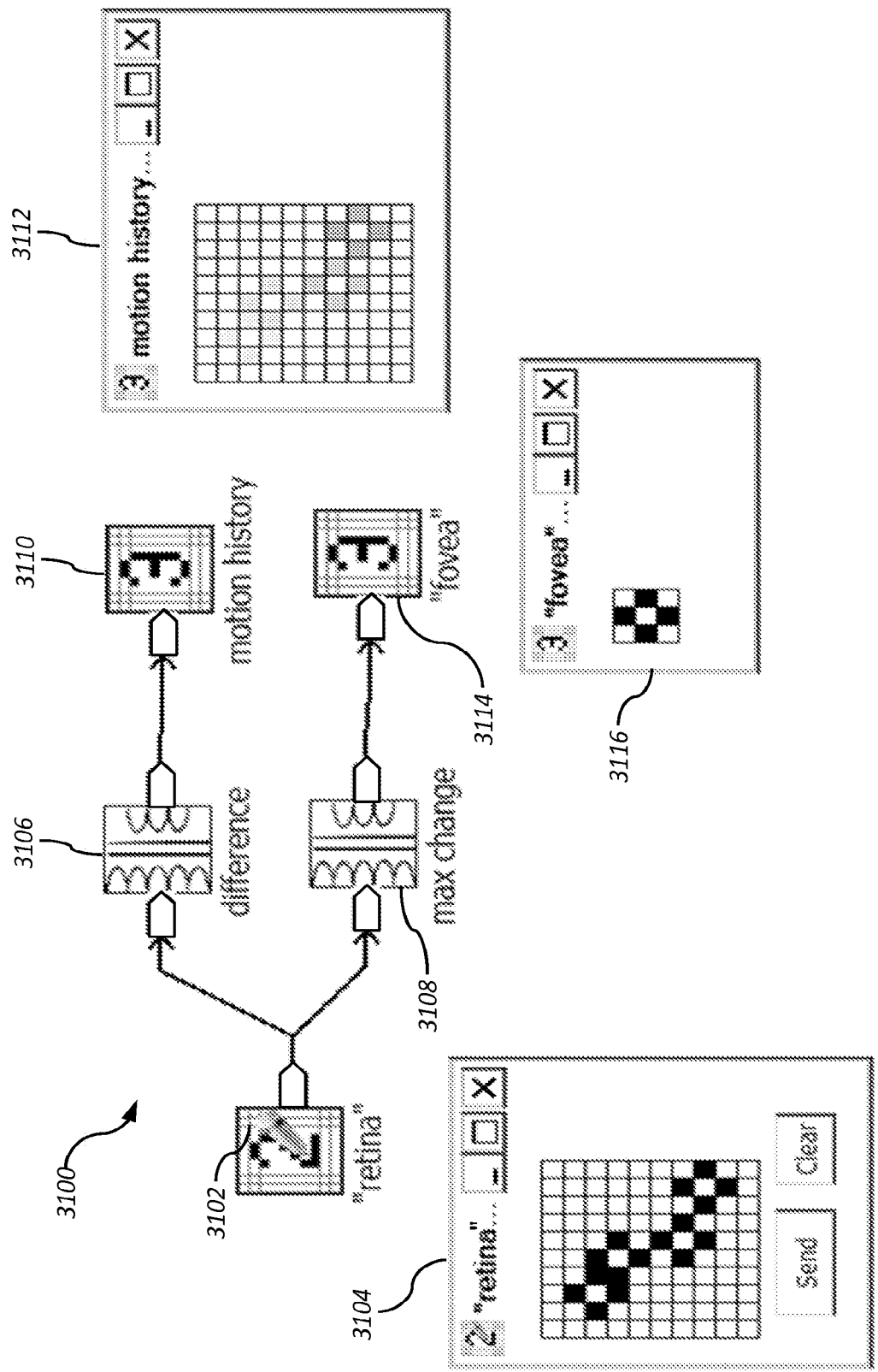
FIG. 31 shows motion tracking with a neural circuit.

FIG. 31 illustrates motion tracking with a neural circuit. Biological brains achieve many different cognitive functions through connections among essentially the same building blocks and learning from experience. The same is true of neural processes in embodiments of neural processing system 100, and a number of examples are provided in the following text. The neural circuit 3100 in FIG. 31 more specifically illustrates motion tracking capability within a small fixed image field.

The "retina" image drawing input module 3102 simulates successive input frames of a simple moving pattern. In successive input frames, a small 3×3 pattern was drawn in image input window 3104. Each little 3×3 pattern was drawn and sent in sequence from the upper left. The "difference" transformer module instance 3106 computes the differences between successive input frames using simple matrix arithmetic, producing the decaying signal sequence displayed by the motion "motion history" image output module 3110 in window 3112. The "max change" transformer module instance 3108 selects the 3×3 region of maximum change between successive input frames, shown by the "fovea" image output module 3114 in window 3116, which remains centered on the region of maximum motion within the larger scene. This simplistic approach might be suitable for simple robotic motion tracking within a fixed wide-angle field of view.

Biological vision systems are of course considerably more complex. The human eye has a lower-resolution motion-sensitive wide-angle retina surrounding a higher-resolution narrow central fovea sharing a common axis. Motion tracking there may require stimulating eye muscles as well as factoring out common-mode motion in the surrounding retina as the eye moves. This more complex processing may be achieved using the same neural circuit building blocks contemplated herein, with processing resources augmented as required for a desired resolution and pattern matching capability.

Note that this neural application does not use any memory patterns. This is an example where fixed non-learning functionality may be more efficiently implemented in custom algorithms rather than more general-purpose memory and learning based approaches.

Figure 32A:
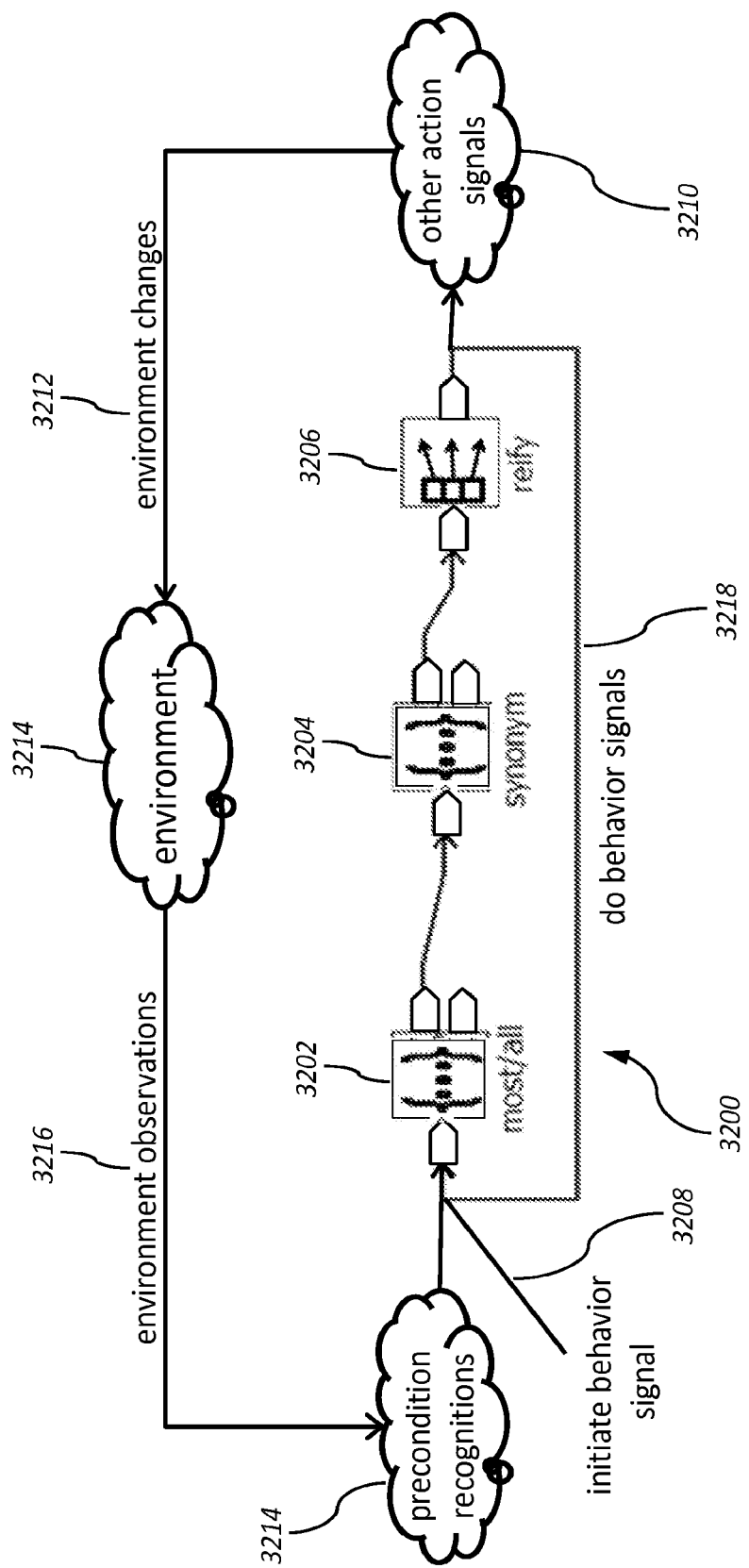
FIG. 32A shows a neural circuit pattern for behavior.
Figure 32B:
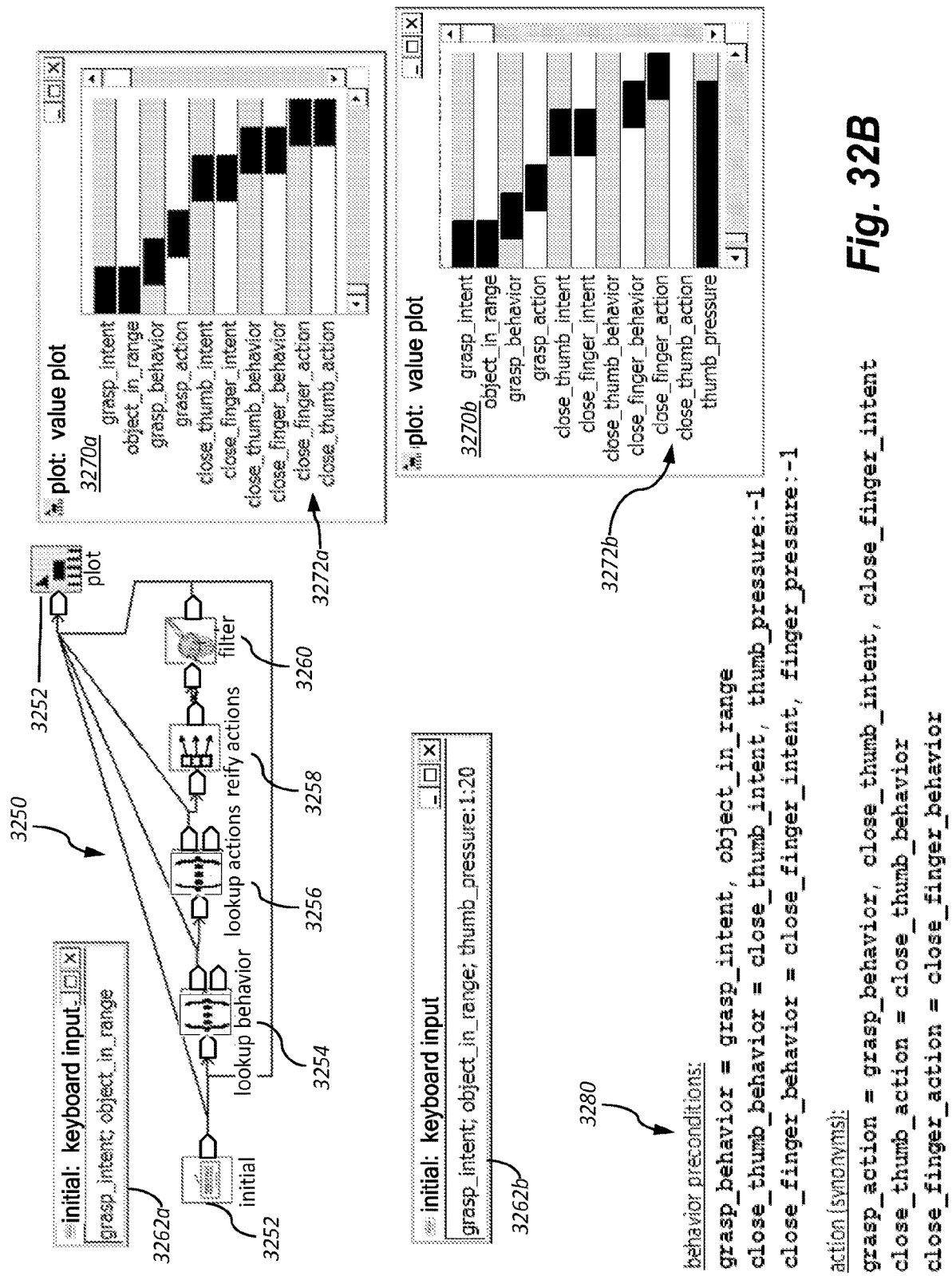
FIG. 32B shows a specific behavior chaining example neural circuit.

FIGS. 32A and 32B illustrate behavior using a neural circuit. FIG. 32A illustrates an overall behavior circuit pattern and FIG. 32B shows a specific example. Precondition recognitions 3214 consist of external and internal observations along with an impetus to perform a particular behavior. The preconditions may include both excitatory and inhibitory elements. An initiate behavior signal 3208 may result from other neural processing. Together these signals stimulate a memory pattern module instance 3202, which may be a set, sequence, temporal or other memory pattern module, with a MOST or ALL pattern matching semantic requiring many or all elements of a pattern to be recognized to generate an output signal. The memory pattern module instance 3204 element finds a synonym pattern that includes a collection of actions that perform the behavior. The reify module instance 3206 expands these behaviors into sets/sequences/temporal sequences of sub-behaviors and other action events and sends signals to perform these behaviors/actions 3210. The effects of these actions feed back through changes 3212 to the external environment 3214 and observations 3216 of that environment by further precondition recognitions 3214, and internally as signals to perform additional behaviors. The combination of intentional sub-behavior events and observed precondition events yields a flexible multi-path behavioral mesh.

FIG. 32B illustrates a specific example of behavior chaining in a neural circuit. The behavioral task is for a (virtual) robotic claw to grasp an object. Two collections of set patterns record the behavior preconditions and actions 3280. Pattern grasp_behavior is enabled by both grasp_intent and object_in_range. Pattern close_thumb_behavior is enabled by close_thumb_intent and inhibited by thumb_pressure (−1 weight). Similarly pattern close_finger_behavior is enabled by close_finger_intent and inhibited by finger_pressure.

Pattern grasp_action is stimulated by grasp_behavior (synonym "any" set matching semantic) and reifies to include close_thumb_intent and close_finger_intent. And so on.

The neural circuit looks up potentially enabled behavior patterns. Those found then feed action patterns which reify into additional behaviors and actions, which feed back until ultimately leaf action signals for close_thumb_action and close_finger_action are emitted.

The two plots 3270a and 3270b from plot module 3252 show the iterated cascade of set matching and reification signals leading to low-level actions. In case 1, the stimuli "grasp_intent" and "object_in_range" are entered via keyboard input module instance 3252 as shown in window 3262a. Both initial preconditions are present for "lookup behavior" set pattern module instance 3254 which recognizes the grasp_behavior pattern. Set pattern module "lookup actions" 3256 finds the synonym action pattern grasp_action and the "reify actions" reify module instance generates all the grasp_action pattern members, and filter module instance 3260 selects just the actions to be performed. These actions both feed window instance 3270a of plot module 3252, and feed back as further inputs to "lookup behavior" module instance 3254, yielding the generation of the expected low-level actions of close_thumb_action and close_finger_action as shown in 3272a. In case 2, an additional external observation thumb_pressure is added in keyboard input window 3262b with a duration of 20 stamp counts long enough to impact the behavior chain. The first iteration of processing is the same as in case 1, but the presence of the thumb_pressure signal inhibits the recognition of close_thumb_behavior and hence no close_thumb_action is generated as indicated at 3272b.

Stepping back a bit, this behavior architecture suggests that "chaining" of behavior steps within the brain may be rather loose: perform a step, and likely next steps are enabled by both previous steps and internal or external changes, rather than explicit sequencing. Unlike procedural programming, a behavior pattern need not anticipate all the things that might go wrong or even all the consequences, expected or not. Other behavior patterns in the brain may detect and handle those situations. (Note by the way that young children may simply do nothing when faced with novel situations for which they have not yet learned any behavior.) Notions of hierarchy and sequence and procedure and conditionals may be overlays projected from our procedural programming heritage. This loose open chaining also may enable rapid adjustment to the unexpected and discovering novel alternative behavior steps.

Learning behavioral elements may be similar to any other learning. Concurrence or sequential occurrence of input signals, actions taken and recognized patterns may create and anneal behavioral set/sequence/temporal patterns just like any other memory patterns.

In another aspect, neural processing system embodiments may support a behavioral computing paradigm characterized by a plurality of learned skills, with each skill comprising a set of pre-conditions that must be true to enable a behavior and a corresponding set of actions. In operation, the set of pre-conditions of a skill becoming true may enable or cause the actions of said skill to be performed, said actions possibly effecting changes to an internal system or external environment such that pre-conditions to the same or other behaviors may subsequently become true or false, thereby leading to (other) skills being executed. Said preconditions may be the result of other kinds of processing such as pattern matching, thresholding, numeric operations, and so forth. A skill may be learned by observing temporal concurrence or sequence among pre-conditions and actions.

Further learning may associate a skill with changed conditions as a result of executing a skill. The learning may be refined through observation of multiple instances of executing the skill, diminishing weights of any conditions infrequently changed, adding new conditions found in subsequent executions of the skill, and increasing weights of any conditions frequently changed. The association may be used in planning and skill choice computations, for example to enable or disable skills known to effect desired changes (e.g., by sending excitatory signals to their precondition computations, or disabled by sending inhibitory signals to their precondition computations)

Figure 33:
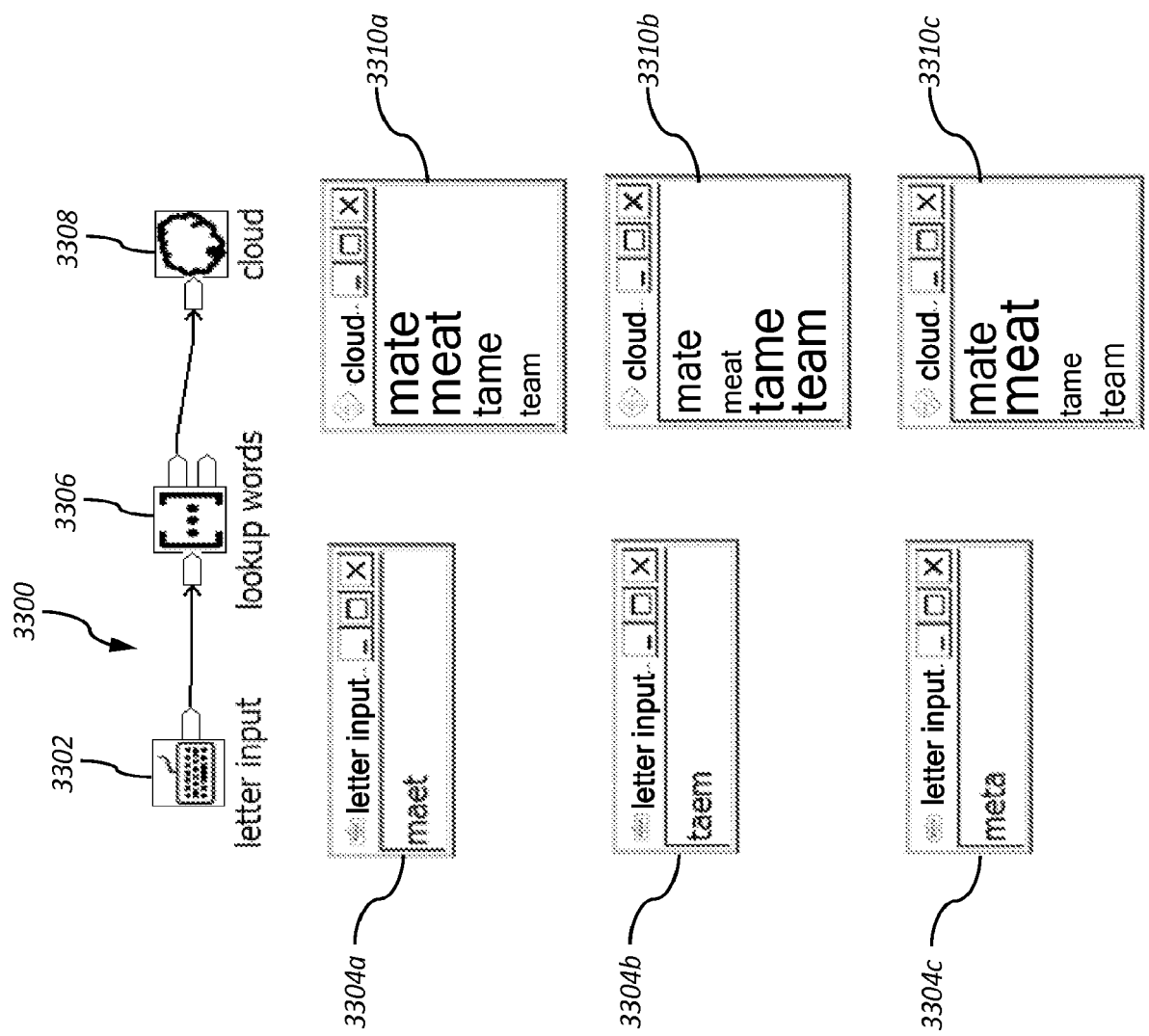
FIG. 33 shows an anagram puzzle solver using a neural circuit.

FIG. 33 shows an anagram solver using a neural circuit 3300. This circuit approaches the anagram solution as a misspelled word problem. Letters are entered in sequence in keyboard input module instance 3302 and corresponding signals are sent to sequence module instance 3306, where signals for matching patterns are sent to text cloud display module instance 3308 for display. Previously learned words are represented as sequence patterns with a high positional error tolerance parameter setting, which allows all the previous letter sequence patterns containing the letters to match with matching scores proportional to the degree of matching. In the first trial, the letters m, a, e, t are entered in order in window 3304a, yielding the several possible known words shown in window 3310a, where font size is proportional to pattern matching score. In the second trial where letters t, a, e, m are entered in order in window 3304b, the same list of matching words is discovered and shown in window 3310b, but with different matching scores. Similarly for m, e, t, a entered in window 3304c and the corresponding output 3310c.

This circuit may be augmented by using a behavioral sequence to mimic human anagram solving strategies even more. Rewrite given letters (either on paper or in our imagination) in different sequences, thereby "resubmitting" them to our perceptual and pattern recognition machinery, until additional valid words "pop" more strongly, as shown in 3304b/3310b and 3304c/3310c.

Figure 34:
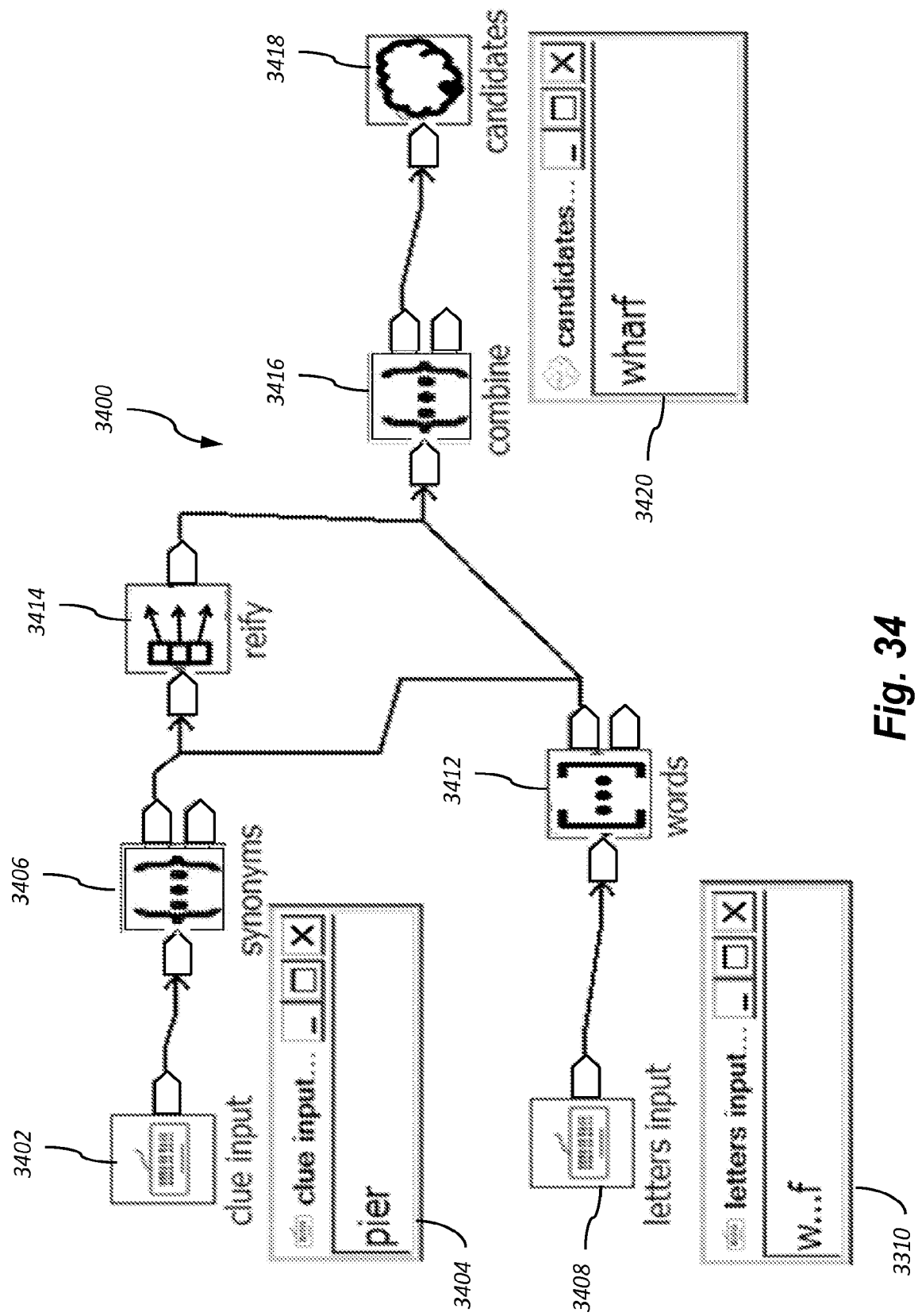
FIG. 34 shows a crossword puzzle solver using a neural circuit.

FIG. 34 shows a crossword puzzle solver using a neural circuit. At its simplest, a crossword puzzle clue is a synonym for a desired word. The corresponding puzzle grid entry shows the number of letters required with possibly several letters filled in courtesy of previous efforts. The simple crossword puzzle solving neural application 3400 depicted takes a typed input pair of a clue word in keyboard input window 3404 of keyboard input module instance 3402 and a letter pattern to be solved entered into keyboard input window 3210 of keyboard input module instance 3208. The word to be solved is entered with explicit letters and a dot (.) for unknown letters. The dot (.) is simply any letter not likely to be found in the result. Previously a set of synonym memory patterns has been learned, in this case wharf, pier, levee, and dock among others. The clue word directly activates all its synonyms via set module instance 3406 feeding reify module instance 3414. The partial answer letter sequence "w , , , f" stimulates possible matching known word patterns in sequence module 3412. The concurrence of a synonym for the clue ("pier") and a word spelling matching the partial pattern ("w . . . f") in set module instance 3416 creates a strong match pattern as shown in the text cloud module instance 3418 display window 3420.

When a neural circuit like 3400 gets "stuck" (that is when the above neural graph doesn't yield any decent word candidates), higher-level cognitive circuits may suggest a missing letter or two, merge those imagined letters with the perceived letters, and re-submit the combined letter sequence via downward feedback paths to the neural circuit 3400 machinery to generate other candidate words.

Figure 35A:
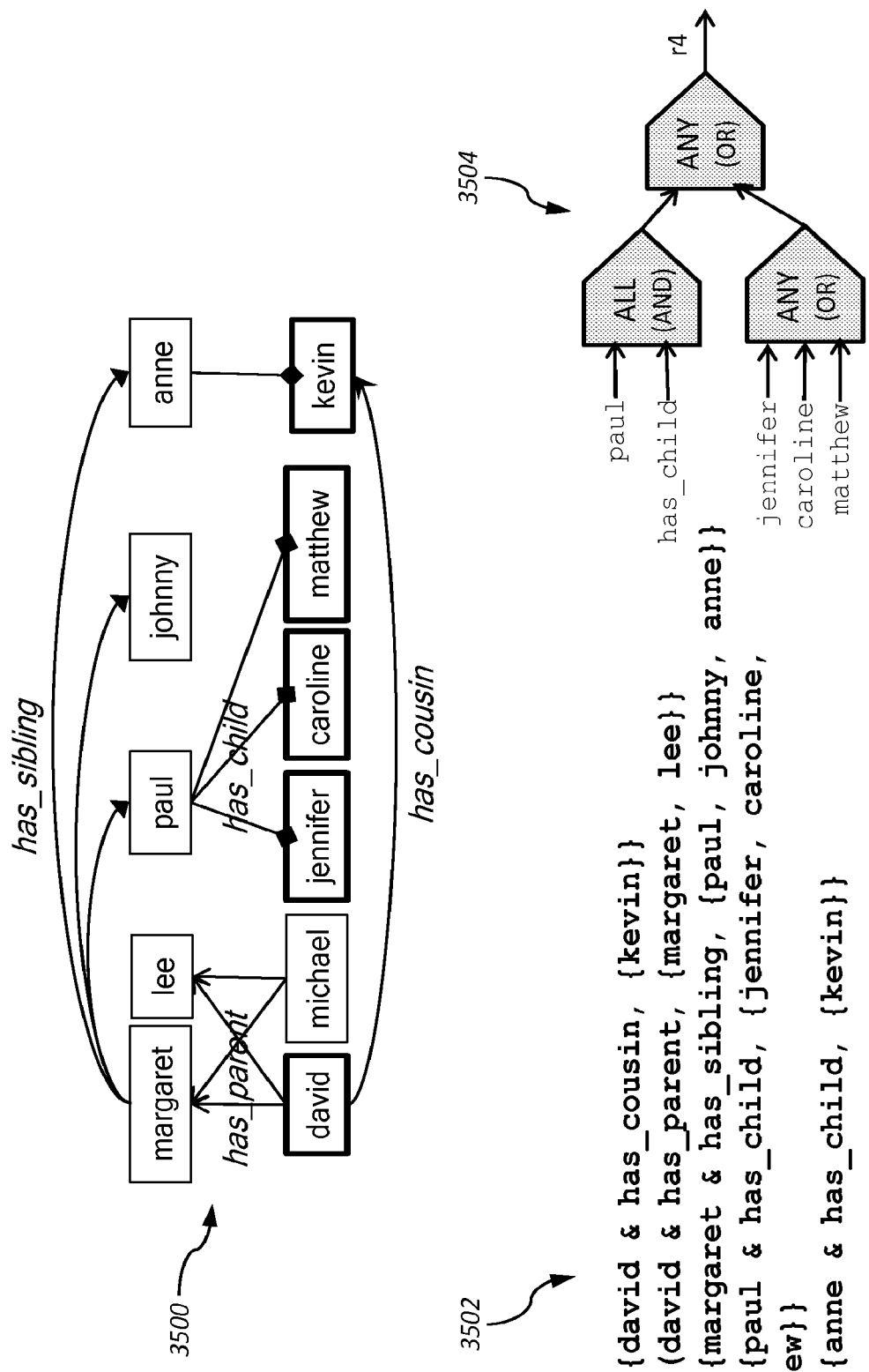
FIG. 35A illustrates rules for cousin identification.

FIG. 35A illustrates rules for cousin identification. How do we figure out, learn and remember our cousins? We learn some cousins from direct experience: "This is your cousin Kevin." We can also "figure out" who our cousins are starting from known fragmentary relationships. This is a kind of behavioral "procedure" sequence: [find your parents, find their siblings, find their children]. After travelling this behavioral path a time or two, we may then "remember" cousins we derived, and can avoid the longer inference path the next time.

Many representations and algorithms are possible to attack this cognitive task. How do human brains do it? Biological representations of 1:many binary relationships like has_cousin(A, B) are not yet understood. In particular, biological brains seem to lack any obvious analog to re-bindable programming variables or pointers, which eliminates many traditional programming approaches. How can neural processing system facilities, modeled on biological brains, do it? Here is one biologically plausible model in embodiments.

Relationship diagram 3500 shows some fragmentary a priori known family relationships. It is known a priori that "david" has a cousin "kevin" as shown by the "has_cousin" relationship arrow. "David" has other cousins, but they are not (yet) known explicitly. When asked who David's cousins are, one would need to derive them by traversing several relationship arrows through parents, parents' siblings and parents' siblings children.

Using a set/logic notation in 3502, each set r1 through r5 may model a 1-many synonym (disjunctive set) relationship between a concept of a "person & relation" and a set of people. Thus, in r4, "paul & has_child" is a synonym for the set of people {"jennifer", "caroline", and "matthew" }. Diagram 3504 suggests a plausible corresponding biological 2-layer construct: the first layer has two types of neurons: one fires with the conjunction of a person concept and a relationship concept, for example "paul" and "has_child", and the other collects the elements of the "many" side of the relationship, in this case "jennifer", "caroline" and "matthew". These both then feed a synonym (ANY/OR) neuron which will fire when either input is active.

In addition, in 3502, a "procedure" for deriving a "has_cousin" relationship is modeled as a sequence of other relationships to traverse: [has_parent, has_sibling, has_child]. An input query of "david" and "has_cousin" should produce the correct answers are shown in 3500 above with bold outlined boxes.

Figure 35B:
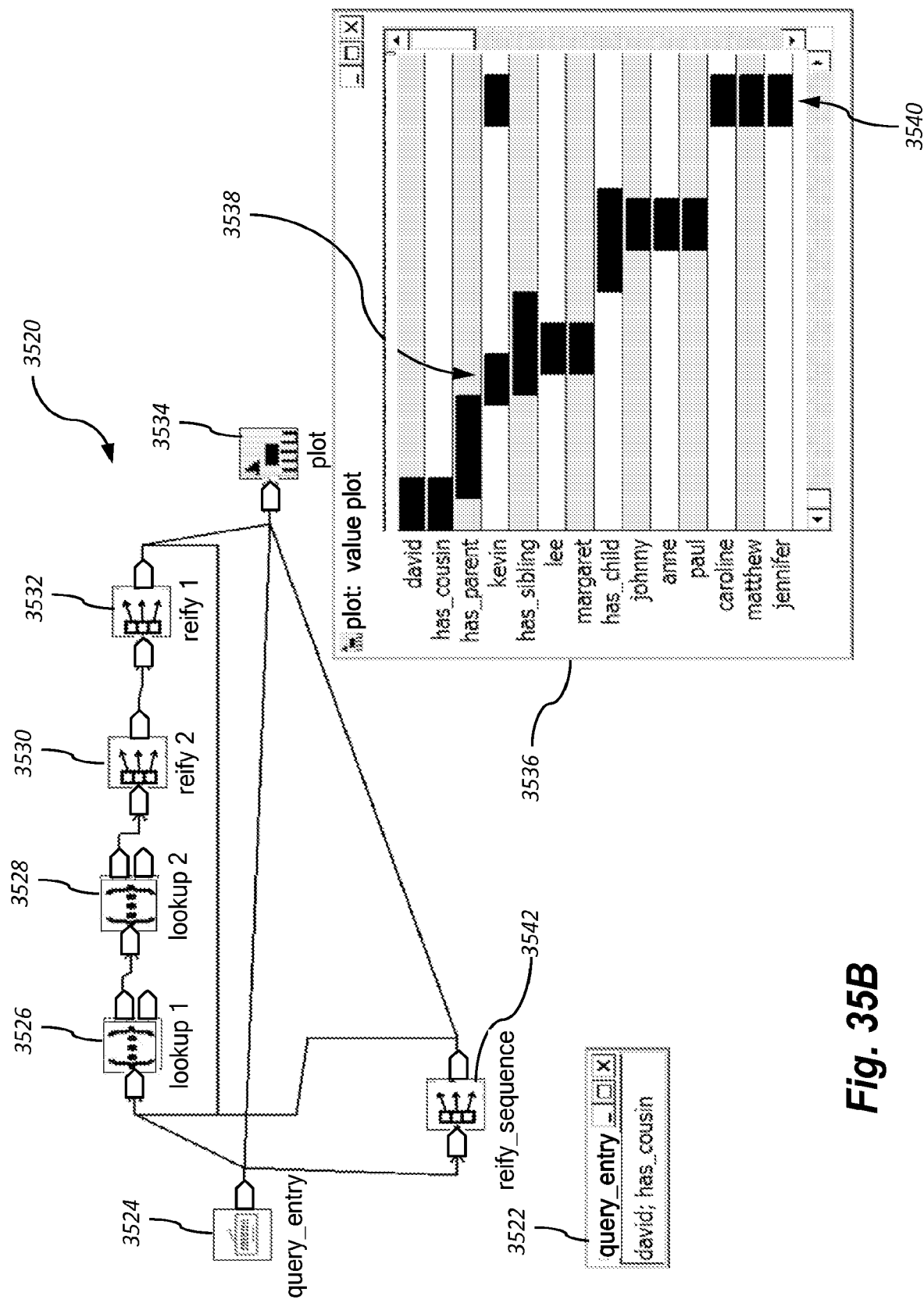
FIG. 35B illustrates a neural circuit for cousin identification.

FIG. 35B illustrates a neural circuit 3520 for performing this sort of direct lookup and relationship chaining derivation, in this example cousin identification. A query consisting of a person identifier signal "david" and a relationship identifier signal "has_cousin" is entered in keyboard entry window 3522 of keyboard entry module instance 3524. The input query signals initially follow the upper path, first triggering the set module instance 3526 to match the conjunction of "david" and "has_cousin". This recognized pattern feeds a second set module 3528 which matches known synonym patterns in a synonym set with a collection of people having that relationship, in this case a singleton set containing just "kevin", the a priori known cousin. Two successive reify module instances 3530 and 3532 then yield the expected cousin's name which is displayed by signal burst 3538 in plot window 3536 associated with plot module instance 3534, along with related signal activity. Meanwhile, along the lower path, the "reify_sequence" reify module instance 3542 emits events "has_parent", "has_sibling" and "has_child" signals in sequence, the "procedural" sequence needed to derive other relationship query answers. Concurrently, the feedback path from module 3532 to module 3526 recycles results of each known relationship, each combining with a next relationship sequence step, to yield subsequent intermediate results. Ultimately, the deliberate procedural process yields the complete cousins result set, including the expected reactivation of "kevin" as shown in signal activations 3540 in plot window 3536. The sequence and concurrency of interrelated signal activations is traced in window 3536.

Figure 35C:
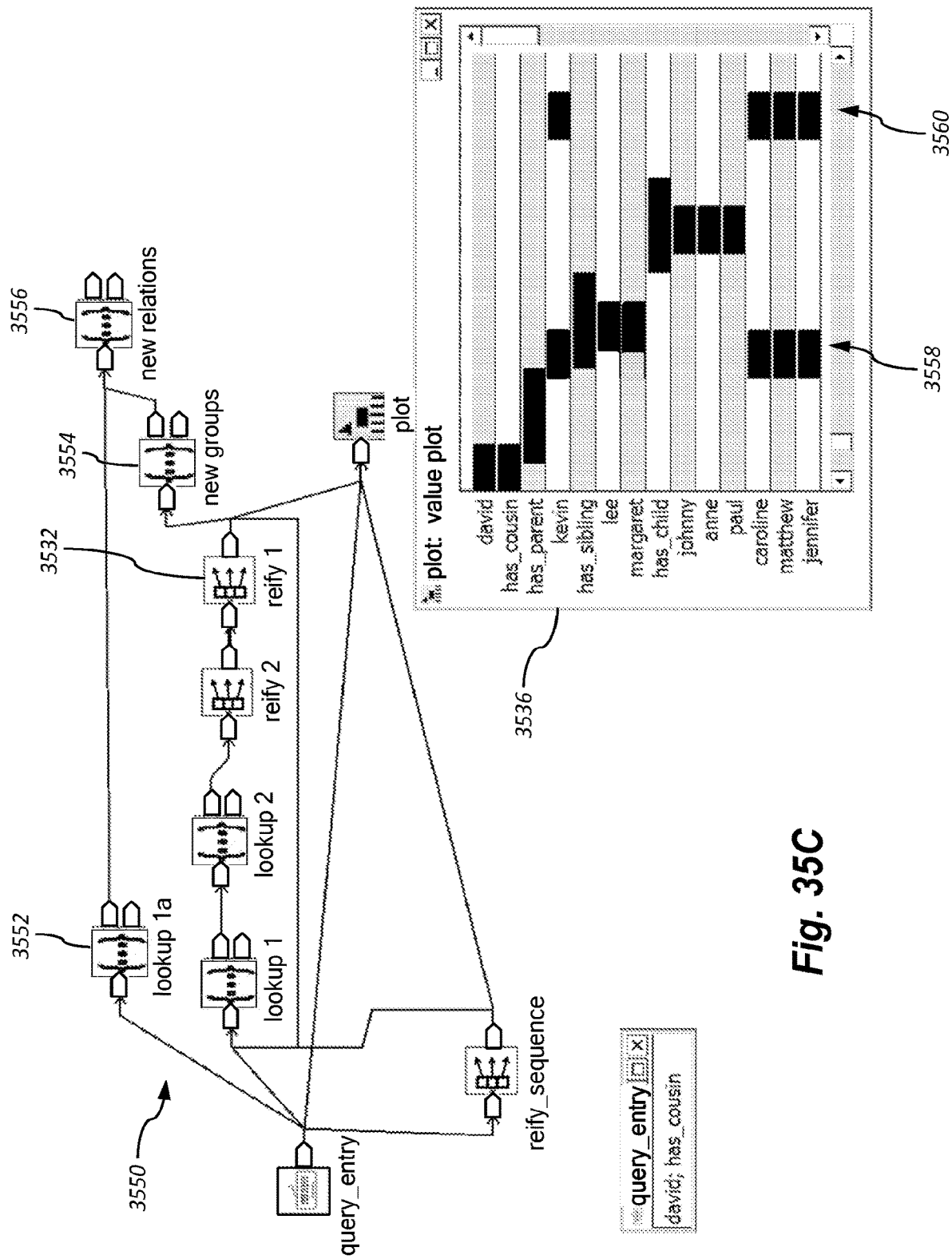
FIG. 35C illustrates a neural circuit for learning a new cousin.

FIG. 35C illustrates an adaptation 3550 of neural circuit 3520 that adds learning of new cousin relationships from procedural derivation and adding them to the set of signals having the desired relationship. The added path comprising set pattern module instances 3552, 3554 and 3556 does several things. "lookup 1a" set module instance 3552 repeats the conjunction of "david" and "has_cousin" outside the feedback loop of. "new groups" set pattern module 3554 watches the concurrency of people names emerging from "reify 1" 3532, and when it finds a new active concurrent combination (of people, in this case, the desired set "{kevin, jennifer,caroline,matthew}") not previously seen before, creates a new distinct group. The "new_relations" set pattern module instance then creates the desired synonym relation between {david, has_cousin} and the newly derived group. In a repeated trial of the original query, the new relationship formed after the original query is found directly as shown in the signal values 3558, including all of the a priori and recently learned new cousins. The derivation procedural loop continues as before, yielding signal repeat for the cousins. A neural circuit designer may want to add functions such as adjustments to signal gains and learning rates to enable or disable the unneeded derivational activity, for example limiting how much effort is put into "thinking about" an answer.

Figure 36:
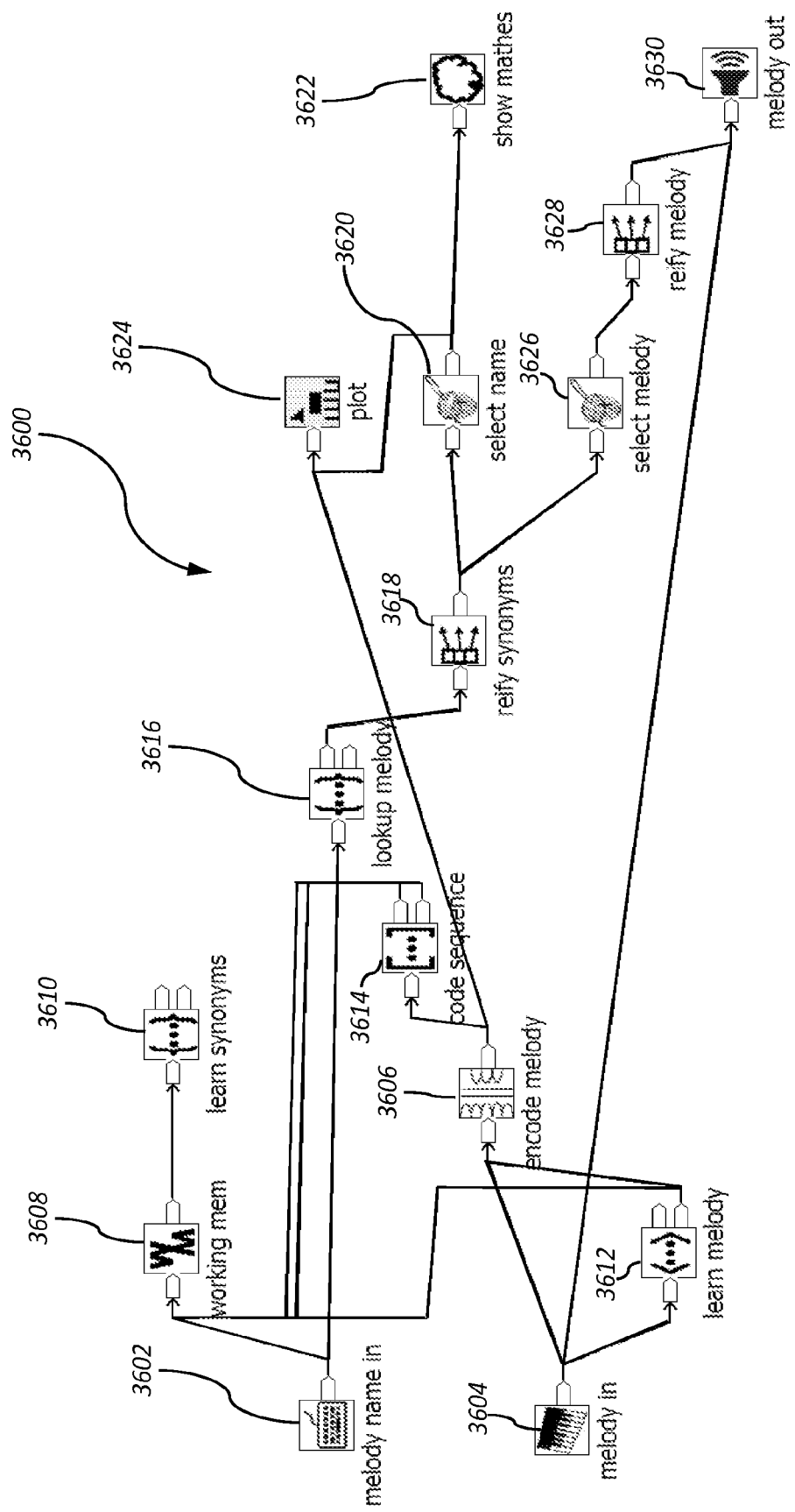
FIG. 36 illustrates tune identification using a neural circuit.

FIG. 36 illustrates tune identification using a neural circuit. This circuit 3600 can learn a new melody and an association with a melody name, can recognize a previously learned melody from a few recognizable notes (in any key, tempo and with some mistakes) played including mistakes and differences in musical key and tempo and provide the names of similar melodies, and can replay a known melody in its originally learned form after entering either its name or a few recognizable notes.

The "melody in" MIDI (Musical Instrument Digital Interface) input module instance 3604 generates signals corresponding to MIDI note-on, and note-off events, with a stamp derived from the MIDI timestamp, using the MIDI note number as the event ID, and the MIDI velocity (volume) as the event value, normalized to the range [0,1]. This raw melody input feeds several paths. The path from module instance 3604 to "melody out" MIDI output module instance 3630 plays the melody notes via a MIDI synthesizer device as they are entered. The "learn melody" temporal pattern module instance 3612 remembers this melody signal in some detail for later replay.

The "encode melody" transformer module instance 3606 quantizes the MIDI input signals into an abstract invariant code of signals for "up", "down" or "same" reflecting whether a note is higher, lower or the same as a previous note. So the opening phrase of a melody such as "Happy Birthday" may be encoded as the signal sequence [same, same, up, down, up, down]. The "code sequence" sequence pattern module instance 3614 remembers this sequence as the abstract invariant signature for this melody. A name for a new melody is entered via keyboard input module instance 3602. The "working mem" working memory module instance 3608 persists all three of a typed name, the melody code pattern ID, and the original melody temporal pattern ID, which are then associated as synonyms in the "learn synonyms" set pattern module instance 3610.

Later MIDI input of any significant part of the melody, even with extra/missing/wrong notes and in a different tempo or musical key, yields a significant matching confidence with the code sequence pattern in "lookup melody" set pattern module 3616. Later input of either a similar melody or the known melody name stimulates the disjunctive synonym set pattern representing that melody in "lookup melody" set pattern module 3616, yielding a signal for a previously remembered synonym pattern. Reification in reify module instance 3618 then generates signals for the name, the invariant melody sequence pattern, and the recorded temporal pattern for the original melody. Selecting just the melody temporal pattern in filter module instance 3626 feeds further reification in "reify melody" reify module instance 3628 of the original melody pattern into its component MIDI note messages feeds the "melody out" MIDI output module 3630 which then plays the original melody. "Select name" filter module instance 3620 selects just name signals received from reify module instance 3618 and displays possible matching melody names in the "show matches" text cloud display module 3622 with font sizes proportional to melody recognition strength.

Future Module Possibilities

It is anticipated that the range of system functionality enabled by embodiments will be enhanced over time with the addition of a plurality of additional module types 120 providing additional functionality and following the general design patterns and rules of existing module types. Such additional modules will address a wide range of input, output, processing, memory and other useful reusable combinable functions.

Visual Domain

Future modules in the visual domain may convert electromagnetic energy or other physical activity (e.g., acoustic, motion, pressure) signals impinging on sensors or stored/communicated in various formats to and from internal neural process signals and process such internal signals for cognitive or other processing. Vision is usually thought of in terms of the visible light spectrum, but it may include energy over time from a wider spectrum, including but not limited to X-rays, infrared, ultraviolet, etc. At its most raw form, time-varying electromagnetic energy at various frequencies (e.g., color) and intensities is received by multiple sensors in a 2-dimensional array. At its most processed form it delivers recognized faces, gestures, body poses, objects, scene segments, and motion. All of these may be encapsulated as input modules. Other sources of visual data such as digital images, video and virtual reality scenes may be encapsulated. Additionally, various kinds of array or matrix oriented sensor systems may provide image-like inputs.

Static Images

In one aspect, a neural processing system might be hooked up to an external static image source such as a digital scanner, digital camera, imaging device, scanner (e.g., MRI, fMRI, MEG, EEG, CAT), X-ray machine, artificial skin, pressure array, microphone or radio telescope array, etc. A suitable input module may deliver signals comprising images as 2D or 3D matrices of intensity, color, transparency and other image characteristics, have module parameters including without limitation source-specific parameters, image resolution, filtering, intensity scaling, geometric transformations, etc. In another aspect, a suitable input module may obtain image-like information from computer files or pointers to memory regions containing images in any of a variety of image formats including without limitation PNG, JPEG, TIFF, GIF, bitmap, etc.

In another aspect, a neural processing system might be hooked up to an external image output facility such as a graphical display, video display, printer, facsimile transmitter, etc. A suitable output module may receive signals representing images such as 2D or 3D matrices of intensity, color, transparency or other image characteristics, have module parameters including without limitation target facility specific parameters, image resolution, filtering, intensity scaling, geometric transformations, etc. and convert those signal values into appropriate data and control signals to render the image on the target image facility. In another aspect, a suitable output module may write image representations in a variety of image formats including without limitation PNG, JPEG, TIFF, GIF, bitmap, etc. into files or memory regions.

In yet another aspect, a neural processing system might be hooked up to a 3-dimensional image or object creation system such as a stereoscopic display, holographic display, 3-dimensional printer or machining tool. A suitable output module may receive signals representing 3 dimensional image aspects and convert them into data and control signals to direct such a 3-dimensional image creation system to render an appropriate 3-dimensional image or object.

Moving Images

In another aspect, a neural processing system might be coupled to a video camera or other source of moving images such as a moving imaging device (e.g., radar, LIDAR), scanner, etc. A suitable input module may deliver signals comprising sequences of images as 2D or 3D matrices of intensity, color, transparency or changed image element values. In another aspect, a suitable input module may convert moving image data encoded in any of a variety of moving image formats including without limitation MPEG, MP4, AVI into 2D or 3D matrices of intensity, color, transparency or changed image element values.

In another aspect, a neural processing system might be coupled to a moving image output device such as a video display, stereoscopic display, holographic display, artificial skin, electrode or mechanical array, audio speaker array, etc. A suitable output module may receive signals comprising sequences of images as 2D or 3D matrices of intensity, color, transparency or changed image element values and convert them to data and control signals to create a moving output image. In another aspect, a suitable output module may render signals representing moving images into files or memory regions containing moving image information in a variety of moving image formats including without limitation MPEG, MP4, AVI, etc.

Image Processing

A variety of image processing functions may usefully be performed within the neural processing system context including without limitation static and moving image transformations, feature detections and extractions, motion detection, segmentation, object recognition, facial recognition, pose recognition, skeleton position, etc. Two general approaches may be used to provide suitable modules. In one aspect, image transformations may be performed within image input modules before converting results into internal neural processing system signal formats. For example, this may include capturing conventional image-processing pipeline libraries and device capabilities as part of image input modules and delivering resulting images to neural graphs for other processing. For example, the Microsoft ° Kinect® device provides skeleton position maps derived from its video camera, which may be usefully delivered to neural graphs. In another aspect, external image formats may be converted into internal signal representations and processed within the neural processing system using image-specific or generic functions such as matrix operations within a transformer module or signal processing modules.

In the possible image processing modules listed below, internal image matrices may be sparse or fully instantiated, may be without limitation single 2D matrices (e.g., image brightness), multiple 2D matrices one each for R, G and B planes (or other color encoding schemes such as HSV), or a 2D matrix with cell values as RGB or other color encoding scheme tuples. It will be clear to those skilled in the arts that the image processing module functions listed herein may be separated into multiple module types or combined into fewer module types with parameters for selecting among and specifying image processing functions.

An image transformation module may receive an image matrix and produce one or more scalars, vectors or matrices of possibly different dimensions and sizes depending on parameters for the type(s) of image transformation.

An image segmentation module may receive an image matrix and produce one or more image matrices for each identified image segment.

A feature recognition module may receive an image matrix and produce one or more image matrices or other signals for each recognized feature.

A motion or change detection module may receive a sequence of image matrices and output a sequence of matrices with non-0 cell values identifying changed elements or other signal encodings of changed elements.

An object detection module may receive an image matrix and produce one or more image matrices or other signals for each identified object. In another aspect an object detection module may receive an image matrix and produce a matrix identifying centroids and extents of identified objects.

A color separation module may receive an image matrix with color values encoded in each cell (e.g., RGB or HSV) and produce multiple matrices with cells encoding individual color intensities.

An image characterization module may receive an image matrix and produce one or more scalar, vector and/or matrix signals representing image characteristics such as overall image brightness, contrast, variability, etc.

An image or facial matching module may receive two or more image matrices and produce a scalar value encoding image or facial similarity, and/or matrices encoding areas of image similarity and difference. In another aspect, an image or facial matching module may produce output signals representing matching strengths of a current input image matrix for a plurality of previously learned image matrices.

A 3D extraction module may receive two or more image matrices (as in binocular vision) and produce a depth matrix reflecting distance to features in both images.

A skeleton position module may receive an image matrix and output one or more signals reflecting joint positions of FIGURES (humans, animals, robots) in the image.

A general signal processing module may receive one or more image matrices and perform general 2 dimensional and 3 dimensional signal processing functions such as filtering.

Audio Domain
Raw Audio

Audio signals typically arrive at computing systems in a digitized time-domain form, from microphones or audio stream/file formats. Most analogs to brain processing of audio start from cochlear sensors which approximate signals in the frequency domain. One important module is therefore a Discrete Time Fourier Transform module (see Signal Processing) which may generate a series of vectors of audio energy values for parameterized ranges of frequency bands. Other signal processing functions or modules may "clean up" an audio signal with filtering, noise suppression, echo cancellation, etc.

Audio Processing

Given an audio signal representation as a sequence of frequency-domain vector events, much audio processing can be done with straightforward non-audio-specific module types.

The transformer and filter modules can be major workhorses here, for simple filtering and transformations (e.g., frequency shifting), etc. The temporal memory pattern module can record simple-to-complex audio sequences as a matrix of frequency-band intensities, and provide matching with temporal tolerance to already recorded patterns. The reify module can regenerate the sequence of audio frequency vectors at a parameterized playback speed. An audio output module may take the sequence of audio frequency vectors (e.g., from a temporal pattern module or from prior processing) and output it either to audio files in several standard formats, or to speaker devices.

More sophisticated audio processing modules may perform functions like phoneme extraction, voice analysis and speech recognition, musical analysis, etc. These modules might encapsulate available audio and speech libraries.

A phoneme extraction module may generate signals for possible phoneme matches, each with an ID from a phoneme vocabulary space and a value indicating confidence of that phoneme.

A voice analysis module may compute various characteristics of the voice and generate signals for those characteristics as described elsewhere in this document.

A musical analysis module may derive complex musical characteristics like instrument identification (from comparison to frequency pattern signatures), note/chord/key identification, musical style, etc. from the sequence of frequency-domain vector events.

The use of established signal processing functions may tend to require internal conversion from the native neural processing system signal representation to the signal format used by those functions, and back.

Audio output modules may convert internal audio signal representations to data and control signals for external audio production such as speaker, amplification, processing and recording systems, as well as for storage in computer memory or files in a variety of audio formats.

Other Sensory Domains

Input modules may usefully be provided for other sensory domains. For example, modules for touch-input analogs can deliver matrices of scaled pressure values for different regions, at a rate and spatial scale consistent with application needs (i.e., human touch cannot resolve pressure changes very fast nor down to a very fine spatial granularity). Some regions like fingers may make available a much higher spatial and temporal resolution than other less-sensitive regions.

Taste and smell analog modules, and chemical detector modules, may deliver signals whose IDs are related to specific taste, smell or other chemical characteristic components. Set memory pattern modules may be used to correlate patterns of these inputs with experience: we learn a combination of strengths of different taste and/or smell elements means "apple" and can later recognize that.

Proprioception sensor (internal body/system state/change awareness) modules can deliver signals appropriate to what they are monitoring. These may be either polled or driven by detected changes.

Non-biological systems (robots, vehicles, buildings, factories, ecologies, the world, the internet, etc.) provide a wide spectrum of other analogs to senses. Modules representing these "senses" to a neural processing application may take the form of either poll- or event-driven input modules which generate signals whose IDs, value formats (scalars, vectors, matrices) and generation rates are appropriate to what is being sensed.

Robotic sensors abound: location (e.g., GPS, position relative to a map, compass), motion (velocity, heading, acceleration), orientation, individual motor motion and power consumption, battery levels, joint and body feature locations and motion, tilt, proximity, pressure, magnetics, image, audio, video, electromagnetic spectrum. Again, modules encapsulating these sensors may generate signals with IDs, value formats and generation frequencies appropriate to the needs of the application and the capabilities of the sensors as described elsewhere in this document.

Data streams abound: sensor data, telemetry, audio and video, positional data, financial data, news feeds, telephone call records, environmental data, traffic data, telephone call records, etc. Modules to bring this data to neural processing system applications may have a similar plot: one module instance may represent one stream, or the aggregate of several streams, or the results of pre-processing of stream(s). Such a module may have parameters that specify any connection information needed, and any filtering needed. It may output signals as salient features arrive from the stream(s), with IDs and value types (scalar, vector, matrix) appropriate to the features. Repeats of the same salient feature should reuse the same signal ID (e.g., same vehicle, telephone, sensor, object). Values may be scaled to the significance, confidence, or intensity of that feature. Sensors with an inherent scalar range like temperature may encode temperature as a vector with individual values representing strength at a particular temperature value.

Outputs/Actuators

Control

A great many areas for controlling machinery and processes require encapsulation of various kinds of data and control interfaces. This may for example include vehicle control interfaces for driving, flying, walking, crawling, swimming, and so forth. This may also include control interfaces for virtual device within, e.g., three-dimensional virtual reality environments. In another aspect, this may include building control interfaces for, e.g., HVAC, lighting, security, irrigation, other water, etc. In another aspect, this may include control interfaces for traffic control of, e.g., air traffic, road traffic (e.g., stop signs, toll booths, highway on ramps, etc.), train traffic, and combinations thereof. In another aspect, this may include control interfaces for manufacturing including any discrete or continuous processes or combinations thereof. This may also include other forms of control such as machine control, energy generation and distribution, information flow processes, communication flow processes and so forth.

In one aspect, module interfaces may be adapted to specific systems (e.g., a particular make and model of automobile) or generic types of system (e.g., an automobile). Module interfaces may also or instead include a variety of module interfaces for specific electromechanical controllers such as switches, variable power supplies, current sources, voltage sources, PWM modulation systems, digital messaging, and so forth.

Displays

See also "User Interface". There is an endless appetite for new kinds of displays of events, sequences, patterns, etc. Displays may encapsulate various plotting libraries for different types of rendering, as well as interfaces for, e.g., monochrome display, color display, two-dimensional display, three-dimensional display, and so forth. Modules for display output may convert internal signal representations into appropriate interface data and control signals for such displays.

Data Visualization

In another aspect, modules may convert internal signals representing arbitrary concepts or abstractions into graphical visualizations of aspects of the represented concepts, for example, 2D, 3D and moving images of line, surface, shaded, color-coded forms, control of actions of virtual or animated FIGURES or faces, image transformations such as distortions, etc.

Sound Synthesis

Modules may convert internal signals representing audio information to data and control signals for producing sound or storing audio data in computer memory or files in a variety of formats. Much can be done with simple MIDI output using MIDI parameters for instruments, ADSR (attack-decay-sustain-release) and numerous other MIDI synthesizer parameters. More generally, sound synthesis may use a variety of techniques including without limitation frequency modulation synthesis, sampling, physical modeling, and so forth. High-quality audio can for example be generated by reverse-transforming frequency-domain vector representations back into the time domain and fed to standard audio output facilities.

Speech

Modules may encapsulate speech production libraries. Inputs may be internal signals representing words and phrases, parameters may include vocal tract models, accents, vocabularies, expressive tone and style, etc. As with some other domains, it may be desirable to encapsulate just low-level interfaces like vocal tract models and use learned memory patterns to generate speech. In another aspect, both high and low level interfaces may be usefully employed in combination, such as where trained models are available for specific individuals, and generic models are available for speech input that is not recognized as belong to the specific individual(s).

Behavior and Actions

In general, two broad approaches may be possible. In one approach, an interface may encapsulate usually robot-specific high-level behavior libraries: e.g., move right hand to position X,Y,Z slowly, and an underlying library can determine joint motions, accelerations, obstacle avoidance. This usefully accommodates adaptations to different forms of robotics such as SCARA arms, x-y-z gantries, and so forth. In another aspect, an interface may encapsulate low-level control for specific motions and actions of a particular physical platform and perform complex movements as layers of learned macro behaviors in neural process system circuits.

Processing

Signal Processing

General-purpose and domain-specific digital signal processing libraries abound. They do various kinds of signal filtering, transformations and matching. Most deal with digitized signals with a fixed sampling rate. Event sequences in the neural processing system described herein may be in a compressed signal form, with signal events sent only when the value of a signal changes. Further, neural processing system links may carry multiple signals, each with an identifier of a distinct signal. A module encapsulating typical digital signal processing functions may convert arriving signals into multiple digital signals in the format needed by the underlying library, perform the desired signal processing function, and convert the resulting signal(s) back to the neural processing system signaling representation.

Often we would expect a separate suite of digital signal processing functions to build a composite function which is then embedded in a neural processing system module, to avoid frequent (and possibly information-losing) conversions form and to neural processing system signal representations.

Vector and Matrix Functions

Modules may encapsulate general-purpose vector and matrix manipulation functions, including without limitation arithmetic, vector and matrix products, inversions, eigenvalue and eigenvector derivation, decomposition, composition, etc. Such modules may receive input scalar, vector and/or matrix signals, perform computations as specified by module parameters, and produce output scalar, vector and/or matrix signals.

Transforms

Mathematical transforms enable a wide range of general and special purpose processing of vector and matrix information. Modules may encapsulate such transforms for general or special purposes, receiving input signals in neural processing system signal representations, performing transforms specified by module type and/or module parameters, and converting transform results to neural processing system representations. Additionally, modules may encapsulate transform pipelines, enabling the application of multiple transforms and transform-related processing to data in transform library native formats.

Much processing of audio information starts with converting a time-domain signal (such as that delivered by typical microphones, audio streams and audio file reading) into the frequency domain, using a Discrete Time Fourier Transform function. A module may receive an audio stream in the time domain, apply the indicated transform function and deliver output signals in the frequency domain. Multiple signal encodings are possible. One could be a (sparse or fully instantiated) vector of intensity values, each vector element corresponding to a frequency range. Another encoding may use individual signals with IDs corresponding to frequency ranges.

In another aspect, a module may encapsulate 2D and 3D image transformations and transformation pipelines, converting input image signals into a native format for invoking said transformations and converting transformation results back into neural processing system output signals.

Mathematical Functions

While transform theory facilitates a broad range of audio and visual processing, an input our output module, or other modules within a neural processing system, may usefully implement a variety of specific or generic mathematical functions. This may for example include generic mathematical tool sets such as statistical libraries, calculus libraries, differential equation libraries, and so forth, as well as domain-specific mathematical libraries for, e.g., geometry, trigonometry, thermodynamics, optics, mechanics, control systems, finite element analysis, economics, and so forth. These and any other mathematical tools, algorithms, heuristics, and the like may be implemented in modules for various forms of processing as contemplated herein.

Language Processing

Two broad approach extremes may be possible here. In one aspect, a system may encapsulate the many existing language processing libraries in modules. These modules may start from audio sources (microphones, audio files/streams) or text sources, and output signals for a variety of derived language features including without limitation phonemes, letters, words, phrases, meanings, commands. Output signals may for example include multiple candidate possibilities together with relative strengths/likelihoods.

In another aspect, the system may encapsulate lower-level audio and visual processing functions and use other modules (e.g., signal processing, processing and memory modules) to commingle the domains and perform higher-level processing. This approach exposes much more of the structure of language processing to enable experimenting with prediction, feedback and layered models. For example, seeing a couple of words from a familiar phrase can strengthen/speed the comprehension of likely subsequent words.

It will be appreciated that various combinations of high-level and low-level encapsulation may also or instead be employed.

Memory

Neural processing systems described herein may include several built-in modules for learning and recognizing patterns: set patterns for roughly concurrent events in any order; sequence patterns for time-independent sequences of events in a partial or total order; and temporal patterns for relative time-dependent sequences of events. These built-in modules have learning and matching parameters and algorithms of general-purpose utility. But, like biological brains, evolution has sometimes found it necessary to evolve alternate mechanisms that are better at certain survival-related tasks. Since envisioned neural processing systems are likely to be engaged in many cognitive tasks outside typical human experience, and since like with evolution, better solutions may emerge, in this case from the greater research and development community, there may be needs for additional memory modules.

Alternate Implementations

The representations and matching/learning algorithms of the neural processing system set, sequence and temporal patterns may not be optimal for some cases. Modules with similar functionality can be created, with inputs being features with distinctive IDs, and outputs being signals for recognized pattern IDs with scalar values proportional to matching confidence. Note that there is nothing in the envisioned neural processing system that prevents instances of different modules working on the same inputs delivering and perhaps merging their respective outputs, perhaps in Minsky's "Society of Mind" style.

Machine Learning

A great deal of work has gone into technologies for classification, pattern discovery and recognition and related areas. Many of these are superior to human abilities in some areas, particularly in areas outside of human sensory experience, or requiring far more data than humans can possibly apprehend.

A variety of useful techniques are outlined here by way of example and not limitation. A machine learning module or interface may, for example, encapsulate neural networks, classifiers, Hidden Markov Models and other probabilistic models, "deep learning" networks, recurrent neural networks, convolutional neural networks and so forth. Such modules may have the same general design as other neural processing system long-term memory modules: input signals may correspond to multiple features either concurrent or in sequence, with durable IDs and values proportional to strength/confidence; output signals have IDs of possible matching patterns/classes/states/predictions, again with values proportional to confidence/strength/likelihood.

Training of these memory systems can happen in several ways. In one aspect, a parameter can provide a training data set which is used live to train the model during the module's start( ) function. In another aspect, a pre-trained model in a file can be loaded at start( ) time; the module can provide a save( ) function to save its current model state in a file for subsequent reuse. A training data set can also or instead be provided via an input module (e.g., file read) or other source, which runs once the application is running.

The module can learn continuously from one or more sources.

Miscellaneous Modules
User Interface

Anticipated use of envisioned neural processing systems, especially during application development, involves user interaction: providing input data, showing activity and results of processing. Many possibilities may enrich both development and applications.

For example, a neural process design may include a drawing input module that permits direct graphical input in any suitable form. According to a particular application, this may accommodate free-form drawing of shapes, or drawing in a structured environment such as letter/word recognition, a musical scale, a time-based graph, a frequency-based graph, and so forth. In another aspect, a user interface module may provide a web page output that provides results in a convenient and universal format such as HTML. In one aspect, this may include output of a static web page at any suitable time or in response to any suitable event. In another aspect, this may include the creation of a dynamic web page that updates during execution of a neural circuit. In another aspect, a user interface module may support multi-dimensional graphing with control over style, color, rotation or the like.

In another aspect, an output module may provide navigational output including, for example, device specific navigation output (e.g., raise aileron two degrees) or device independent output (e.g., turn five degrees left, slow down fifty percent, head magnetic 273 degrees, etc.). In another aspect, an output module may provide a video or virtual reality output such as an output that simulates a context for a robot using three-dimensional models or other contextual information, or an image or video output for same. In another aspect, the output may combine, e.g., video output and virtual output to provide an augmented reality display of, e.g., a physical context for a robot or other remote device, which may be a manually operated device, an autonomous device, or a computer-assisted manually operated device.

In one aspect, a user interface module may provide any suitable visual composition of relevant information, controls, sensor data, and so forth. This may, for example, support a user interface front end that binds neural graph parameters to input controls, output displays to screen regions or windows, etc. A custom design-time GUI may also be provided to configure the user interface and bindings of controls/regions to event IDs, parameters and module ports.

Environment Simulators

A great deal of research lies ahead in the area of learning of an (artificial) organism's capabilities to interact within an environment. This may be enhanced by modules that embody simulated environments from simple 2D grids to artificial worlds complete with physical properties like weight and gravity and other agents. Simulated senses may deliver input signals related to the current state and changes in the environment. Simulated actuators may control the artificial organism's actions within the environment.

Planners

Artificial intelligence planning technologies typically operate on a graph of states and state transitions including measures of distance/cost, an initial state, and a goal state. The output is a plan, which is a list of state transitions to take, or possibly a set of plans with associated costs. Parameters can include additional policies like minimizing the number of nodes visited. Often systems like robots do continuous re-planning, generating new plans as actions are taken and costs vary dynamically (e.g., responding to live traffic congestion or battle casualties).

In envisioned neural processing systems, a plan could be a sequence of state nodes to visit, similar to reifying a known sequence pattern. A module may encapsulate an existing planner capability, an output port of which would deliver such a sequence. The inputs to the planner module might include the current state and the goal state. The map would be represented in a pattern memory space whose identity is a module parameter. Many representations of maps are possible. One useful representation that works naturally in envisioned neural processing systems records each state node as a synonym set pattern with an ANY/OR match scoring curve. All state nodes that can directly reach a state node are the members of this set. So, if nodes B, C and D can all reach node A directly, then A is a set pattern with a synonym semantic with input features B, C and D. The weight of each input feature in the set is inversely proportional to distance/cost to get from that node to the target node: higher weights mean "closer". An encapsulation of a planner would convert this entire memory pattern space into the appropriate representation needed by the planner, which would run and produce a plan which is output from the module as a sequence of signals of nodes to visit.

Simultaneous localization and mapping (SLAM) is an integrated robotic method to incrementally build and modify a map and estimate a robot's position on a map. One simple encapsulation of SLAM may be as an internal capability to a robotic location module, with output signals specifying a probability distribution as a matrix of probability values corresponding to a map grid.

External Data

A considerable amount of data to be processed in neural processing system applications may reside in external repositories including without limitation databases, documents and document repositories, file systems, web sites and the like. Modules may obtain such information by querying or searching such external repositories, and may create, modify and delete information in such repositories.

A database query module may have parameters specifying database identity, query specification, query results limitations, query results delivery signal encoding. Input signals may provide variable data to be used in queries, submitting a new query for each new input signal sets. Outputs may be signals corresponding to query results, for example a signal identity corresponding to a query result column name and a value encoding a query result row value for a column.

A module for XML document querying may perform similar query operations on XML-formatted documents. Input signals may provide variable data for query specifications. Parameters may include XML query or similar expressions (e.g., XQuery, XSLT) with embedded variables to be filled in from input signals. Output signals may encode query results, for example personal names extracted from one or more XML documents.

A database update module may have parameters specifying database identity and update/insert/delete specifications. Input signals may provide variable data to be used to update or delete existing database records or insert new records.

A search module for searching documents, document repositories, web sites, file systems and the like may submit concurrent search terms to a search engine and output signals representing found items in order of return or preferential order with signal values representing search criteria matching confidence. Such modules may have parameters specifying the repository, location or extent of the corpus to be searched, to control the search strategy or search engine, and to control results caching. Input signals may provide variable search terms, optionally with signal values indicating importance of each term to searching.

A URL (web Universal Resource Locator) module may locate and return web pages and/or web page contents with optional filtering, parsing and post-processing. Input signal IDs may be URLs or parts of URLs or search terms. Parameters may specify filtering, parsing, routing of page contents and references of different types to multiple output ports and output signal timing.

External Devices

Numerous available devices provide collections of sensors and actuators generally useful to cognitive systems research and commercial applications. These may include without limitation Microsoft® Kinect®, Lego® Mindstorms®, Arduino and other electronic prototyping systems, robotic devices especially those accessible through Robotic Operating System (ROS) interfaces, building and vehicle sensor and control systems Modules may encapsulate some or many interfaces to these devices.

A module for interfacing to a Microsoft Kinect may offer multiple output ports for delivering different kinds of signals, including RGB light intensity frames, depth sensor frames, skeletal tracking frames, audio signals, speech recognition outputs, such signals having matrix values and or sequences of values as appropriate. Module parameters may specify frame rates, speech lexicon and vocabulary files, feature enablement and other Kinect parameters. Inputs may include signals to control motorized tilt mechanism and possibly set dynamically adjustable parameters like frame rates and sensor enablement.

A Lego Mindstorms system offers a variety of included and add-on robot hardware components. A module for interfacing to a Mindstorms system may provide input ports to deliver data and control signals to a Mindstorms robot including messages for an LCD screen on the robot block, various regulated and unregulated motor controls for speed, position, acceleration, power. Output signals may correspond to inputs from a variety of sensors: proximity/distance, GPS, color, touch, pressure, gyroscope. ultrasonic, infrared, magnetic, compass, color, light, sound, temperature, image, motion, etc. Module parameters may specify feature enablement and other parameters.

An envisioned neural processing system may include modularity engineered to support multiple alternative operating modes of a Lego Mindstorms robot: on-board (e.g., neural process applications running locally in the robot), remote (neural process applications running on another computer communicating via WiFi/Bluetooth/etc. to an operating kernel on the robot), and distributed (both central control to multiple robots, and peer-to-peer interaction among robots). The data-flow nature of neural process applications makes it possible to create a single application, parts of which may operate on different machines (such as individual robots, centralized controller/cognitive functions) with communications links.

One module instance may control or interface to one robot unit, either locally (i.e., neural process applications running on-board) or remotely (via communications like BlueTooth, WiFi, etc. There may be separate modules for sensor-side and output-side functions. Distinct assignable ports for different sensors, robot controls. Multiple module instances in a graph may share the same robot instance.

Robotic Operating System

The Robotic Operating System (ROS) is an open-source platform that provides a general-purpose publish/subscribe model for message passing among robotic components like sensors, actuators and processing. A node (independent process) can subscribe to a topic and a node can publish to a topic. Message formats are topic specific.

A great many useful components are accessible via ROS. ROS modules for neural processing systems would provide access to various ROS services and components without custom programming. In general, a ROS input module would subscribe to one or more ROS topics, receive messages on those topics, and parse/convert them into appropriate neural processing system signals. A ROS output module would publish to one or more ROS topics, converting neural processing system signals into ROS messages appropriate to those topics. A ROS processing module would receive neural processing system signals, publish ROS messages for them to invoke ROS processing services, listen for other ROS messages on appropriate topics, and convert those messages into appropriate neural processing system signals.

It will be clear to those skilled in the arts that future possible neural processing system module types described herein are meant as non-limiting examples, and a great many more modules of similar purposes are contemplated herein.

Intelligent Applications

The neural processing system paradigm advantageously facilitates the use of neural graphs 110 in a wide range of industrial and commercial applications with only minimal effort. In the following discussions, the terms "NeurOS" and "NeuroBlocks" refer to embodiments of a neural processing system 100 and neural processing modules 120, respectively.

For example, a neural graph may be used in a robotics system, where the circuit may be used to control a robotic arm, gantry, vehicle, or other devices. The circuit may for example receive sensory input from imaging devices, motion sensors, thermometers, or any of a variety of transducers, and generate suitable control signals for operation of the robot.

The neural circuit may also or instead be used in an analytics platform. For example, the circuit may be employed in a marketing analytics context for use in pattern recognition, machine learning, and so forth. More generally, one or more neural circuits may be used with a sensor platform of any type, Internet of Things applications and devices, industrial applications, commercial applications, data processing systems (such as data integration systems and the like), data storage systems, data warehousing systems, decision support systems, classification systems, health care record management systems, and the like. The system may be employed to provide a variety of analyses such as linear regression or other statistical analysis, principle component analysis, nearest neighbor analysis, and so forth.

Still more generally, neural processing systems as envisioned herein are an enabling technology to systems for a wide variety of purposes including stand-alone cognitive processing applications and integration with physical systems. The technology enables any system involving zero or more elements of input/sensing; output/action; processing; learning and recognition and generation of patterns; rapid design iteration; dynamic adjustment of parameters and processing flow.

Embodiments can be used anywhere one could imagine a human or animal or collection of humans or animals, with biological-like or machine sensors and actuators, might be employed: biological, cognitive capabilities for learning, including continuous learning, complex spatio-temporal pattern recognition, fusion across domains, reasoning, puzzle-solving, decision-making especially in the absence of complete information, multiple solution generation, etc. This would include environments where no actual humans could ever be used, such as "inside" the internet, "in" buildings and mobile vehicles, physically dangerous environments. And it is especially useful in contexts where no human could possibly cope with the breadth and/or scope and/or speed or variety of information.

Neural applications as envisioned herein are also inherently useful in situations where multiple things are going on concurrently: multi-tasking, needing to be flexibly responsive to a broad range of external events in arbitrary order and integrating them with on-going internal processes.

A collection of input processing modules composed to interact with each other may produce functions similar to those of the human brain, wherein the modules are collectively capable of accepting multiple events that are of heterogeneous type and that arrive in an arbitrary order.

A collection of pattern processing modules of distinct functional capability may be composed to perform human-like learning in response to inputs of heterogeneous type. In one aspect, the modules may be adapted to make cognitive errors, logical mistakes, or omissions similar to those made by a biological brain. For example, modules, sub-graphs, or sub-assemblies may maintain uncertainty in the face of optical illusions, make common errors about the probability of events, make common deductive reasoning errors, and the like.

The technology may not in all cases be superior to sharply targeted implementations for solving particular static problems: it will generally be possible to craft a "rifle shot" custom solution that is superior in performance, energy usage, size, etc. The technology is best suited, as are people, for areas where problems are loosely defined, loosely bounded and need to evolve to address new information, new circumstances, new situations, new needs, where it is important to be able to apply prior training and experience.

It may be possible to build systems for the various uses surveyed here without using the neural processing system technology as described herein. However, such systems built with neural processing system technology may be superior in numerous ways to those built with alternative technologies:

The functional power of neural processing system applications as contemplated herein derives in large part from the synergy of combination of composable modules. Modules add external interfacing and internal functionality.

Thanks to the dataflow architecture of neural processing specifications as described herein, individual applications (neural graphs or circuits) may function without redesign on single processors, multi-processors, homogeneous and heterogeneous distributed systems. For example, a distributed robotic system could involve parts of a neural processing application running on each of multiple robots as well as on remote hosts, including robust operation even with partial communications failures. A distributed "network mind" application could involve multiple computers for both processing and resource scalability as well as robustness to failures.

Neural processing system applications are easy to build and test and customize, with rapid design iteration and strong modularity that allows piecemeal development and integration. Neural processing system applications can even be modified while running. NeurOS applications can easily be built to be adaptive to changes: environment, wear and tear, goal shifts, resource availability, etc. Neural processing system applications can easily handle large numbers of concurrent inputs and learn and detect multi-dimensional patterns. Neural processing system applications can function as both whole solutions or in easy combination with other technologies. The high reuse and combinability of a large and growing set of general-purpose and specialized modules simplifies and accelerates development, enabling an incremental approach to attacking requirements.

In general, neural processing systems as described herein may be employed at many different levels of application development. This may, for example, include the use of a neural processing system to directly build specific applications. This may also or instead include the use of a neural processing system to build customizable capabilities (e.g., value-added resellers, independent software vendors, consulting practices). This may also or instead include the use of a neural processing system to build generic capabilities which are themselves incorporated in other products (e.g., language processing, pattern discovery). Neural processing system application areas may be thought of in several broad non-exclusive categories: monitoring, control, analysis, assistance and miscellaneous.

A collection of pattern processing modules of distinct functional capability may be composed together to perform complex spatio-temporal pattern recognition.

A collection of computer-based pattern processing modules of distinct functional capability may be composed together to solve a game/puzzle in a human-like fashion.

In another aspect, a neural circuit may be useful in a variety of monitoring tasks. For example, this may include complex system monitoring for recognized or anomalous patterns. This may also or instead include environmental monitoring of any sort including environment in the specific sense (air purity, pollutants, water purity, etc.) and environment in the general sense of any measurable quantity in an environment (temperature, humidity, etc.). Monitoring may also be coupled with any suitable control system for generating appropriate outputs based on one or more monitored quantities.

In another aspect, a neural circuit may be used for building monitoring. This may include monitoring and/or control for comfort (e.g., temperature, humidity), safety (e.g., intrusion detection, smoke, fire, carbon monoxide), information (e.g., by operation of automated visual or auditory alerts when someone enters or leaves a location, news updates, calendar reminders and so forth), or entertainment, any of which may be provided in a home or work environment. In another aspect, this may include monitoring of an industrial environment for process control, quality, efficiency, utilization, and so forth. Similarly, vehicles may be monitored for comfort, safety (e.g., proximity alerts, poor driving conditions, safety) or entertainment of individual passengers, or for management of a fleet such as departure times, arrival times, capacity, fuel, etc.

In a health care context, neural circuits may be used for in-home or in-hospital patient monitoring. For example, pattern matching may be used to recognize onset of a serious condition such as a seizure or heart attack, or to monitor body temperature, sleep patterns, or other events relevant to patient health. In another aspect, output signals such as instructions to take medication, change a dressing, or the like may be provided. More generally, anywhere that detectable patient conditions can be used to drive actionable recommendations, a neural circuit may be usefully employed, and may be augmented with relevant patient history or medical information where helpful (and as authorized or appropriate under any relevant HIPPA or other privacy constraints).

In another aspect, a neural circuit may be usefully employed anywhere that pattern detection is helpful. This may, for example, include detecting financial fraud, detect network security breaches, detecting geological disturbances, and so forth. Neural circuits may be usefully employed for example, in predictive maintenance applications, surveillance (e.g., intrusion detection, face recognition), person and vehicle tracking, network threat detection, network traffic congestion monitoring, vehicle traffic congestion monitoring, digital rights management applications such as copyright/intellectual property violation detection, sound or music recognition, image recognition, system integrity, industrial process monitoring, vehicle systems monitoring, fraud based on, e.g., credit card usage patterns, financial transaction patterns, and so forth. Other potential applications include enterprise operational monitoring such as monitoring of sales channels, distribution channels, sourcing, manufacturing, rework, inspection, and so forth.

A neural circuit may be usefully employed in a variety of control contexts including any context where elements of monitoring are combined with any action or output abilities. Here, pattern recognition capabilities are certainly relevant, and may be enhanced by feedback and experience-based learning. Possible control applications include machine control, autonomous robot or vehicle control, assistive vehicle control, multi-agent monitoring, coordination and control (e.g. groups of robots, teams of people like emergency responders), real-time pricing, and enterprise operational control (e.g., distribution planning, route planning, factory optimization, load balancing, energy management).

A neural circuit may also or instead be used in a variety of environments to detect and mitigate dangers. For example, a neural circuit may be used in threat response and neutralization to anticipate undesired affects and shut downs, rerouting, raising barriers, imposing quarantines, backing things up, notifications, pre-positioning response resources (e.g., hurricane preparedness), and so forth. The neural circuit may more broadly be used for analysis and diagnosis in contexts such as medical diagnosis, malfunction diagnosis, relationship navigation and discovery, predicting faults, failures, or threats, predicting chemical and physical properties of chemical compositions, predicting consequences of complex system changes like weather, environment, predicting effects of genomic changes, predicting effects of drugs, discovering patterns in data, continuous new-pattern discovery and pattern activity trend monitoring (e.g., declining/growing diseases, fraud, weather), computer virus and other malware detection; frequent learning of new virus patterns, and so forth.

A neural circuit may also be used as an assistance tool. For example, the circuit may be used for personal assistance characterized by interactions between an application and a particular person. The application may start with general capabilities in an area and access (e.g., via networking) to more extensive capabilities. It must learn and adapt to the needs, habits, goals and personal considerations of the person, generally with minimal explicit training and a great deal of observation and interaction. Similarly, a personal digital assistant may be realized, especially with dynamic distribution of function among personal devices and the cloud.

Other possible applications include mail sorting, filtering and auto-responding, language understanding, translation, generation, teaching (where a circuit can adapt to students' abilities, progress), prosthetic control, especially adaptive, human interaction, assisted design of various kinds such as by applying conventions, styles, auto-completion, auto-(re) organization, expert assistance, planning, continuous replanning, emergency response/crisis planning and continuous replanning, locations and capabilities of assets, continually updating routes, capacities, and so forth, as well as anything more generally involving continuous adjustments of and to current conditions.

A variety of other applications are possible. A neural circuit may be used to solve puzzles. A neural circuit may be used for any form of deductive or inductive reasoning. A neural circuit may be used for legal research. A neural processing system may be used as a self-learning system that learns about its capabilities (abilities to interact) and environments, either autonomously or with supervision/teaching. The neural processing system may be used in a self-learning system that adapts to wear and tear, environmental influences, energy fluctuation, damage, and so forth. A neural circuit may be used to train systems such as by replicating multiple instances of a system after learning. A neural circuit may be used for distributed learning, such as where multiple instances of a system are networked together, with the learning from each system integrated into the whole. A neural circuit may be used for robotic learning and behavior—via Lego MindStorms, Robotic Operating System, custom robot interfaces—both on-board robots, via radio control, via distributed operation via radio in either a central-controller way or a distributed "swarm" way or both. The dataflow architecture of neural processing specifications allows distribution this way.

Other applications in finance, the "Internet of Things", food production, animal monitoring, and other environments will be readily apparent. For example, neural circuits may be usefully employed in a variety of energy contexts such as for power generation monitoring, offshore wind farm maintenance, remote solar monitoring, pipeline and oil production monitoring, energy production systems, solar array positioning, wind power positioning, and so forth.

Pattern recognition capabilities of a neural circuit may be employed for predicting faults, failures, threats, and the like, such as by predicting chemical and physical properties of chemical compositions or predicting consequences of complex system changes like weather and the environment. This may include prediction of severe weather events such as tornadoes, hurricanes (or hurricane paths), earthquakes, volcanic eruptions, and so forth.

Other applications for predictive neural circuits include circuits for prediction, e.g., productive store locations. productive product placement in a retail outlet, pricing, advertisement targeting, market positioning, and the like.

Neural circuits may also be used for a variety of simulations, particularly simulations of human behavior or simulations of human cognitive activity.

Possible legal research applications of a neural circuit include various types of prediction, pattern recognition and the like such as reasoning under incomplete facts, prediction of litigation outcomes, prediction of appellate outcomes, simulation of jury decision-making, prediction of counter-party behavior in transactions, and so forth.

A neural circuit may also be usefully employed in a variety of devices that monitor usage or respond to external conditions including, without limitation, wearable/sensor-enabled devices, health monitors, performance monitors, end point sensor networks, and for adaptation of systems to wear and tear, environmental influences, energy fluctuation, damage, and so forth.

Other possible applications for a neural circuit include providing intelligence at end points on sensor-enabled devices, sensor pattern recognition, text recognition, and so forth.

In another aspect, a neural circuit may be usefully employed for finance-related activities such as prediction of securities prices, market pattern recognition, new pattern discovery, crash prediction, recognition of critical shift conditions, and so forth. Similar predictive functions may be usefully performed in the context of sports, weather, medicine (e.g., epidemiology or disease progression), and so forth.

Still more generally, the technology enables any system involving zero or more elements of input/sensing; output/action; processing; learning and recognition and generation of patterns; rapid design iteration; dynamic adjustment of parameters and processing flow. NeurOS can be used anywhere one could imagine a human or collection of humans, with human-like or machine sensors and actuators, might be employed: human-like capabilities for learning, including continuous learning, complex spatio-temporal pattern recognition, fusion across domains, reasoning, puzzle-solving, decision-making especially in the absence of complete information, multiple solution generation, etc. This would include environments where no actual humans could ever be used, such as "inside" the internet, "in" buildings and mobile vehicles, physically dangerous environments. And it is especially useful in contexts where no human could possibly cope with the breadth and scope and speed of information.

Numerous other use cases are possible. For example, a neural circuit may be deployed as a purpose-specific application for any of the applications contemplated herein. Neural circuits may enable value-added consulting practices. In another aspect, neural circuits may enable generic capabilities such as language processing, pattern discovery, ecosystem/value chain applications, Systems Integration/Relationship, robotics, analytics, pattern recognition, machine learning, sensor platforms, data integration, data storage, decision support, and so forth.

Figure 37:
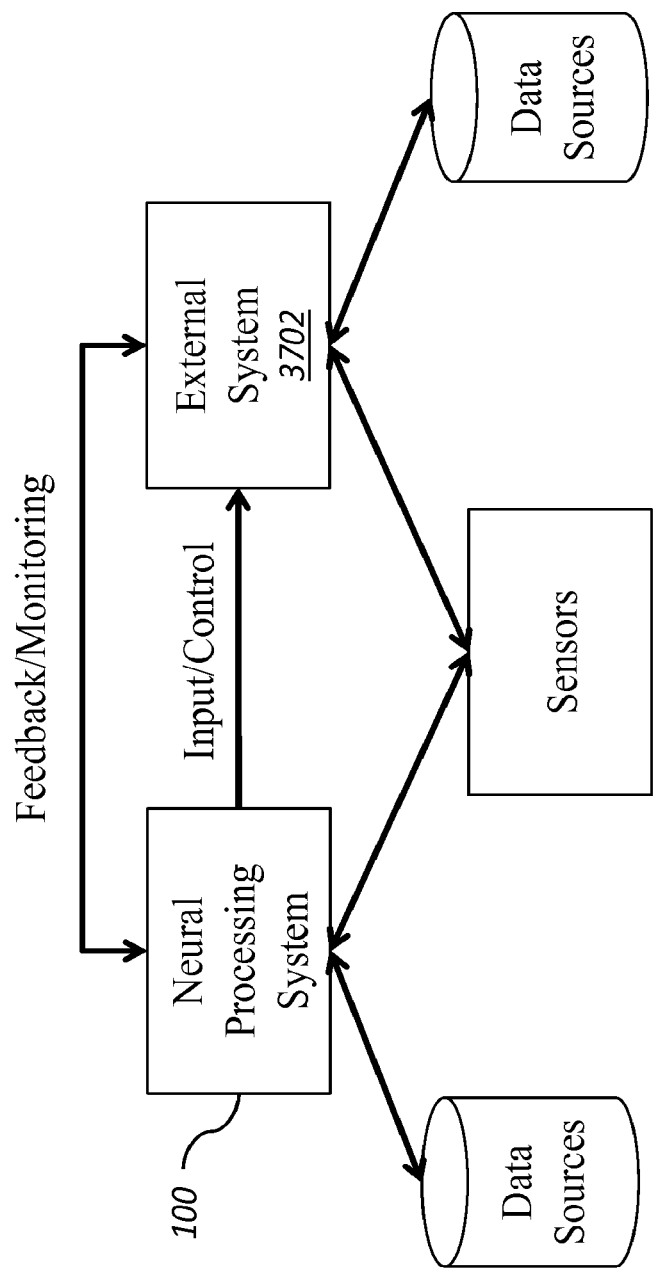
FIG. 37 shows a neural processing system providing monitoring, input and/or control to an external system.

FIG. 37 depicts an embodiment in which the neural processing system 100 provides monitoring, input and/or control to an external system 3702, optionally including feedback from the external system 3702. A very wide range of external systems 3702 are possible, including various systems that require some form of intelligent monitoring and/or control. It should be noted that embodiments with multiple external systems associated with a single neural processing system 100 and/or multiple neural processing systems 100 with a single external system may be contemplated (but are not shown).

Figure 38:
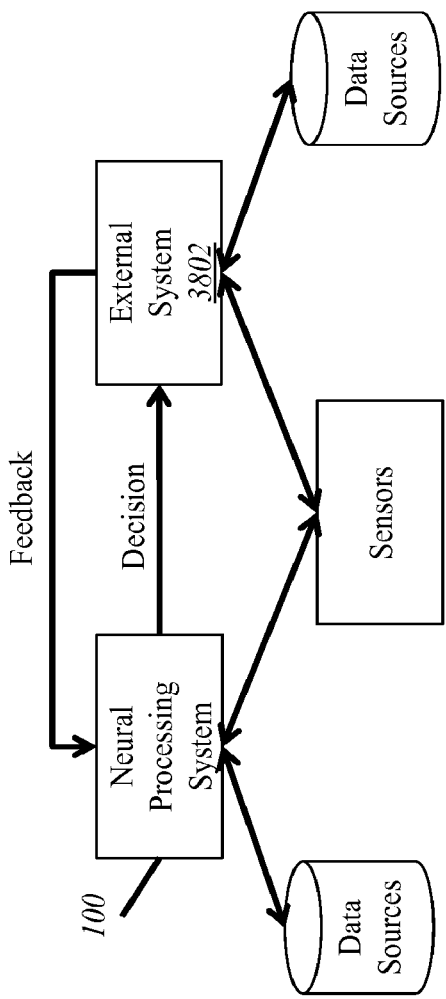
FIG. 38 shows a neural processing system providing a decision to an external system.

FIG. 38 depicts an embodiment in which the neural processing system 100 provides a decision to an external system 3802, optionally including feedback from the external system 3802. A wide range of such external systems 3802 are possible, including various systems that make decisions or take decisions as inputs.

Figure 39:
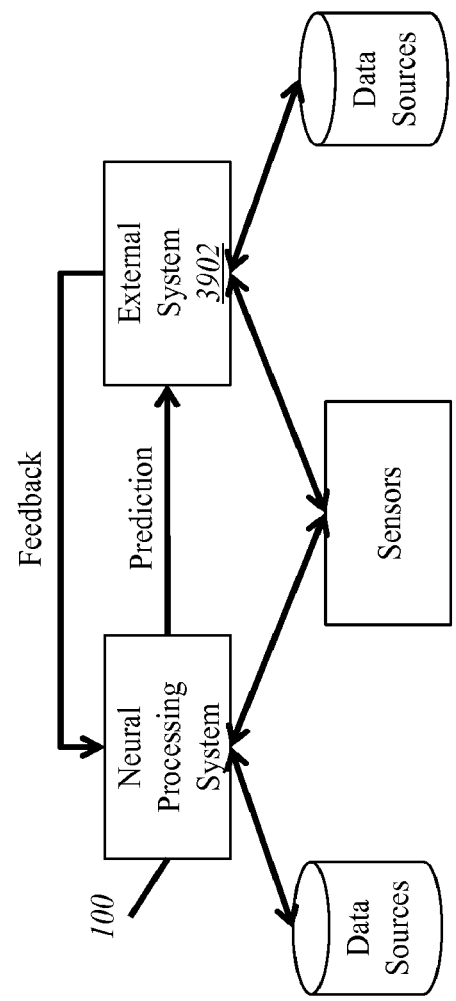
FIG. 39 shows a neural processing system providing a prediction to an external system.

FIG. 39 depicts an embodiment in which the neural processing system 100 provides a prediction to an external system 3902, optionally including feedback from the external system 3902. A wide range of such external systems 3802 are possible, including various systems that make predictions or take predictions as inputs.

Various embodiments of interactions with a neural processing system 100 according to the present disclosure may be used in conjunction with various types of external systems, providing input to, taking input and/or feedback from, monitoring, controlling, and otherwise interacting with and/or being integrated with such external systems, examples of which are provided below. Each such embodiment may involve integration of the neural processing system 100 into the external system, local connections or interfaces, or more broadly distributed interfaces or connections (e.g., via the Internet, via data integration systems, via the cloud, or the like). The various embodiments, taking forms similar to those described in FIGS. 37 through 39, may take a wide variety of inputs from various sensors of heterogeneous types, such as taking in sensory input similar to a biological brain, like sounds for auditory sensing, light for visual sensing (and including more generally microwave, UV, IR and other portions of the electromagnetic spectrum beyond the visible, as modules and the like are not constrained to the same limitations as a biological eye), chemical and particle sensors for functions like taste and smell, thermal, weight and pressure sensors and the like for touch, and taking in a broader range of machine-sensible inputs. Sensors may include higher-level sensors, such as functional sensors that use or take advantage of one or more underlying chemical, biological and physical sensing capabilities, such as, motion sensors, accelerometers, electrical sensors (e.g., voltage, galvanic skin response, current), smoke sensors, specific chemical sensors (e.g., carbon monoxide and ozone among many others), sensors for "sniffing" explosives, sensors for detecting cells (e.g., pathogens), and many others. The inputs to the neural processing system 100 and/or an external data source may also include various data sources, such as databases, libraries, and other repositories, containing information of many types, including information generated by or about the applicable external system or systems and information from separate sources, such as data sources reflecting the outputs of various models (economic models, weather models, financial forecasting models, sports performance models, compensation models, behavioral models and many others), data sources reflecting activities or states of devices (e.g., mobile devices and end-point devices in the "Internet of Things"), and data sources containing various measures, metrics and statistics (economic statistics, behavioral statistics, biological statistics, physical properties, chemical properties and many others). Sensors and data sources may be integrated into or with the neural processing system 100, the external system, or both, or may be distributed. Thus, the neural processing system 100, in distributed sensor embodiments, may enable providing cognitive capabilities to sensor-enabled devices or collections of devices (e.g., mobile computing devices, industrial assets, and a wide range of end-point devices) in the Internet of Everything.

Figure 40:
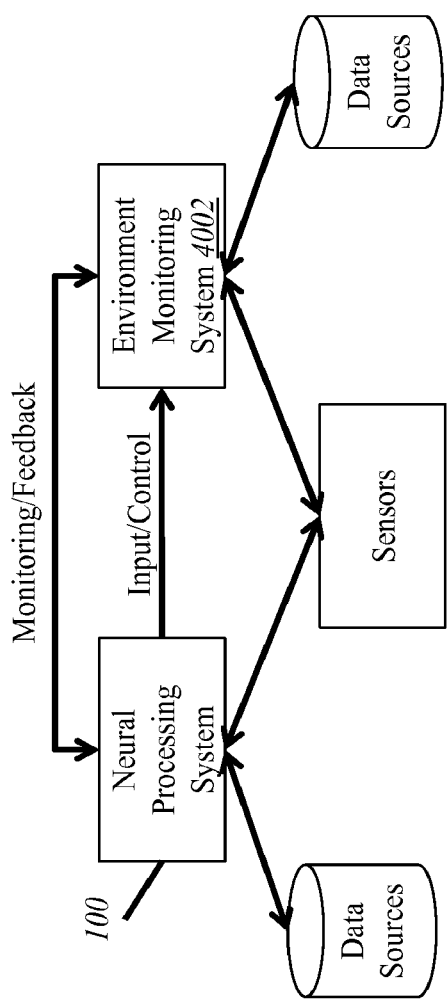
FIG. 40 shows a neural processing system providing monitoring, input and/or control to an environmental monitoring system.

FIG. 40 depicts an embodiment in which the neural processing system 100 provides monitoring, input and/or control to an environment monitoring system 4002, optionally including feedback from the environment monitoring system 4002. The environment monitoring system 4002 may monitor a farm, a building, an intensive care environment, an energy production environment, a manufacturing environment, and the like. The system 4002 may include or be communicatively coupled with sensors such as temperature sensors, pressure sensors, and the like. The system 4002 may retrieve information from data sources such as about weather, humidity, pollution levels, oxygen content, carbon content, and the like.

Figure 41A:
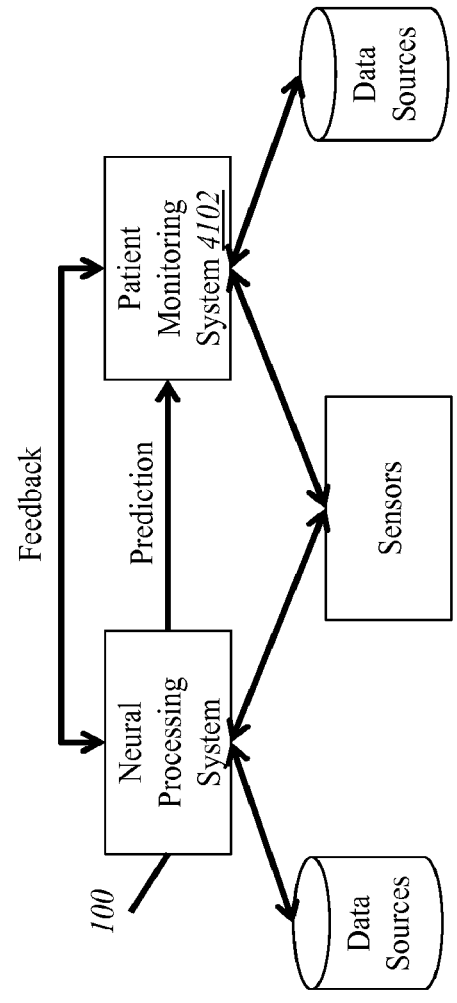
FIG. 41A shows a neural processing system providing a prediction to a patient monitoring system.

FIG. 41A depicts an embodiment in which the neural processing system 100 provides a prediction to a patient monitoring system 4102, optionally including feedback from the patient monitoring system 4102. The patient monitoring system 4102 may monitor a patient, a hospital setup, medical devices associated with a patient, different accessories in a hospital, patient recovery rate, and the like. The patient monitoring system 4102 may include or be coupled to sensors such as glucose monitors, blood sugar sensors, cardiac activity detector, and the like. The system 4102 may retrieve information from data sources such as about patient cardiac activity, patient medical records, electronic medical records, health records, medical tests and checkups, device data, medical labs, and the like.

Figure 41B:
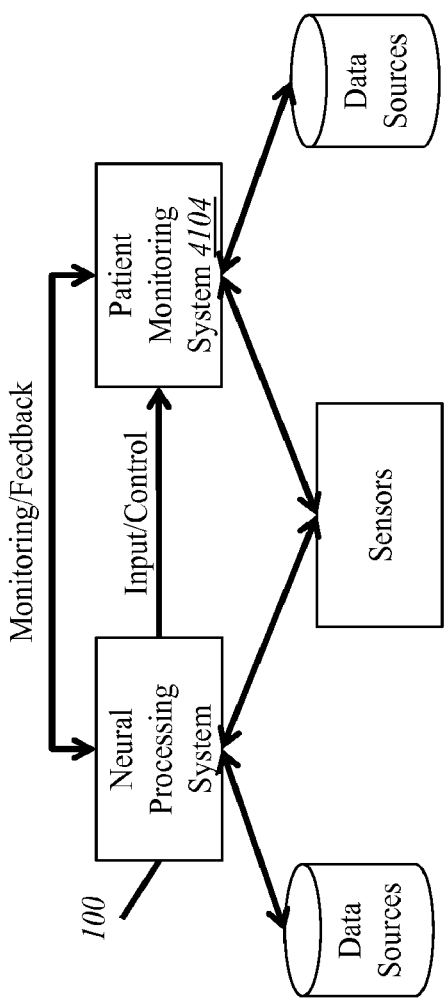
FIG. 41B shows a neural processing system providing monitoring, input and/or control to a patient monitoring system.

FIG. 41B depicts an embodiment in which the neural processing system 100 provides monitoring, input and/or control to a patient monitoring system 4104, optionally including feedback from the patient monitoring system 4104. The patient monitoring system 4104 may monitor a patient, a hospital setup, medical devices associated with a patient, different accessories in a hospital, patient recovery rate, and the like. The patient monitoring system 4104 may include or be coupled to sensors such as glucose monitors, blood sugar sensors, cardiac activity detector, and the like. The system 4104 may retrieve information from data sources such as about patient cardiac activity, patient medical records, electronic medical records, health records, medical tests and checkups, device data, medical labs, and the like.

Figure 42:
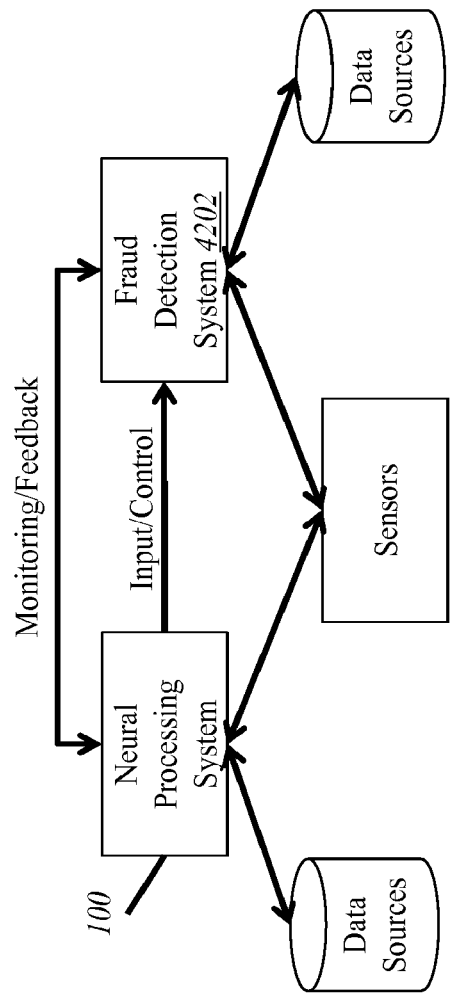
FIG. 42 shows a neural processing system providing monitoring, input and/or control to a fraud detection system.

FIG. 42 depicts an embodiment in which the neural processing system 100 provides monitoring, input and/or control to a fraud detection system 4202, optionally including feedback from the fraud detection system 4202. The fraud detection system 4202 may monitor fraudulent calls, fraudulent payments, fraud signatures, fraudulent behavior, customer transactions, cyber threats, and the like. The fraud detection system 4202 may include or be coupled to sensors such as data sensors, transaction monitors, forensic sensors, and the like. The fraud detection system 4202 may retrieve information from data sources such as transaction records, emails, data backups, data mining sources, customer transaction history, consumer records, purchasing cards, forensic accounts, and the like.

Figure 43:
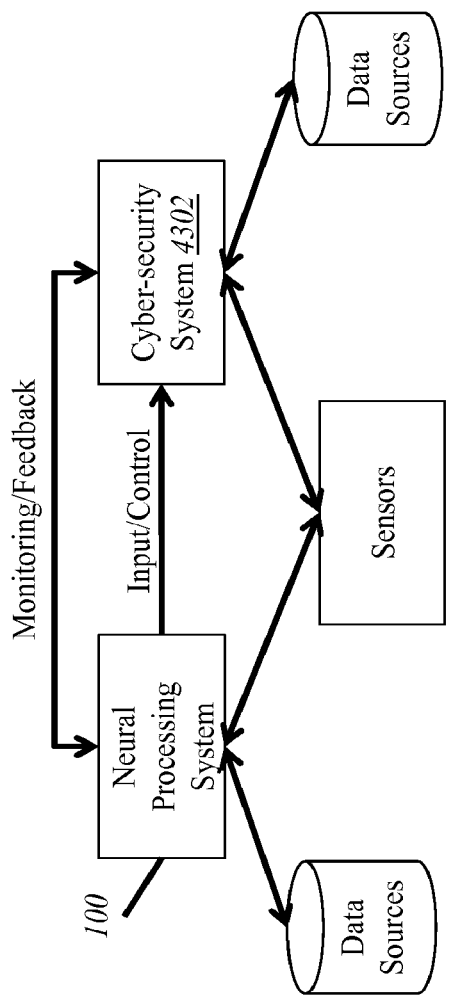
FIG. 43 shows a neural processing system providing monitoring, input and/or control to a cyber-security system.

FIG. 43 depicts an embodiment in which the neural processing system 100 provides monitoring, input and/or control to a cyber-security system, optionally including feedback from the cyber-security system 4302. The cyber-security system 4302 may monitor information sources, databases, computing devices, private and public networks, internet, smart phones, computers, and the like. The cyber-security system 4302 may include or be coupled to sensors such as firewalls, anti-virus, access control devices, intrusion detection systems, and the like. The cyber-security system 4302 may retrieve information from data sources such as logs, access information, code reviews, audit trails, and the like.

Figure 44:
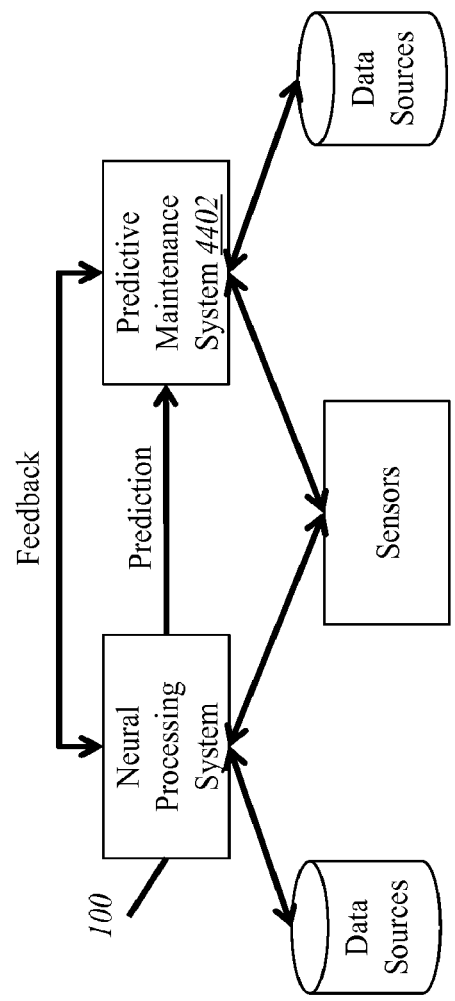
FIG. 44 shows a neural processing system providing a prediction to a predictive maintenance system.

FIG. 44 depicts an embodiment in which the neural processing system 100 provides a prediction to a predictive maintenance system 4402, optionally including feedback from the predictive maintenance system 4402. The predictive maintenance system 4102 may monitor plants, equipments, mining sites, acoustics, vibrators, heavy machines, construction sites, buildings, and the like. The predictive maintenance system 4402 may include or be coupled to sensors such as equipment condition detectors, wireless sensors, distributed control systems, non-destructive testers, sound detectors, vibration sensors, and the like. The predictive maintenance system 4402 may retrieve information from data sources such as maintenance data, performance records, specifications, failure data, and the like.

Figure 45:
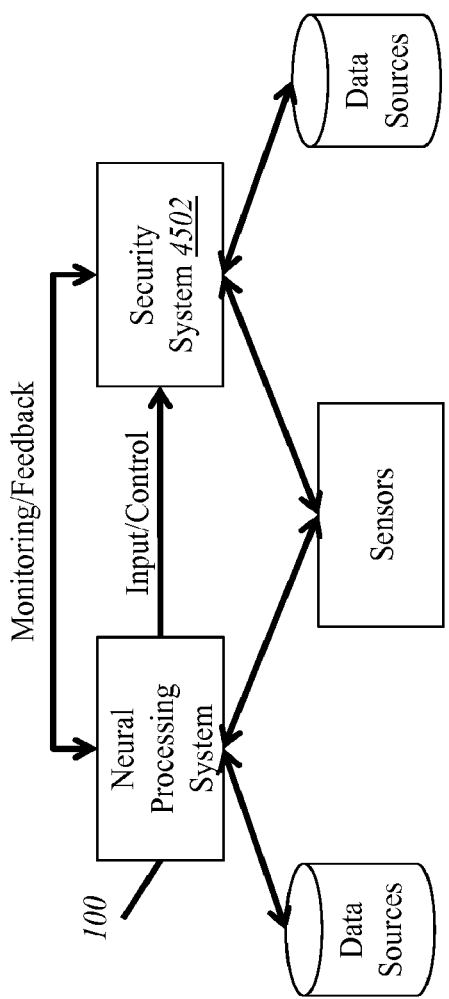
FIG. 45 shows a neural processing system providing monitoring, input and/or control to a security system.

FIG. 45 depicts an embodiment in which the neural processing system 100 provides monitoring, input and/or control to a security system 4502, optionally including feedback from the security system 4502. The security system 4502 may monitor intrusions, unauthorized entry, residential complexes, commercial complexes, industrial and military properties, personal property, vehicles, prisons, and the like. The security system 4502 may be coupled to or may include sensors such as television surveillance devices, access control systems, alarms, noise sensors, microwave detectors, ultrasonic detectors, photo sensors, smoke heat and carbon monoxide detectors, glass-break detection systems, vibration or inertia sensors, magnetic field detectors, microphonic systems, and the like.

Figure 46:
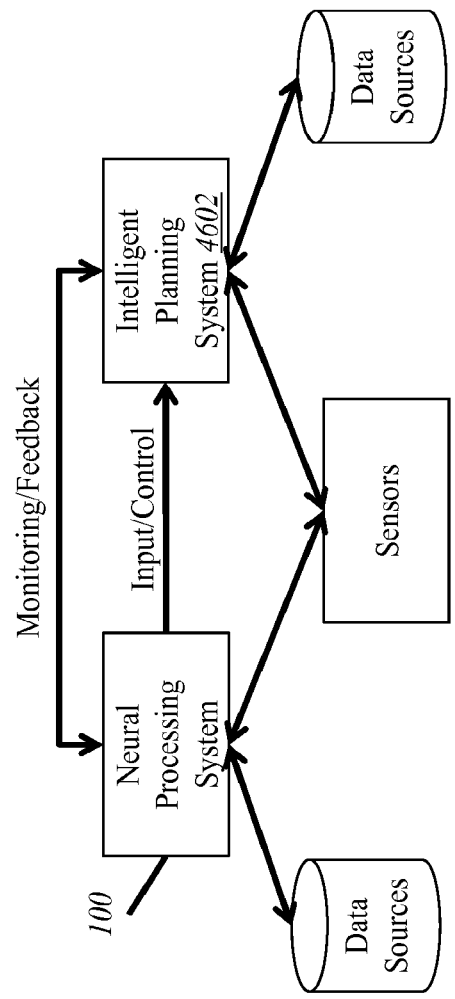
FIG. 46 shows a neural processing system providing monitoring, input and/or control to an intelligent planning system.

FIG. 46 depicts an embodiment in which the neural processing system 100 provides monitoring, input and/or control to an intelligent planning system 4602, optionally including feedback from the intelligent planning system 4602. The intelligent planning system 4602 may monitor industrial complexes, manufacturing units, construction sites, hospital premises, assembly lines, space centers, and the like. The intelligent planning system 4602 may be coupled to or may include sensors and automated systems such as machine learning systems, robots, intelligent agents, unmanned vehicles, artificial intelligence enabled devices, optimization tools, remote sensors, and remote controls, scheduling system, and the like. The intelligent planning system 4602 may retrieve information from data sources such as strategy documents, scheduling resources, planning resources and data, ERP databases, and the like.

Figure 47:
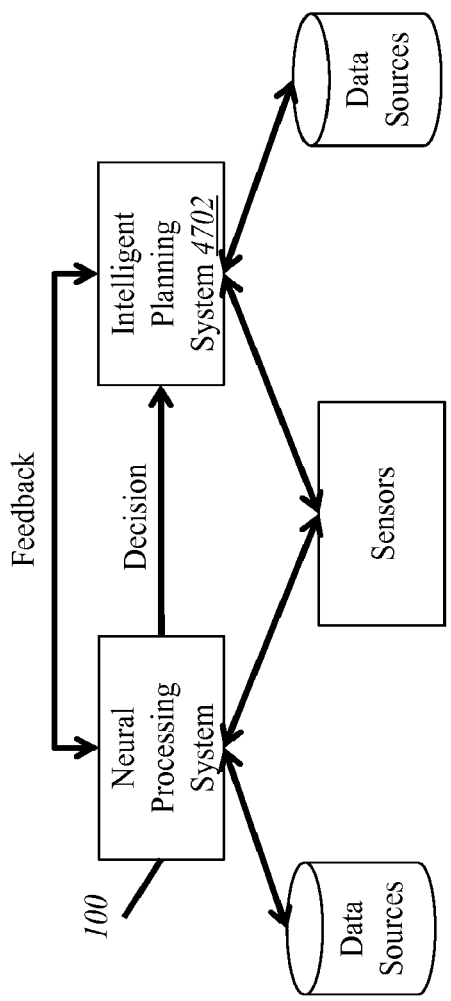
FIG. 47 shows a neural processing system providing a decision to an intelligent planning system.

FIG. 47 depicts an embodiment in which the neural processing system 100 provides a decision to an intelligent planning system 4702, optionally including feedback from the intelligent planning system 4702. The intelligent planning system 4702 may monitor industrial complexes, manufacturing units, construction sites, hospital premises, assembly lines, space centers, and the like. The intelligent planning system 4702 may be coupled to or may include sensors and automated systems such as machine learning systems, robots, intelligent agents, unmanned vehicles, artificial intelligence enabled devices, optimization tools, remote sensors, and remote controls, scheduling system, and the like. The intelligent planning system 4702 may retrieve information from data sources such as strategy documents, scheduling resources, planning resources and data, ERP databases, and the like.

Figure 48:
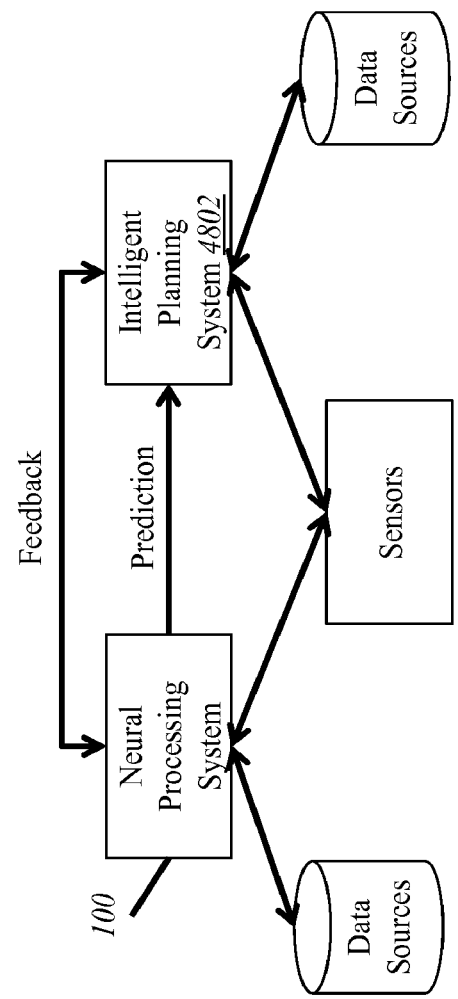
FIG. 48 shows a neural processing system providing a prediction to an intelligent planning system.

FIG. 48 depicts an embodiment in which the neural processing system 100 provides a prediction to an intelligent planning system 4802, optionally including feedback from the intelligent planning system. The intelligent planning system 4802 may monitor industrial complexes, manufacturing units, construction sites, hospital premises, assembly lines, space centers, and the like. The intelligent planning system 4802 may be coupled to or may include sensors and automated systems such as machine learning systems, robots, intelligent agents, unmanned vehicles, artificial intelligence enabled devices, optimization tools, remote sensors, and remote controls, scheduling system, and the like. The intelligent planning system 4802 may retrieve information from data sources such as strategy documents, scheduling resources, planning resources and data, ERP databases, and the like.

Figure 49:
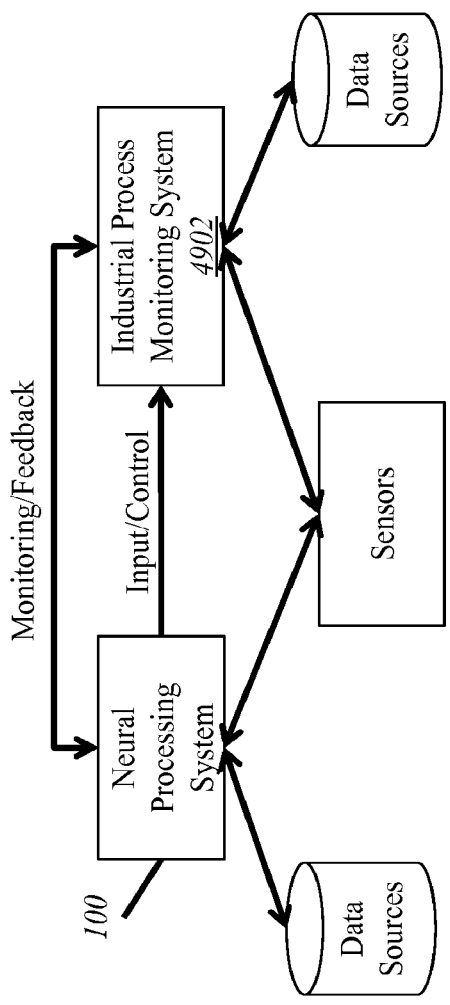
FIG. 49 shows a neural processing system providing monitoring, input and/or control to an industrial process monitoring system.

FIG. 49 depicts an embodiment in which the neural processing system 100 provides monitoring, input and/or control to an industrial process monitoring system 4902, optionally including feedback from the industrial process monitoring system 4902. The industrial process monitoring system 4902 may monitor an industrial factory, construction sites, manufacturing units, mining sites, offshore drilling sites, oil and gas pipelines and refineries, and the like. The industrial process monitoring system 4902 may include or be coupled to sensors such as temperature sensor, pressure sensor, humidity sensor, flow sensor, wireless sensors to monitor measurements for example proximity, temperature, pressure, level, power quality, and the like. The industrial process monitoring system 4902 may retrieve information from data sources such as process control system, device operation data, manufacturing or industrial output data, and the like.

Figure 50:
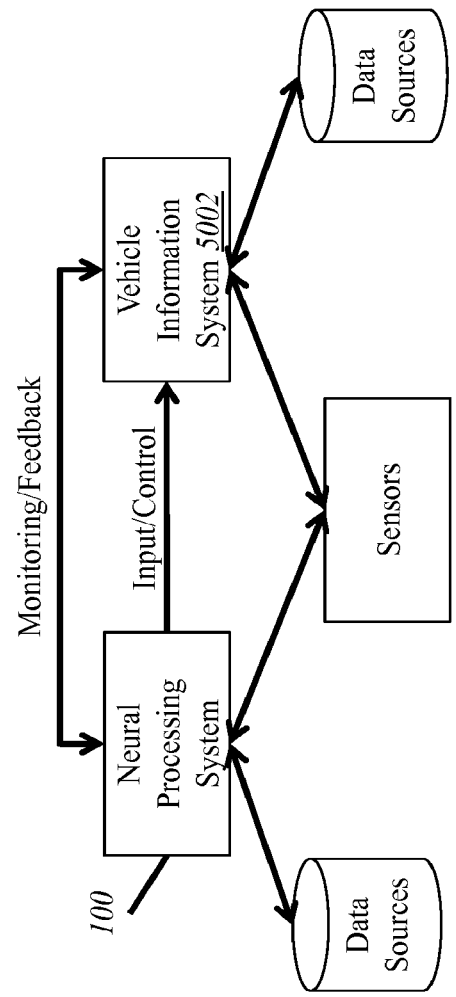
FIG. 50 shows a neural processing system providing monitoring, input and/or control to a vehicle information system.

FIG. 50 depicts an embodiment in which the neural processing system 100 provides monitoring, input and/or control to a vehicle information system 5002, optionally including feedback from the vehicle information system 5002. The vehicle information system 5002 may monitor vehicles, parking areas, traffic congestion, service areas, road works, traffic collisions, and the like. The vehicle information system 5002 may include or be coupled to sensors such as vehicle diagnostic equipment, wheel sensors, brake sensors, speedometers, fuel meters, road sensors, and the like. The vehicle information system 5002 may collect information from data sources such as vehicle on-board data sources, diagnostic data sources, traffic and road data sources, parking management systems, traffic congestion handling systems, and the like.

Figure 51:
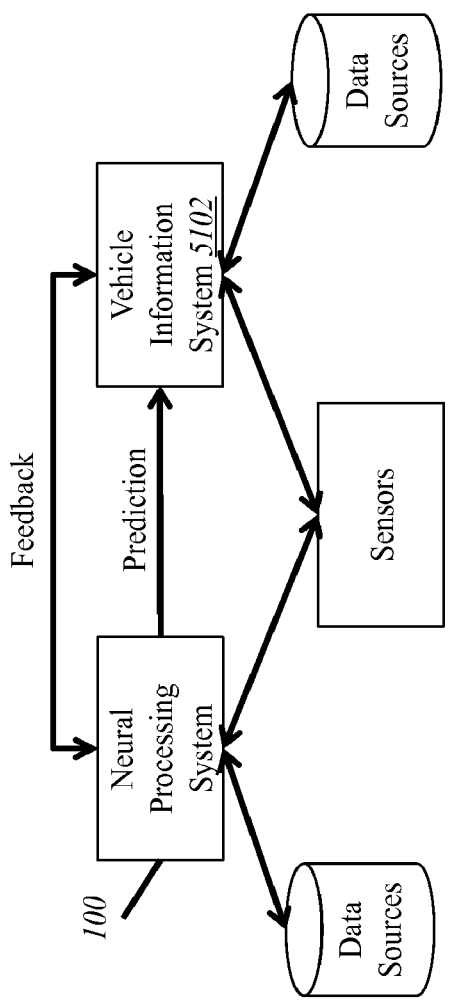
FIG. 51 shows a neural processing system providing a prediction to a vehicle information system.

FIG. 51 depicts an embodiment in which the neural processing system 100 provides a prediction to a vehicle information system 5102, optionally including feedback from the vehicle information system 5102. The vehicle information system 5102 may monitor vehicles, parking areas, traffic congestion, service areas, road works, traffic collisions, and the like. The vehicle information system 5102 may include or be coupled to sensors such as vehicle diagnostic equipment, wheel sensors, brake sensors, speedometers, fuel meters, road sensors, and the like. The vehicle information system 5102 may collect information from data sources such as vehicle on-board data sources, diagnostic data sources, traffic and road data sources, parking management systems, traffic congestion handling systems, and the like.

Figure 52:
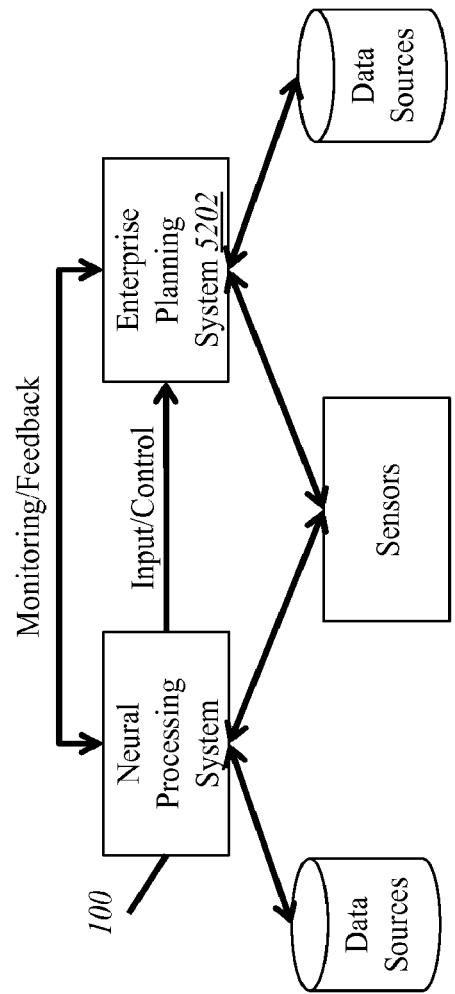
FIG. 52 shows a neural processing system providing monitoring, input and/or control to an enterprise planning system.

FIG. 52 depicts an embodiment in which the neural processing system 100 provides monitoring, input and/or control to an enterprise planning system 5202, optionally including feedback from the enterprise planning system 5202. The enterprise planning system 4902 may monitor political, social, economic, legal, technological and environmental factors that may interact or impact an enterprise operations or business. The enterprise planning system 5202 may monitor resource houses or warehouses, assembly lines, plants, manufacturing units, service centers, different organizational departments, projects, and the like. The enterprise planning system 5202 may include or be coupled to sensors such as those deployed in supply chain, demand sensors, downstream workflow sensors, and the like. The enterprise planning system 5202 may collect information from data sources such as downstream data sources, warehouse management systems, supply management databases, ERP databases, financial databases, and the like.

Figure 53:
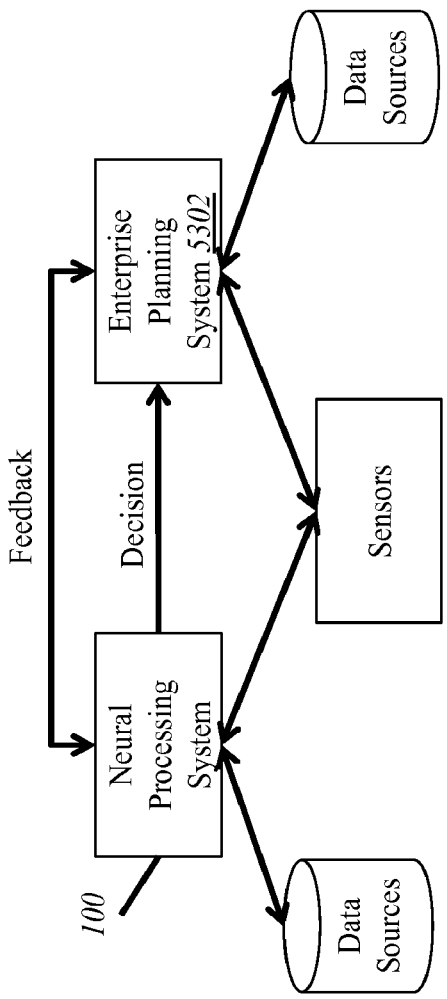
FIG. 53 shows a neural processing system providing a decision to an enterprise planning system.

FIG. 53 depicts an embodiment in which the neural processing system 100 provides a decision to an enterprise planning system 5302, optionally including feedback from the enterprise planning system 5302. The enterprise planning system 5302 may monitor political, social, economic, legal, technological and environmental factors that may interact or impact an enterprise operations or business. The enterprise planning system 5302 may monitor resource houses or warehouses, assembly lines, plants, manufacturing units, service centers, different organizational departments, projects, and the like. The enterprise planning system 5302 may include or be coupled to sensors such as those deployed in supply chain, demand sensors, downstream workflow sensors, and the like. The enterprise planning system may collect information from data sources such as downstream data sources, warehouse management systems, supply management databases, ERP databases, financial databases, and the like.

Figure 54:
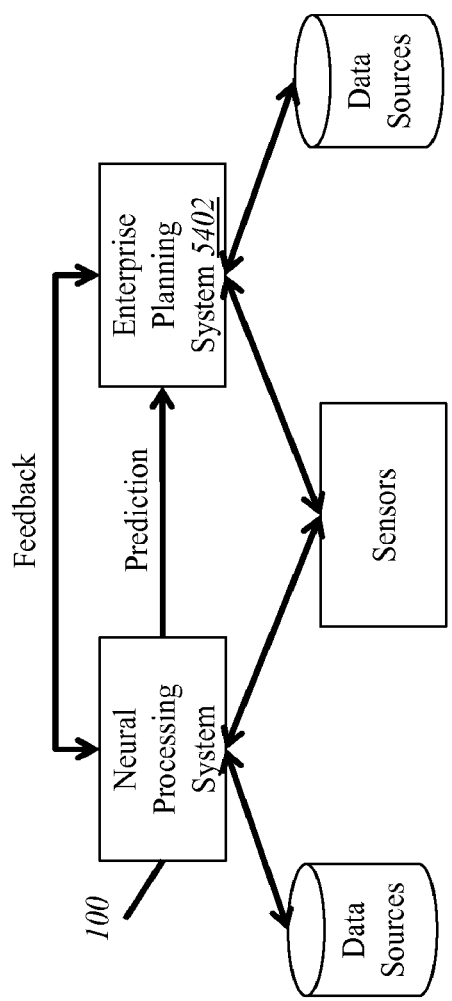
FIG. 54 shows a neural processing system providing a prediction to an enterprise planning system.

FIG. 54 depicts an embodiment in which the neural processing system 100 provides a prediction to an enterprise planning system 5402, optionally including feedback from the enterprise planning system 5102. The enterprise planning system 5402 may monitor political, social, economic, legal, technological and environmental factors that may interact or impact an enterprise operations or business. The enterprise planning system 5402 may monitor resource houses or warehouses, assembly lines, plants, manufacturing units, service centers, different organizational departments, projects, and the like. The enterprise planning system 5402 may include or be coupled to sensors such as those deployed in supply chain, demand sensors, downstream workflow sensors, and the like. The enterprise planning system 5402 may collect information from data sources such as downstream data sources, warehouse management systems, supply management databases, ERP databases, financial databases, and the like.

Figure 55:
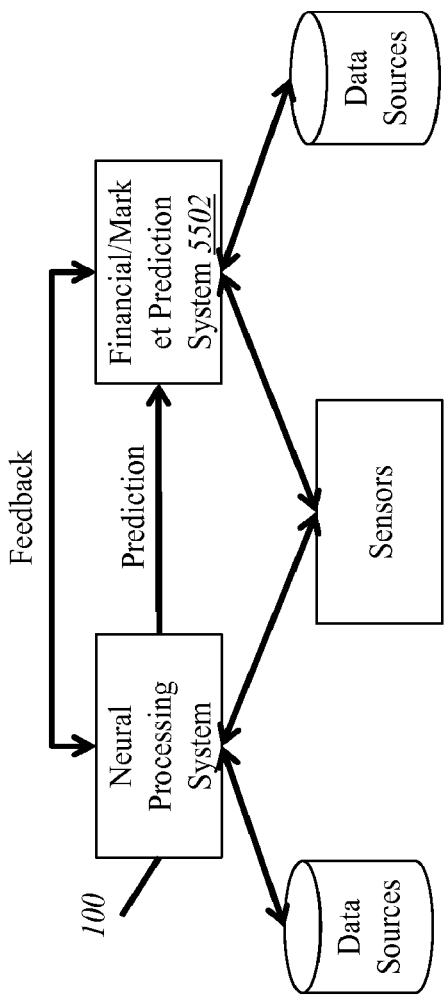
FIG. 55 shows a neural processing system providing a prediction to a financial or market prediction system.

FIG. 55 depicts an embodiment in which the neural processing system 100 provides a prediction to a financial/market prediction system 5502, optionally including feedback from the financial/market prediction system 5502. The financial/market prediction system 5202 may monitor stock exchanges, trading industry, supply and demand, corporations performance and growth, investments, valuations, and the like. The financial/market prediction system 5502 may collect information from data sources such as stock data, investment sources, corporate data sheets, financial reports, other paid and free databases, and the like.

Figure 56:
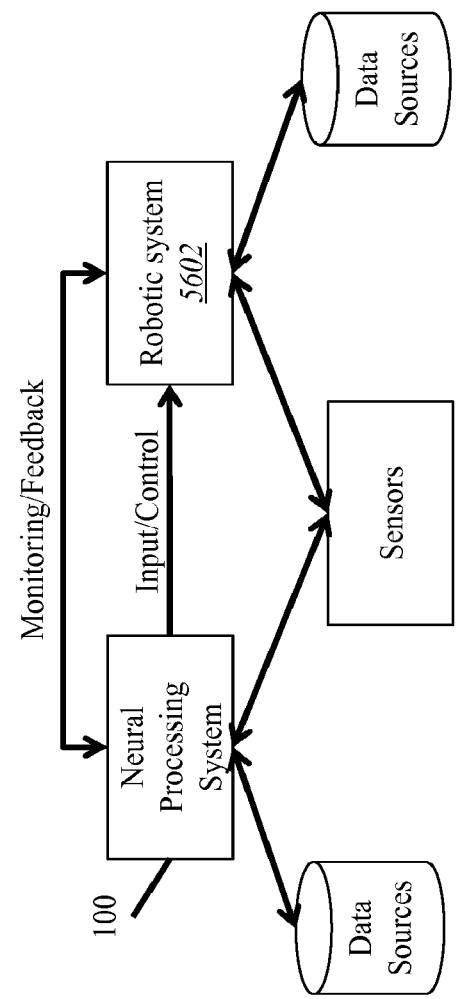
FIG. 56 shows a neural processing system providing monitoring, input and/or control to a robotic system.

FIG. 56 depicts an embodiment in which the neural processing system 100 provides monitoring, input and/or control to a robotic system 5602, optionally including feedback from the robotic system 5602. The robotic system 5602 may monitor industrial sites, manufacturing plants, healthcare premises, enterprises, chemical processing plants, mining sites, and the like. The robotic system 5602 may include or be coupled to sensors such as flow sensors, temperature sensors, pressure sensors, power sensors, sensors for monitoring internal components of robots, tactile sensors, and the like. The robotic system 5602 may collect information from data sources such as ERP databases, operations reports, control systems, feedback devices, commercial data and specifications or standards. The robotic system 5602 may be deployed in a wide range of environments, such as manufacturing (e.g., semiconductor manufacturing, assembly lines (e.g., vehicle manufacturing lines)), commercial (e.g., for office cleaning robots and robots used for customer guidance in stores), personal (e.g., personal robotic assistants), military and police (e.g., bomb-sniffing and defusing robots), government (e.g. in spacecraft), and many others.

Figure 57:
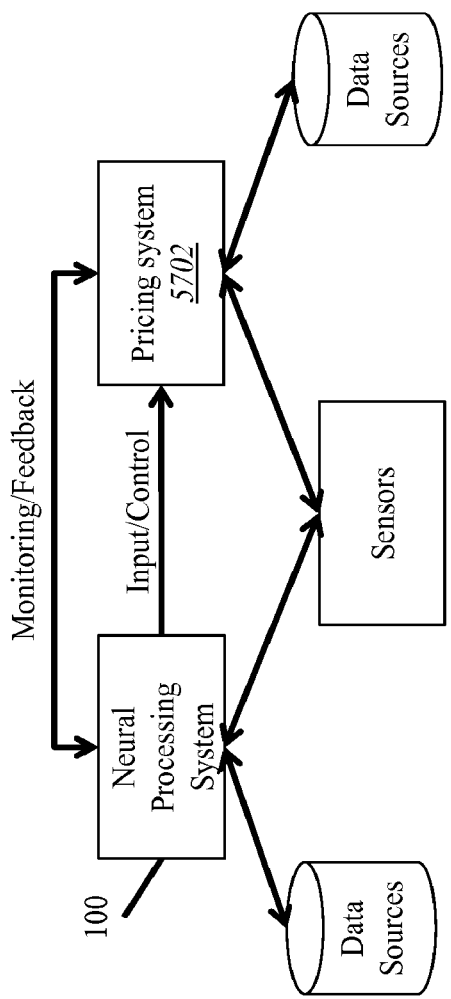
FIG. 57 shows a neural processing system providing monitoring, input and/or control to a pricing system.

FIG. 57 depicts an embodiment in which the neural processing system 100 provides monitoring, input and/or control to a pricing system 5702, optionally including feedback from the pricing system 5702. The pricing system 5702 may monitor market dynamics, supply and demand economics, corporate financial environments, stock markets, prices of products and services, inventory, costs, target financial objectives, and many other factors. The pricing system 5702 may collect information from data sources such as stock data, investment sources, corporate data sheets, financial reports, other databases. The pricing system may use output from the neural processing system to make pricing decisions for products and services.

Figure 58:
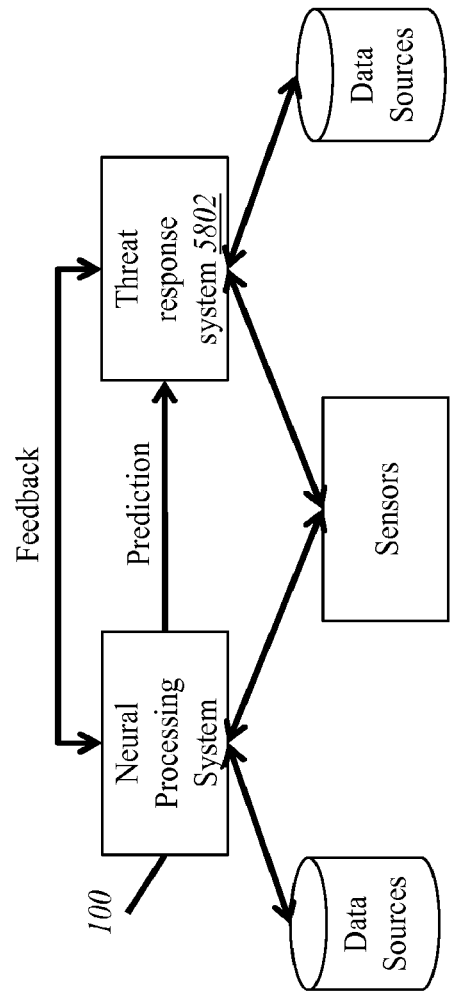
FIG. 58 shows a neural processing system providing a prediction to a threat response system.

FIG. 58 depicts an embodiment in which the neural processing system 100 provides a prediction to a threat response system 5802, optionally including feedback from the threat response system 5802. The threat response system 5802 may use pattern recognition modules as described herein or as understood by one of ordinary skill in the art to identify patterns that may indicate a threat, such as a threat of terrorist attack, a threat of a weather disaster, a threat of a disease epidemic, a threat of a crime (including violent crime, fraud, and other crimes), a threat of an economic crash, or many other kinds of threats.

Figure 59:
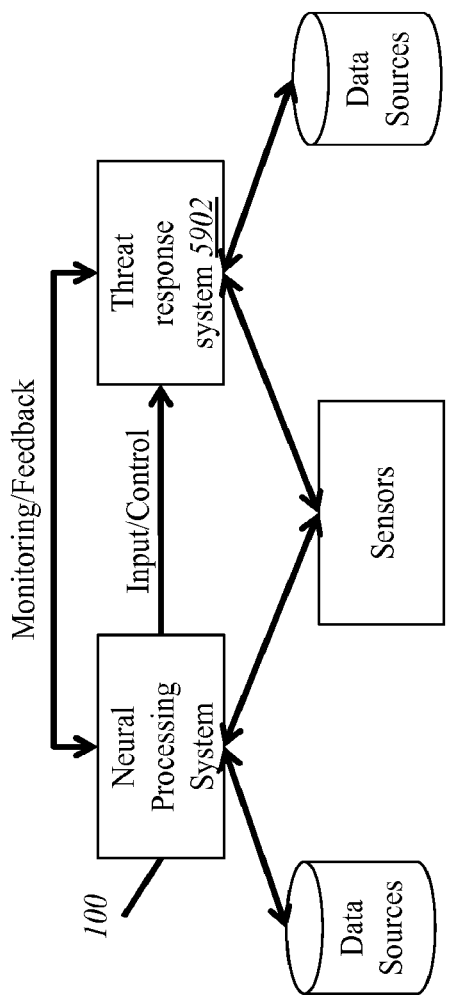
FIG. 59 shows a neural processing system providing monitoring, input and/or control to a threat response system.

FIG. 59 depicts an embodiment in which the neural processing system 100 provides monitoring, input and/or control to a threat response system 5902, optionally including feedback from the threat response system 5902.

Figure 60:
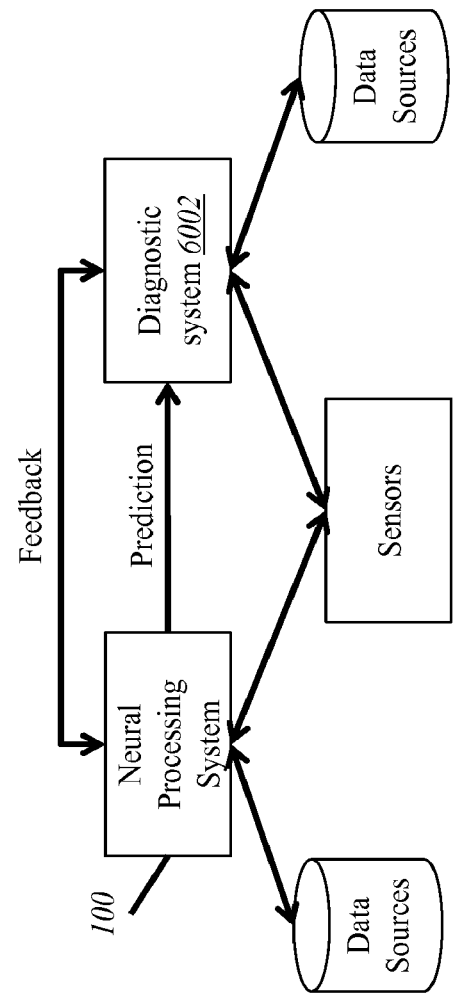
FIG. 60 shows a neural processing system providing a prediction to a diagnostic system.

FIG. 60 depicts an embodiment in which the neural processing system 100 provides a prediction to a diagnostic system 6002, optionally including feedback from the diagnostic system 6002. The diagnostic system 6002 may monitor health environments, vehicles, flights and on-board systems, manufacturing environments, and the like. The diagnostic system 6002 may include or be coupled to sensors such as medical sensors, patient sensors, medical devices-based sensors, pressure sensors, flow sensors, temperature sensors, speed sensors, and the like. The diagnostic system 6002 may collect information from data sources such as operation reports, performance reports, failure analysis reports, technical specifications, and the like.

Figure 61:
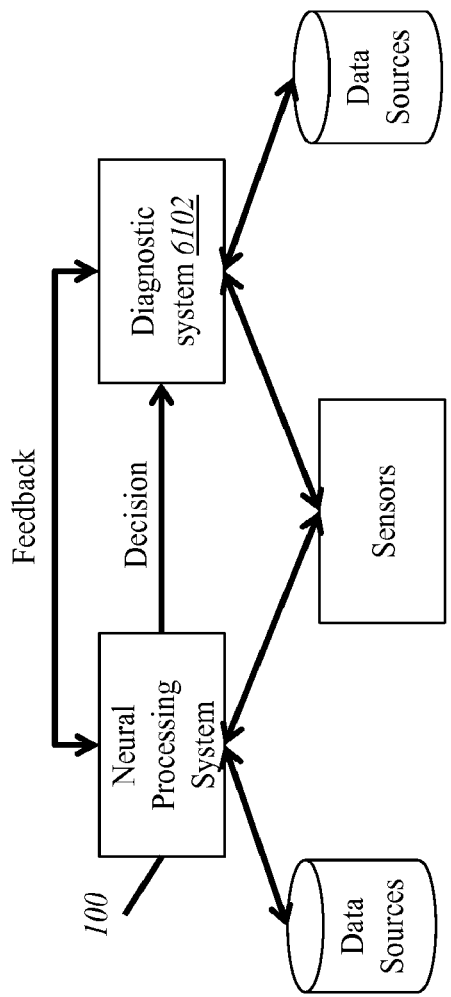
FIG. 61 shows a neural processing system providing a decision to a diagnostic system.

FIG. 61 depicts an embodiment in which the neural processing system 100 provides a decision to a diagnostic system 6102, optionally including feedback from the diagnostic system 6102. The diagnostic system 6102 may monitor health environments, vehicles, flights and on-board systems, manufacturing environments, and the like. The diagnostic system 6102 may include or be coupled to sensors such as medical sensors, patient sensors, medical devices-based sensors, pressure sensors, flow sensors, temperature sensors, speed sensors, and the like. The diagnostic system 6102 may collect information from data sources such as operation reports, performance reports, failure analysis reports, technical specifications, and the like.

Figure 62:
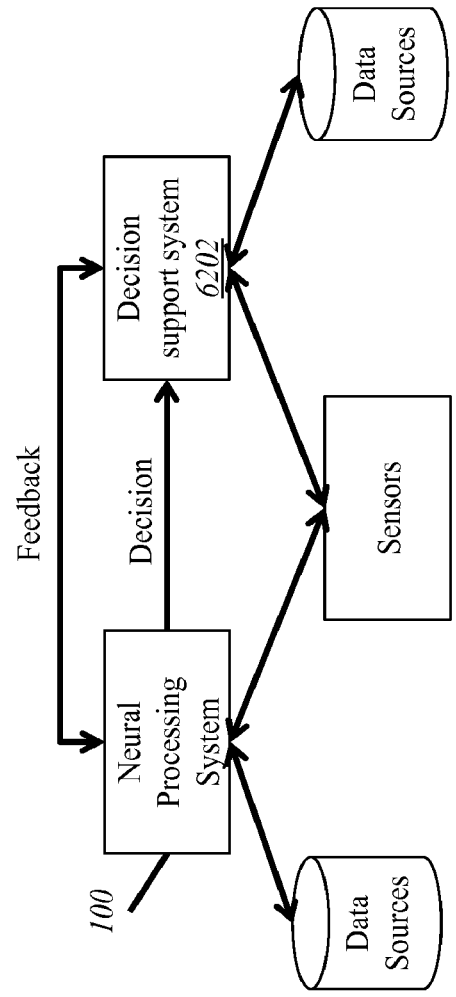
FIG. 62 shows a neural processing system providing a decision to a decision support system.

FIG. 62 depicts an embodiment in which the neural processing system 100 provides a decision to a decision support system 6202, optionally including feedback from the decision support system. The decision support system 6202 may facilitate decision making in enterprises, healthcare institutes, manufacturing facilities, mining sites, service operations, and the like. The decision support system 6202 may collect information from data sources such as data warehouses, data marts, inventory information, ERP systems, sales data, material resource planning databases, executive information systems, knowledge data stores, and the like.

Figure 63:
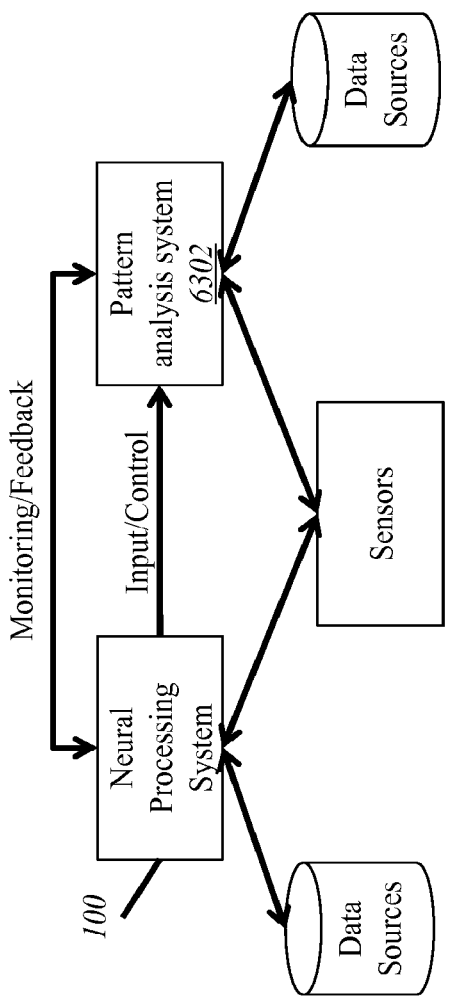
FIG. 63 shows a neural processing system providing monitoring, input and/or control to a pattern analysis system.

FIG. 63 depicts an embodiment in which the neural processing system 100 provides monitoring, input and/or control to a pattern analysis system 6302, optionally including feedback from the pattern analysis system 6302.

Figure 64:
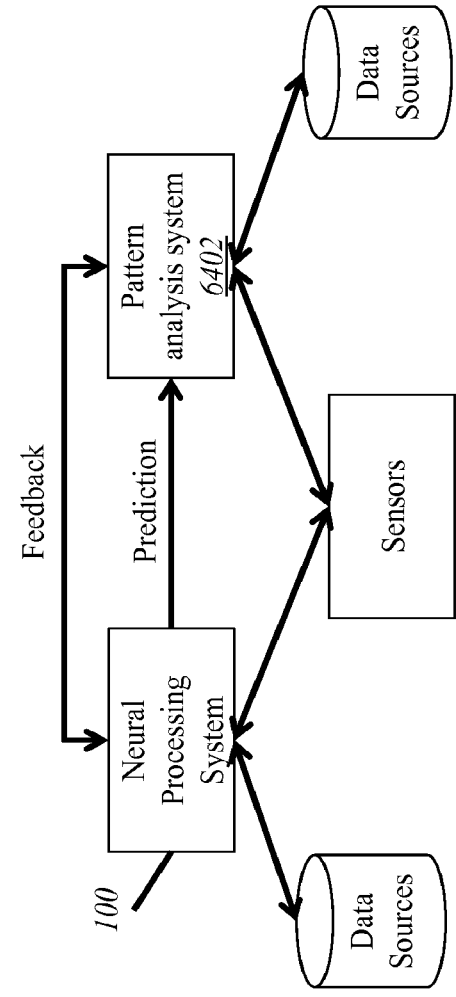
FIG. 64 shows a neural processing system providing a prediction to a pattern analysis system.

FIG. 64 depicts an embodiment in which the neural processing system 100 provides a prediction to a pattern analysis system 6402, optionally including feedback from the pattern analysis system 6102.

Figure 65:
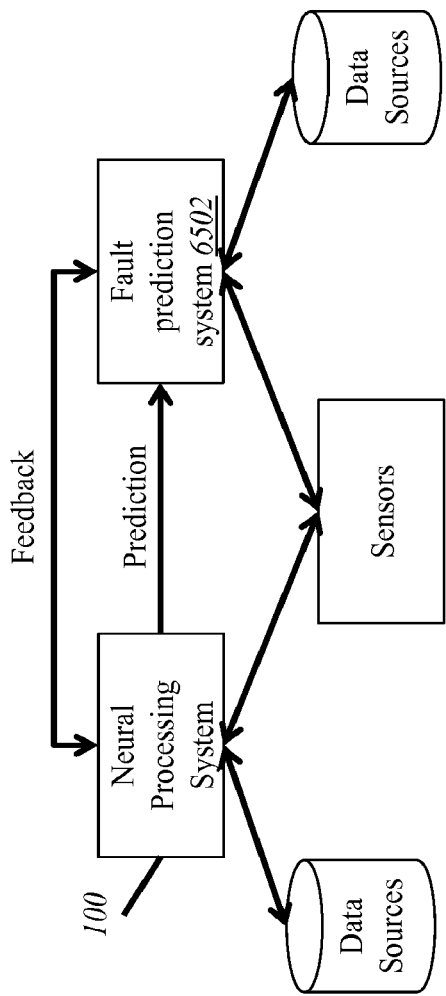
FIG. 65 shows a neural processing system providing a prediction to a fault prediction system.

FIG. 65 depicts an embodiment in which the neural processing system 100 provides a prediction to a fault prediction system 6502, optionally including feedback from the fault prediction system 6502. The fault prediction system 6502 may monitor medical faults, manufacturing faults, mining environments, quality deviations, electrical and electronic faults, power environments, road accidents, aerospace, and the like. The fault prediction system 6502 may include or be coupled to sensors such as electrical and electronic sensors, fuses, speed sensors, accelerometers, pressure sensors, temperature sensors, power sensors, leakage sensors, chemical sensors, events monitor, and the like. The fault prediction system 6502 may collect information from various data sources such as error logs, diagnostic tests information sources, rules engines, guidelines and manuals, and the like.

Figure 66:
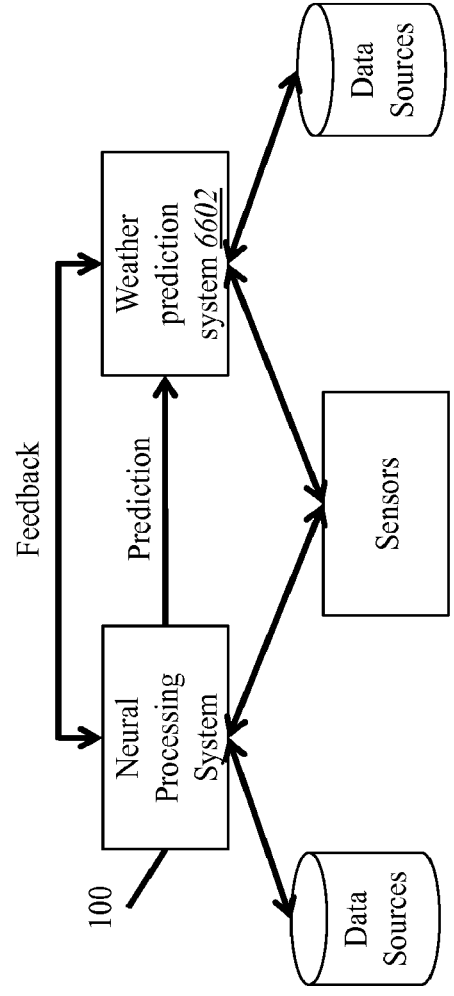
FIG. 66 shows a neural processing system providing a prediction to a weather prediction system.

FIG. 66 depicts an embodiment in which the neural processing system 100 provides a prediction to a weather prediction system 6602, optionally including feedback from the weather prediction system 6602. The weather prediction system 6602 may include sensors such as humidity sensors, temperature sensors, pressure sensors, precipitation sensors, wind sensors, and the like. The weather prediction system 6602 may collect information from data sources such as historical climatic data sources, military data sources, natural events schedules and prediction records, and the like.

Figure 67:
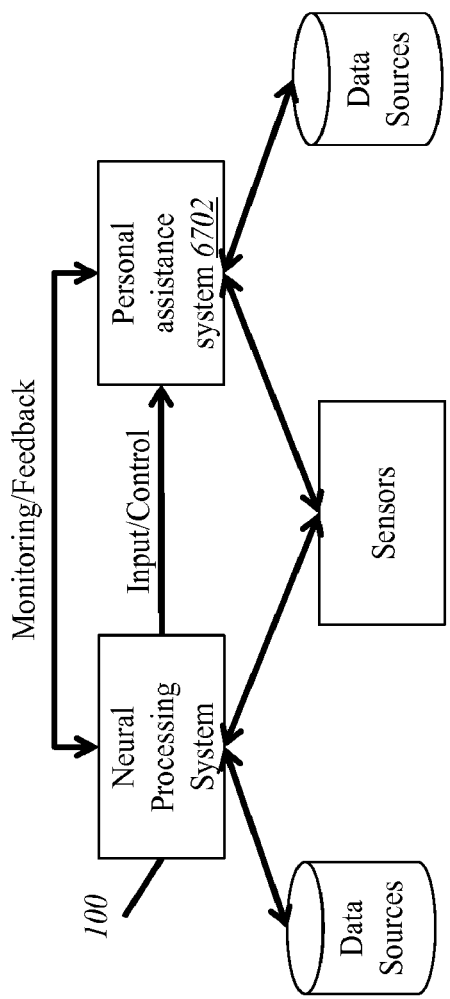
FIG. 67 shows a neural processing system providing monitoring, input and/or control to a personal assistance system.

FIG. 67 depicts an embodiment in which the neural processing system 100 provides monitoring, input and/or control to a personal assistance system 6702, optionally including feedback from the personal assistance system 6702. The personal assistance system 6702 may monitor personal health conditions, daily business tasks, meetings scheduling, arranging travel, answering phone calls, taking notes, and the like. The personal assistance system 6702 may include or be coupled to sensors such as temperature sensors, pollution sensors, gas sensors, and the like.

Figure 68:
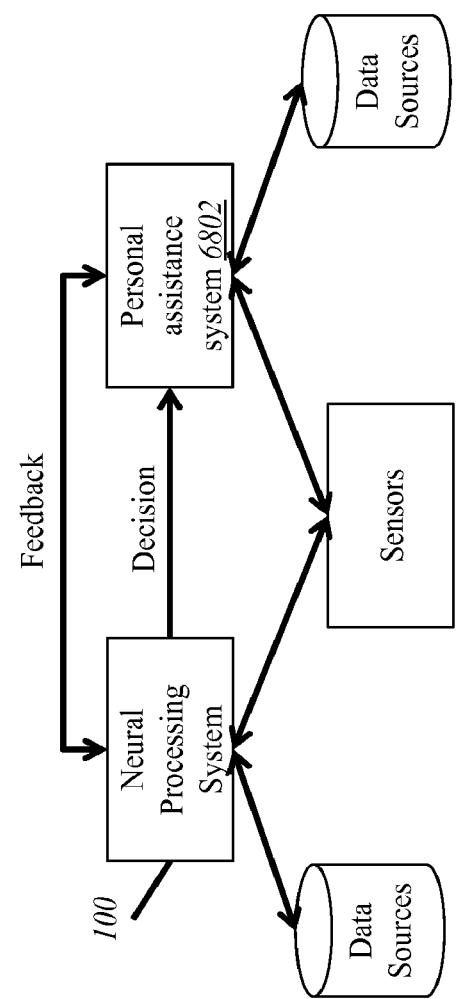
FIG. 68 shows a neural processing system providing a decision to a personal assistance system.

FIG. 68 depicts an embodiment in which the neural processing system 100 provides a decision to a personal assistance system 6802, optionally including feedback from the personal assistance system 6802. The personal assistance system 6802 may monitor personal health conditions, daily business tasks, meetings scheduling, arranging travel, answering phone calls, taking notes, and the like. The personal assistance system 6802 may include or be coupled to sensors such as temperature sensors, pollution sensors, gas sensors, and the like.

FIG. 69 depicts an embodiment in which the neural processing system 100 provides a prediction to a personal assistance system 6902, optionally including feedback from the personal assistance system 6902. The personal assistance system 6902 may monitor personal health conditions, daily business tasks, meetings scheduling, arranging travel, answering phone calls, taking notes, and the like. The personal assistance system 6902 may include or be coupled to sensors such as temperature sensors, pollution sensors, gas sensors, and the like.

FIG. 70 depicts an embodiment in which the neural processing system 100 provides monitoring, input and/or control to an expert assistance system 7002, optionally including feedback from the expert assistance system 70002.

Figure 71:
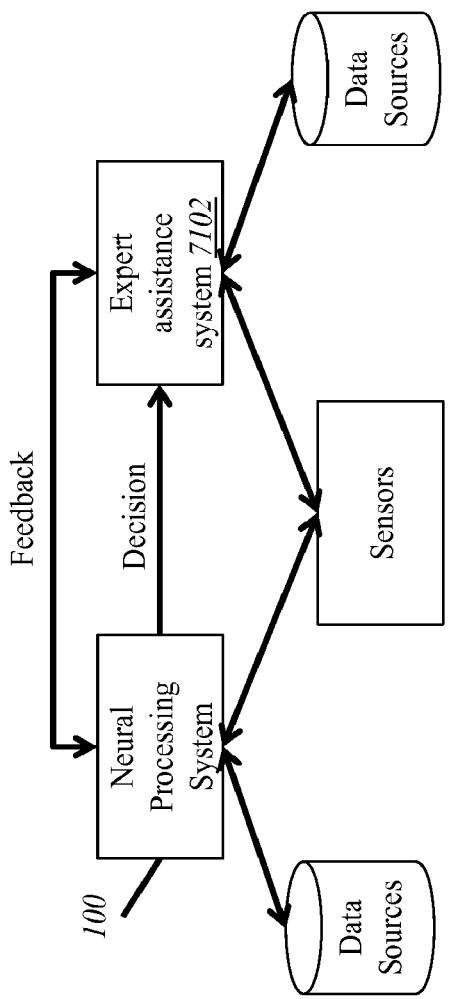
FIG. 71 shows a neural processing system providing monitoring a decision to an expert assistance system.

FIG. 71 depicts an embodiment in which the neural processing system 100 provides a decision to an expert assistance system 7102, optionally including feedback from the expert assistance system 7102.

Figure 72:
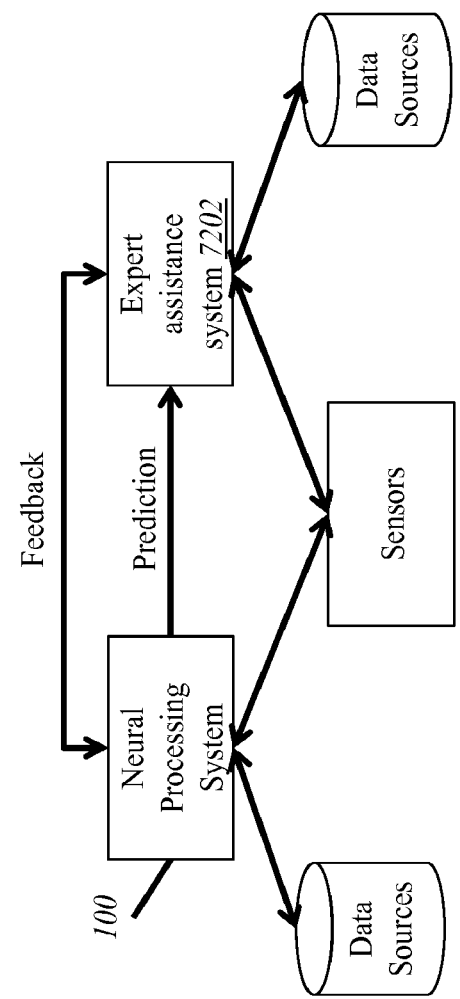
FIG. 72 shows a neural processing system providing a prediction to an expert assistance system.

FIG. 72 depicts an embodiment in which the neural processing system 100 provides a prediction to an expert assistance system 7202, optionally including feedback from the expert assistance system 7202.

Figure 73:
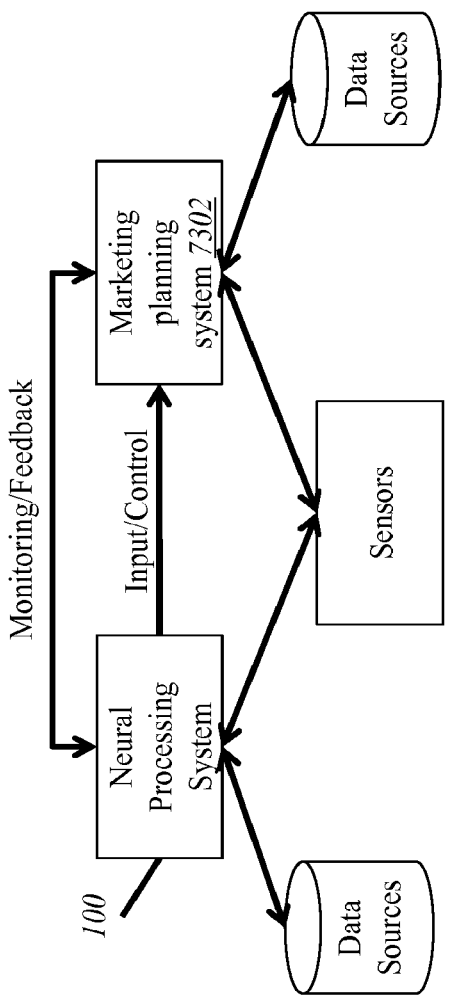
FIG. 73 shows a neural processing system providing monitoring, input and/or control to a marketing planning system.

FIG. 73 depicts an embodiment in which the neural processing system 100 provides monitoring, input and/or control to a marketing planning system 7302, optionally including feedback from the marketing planning system 7302. The market planning system 7302 may monitor stock exchanges, trading industry, supply and demand, corporations' performance and growth, investments, corporate valuations, and the like. The market planning system 7302 may collect information from data sources such as stock data, investment sources, corporate data sheets, financial reports, other databases, and the like.

Figure 74:
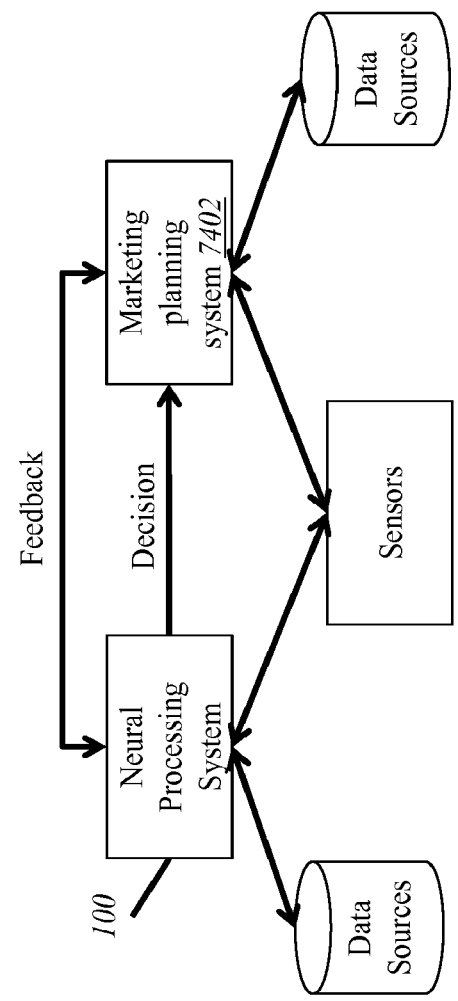
FIG. 74 shows a neural processing system providing a decision to a marketing planning system.

FIG. 74 depicts an embodiment in which the neural processing system 100 provides a decision to a marketing planning system 7402, optionally including feedback from the marketing planning system 7402. The market planning system 7402 may monitor stock exchanges, trading industry, supply and demand, corporations' performance and growth, investments, corporate valuations, and the like. The market planning system 7402 may collect information from data sources such as stock data, investment sources, corporate data sheets, financial reports, other databases, and the like.

Figure 75:
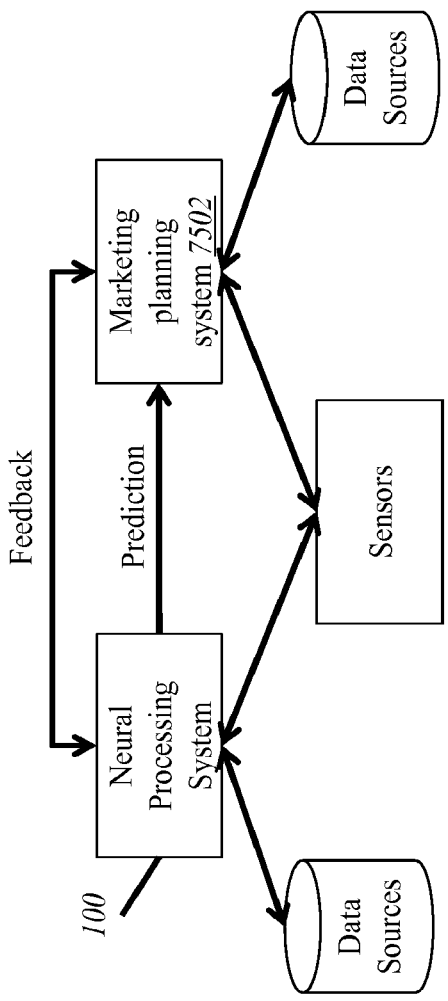
FIG. 75 shows a neural processing system providing a prediction to a marketing planning system.

FIG. 75 depicts an embodiment in which the neural processing system 100 provides a prediction to a marketing planning system 7502, optionally including feedback from the marketing planning system 7502. The market planning system 7502 may monitor stock exchanges, trading industry, supply and demand, corporations' performance and growth, investments, corporate valuations, and the like. The market planning system 7502 may collect information from data sources such as stock data, investment sources, corporate data sheets, financial reports, other databases, and the like.

Figure 76A:
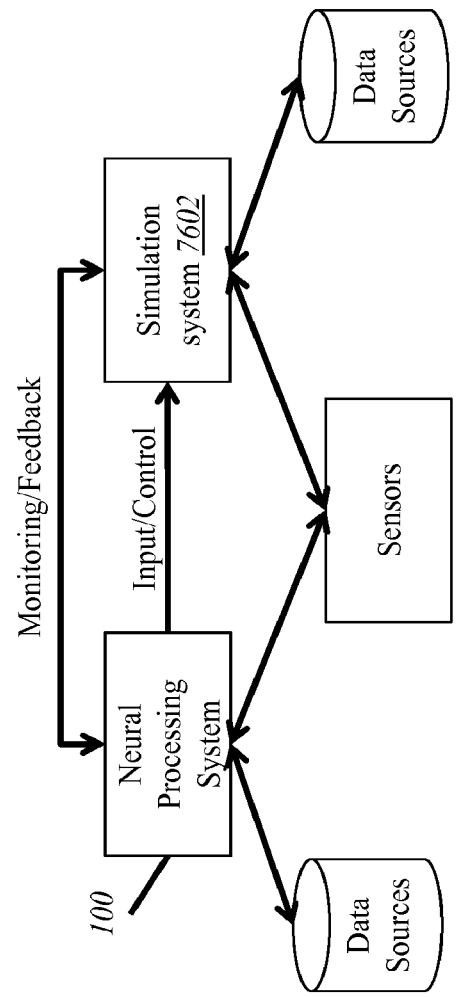
FIG. 76A shows a neural processing system providing monitoring, input and/or control to a simulation system.

FIG. 76A depicts an embodiment in which the neural processing system 100 provides monitoring, input and/or control to a simulation system 7602, optionally including feedback from the simulation system 7602. The simulation system 7602 may monitor space environment, medical environment, manufacturing environment, mining environment, offshore drills, weather conditions, and the like. The simulation system 7602 may include or be coupled to sensors such as weather sensors, chemical sensors, motion sensors, flow sensors, and the like. The simulation system 7602 may collect data from data sources such as simulated environment databases, weather reports, clinical databases, and the like.

Figure 76B:
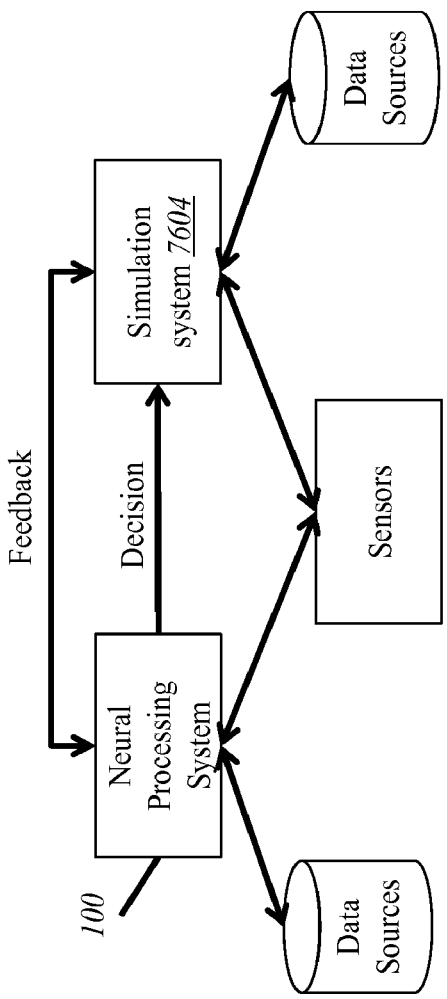
FIG. 76B shows a neural processing system providing a decision to a simulation system.

FIG. 76B depicts an embodiment in which the neural processing system 100 provides a decision to a simulation system 7604, optionally including feedback from the simulation system 7604. The simulation system 7604 may monitor space environment, medical environment, manufacturing environment, mining environment, offshore drills, weather conditions, and the like. The simulation system 7604 may include or be coupled to sensors such as weather sensors, chemical sensors, motion sensors, flow sensors, and the like. The simulation system 7604 may collect data from data sources such as simulated environment databases, weather reports, clinical databases, and the like.

Figure 77:
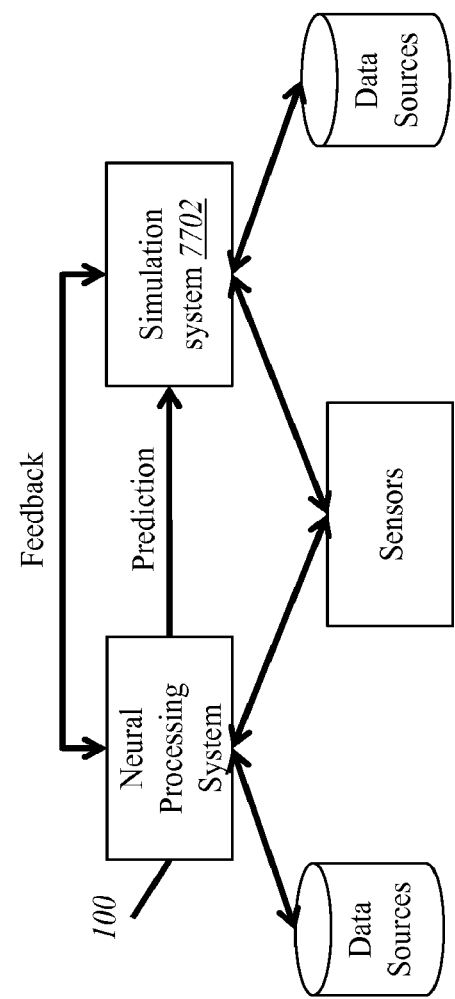
FIG. 77 shows a neural processing system providing a prediction to a simulation system.

FIG. 77 depicts an embodiment in which the neural processing system 100 provides a prediction to a simulation system 7702, optionally including feedback from the simulation system 7702. The simulation system 7702 may monitor space environment, medical environment, manufacturing environment, mining environment, offshore drills, weather conditions, and the like. The simulation system 7702 may include or be coupled to sensors such as weather sensors, chemical sensors, motion sensors, flow sensors, and the like. The simulation system 7702 may collect data from data sources such as simulated environment databases, weather reports, clinical databases, and the like.

Figure 78:
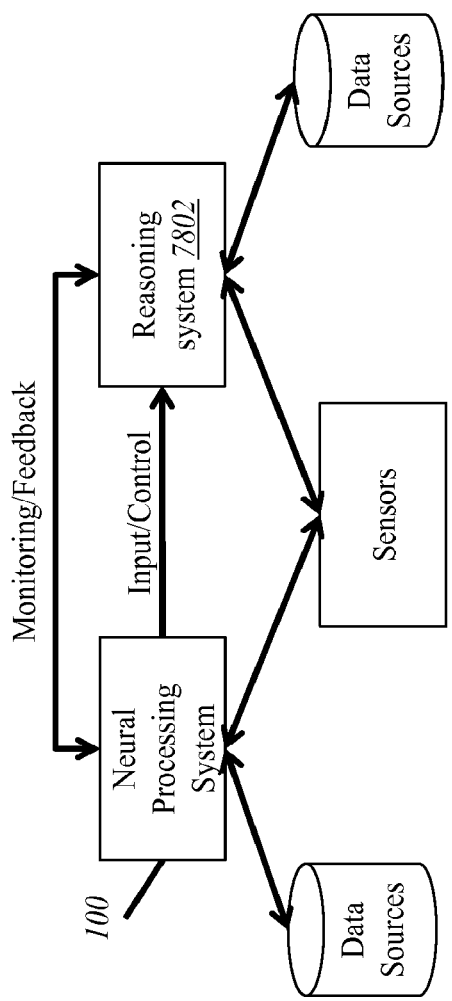
FIG. 78 shows a neural processing system providing monitoring, input and/or control to a reasoning system.

FIG. 78 depicts an embodiment in which the neural processing system 100 provides monitoring, input and/or control to a reasoning system 7802, optionally including feedback from the reasoning system 7802. The reasoning system 7802 may monitor medical and diagnostics environments, robotics and intelligent environments, industrial and manufacturing environments, agriculture, and law related issues. The reasoning system 7802 may include or be coupled to fault detection systems, inference engines, artificial intelligent systems, machine learning systems, and the like. The reasoning system 7802 may collect information from data sources such as knowledge sources, software systems, business rules databases, and the like.

Figure 79:
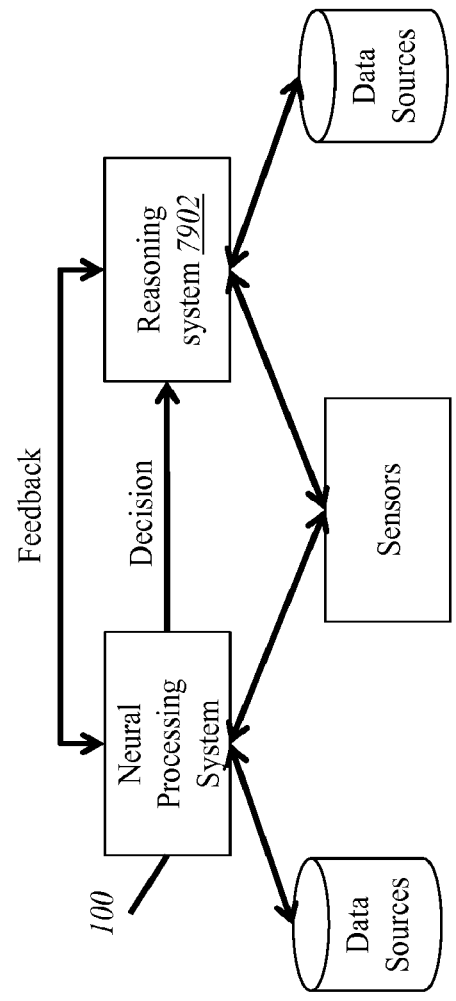
FIG. 79 shows a neural processing system providing a decision to a reasoning system.

FIG. 79 depicts an embodiment in which the neural processing system 100 provides a decision to a reasoning system 7902, optionally including feedback from the reasoning system 7902. The reasoning system 7902 may include or be coupled to fault detection systems, inference engines, artificial intelligent systems, machine learning systems, and the like. The reasoning system 7902 may collect information from data sources such as knowledge sources, software systems, business rules databases, and the like.

Figure 80:
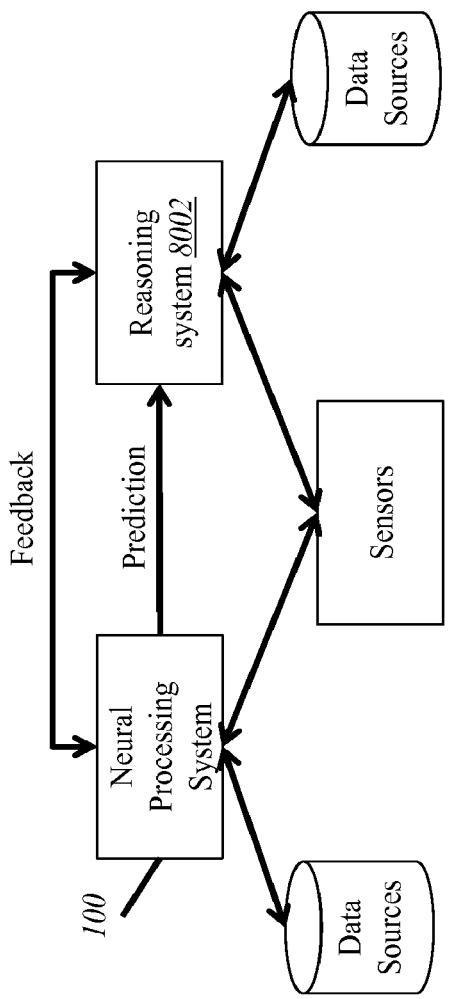
FIG. 80 shows a neural processing system providing a prediction to a reasoning system.

FIG. 80 depicts an embodiment in which the neural processing system 100 provides a prediction to a reasoning system 8002, optionally including feedback from the reasoning system 8002. The reasoning system 8002 may include or be coupled to fault detection systems, inference engines, artificial intelligent systems, machine learning systems, and the like. The reasoning system 8002 may collect information from data sources such as knowledge sources, software systems, business rules databases, and the like.

Figure 81:
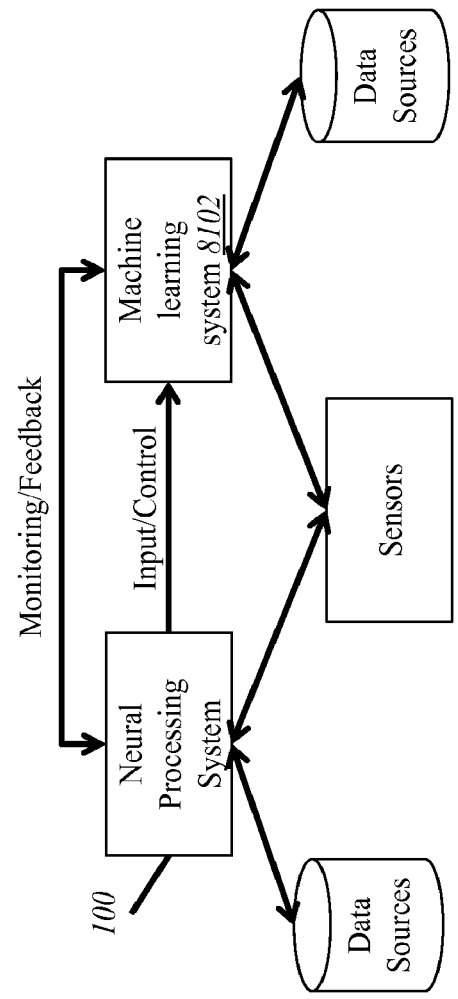
FIG. 81 shows a neural processing system providing monitoring, input and/or control to a machine learning system.

FIG. 81 depicts an embodiment in which the neural processing system 100 provides monitoring, input and/or control to a machine learning system 8102, optionally including feedback from the machine learning system 8102. The machine learning system 8102 may include or be coupled to fault detection systems, inference engines, artificial intelligent systems, semantic engines, and the like. The machine learning system 8102 may collect information from data sources such as knowledge sources, software systems, business rules databases, and the like.

Figure 82:
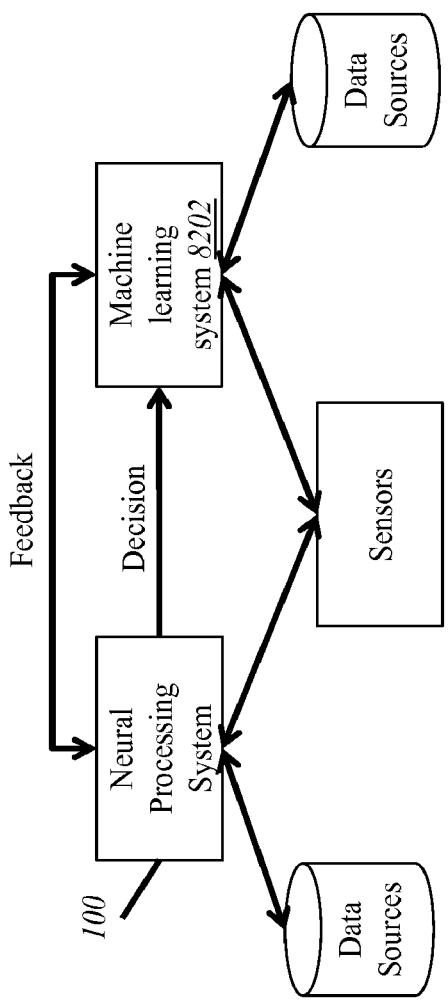
FIG. 82 shows a neural processing system providing a decision to a machine learning system.

FIG. 82 depicts an embodiment in which the neural processing system 100 provides a decision to a machine learning system 8002, optionally including feedback from the machine learning system 8202. The machine learning system 8202 may include or be coupled to fault detection systems, inference engines, artificial intelligent systems, semantic engines, and the like. The machine learning system 8202 may collect information from data sources such as knowledge sources, software systems, business rules databases, and the like.

Figure 83:
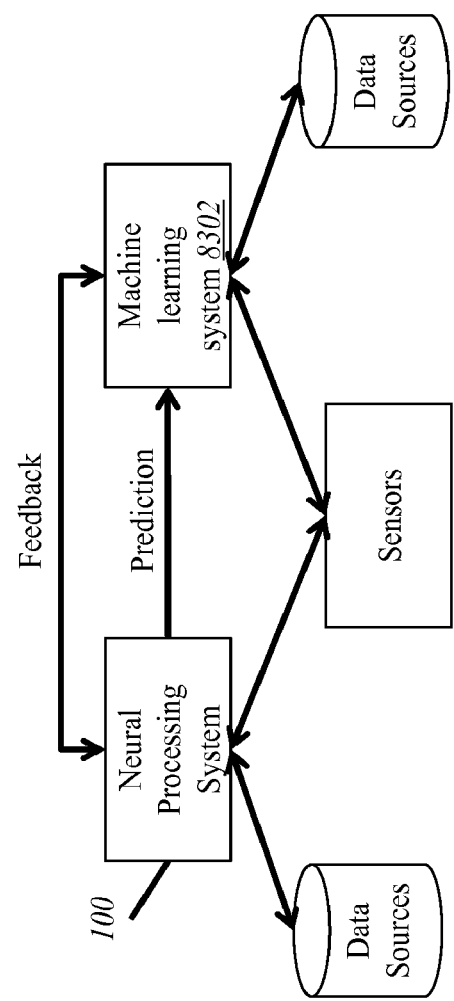
FIG. 83 shows a neural processing system providing a prediction to a machine learning system.

FIG. 83 depicts an embodiment in which the neural processing system 100 provides a prediction to a machine learning system 8302, optionally including feedback from the machine learning system 8302. The machine learning system 8302 may include or be coupled to fault detection systems, inference engines, artificial intelligent systems, semantic engines, and the like. The machine learning system 8302 may collect information from data sources such as knowledge sources, software systems, business rules databases, and the like.

Figure 84:
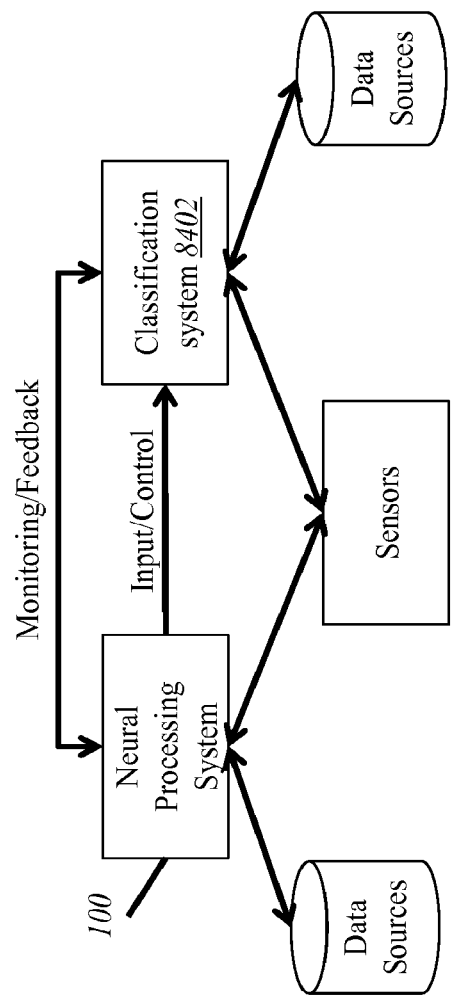
FIG. 84 shows a graph providing monitoring, input and/or control to a classification system.

FIG. 84 depicts an embodiment in which the neural processing system 100 provides monitoring, input and/or control to a classification system 8402, optionally including feedback from the classification system 8402.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory or other computer-readable medium, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same. In one aspect, the computer-readable medium may include any computer components, devices, and recording media that retain digital data used for computing for some interval of time. By way of example and not limitation, this may include semiconductor storage known as random access memory (RAM), mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like. Other general types of computer memory useful for storing computer code in a non-transitory medium include dynamic memory, static memory, read/write storage, mutable storage, read only, random access, sequential access, location addressable memory, file addressable memory, content addressable memory, network attached storage, storage area network devices, bar codes, magnetic ink, and the like.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

The methods and systems described herein may be deployed in part or in whole through a machine that executes computer software, program codes, and/or instructions on a processor, which processor may include any suitable processing circuitry, as well as groups of processors or processing cores. The processor may be part of a server, client, network infrastructure, mobile computing platform, stationary computing platform, or other computing platform. A processor may include any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

The methods and systems described herein may be deployed in part or in whole through a machine that executes computer software on any network element or resource including without limitation a server, client, firewall, gateway, hub, router, or other such computer and/or networking hardware. A software program realizing any of the methods or systems contemplated herein may be associated with a server that may include a file server, print server, domain server, Internet server, web server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods and systems described herein, as well as any programs or code realizing same in a non-transitory computer readable medium, may be executed by the server or any of the other network resources described herein. In addition, other devices required for execution of methods as described in this application may be considered as a part of the infrastructure associated with the server.

A server for realizing the methods and systems contemplated herein may provide an interface to other devices including, without limitation, clients, other servers, printers, database servers, print servers, file servers, communication servers, distributed servers and the like. Additionally, this coupling and/or connection of devices in a communicating relationship through a network may facilitate remote execution of a program across the network, or parallel processing of a program or method at one or more locations. In addition, devices attached to the server through an interface may include at least one storage medium capable of storing programs, code and/or instructions that embodied the methods described herein. A central repository may provide program instructions to be executed on different devices. In this implementation, the remote repository may act as a storage medium for program code, instructions, and programs.

The software program may be associated with a client that couples in a communicating relationship with any of the foregoing. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The methods and systems described herein may transform physical and/or or intangible items from one state to another. The methods and systems described herein may also transform data representing physical and/or intangible items from one state to another.

The elements described and depicted herein, including in flow charts and block diagrams throughout the FIGURES, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A neural process development, deployment, and execution system comprising: a development system that facilitates a user creating, modifying, saving and restoring a neural process specification and includes: a neural module library storing a plurality of module types including input type modules, output type modules, processing type modules, and memory type modules including at least one memory type module that adjusts an aspect of a stored memory pattern based on a degree of match of a combination of inputs to the at least one memory module with the memory pattern relative to a match threshold, an amount of the adjusting constrained by a local learning rate parameter that is determined based on parameters that are local to the at least one memory type module, wherein the parameters that are local to the at least one memory type module comprise a set of live expressions referring to and combining values of sharable graph parameters; and a design creation and editing canvas configured as a graphical design editor configured to define the neural process specification as a set of neural modules including the at least one memory type module connected by a set of neural links; a neural computing system that: provides deployment, running, managing, controlling, monitoring, or visualizing the neural process specification; processes the neural processing specification based on at least one link signal strength parameter and one or more of time-parameters or a set of dependency parameters; and includes and at least one of a link signal pattern memory storage sub-system or a memory sequence and matching sub-system; a user interface through which a user controls deploying the neural process specification to one or more neural computing system instances, the user interface supporting user control for a plurality of controls selected from a list consisting of starting, stopping, pausing, stepping and resuming execution, modifying execution parameters, modifying real or virtual execution rate of stamp increments, saving a neural process specification including current execution state, and restoring a saved neural process specification including a saved execution state; and an interface that facilitates concurrent access to the neural process specification by the development system, the neural computing system, and the user interface.

2. The system of claim 1, wherein the link signal pattern memory storage sub-system stores patterns detected that are outside of a pattern match score threshold.

3. The system of claim 1, wherein the memory sequence and matching sub-system produces pattern matching confidence for a plurality of patterns.

4. The system of claim 1, wherein the interface that facilitates concurrent access enables changes made to the neural process specification by a user of the development system to impact an instance of the neural process specification being executed by the neural computing system.

5. The system of claim 4, wherein the neural computing system adapts execution of the neural process specification responsive to the changes made to the neural process specification.

6. The system of claim 4, wherein changes made through one of the user interface or the development system cause a corresponding change in processing the neural process specification.

7. The system of claim 1, wherein the neural computing system pre-computes signal and module interdependencies based on the set of dependency parameters and invokes module functions that preserve those dependencies.

8. The system of claim 1, wherein the one or more neural computing system instances includes a neural process specification compiler.

9. The system of claim 1, wherein the one or more neural computing system instances includes a neural process specification configuration generator.

10. The system of claim 1, wherein the development system includes one or more of a text editor, a program editor, an outline editor, a graphical editor, an immersive environment, an experiential environment, and a virtual reality environment.

11. A system comprising: a development system that facilitates user manipulation of a neural process specification and including: a library of neural modules storing a plurality of module types including input type modules, output type modules, processing type modules, and memory type modules including at least one memory type module that adjusts an aspect of a stored memory pattern based on a degree of match of a combination of inputs to the at least one memory module with the memory pattern relative to a match threshold, an amount of the adjusting constrained by a local learning rate parameter that is determined based on parameters that are local to the at least one memory type module, wherein the parameters that are local to the at least one memory type module comprise a set of live expressions referring to and combining values of sharable graph parameters; and a specification design module configured for a user to define a neural process specification as a set of neural modules including the at least one memory type module connected by a set of neural links; a neural computing environment that provides two or more of deployment, running, managing, controlling, monitoring, visualizing, saving and restoring neural process specifications, wherein the neural computing environment processes the neural processing specification based on a plurality of parameters including time-parameters, a set of dependency parameters, and at least one link signal strength parameter; a user interface through which a user controls deploying the neural process specification to one or more neural computing environment instances, the user interface supporting user control for at least two of starting, stopping, pausing, stepping and resuming execution, modifying execution parameters, modifying real or virtual execution rate of stamp increments, saving a neural process specification including current execution state, and restoring a saved neural process specification including a saved execution state; and an interface that facilitates access to the neural process specification during development and execution thereof.

12. The system of claim 11, wherein the neural computing environment includes and at least one of a memory pattern storage sub-system or a memory sequence and matching sub-system.

13. The system of claim 12, wherein the memory pattern storage sub-system stores patterns detected that are outside of a pattern match score threshold.

14. The system of claim 12, wherein the memory sequence and matching sub-system produces pattern matching confidence for a plurality of patterns.

15. The system of claim 11, wherein the development system defines a first neural process specification for center-surround lateral inhibition visual process used by biological visual cortexes to highlight edges and the neural computing environment executes the first neural process specification by performing a center-surround matrix computation function.

16. The system of claim 11, wherein the development system defines a second neural process specification for working memory and the neural computing environment executes the second neural process specification by executing one of a working memory module from the library of neural modules or a filter module with a feedback loop.

17. A method of development, deployment, and execution of a neural process specification, the method comprising: storing, in a library of neural modules, a plurality of module types including input type modules, output type modules, processing type modules, and memory type modules including at least one memory type module that adjusts an aspect of a stored memory pattern based on a degree of match of a combination of inputs to the at least one memory module with the memory pattern relative to a match threshold, an amount of the adjusting constrained by a local learning rate parameter that is determined based on parameters that are local to the at least one memory type module, wherein the parameters that are local to the at least one memory type module comprise a set of live expressions referring to and combining values of sharable graph parameters; defining with a neural process specification development system the neural process specification as a set of neural modules including the at least one memory type module connected by a set of neural links; accessing the neural process specification through an interface that facilitates concurrently developing, deploying, and executing the neural process specification; deploying the neural process specification as an executable neural graph to an instance of a neural computing system that facilitates deployment, running, managing, controlling, monitoring, visualizing, saving and restoring neural process specifications; processing the neural process specification with the instance of a neural computing system based on a link signal strength parameter and one or more of a plurality of parameters including time-parameters or a set of dependency parameters, the processing including storing data patterns in a link signal pattern memory storage sub-system; and providing a user interface through which a user is enabled to control one or more aspects of the processing including starting, stopping, pausing, stepping and resuming processing, modifying one or more of the plurality of parameters, saving and restoring a saved neural process specification including a saved execution state, and deploying the neural process specification.

18. The method of claim 17, further comprising pre-computing signal and module interdependencies based on the set of dependency parameters and invoking module functions that preserve those dependencies.

19. The system of claim 1, wherein the values of sharable graph parameters dynamically adjust in response to an event impacting at least one of attention, concentration, focus, and sensitivity.

* * * * *